US007524910B2

(12) United States Patent
Jiang et al.

(10) Patent No.: US 7,524,910 B2
(45) Date of Patent: Apr. 28, 2009

(54) POLYOLEFIN ADHESIVE COMPOSITIONS AND ARTICLES MADE THEREFROM

(75) Inventors: Peijun Jiang, League City, TX (US); Keith Allen Nelson, Houston, TX (US); Christopher Lewis Curry, Seabrook, TX (US); Armenag Hagop Dekmezian, Kingwood, TX (US); Charles Lewis Sims, Houston, TX (US); Ramin Abhari, Friendswood, TX (US); Cesar Alberto Garcia-Franco, Houston, TX (US); Jo Ann Marie Canich, Houston, TX (US); Nicolas Kappes, Brussels (BE); Michel Louis Faissat, Waterloo (BE); Lutz Erich Jacob, Tervuren (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 510 days.

(21) Appl. No.: 10/686,951

(22) Filed: Oct. 15, 2003

(65) Prior Publication Data

US 2004/0127614 A1 Jul. 1, 2004

Related U.S. Application Data

(60) Provisional application No. 60/460,714, filed on Apr. 4, 2003, provisional application No. 60/418,482, filed on Oct. 15, 2002.

(51) Int. Cl.
*C08F 210/00* (2006.01)
(52) U.S. Cl. .................. 526/348; 524/570; 524/582; 526/351
(58) Field of Classification Search .............. 524/570, 524/582; 526/348, 351
See application file for complete search history.

(56) References Cited

U.S. PATENT DOCUMENTS

| | | | |
|---|---|---|---|
| 1,953,104 A | 4/1934 | Hale-Church et al. | |
| 3,483,276 A | 12/1969 | Mahlman | 260/897 |
| 3,821,143 A | 6/1974 | Cluff et al. | |
| 3,927,166 A | 12/1975 | Tomoda et al. | |
| 3,954,697 A | 5/1976 | McConnell et al. | |
| 4,178,272 A | 12/1979 | Meyer, Jr. et al. | |
| 4,205,021 A | 5/1980 | Morita et al. | |
| 4,210,570 A | 7/1980 | Trotter et al. | 260/33.6 AQ |
| 4,217,428 A | 8/1980 | McConnell et al. | |
| 4,361,628 A | 11/1982 | Krueger et al. | 428/475.8 |
| 4,476,283 A | 10/1984 | Andersen | 525/53 |
| 4,496,698 A | 1/1985 | Adriaans et al. | |
| 4,510,286 A | 4/1985 | Liu | 525/71 |
| 4,525,469 A | 6/1985 | Ueda et al. | |
| 4,547,552 A | 10/1985 | Toyota et al. | |
| 4,600,648 A | 7/1986 | Yazaki et al. | 428/412 |
| 4,668,752 A | 5/1987 | Tominari et al. | |
| 4,668,753 A | 5/1987 | Kashiwa et al. | |
| 4,668,834 A | 5/1987 | Rim et al. | |
| 4,673,719 A | 6/1987 | Kioka et al. | |
| 4,675,247 A | 6/1987 | Kitamura et al. | |
| 4,701,432 A | 10/1987 | Welborn, Jr. | |
| 4,719,260 A | 1/1988 | Stuart, Jr. et al. | |
| 4,725,506 A | 2/1988 | Nagano | |
| 4,737,548 A | 4/1988 | Kojima et al. | |
| 4,751,121 A | 6/1988 | Kuhnel et al. | |
| 4,774,144 A | 9/1988 | Jachec et al. | |
| 4,794,096 A | 12/1988 | Ewen | |
| 4,822,688 A | 4/1989 | Nogues | 428/458 |
| 4,826,939 A | 5/1989 | Stuart, Jr. | |
| 4,837,271 A | 6/1989 | Brindopke | |
| 4,849,487 A | 7/1989 | Kaminsky et al. | |
| 4,866,023 A | 9/1989 | Ritter et al. | |
| 4,882,406 A | 11/1989 | Cozewith et al. | |
| 4,886,853 A | 12/1989 | Foster et al. | |
| 4,892,851 A | 1/1990 | Ewen et al. | |
| 4,897,452 A | 1/1990 | Berrier et al. | |
| 4,929,509 A | 5/1990 | Godfrey | |
| 4,935,474 A | 6/1990 | Ewen et al. | |
| 4,937,299 A | 6/1990 | Ewen et al. | |

(Continued)

FOREIGN PATENT DOCUMENTS

CA 2157806 3/1997

(Continued)

OTHER PUBLICATIONS

Abstract of DE 2316614.

(Continued)

*Primary Examiner*—Edward J Cain

(57) ABSTRACT

Embodiments of the present invention relate to article comprising a polymer comprising one or more C3 to C40 olefins, optionally one or more diolefins, and less than 5 mole % of ethylene having a Dot T-Peel of 1 Newton or more, a branching index (g') of 0.95 or less measured at the Mz of the polymer; and an Mw of 100,000 or less. This invention further relates to a process to produce an olefin polymer comprising: 1) selecting a first catalyst component capable of producing a polymer having an Mw of 100,000 or less and a crystallinity of 20% or less; 2) selecting a second catalyst component capable of producing polymer having an Mw of 100,000 or less and a crystallinity of 40% or more; 3) contacting the catalyst components in the presence of one or more activators with one or more C3 to C40 olefins, in a reaction zone.

294 Claims, 10 Drawing Sheets

U.S. PATENT DOCUMENTS

| | | |
|---|---|---|
| 4,939,202 A | 7/1990 | Maletsky et al. |
| 4,939,217 A | 7/1990 | Stricklen |
| 4,942,096 A | 7/1990 | Abe et al. |
| 4,950,720 A | 8/1990 | Randall, Jr. et al. |
| 4,960,820 A | 10/1990 | Hwo |
| 4,975,403 A | 12/1990 | Ewen |
| 4,981,760 A | 1/1991 | Naito et al. |
| 5,008,356 A | 4/1991 | Ishimaru et al. |
| 5,021,257 A | 6/1991 | Foster et al. |
| 5,035,283 A | 7/1991 | Brücher et al. |
| 5,036,034 A | 7/1991 | Ewen |
| 5,039,614 A | 8/1991 | Dekmezian et al. |
| 5,041,251 A | 8/1991 | McCoskey et al. |
| 5,047,485 A | 9/1991 | DeNicola, Jr. |
| 5,077,129 A | 12/1991 | Schinkel et al. |
| 5,089,319 A | 2/1992 | Bothe |
| 5,091,352 A | 2/1992 | Kioka et al. |
| 5,096,743 A | 3/1992 | Schoenbeck |
| 5,100,963 A | 3/1992 | Lin |
| 5,108,680 A | 4/1992 | Menting et al. |
| 5,114,897 A | 5/1992 | Schell, Jr. et al. |
| 5,115,030 A | 5/1992 | Tanuka et al. |
| 5,116,881 A | 5/1992 | Park et al. |
| 5,118,566 A | 6/1992 | Wilhelm et al. |
| 5,132,157 A | 7/1992 | Asanuma et al. |
| 5,147,696 A | 9/1992 | Lansbury et al. |
| 5,149,579 A | 9/1992 | Park et al. |
| 5,151,474 A | 9/1992 | Lange et al. |
| 5,152,946 A | 10/1992 | Gillette |
| 5,155,080 A | 10/1992 | Elder et al. |
| 5,155,160 A | 10/1992 | Yeh et al. |
| 5,155,184 A | 10/1992 | Laurent et al. |
| 5,171,799 A | 12/1992 | Kioka et al. |
| 5,175,051 A | 12/1992 | Schloegl et al. |
| 5,185,398 A | 2/1993 | Kehr et al. |
| 5,202,361 A | 4/1993 | Zimmerman et al. |
| 5,204,037 A | 4/1993 | Fujii |
| 5,209,971 A | 5/1993 | Babu et al. |
| 5,212,247 A | 5/1993 | Asanuma et al. |
| 5,216,095 A | 6/1993 | Dolle et al. |
| 5,218,046 A | 6/1993 | Audureau et al. |
| 5,218,071 A | 6/1993 | Tsutsui et al. |
| 5,219,903 A | 6/1993 | Fujii et al. |
| 5,219,913 A | 6/1993 | Tomomatsu et al. |
| 5,219,968 A | 6/1993 | Shiomura et al. |
| 5,225,500 A | 7/1993 | Elder et al. |
| 5,231,126 A | 7/1993 | Shi et al. ............... 524/296 |
| 5,232,992 A | 8/1993 | Asanuma et al. |
| 5,236,649 A | 8/1993 | Hall et al. |
| 5,236,962 A | 8/1993 | Govoni et al. |
| 5,244,996 A | 9/1993 | Kawasaki et al. |
| 5,246,779 A | 9/1993 | Heimberg et al. |
| 5,252,659 A | 10/1993 | Koizumi et al. |
| 5,271,976 A | 12/1993 | Kondo et al. |
| 5,272,236 A | 12/1993 | Lai et al. |
| 5,278,216 A | 1/1994 | Asanuma et al. |
| 5,278,220 A | 1/1994 | Vermeire et al. |
| 5,286,564 A | 2/1994 | Cecchin et al. |
| 5,292,561 A | 3/1994 | Peiffer et al. |
| 5,300,361 A | 4/1994 | Vowinkel et al. |
| 5,308,817 A | 5/1994 | Reddy et al. |
| 5,310,584 A | 5/1994 | Jacoby et al. |
| 5,314,956 A | 5/1994 | Asanuma et al. |
| 5,317,036 A | 5/1994 | Brady, III et al. |
| 5,317,070 A | 5/1994 | Brant et al. |
| 5,326,824 A | 7/1994 | Asanuma et al. |
| 5,332,707 A | 7/1994 | Karayannis et al. |
| 5,334,677 A | 8/1994 | Razavi et al. |
| 5,336,746 A | 8/1994 | Tsutsui et al. |
| 5,346,773 A | 9/1994 | Simoens |
| 5,350,817 A | 9/1994 | Winter et al. |
| 5,354,619 A | 10/1994 | Babu |
| 5,359,102 A | 10/1994 | Inoue et al. |
| 5,367,022 A | 11/1994 | Kiang et al. |
| 5,368,919 A | 11/1994 | Robeson |
| 5,369,196 A | 11/1994 | Matsumoto et al. |
| 5,373,059 A | 12/1994 | Asanuma et al. |
| 5,374,685 A | 12/1994 | Asanuma et al. |
| 5,374,700 A | 12/1994 | Tsutsui et al. |
| 5,397,843 A | 3/1995 | Lakshmanan et al. |
| 5,403,667 A | 4/1995 | Simoens |
| 5,410,003 A | 4/1995 | Bai |
| 5,412,020 A | 5/1995 | Yamamoto et al. |
| 5,414,027 A | 5/1995 | DeNicola, Jr. et al. |
| 5,416,228 A | 5/1995 | Ewen et al. |
| 5,430,070 A | 7/1995 | Kono |
| 5,434,115 A | 7/1995 | Yamada et al. |
| 5,439,994 A | 8/1995 | Inoue et al. |
| 5,441,807 A | 8/1995 | Brandt et al. |
| 5,455,300 A | 10/1995 | Smith |
| 5,455,305 A | 10/1995 | Galambos |
| 5,459,217 A | 10/1995 | Todo et al. |
| 5,459,218 A | 10/1995 | Palackal et al. |
| 5,464,905 A | 11/1995 | Tsutsui et al. |
| 5,468,440 A | 11/1995 | McAlpin et al. |
| 5,468,560 A | 11/1995 | McPherson et al. |
| 5,468,807 A | 11/1995 | Tsurutani et al. |
| 5,475,075 A | 12/1995 | Brant et al. |
| 5,476,911 A | 12/1995 | Morini et al. |
| 5,478,646 A | 12/1995 | Asanuma et al. |
| 5,478,891 A | 12/1995 | Lakshmanan et al. |
| 5,480,848 A | 1/1996 | Geerts |
| 5,480,942 A | 1/1996 | Addeo et al. |
| 5,483,002 A | 1/1996 | Seelert et al. |
| 5,500,284 A | 3/1996 | Burgin et al. |
| 5,504,171 A | 4/1996 | Etherton et al. |
| 5,504,172 A | 4/1996 | Imuta et al. |
| 5,512,612 A | 4/1996 | Brown et al. |
| 5,514,460 A | 5/1996 | Surman et al. |
| 5,516,583 A | 5/1996 | Zhang et al. |
| 5,516,848 A | 5/1996 | Canich et al. |
| 5,519,091 A | 5/1996 | Tsutsui et al. |
| 5,521,251 A | 5/1996 | Satoh et al. |
| 5,525,689 A | 6/1996 | Tsutsui et al. |
| 5,527,846 A | 6/1996 | Christell et al. |
| 5,529,843 A | 6/1996 | Dries et al. |
| 5,529,850 A | 6/1996 | Morini et al. |
| 5,529,943 A | 6/1996 | Hong et al. |
| 5,530,054 A | 6/1996 | Tse et al. |
| 5,532,396 A | 7/1996 | Winter et al. |
| 5,534,473 A | 7/1996 | Welch et al. |
| 5,534,595 A | 7/1996 | Asanuma et al. |
| 5,536,773 A | 7/1996 | Yamada et al. |
| 5,539,056 A | 7/1996 | Yang et al. |
| 5,539,066 A | 7/1996 | Winter et al. |
| 5,541,260 A | 7/1996 | Pelliconi et al. |
| 5,541,262 A | 7/1996 | Brichta et al. |
| 5,543,373 A | 8/1996 | Winter et al. |
| 5,547,766 A | 8/1996 | Gobran |
| 5,548,007 A | 8/1996 | Asanuma et al. |
| 5,548,008 A | 8/1996 | Asanuma et al. |
| 5,548,014 A | 8/1996 | Tse et al. |
| 5,552,489 A | 9/1996 | Merrill et al. |
| 5,554,668 A | 9/1996 | Scheve et al. |
| 5,556,920 A | 9/1996 | Tanaka et al. |
| 5,559,165 A | 9/1996 | Paul |
| 5,565,533 A | 10/1996 | Galimberti et al. |
| 5,565,534 A | 10/1996 | Aulbach et al. |
| 5,571,613 A | 11/1996 | Schuhmann et al. |
| 5,574,082 A | 11/1996 | Keller et al. |
| 5,576,259 A | 11/1996 | Hasegawa et al. |
| 5,576,260 A | 11/1996 | Winter et al. |
| 5,578,743 A | 11/1996 | Ho et al. |
| 5,579,913 A | 12/1996 | Yamada et al. |

| | | | | | |
|---|---|---|---|---|---|
| 5,585,448 A | 12/1996 | Resconi et al. | 5,741,868 A | 4/1998 | Winter et al. |
| 5,585,508 A | 12/1996 | Küber et al. | 5,747,160 A | 5/1998 | Pinoca et al. |
| 5,587,501 A | 12/1996 | Winter et al. | 5,747,405 A | 5/1998 | Little et al. |
| 5,591,785 A | 1/1997 | Scheve et al. | 5,747,620 A | 5/1998 | Machida et al. |
| 5,591,817 A | 1/1997 | Asanuma et al. | 5,747,621 A | 5/1998 | Resconi et al. |
| 5,594,074 A | 1/1997 | Hwo et al. | 5,753,769 A | 5/1998 | Ueda et al. |
| 5,594,078 A | 1/1997 | Welch et al. | 5,753,771 A | 5/1998 | Xie |
| 5,594,080 A | 1/1997 | Waymouth et al. | 5,756,141 A | 5/1998 | Chen et al. |
| 5,594,172 A | 1/1997 | Shirnohara | 5,756,169 A | 5/1998 | Peiffer et al. |
| 5,595,827 A | 1/1997 | Yamada et al. | 5,756,614 A | 5/1998 | Chien et al. |
| 5,596,052 A | 1/1997 | Resconi et al. | 5,759,469 A | 6/1998 | Asanuma et al. |
| 5,599,881 A | 2/1997 | Xie | 5,760,028 A | 6/1998 | Jadhav et al. |
| 5,599,885 A | 2/1997 | Kawasaki et al. | 5,763,349 A | 6/1998 | Zandona |
| 5,602,223 A | 2/1997 | Sasaki et al. | 5,763,516 A | 6/1998 | Godfrey |
| 5,605,969 A | 2/1997 | Tsutsui et al. | 5,767,031 A | 6/1998 | Shamshoum et al. |
| 5,610,254 A | 3/1997 | Sagune et al. | 5,767,032 A | 6/1998 | Hokkanen et al. |
| 5,612,428 A | 3/1997 | Winter et al. | 5,767,033 A | 6/1998 | Imuta et al. |
| 5,618,369 A | 4/1997 | Peiffer et al. | 5,767,300 A | 6/1998 | Aulbach et al. |
| 5,618,883 A | 4/1997 | Plamthottam et al. | 5,773,129 A | 6/1998 | Wakamatsu et al. |
| 5,621,046 A | 4/1997 | Iwanami et al. | 5,773,142 A | 6/1998 | Murschall et al. |
| 5,622,760 A | 4/1997 | Leiss | 5,773,516 A | 6/1998 | Huffer et al. |
| 5,629,254 A | 5/1997 | Fukuoka et al. | 5,773,544 A | 6/1998 | Christell et al. |
| 5,631,202 A | 5/1997 | Ewen | 5,776,851 A | 7/1998 | Küber et al. |
| 5,633,010 A | 5/1997 | Chen | 5,777,055 A | 7/1998 | Peiffer et al. |
| 5,633,018 A | 5/1997 | Stouffer et al. | 5,780,168 A | 7/1998 | Satoh et al. |
| 5,639,842 A | 6/1997 | Tsutsui et al. | 5,792,549 A | 8/1998 | Wilkie |
| 5,641,848 A | 6/1997 | Giacobbe et al. | 5,795,941 A | 8/1998 | Cree et al. |
| 5,643,846 A | 7/1997 | Reddy et al. | 5,795,946 A | 8/1998 | Agarwal et al. |
| 5,648,428 A | 7/1997 | Reddy et al. | 5,798,175 A | 8/1998 | Tynan, Jr. et al. |
| 5,652,308 A | 7/1997 | Merrill et al. | 5,804,304 A | 9/1998 | Williams et al. |
| 5,658,997 A | 8/1997 | Fukuoka et al. | 5,804,524 A | 9/1998 | Reddy et al. |
| 5,661,096 A | 8/1997 | Winter et al. | 5,804,623 A | 9/1998 | Hoffmann et al. |
| 5,663,232 A | 9/1997 | Seppanen et al. | 5,804,665 A | 9/1998 | Watanabe et al. |
| 5,663,249 A | 9/1997 | Ewen | 5,807,948 A | 9/1998 | Sugane et al. |
| 5,665,469 A | 9/1997 | Brandt et al. | 5,817,590 A | 10/1998 | Hasegawa et al. |
| 5,667,902 A | 9/1997 | Brew et al. | 5,817,725 A | 10/1998 | Zandona |
| 5,670,436 A | 9/1997 | Herrmann et al. | 5,824,753 A | 10/1998 | Naganuma et al. |
| 5,672,668 A | 9/1997 | Winter et al. | 5,827,252 A | 10/1998 | Werenicz et al. |
| 5,677,068 A | 10/1997 | Ghirardo et al. | 5,834,393 A | 11/1998 | Jacobsen et al. |
| 5,683,818 A | 11/1997 | Bolvari | 5,834,538 A | 11/1998 | deHullu et al. |
| 5,684,099 A | 11/1997 | Watanabe et al. | 5,834,562 A | 11/1998 | Silvestri et al. |
| 5,686,533 A | 11/1997 | Gahleitner et al. | 5,840,783 A | 11/1998 | Momchilovich et al. |
| 5,693,730 A | 12/1997 | Küber et al. | 5,840,815 A | 11/1998 | Tsutsui et al. |
| 5,693,836 A | 12/1997 | Winter et al. | 5,843,577 A | 12/1998 | Ouhadi et al. |
| 5,696,045 A | 12/1997 | Winter et al. | 5,844,037 A | 12/1998 | Lundgard et al. |
| 5,696,049 A | 12/1997 | Ikeyama et al. | 5,846,558 A | 12/1998 | Nielsen et al. |
| 5,698,651 A | 12/1997 | Kawasaki et al. | 5,846,654 A | 12/1998 | Modrak |
| 5,700,886 A | 12/1997 | Winter et al. | 5,846,896 A | 12/1998 | Ewen |
| 5,700,895 A | 12/1997 | Kanda et al. | 5,846,918 A | 12/1998 | Meijer et al. |
| 5,703,172 A | 12/1997 | Watanabe et al. | 5,847,059 A | 12/1998 | Shamshoum et al. |
| 5,703,180 A | 12/1997 | Tsutsui et al. | 5,849,409 A | 12/1998 | Pinoca et al. |
| 5,705,565 A | 1/1998 | Hughes et al. | 5,851,610 A | 12/1998 | Ristey et al. |
| 5,705,568 A | 1/1998 | Gahleitner et al. | 5,852,100 A | 12/1998 | Sadatoshi et al. |
| 5,705,579 A | 1/1998 | Hawley et al. | 5,852,116 A | 12/1998 | Cree et al. |
| 5,705,584 A | 1/1998 | Fukuoka et al. | 5,854,354 A | 12/1998 | Ueda et al. |
| 5,709,937 A | 1/1998 | Adams et al. | 5,856,400 A | 1/1999 | Matsumura et al. |
| 5,710,223 A | 1/1998 | Fukuoka et al. | 5,856,406 A | 1/1999 | Silvis et al. |
| 5,712,323 A | 1/1998 | Braga et al. | 5,858,293 A | 1/1999 | Yoo |
| 5,714,256 A | 2/1998 | DeLucia et al. | 5,859,088 A | 1/1999 | Peterson et al. |
| 5,714,426 A | 2/1998 | Tsutsui et al. | 5,859,139 A | 1/1999 | Addeo et al. |
| 5,714,427 A | 2/1998 | Winter et al. | 5,861,211 A | 1/1999 | Thakkar et al. |
| 5,716,570 A | 2/1998 | Peiffer et al. | 5,861,474 A | 1/1999 | Weller et al. |
| 5,716,698 A | 2/1998 | Schreck et al. | 5,863,665 A | 1/1999 | Kale et al. |
| 5,719,235 A | 2/1998 | Zandona | 5,863,994 A | 1/1999 | DeNicola, Jr. et al. |
| 5,719,241 A | 2/1998 | Razavi et al. | 5,866,663 A | 2/1999 | Brookhart et al. |
| 5,723,546 A | 3/1998 | Sustic | 5,867,316 A | 2/1999 | Carlson et al. |
| 5,723,640 A | 3/1998 | Fukuoka et al. | 5,869,555 A | 2/1999 | Simmons et al. |
| 5,731,362 A | 3/1998 | Scheve et al. | 5,874,505 A | 2/1999 | Saito et al. |
| 5,739,220 A | 4/1998 | Shamshoum et al. | 5,874,513 A | 2/1999 | Watanabe et al. |
| 5,739,225 A | 4/1998 | Tazaki et al. | 5,876,855 A | 3/1999 | Wong et al. |
| 5,739,366 A | 4/1998 | Imuta et al. | 5,880,056 A | 3/1999 | Tsutsui et al. |
| 5,741,563 A | 4/1998 | Mehta et al. | 5,880,241 A | 3/1999 | Brookhart et al. |
| 5,741,565 A | 4/1998 | Coosemans et al. | 5,880,323 A | 3/1999 | Brookhart, III et al. |

| Patent No. | Date | Inventor |
|---|---|---|
| 5,882,774 A | 3/1999 | Jonza et al. |
| 5,882,782 A | 3/1999 | Tsubone |
| 5,883,204 A | 3/1999 | Spencer et al. |
| 5,883,205 A | 3/1999 | Tsutsui et al. |
| 5,886,123 A | 3/1999 | Resconi et al. |
| 5,886,224 A | 3/1999 | Brookhart et al. |
| 5,888,607 A | 3/1999 | Seth et al. |
| 5,888,636 A | 3/1999 | Asanuma et al. |
| 5,891,946 A | 4/1999 | Nohara et al. |
| 5,891,963 A | 4/1999 | Brookhart et al. |
| 5,891,976 A | 4/1999 | Costa et al. |
| 5,900,294 A | 5/1999 | Murschall et al. |
| 5,902,848 A | 5/1999 | Burgin et al. |
| 5,910,136 A | 6/1999 | Hetzler et al. |
| 5,910,362 A | 6/1999 | Aratake et al. |
| 5,911,023 A | 6/1999 | Risch et al. |
| 5,914,079 A | 6/1999 | Peiffer et al. |
| 5,914,376 A | 6/1999 | Herrmann et al. |
| 5,916,974 A | 6/1999 | Song et al. |
| 5,916,988 A | 6/1999 | Tsutsui et al. |
| 5,916,989 A | 6/1999 | Brookhart, III et al. |
| 5,916,990 A | 6/1999 | Yanagihara et al. |
| 5,919,864 A | 7/1999 | Watanabe et al. |
| 5,919,983 A | 7/1999 | Rosen et al. |
| 5,922,823 A | 7/1999 | Sagane et al. |
| 5,932,157 A | 8/1999 | Dries et al. |
| 5,936,051 A | 8/1999 | Santi et al. |
| 5,936,053 A | 8/1999 | Fukuoka et al. |
| 5,942,451 A | 8/1999 | Daponte et al. |
| 5,942,569 A | 8/1999 | Simmons et al. |
| 5,942,586 A | 8/1999 | Herrmann et al. |
| 5,945,496 A | 8/1999 | Resconi et al. |
| 5,947,944 A | 9/1999 | Hetzler et al. |
| 5,959,046 A | 9/1999 | Imuta et al. |
| 5,961,782 A | 10/1999 | Luu et al. |
| 5,969,070 A | 10/1999 | Waymouth et al. |
| 5,969,217 A | 10/1999 | Rhodes |
| 5,972,490 A | 10/1999 | Crighton et al. |
| 5,973,078 A | 10/1999 | Pinoca et al. |
| 5,973,084 A | 10/1999 | Suga et al. |
| 5,977,251 A | 11/1999 | Kao et al. |
| 5,977,260 A | 11/1999 | Ciaccia et al. |
| 5,983,604 A | 11/1999 | Wilfong et al. |
| 5,985,193 A | 11/1999 | Harrington et al. |
| 5,985,426 A | 11/1999 | Wilkie |
| 5,986,024 A | 11/1999 | Wilson, Jr. |
| 5,986,651 A | 11/1999 | Reber et al. |
| 5,990,331 A | 11/1999 | Winter et al. |
| 5,994,437 A | 11/1999 | Lebez et al. |
| 5,997,981 A | 12/1999 | McCormack et al. |
| 5,998,547 A | 12/1999 | Hohner |
| 6,002,033 A | 12/1999 | Razawi et al. |
| 6,004,897 A | 12/1999 | Imuta et al. |
| 6,005,049 A | 12/1999 | Rebhan et al. |
| 6,008,262 A | 12/1999 | McKay et al. |
| 6,017,842 A | 1/2000 | Rosen et al. |
| 6,028,152 A | 2/2000 | Winter et al. |
| 6,033,514 A | 3/2000 | Davis et al. |
| 6,034,164 A | 3/2000 | Elspass et al. |
| 6,034,165 A | 3/2000 | Tomomatsu et al. |
| 6,034,259 A | 3/2000 | Brookhart et al. |
| 6,040,348 A | 3/2000 | Delaite et al. |
| 6,040,407 A | 3/2000 | Ishida et al. |
| 6,040,469 A | 3/2000 | Riedel et al. |
| 6,042,930 A | 3/2000 | Kelch et al. |
| 6,045,922 A | 4/2000 | Janssen et al. |
| 6,046,273 A | 4/2000 | Syed |
| 6,048,942 A | 4/2000 | Buehler et al. |
| 6,054,542 A | 4/2000 | Kojoh et al. |
| 6,054,544 A | 4/2000 | Finlayson et al. |
| 6,057,413 A | 5/2000 | Ima et al. |
| 6,060,139 A | 5/2000 | Peiffer et al. |
| 6,060,561 A | 5/2000 | Wolfschwenger et al. |
| 6,060,584 A | 5/2000 | Neely et al. |
| 6,063,482 A | 5/2000 | Peiffer et al. |
| 6,063,483 A | 5/2000 | Peiffer et al. |
| 6,063,838 A | 5/2000 | Patnode et al. |
| 6,069,213 A | 5/2000 | Nemzek et al. |
| 6,071,598 A | 6/2000 | Peiffer et al. |
| 6,077,907 A | 6/2000 | Raetzsch et al. |
| 6,080,818 A | 6/2000 | Thakker et al. |
| 6,084,010 A * | 7/2000 | Baetzold et al. ............. 523/210 |
| 6,084,041 A | 7/2000 | Andtsjo et al. |
| 6,084,048 A | 7/2000 | Hozumi et al. |
| 6,086,982 A | 7/2000 | Peiffer et al. |
| 6,087,459 A | 7/2000 | Miro et al. |
| 6,090,325 A | 7/2000 | Wheat et al. |
| 6,090,903 A | 7/2000 | Kataoka et al. |
| 6,096,843 A | 8/2000 | Saito et al. |
| 6,100,351 A | 8/2000 | Sun et al. |
| 6,100,353 A | 8/2000 | Lynch et al. |
| 6,107,422 A | 8/2000 | Wang et al. |
| 6,107,430 A | 8/2000 | Dubois et al. |
| 6,107,431 A | 8/2000 | Resconi et al. |
| 6,110,986 A | 8/2000 | Nozawa et al. |
| 6,113,996 A | 9/2000 | Amon et al. |
| 6,114,261 A | 9/2000 | Strelow et al. |
| 6,114,457 A | 9/2000 | Markel et al. |
| 6,114,477 A | 9/2000 | Merrill et al. |
| 6,117,962 A | 9/2000 | Weng et al. |
| 6,121,185 A | 9/2000 | Rosen et al. |
| 6,121,377 A | 9/2000 | Chien |
| 6,121,393 A | 9/2000 | Kioka et al. |
| 6,121,401 A | 9/2000 | Yamamoto et al. |
| 6,121,402 A | 9/2000 | Machida et al. |
| 6,124,231 A | 9/2000 | Fritze et al. |
| 6,124,400 A | 9/2000 | Chien |
| 6,127,484 A | 10/2000 | Cribbs et al. |
| 6,140,439 A | 10/2000 | Brookhart et al. |
| 6,143,683 A | 11/2000 | Shamshoum et al. |
| 6,143,825 A | 11/2000 | Beren et al. |
| 6,143,844 A | 11/2000 | Hokkanen et al. |
| 6,143,846 A | 11/2000 | Herrmann et al. |
| 6,147,174 A | 11/2000 | Holtcamp et al. |
| 6,147,180 A | 11/2000 | Markel et al. |
| 6,150,481 A | 11/2000 | Winter et al. |
| 6,153,549 A | 11/2000 | Hubscher et al. |
| 6,156,844 A | 12/2000 | Hashimoto et al. |
| 6,156,846 A | 12/2000 | Tsuruoka et al. |
| 6,159,888 A | 12/2000 | Welch et al. |
| 6,162,871 A | 12/2000 | Watanabe et al. |
| 6,166,161 A | 12/2000 | Mullins et al. |
| 6,174,930 B1 | 1/2001 | Agarwal et al. |
| 6,174,946 B1 | 1/2001 | Rubenacker et al. |
| 6,174,974 B1 | 1/2001 | Starzewski et al. |
| 6,177,190 B1 | 1/2001 | Gehlsen et al. |
| 6,177,377 B1 | 1/2001 | Chien |
| 6,177,526 B1 | 1/2001 | Fritze |
| 6,177,527 B1 | 1/2001 | Sishta et al. |
| 6,180,229 B1 | 1/2001 | Becker et al. |
| 6,180,732 B1 | 1/2001 | Ewen |
| 6,184,327 B1 | 2/2001 | Weng et al. |
| 6,190,760 B1 | 2/2001 | Nagai et al. |
| 6,191,241 B1 | 2/2001 | Starzewski et al. |
| 6,197,910 B1 | 3/2001 | Weng et al. |
| 6,207,606 B1 | 3/2001 | Lue et al. |
| 6,207,746 B1 | 3/2001 | Uchida et al. |
| 6,207,748 B1 | 3/2001 | Tse et al. |
| 6,207,750 B1 | 3/2001 | Lin et al. |
| 6,207,773 B1 | 3/2001 | Ting et al. |
| 6,210,764 B1 | 4/2001 | Hayes |
| 6,211,110 B1 | 4/2001 | Santi et al. |
| 6,214,447 B1 | 4/2001 | Nakagawa et al. |
| 6,214,948 B1 | 4/2001 | Zandona |
| 6,214,949 B1 | 4/2001 | Reddy et al. |
| 6,214,952 B1 | 4/2001 | Sadatoshi et al. |

| Patent No. | Date | Inventor |
|---|---|---|
| 6,218,457 B1 | 4/2001 | Fralich et al. |
| 6,218,488 B1 | 4/2001 | Schiggino et al. |
| 6,218,493 B1 | 4/2001 | Johnson et al. |
| 6,221,802 B1 | 4/2001 | Costa et al. |
| 6,221,981 B1 | 4/2001 | Jung et al. |
| 6,225,411 B1 | 5/2001 | Dang et al. |
| 6,225,432 B1 | 5/2001 | Weng et al. |
| 6,228,948 B1 | 5/2001 | Flaris et al. |
| 6,238,732 B1 | 5/2001 | Cameron et al. |
| 6,245,856 B1 | 6/2001 | Kaufman et al. |
| 6,248,829 B1 | 6/2001 | Fischer et al. |
| 6,248,832 B1 | 6/2001 | Peacock |
| 6,248,845 B1 | 6/2001 | Loveday et al. |
| 6,251,997 B1 | 6/2001 | Imai et al. |
| 6,251,998 B1 | 6/2001 | Medsker et al. |
| 6,255,246 B1 | 7/2001 | Devore et al. |
| 6,255,395 B1 | 7/2001 | Klosiewicz |
| 6,255,414 B1 | 7/2001 | Ittel et al. |
| 6,255,425 B1 | 7/2001 | Asanuma et al. |
| 6,255,426 B1 | 7/2001 | Lue et al. |
| 6,258,903 B1 | 7/2001 | Mawson et al. |
| 6,262,203 B1 | 7/2001 | Chien et al. |
| 6,265,512 B1 | 7/2001 | Siedle et al. |
| 6,268,062 B1 | 7/2001 | DeMeuse |
| 6,268,445 B1 | 7/2001 | McAdon et al. |
| 6,268,453 B1 | 7/2001 | Köppl et al. |
| 6,271,164 B1 | 8/2001 | Fritze et al. |
| 6,271,310 B1 | 8/2001 | Okayama et al. |
| 6,271,323 B1 | 8/2001 | Loveday et al. |
| 6,274,678 B1 | 8/2001 | Shinozaki et al. |
| 6,277,479 B1 | 8/2001 | Campbell et al. |
| 6,277,934 B1 | 8/2001 | Kondoh et al. |
| 6,281,289 B1 | 8/2001 | Maugans et al. |
| 6,284,814 B1 | 9/2001 | Gupta |
| 6,284,820 B1 | 9/2001 | Braga et al. |
| 6,284,857 B1 | 9/2001 | Shinozaki et al. |
| 6,287,658 B1 | 9/2001 | Cosentino et al. |
| 6,287,705 B1 | 9/2001 | Seta et al. |
| 6,288,189 B1 | 9/2001 | Brown et al. |
| 6,291,063 B1 | 9/2001 | Shah et al. |
| 6,294,611 B1 | 9/2001 | Takayanagi et al. |
| 6,294,632 B1 | 9/2001 | Shiraishi et al. |
| 6,297,301 B1 | 10/2001 | Erderly et al. |
| 6,300,398 B1 | 10/2001 | Jialanella et al. |
| 6,300,419 B1 | 10/2001 | Sehanobish et al. |
| 6,300,451 B1 | 10/2001 | Mehta et al. |
| 6,303,696 B1 | 10/2001 | Ushioda et al. |
| 6,306,970 B1 | 10/2001 | Dang et al. |
| 6,310,140 B1 | 10/2001 | Raetzsch et al. |
| 6,310,163 B1 | 10/2001 | Brookhart et al. |
| 6,313,184 B1 | 11/2001 | Sasaki et al. |
| 6,319,979 B1 | 11/2001 | Dubois et al. |
| 6,319,991 B1 | 11/2001 | Okayama et al. |
| 6,319,998 B1 | 11/2001 | Cozewith et al. |
| 6,323,151 B1 | 11/2001 | Siedle et al. |
| 6,323,284 B1 | 11/2001 | Peacock |
| 6,323,286 B1 | 11/2001 | Kuramochi et al. |
| 6,325,956 B2 | 12/2001 | Chaudhary et al. |
| 6,326,426 B1 | 12/2001 | Ellul |
| 6,326,427 B1 | 12/2001 | Birnbrich et al. |
| 6,326,432 B1 | 12/2001 | Fujita et al. |
| 6,326,444 B2 | 12/2001 | Lynch et al. |
| 6,329,313 B1 | 12/2001 | Fritze et al. |
| 6,329,454 B1 | 12/2001 | Krabbenborg |
| 6,329,468 B1 | 12/2001 | Wang |
| 6,331,590 B1 | 12/2001 | Herrmann et al. |
| 6,331,595 B1 | 12/2001 | Mitchell et al. |
| 6,339,109 B1 | 1/2002 | Day et al. |
| 6,339,136 B1 | 1/2002 | Huikku et al. |
| 6,340,703 B1 | 1/2002 | Kelly |
| 6,340,730 B1 | 1/2002 | Murray et al. |
| 6,342,574 B1 | 1/2002 | Weng et al. |
| 6,346,580 B1 | 2/2002 | Fujita et al. |
| 6,348,272 B1 | 2/2002 | Haveaux et al. |
| 6,350,791 B1 | 2/2002 | Feichtmeier et al. |
| 6,350,828 B1 | 2/2002 | Takaoka et al. |
| 6,350,829 B1 | 2/2002 | Lynch et al. |
| 6,350,830 B1 | 2/2002 | Göres et al. |
| 6,352,948 B1 | 3/2002 | Pike et al. |
| 6,355,747 B1 | 3/2002 | Rausch et al. |
| 6,359,077 B1 | 3/2002 | Avgousti et al. |
| 6,359,095 B1 | 3/2002 | Winter et al. |
| 6,362,125 B1 | 3/2002 | Shamshoum et al. |
| 6,365,763 B1 | 4/2002 | Winter et al. |
| 6,365,779 B2 | 4/2002 | Devore et al. |
| 6,368,708 B1 | 4/2002 | Brown et al. |
| 6,369,175 B1 | 4/2002 | Ewen |
| 6,369,176 B1 | 4/2002 | Laughner et al. |
| 6,376,410 B1 | 4/2002 | Burkhardt et al. |
| 6,376,416 B1 | 4/2002 | Hirakawa et al. |
| 6,380,327 B1 | 4/2002 | Teasley |
| 6,391,974 B1 | 5/2002 | Ogawa et al. |
| 6,395,831 B1 | 5/2002 | Pelliconi et al. |
| 6,399,531 B1 | 6/2002 | Job et al. |
| 6,403,677 B1 | 6/2002 | Walker |
| 6,403,708 B2 | 6/2002 | Moriya et al. |
| 6,403,855 B1 | 6/2002 | Mertens |
| 6,407,168 B1 | 6/2002 | Sugita et al. |
| 6,407,177 B1 | 6/2002 | Shamshoum et al. |
| 6,407,189 B1 | 6/2002 | Herrmann |
| 6,413,899 B1 | 7/2002 | Dolle et al. |
| 6,416,699 B1 | 7/2002 | Gownder et al. |
| 6,417,240 B1 | 7/2002 | Park |
| 6,417,242 B1 | 7/2002 | Hughes et al. |
| 6,417,275 B2 | 7/2002 | Takayanagi et al. |
| 6,420,516 B1 | 7/2002 | Tau et al. |
| 6,423,793 B1 | 7/2002 | Weng et al. |
| 6,423,800 B1 | 7/2002 | Musgrave |
| 6,426,026 B1 | 7/2002 | Avgousti et al. |
| 6,429,274 B1 | 8/2002 | Siedle et al. |
| 6,430,898 B1 | 8/2002 | Remmers et al. |
| 6,433,087 B1 | 8/2002 | Ebner et al. |
| 6,441,094 B1 | 8/2002 | Cecchin et al. |
| 6,444,301 B1 | 9/2002 | Davidson et al. |
| 6,448,301 B1 | 9/2002 | Gaddam et al. |
| 6,448,302 B1 | 9/2002 | Dawson et al. |
| 6,448,358 B1 | 9/2002 | Siedle et al. |
| 6,455,614 B1 | 9/2002 | Jackson et al. |
| 6,455,630 B1 | 9/2002 | Rigosi et al. |
| 6,455,634 B1 | 9/2002 | Khandpur et al. |
| 6,455,643 B1 | 9/2002 | Harlin et al. |
| 6,458,877 B1 | 10/2002 | Ahmed et al. |
| 6,465,558 B2 | 10/2002 | Scheibelhoffer et al. |
| 6,469,110 B1 | 10/2002 | Harlin et al. |
| 6,472,473 B1 | 10/2002 | Ansems et al. |
| 6,472,477 B2 | 10/2002 | Kanzaki et al. |
| 6,476,135 B1 | 11/2002 | Bugada et al. |
| 6,482,907 B1 | 11/2002 | Wang et al. |
| 6,486,246 B1 | 11/2002 | Vion |
| 6,489,426 B1 | 12/2002 | Kawamoto et al. |
| 6,492,465 B1 | 12/2002 | Burkhardt et al. |
| 6,495,646 B1 | 12/2002 | Arthur et al. |
| 6,500,540 B1 | 12/2002 | Langohr et al. |
| 6,503,993 B1 | 1/2003 | Huovinen et al. |
| 6,506,839 B1 | 1/2003 | Nishihara et al. |
| 6,506,847 B1 | 1/2003 | Song |
| 6,509,107 B2 | 1/2003 | Ding et al. |
| 6,509,288 B1 | 1/2003 | Dorer et al. |
| 6,511,755 B1 | 1/2003 | Mochizuki et al. |
| 6,512,019 B1 | 1/2003 | Agarwal et al. |
| 6,512,050 B2 | 1/2003 | Kanamori et al. |
| 6,515,086 B1 | 2/2003 | Razavi |
| 6,518,327 B1 | 2/2003 | Dang et al. |
| 6,518,386 B1 | 2/2003 | Resconi et al. |
| 6,521,675 B1 | 2/2003 | Wu et al. |
| 6,521,693 B2 | 2/2003 | Saito et al. |

| | | | | | | |
|---|---|---|---|---|---|---|
| 6,525,157 B2 | 2/2003 | Cozewith et al. ............ 526/348 | | 6,758,994 B2 | 7/2004 | Gownder et al. |
| 6,528,448 B1 | 3/2003 | Jensen et al. | | 6,759,475 B2 | 7/2004 | Sakai et al. |
| 6,534,608 B2 | 3/2003 | Peterson et al. | | 6,759,500 B1 | 7/2004 | Dolle et al. |
| 6,537,478 B1 | 3/2003 | Grasmeder et al. | | 6,770,355 B1 | 8/2004 | Minami et al. |
| 6,537,652 B1 | 3/2003 | Kochem et al. | | 6,770,714 B2 | 8/2004 | Ommundsen et al. |
| 6,545,072 B2 | 4/2003 | Tamura et al. | | 6,774,069 B2 | 8/2004 | Zhou et al. ................ 442/328 |
| 6,545,099 B2 | 4/2003 | Shinozaki et al. | | 6,777,067 B1 | 8/2004 | Speith-Herfurth et al. |
| 6,545,108 B1 | 4/2003 | Moody et al. | | 6,777,476 B2 | 8/2004 | Jeong et al. |
| 6,548,579 B2 | 4/2003 | Reski et al. | | 6,777,497 B2 | 8/2004 | Kanzaki et al. |
| 6,551,955 B1 | 4/2003 | Diefenbach | | 6,780,936 B1 | 8/2004 | Agarwal et al. |
| 6,555,643 B1 | 4/2003 | Rieger | | 6,784,250 B2 | 8/2004 | Kijima |
| 6,559,211 B2 | 5/2003 | Zhao et al. | | 6,784,252 B2 | 8/2004 | Ramanathan et al. |
| 6,562,886 B1 | 5/2003 | Minami et al. | | 6,784,269 B2 | 8/2004 | Lin et al. |
| 6,562,914 B1 | 5/2003 | Andtsjo et al. | | 6,790,922 B2 | 9/2004 | Rieger |
| 6,569,915 B1 | 5/2003 | Jackson et al. | | 6,797,371 B1 | 9/2004 | Gehlsen et al. |
| 6,569,934 B2 | 5/2003 | Noel, III | | 6,797,774 B2 | 9/2004 | Kijima |
| 6,569,945 B2 | 5/2003 | Bugada et al. | | 6,800,669 B2 | 10/2004 | Thoen et al. |
| 6,569,965 B2 | 5/2003 | Markel et al. | | 6,800,681 B2 | 10/2004 | Ohkawa et al. |
| 6,573,344 B1 | 6/2003 | Hawley et al. | | 6,800,700 B2 | 10/2004 | Sun |
| 6,573,350 B1 * | 6/2003 | Markel et al. ............... 526/348 | | 6,800,703 B1 | 10/2004 | Reinking et al. |
| 6,573,352 B1 | 6/2003 | Tatsumi et al. | | 6,800,706 B1 | 10/2004 | Kanamaru et al. |
| 6,576,306 B2 | 6/2003 | Mehta et al. | | 6,800,710 B2 | 10/2004 | Pelliconi et al. |
| 6,576,712 B2 | 6/2003 | Feldstein et al. | | 6,811,886 B2 | 11/2004 | Speith-Herfurth et al. |
| 6,582,828 B1 | 6/2003 | Kaschel | | 6,815,490 B2 | 11/2004 | Seelert et al. |
| 6,583,076 B1 | 6/2003 | Pekrul et al. | | 6,815,496 B2 | 11/2004 | Tasaka et al. |
| 6,583,209 B2 | 6/2003 | Mehta et al. | | 6,818,698 B1 | 11/2004 | Kashikar |
| 6,583,254 B2 | 6/2003 | Tsuji et al. | | 6,824,721 B2 | 11/2004 | Albe et al. |
| 6,586,531 B2 | 7/2003 | Washiyama et al. | | 6,825,276 B2 | 11/2004 | Forte et al. |
| 6,586,536 B1 | 7/2003 | Kelley | | 6,825,280 B1 | 11/2004 | Hayakawa et al. |
| 6,590,006 B2 | 7/2003 | Park et al. | | 6,825,292 B2 | 11/2004 | Reid |
| 6,593,407 B2 | 7/2003 | Haner et al. | | 6,828,022 B2 | 12/2004 | Bisleri et al. |
| 6,593,442 B2 | 7/2003 | Bidell et al. | | 6,833,180 B1 | 12/2004 | Kodemura |
| 6,596,198 B1 | 7/2003 | Semen | | 6,833,404 B2 | 12/2004 | Quinn et al. |
| 6,596,814 B2 | 7/2003 | Kim et al. | | 6,841,620 B2 | 1/2005 | Ansems et al. |
| 6,599,985 B2 | 7/2003 | Fujii et al. | | 6,844,078 B2 | 1/2005 | Su et al. |
| 6,602,598 B1 | 8/2003 | Simpson et al. | | 6,855,406 B2 | 2/2005 | Takayasu et al. |
| 6,610,785 B1 | 8/2003 | Cecchin et al. | | 6,855,411 B2 | 2/2005 | Su et al. |
| 6,613,381 B1 | 9/2003 | Bredahl et al. | | 6,855,424 B1 | 2/2005 | Thomas et al. |
| 6,613,816 B2 | 9/2003 | Mahdi et al. | | 6,855,656 B2 | 2/2005 | Hosaka et al. |
| 6,620,888 B2 | 9/2003 | Resconi et al. | | 6,855,777 B2 | 2/2005 | McLoughlin et al. |
| 6,620,892 B1 | 9/2003 | Bertin et al. | | 6,858,667 B1 | 2/2005 | Flerlage et al. |
| 6,624,253 B2 | 9/2003 | Nakamura et al. | | 6,858,676 B1 | 2/2005 | Johoji et al. |
| 6,630,559 B2 | 10/2003 | Shinozaki et al. | | 6,858,695 B2 | 2/2005 | Schmidt, Jr. et al. |
| 6,632,885 B2 | 10/2003 | Morizono et al. | | 6,858,700 B2 | 2/2005 | Dahl et al. |
| 6,635,715 B1 | 10/2003 | Datta et al. | | 6,861,472 B2 | 3/2005 | Adedeji et al. |
| 6,635,733 B2 | 10/2003 | Yahata et al. | | 6,863,989 B1 | 3/2005 | Dyatlov et al. |
| 6,639,018 B2 | 10/2003 | Yunoki et al. | | 6,867,252 B1 | 3/2005 | Tomomatsu et al. |
| 6,646,019 B2 | 11/2003 | Perez et al. | | 6,867,253 B1 | 3/2005 | Chen |
| 6,646,051 B1 | 11/2003 | Demain | | 6,872,790 B2 | 3/2005 | Ewen |
| 6,649,685 B2 | 11/2003 | Saito et al. | | 6,875,816 B2 | 4/2005 | DeGroot et al. |
| 6,653,385 B2 | 11/2003 | Wang et al. | | 6,878,327 B2 | 4/2005 | Cooper et al. |
| 6,657,009 B2 | 12/2003 | Zhou | | 6,878,756 B2 | 4/2005 | Cinelli et al. |
| 6,657,025 B2 | 12/2003 | Blackmon et al. | | 6,881,793 B2 | 4/2005 | Sheldon et al. |
| 6,660,805 B1 | 12/2003 | Righettini et al. | | 6,884,846 B2 | 4/2005 | Pradel |
| 6,664,306 B2 | 12/2003 | Gaddam et al. | | 6,884,851 B2 | 4/2005 | Gauthy |
| 6,664,309 B2 | 12/2003 | Svenningsen et al. | | 6,887,941 B2 | 5/2005 | Zhou |
| 6,673,870 B2 | 1/2004 | Owens et al. | | 6,887,943 B2 | 5/2005 | Onoe et al. |
| 6,677,403 B1 | 1/2004 | Abe | | 6,890,661 B2 | 5/2005 | Pradel |
| 6,686,433 B1 | 2/2004 | Miro et al. | | 6,897,261 B1 | 5/2005 | Machida et al. |
| 6,703,457 B2 | 3/2004 | Van Baar et al. | | 6,905,760 B1 | 6/2005 | Mukohara et al. |
| 6,709,734 B2 | 3/2004 | Higashi et al. | | 6,913,834 B2 | 7/2005 | Kanamaru et al. |
| 6,710,134 B2 | 3/2004 | Demain | | 6,914,085 B2 | 7/2005 | Delaite et al. |
| 6,713,573 B2 | 3/2004 | Wenzel et al. | | 6,916,892 B2 | 7/2005 | Tharappel et al. |
| 6,723,769 B2 | 4/2004 | Miller et al. | | 6,924,041 B2 | 8/2005 | Lee et al. |
| 6,727,332 B2 | 4/2004 | Demain | | 6,924,342 B2 | 8/2005 | Stevens et al. |
| 6,730,742 B1 | 5/2004 | Demain | | 6,951,683 B2 | 10/2005 | Blackwell |
| 6,734,253 B2 | 5/2004 | Krabbenborg et al. | | 6,951,900 B2 | 10/2005 | Blanchard et al. |
| 6,734,270 B1 | 5/2004 | Minami et al. | | 6,964,986 B2 | 11/2005 | Bachon et al. |
| 6,747,103 B1 | 6/2004 | Vestberg et al. | | 6,984,680 B2 | 1/2006 | Quinn |
| 6,747,114 B2 | 6/2004 | Karandinos et al. ...... 526/348.2 | | 6,992,121 B1 | 1/2006 | Peters et al. |
| 6,750,288 B2 | 6/2004 | Pradel | | 6,992,128 B2 | 1/2006 | Busch et al. |
| 6,756,098 B2 | 6/2004 | Zhou et al. | | 6,992,146 B2 | 1/2006 | McLoughlin et al. |
| 6,756,463 B2 | 6/2004 | Sugano et al. | | 6,994,763 B2 | 2/2006 | Austin |

| | | |
|---|---|---|
| 6,994,915 B2 | 2/2006 | Pelliconi et al. |
| 6,998,431 B2 | 2/2006 | Albe |
| 7,008,990 B2 | 3/2006 | Raether et al. |
| 7,019,078 B1 | 3/2006 | Collina et al. |
| 7,022,763 B2 | 4/2006 | Matsugi et al. |
| 7,022,795 B1 | 4/2006 | Huffer et al. |
| 7,022,796 B2 | 4/2006 | Blackmon et al. |
| 7,026,055 B2 | 4/2006 | Hanyu et al. |
| 7,026,421 B2 | 4/2006 | Appleyard et al. |
| 7,038,000 B2 | 5/2006 | Vestberg et al. |
| 7,041,381 B1 | 5/2006 | Rasp et al. |
| 7,056,991 B2 | 6/2006 | Tharappel et al. |
| 7,060,754 B2 | 6/2006 | Stevens et al. |
| 7,064,160 B2 | 6/2006 | Zanka et al. |
| 7,064,163 B2 | 6/2006 | Shida |
| 7,067,196 B2 | 6/2006 | Pradel et al. |
| 7,067,585 B2 | 6/2006 | Wang et al. |
| 7,078,468 B2 | 7/2006 | Thorman |
| 7,081,299 B2 | 7/2006 | Richeson |
| 7,081,493 B2 | 7/2006 | Kawai et al. |
| 7,087,314 B2 | 8/2006 | Forte et al. |
| 7,091,277 B2 | 8/2006 | Rydin et al. |
| 7,094,463 B2 | 8/2006 | Haas et al. |
| 7,094,820 B2 | 8/2006 | Zhao et al. |
| 7,101,622 B2 | 9/2006 | Chang et al. |
| 7,101,926 B2 | 9/2006 | McMichael et al. |
| 7,101,929 B2 | 9/2006 | Zah et al. |
| 7,105,604 B2 | 9/2006 | Shimizu et al. |
| 7,105,609 B2 | 9/2006 | Datta et al. |
| 7,109,265 B2 | 9/2006 | Kucera et al. |
| 7,109,269 B2 | 9/2006 | Stevens et al. |
| 7,112,642 B2 | 9/2006 | Meesters et al. |
| 7,115,694 B2 | 10/2006 | Shimizu et al. |
| 7,119,154 B2 | 10/2006 | Coates et al. |
| 7,122,584 B2 | 10/2006 | Moriya et al. |
| 7,122,604 B2 | 10/2006 | Onoe et al. |
| 7,125,924 B2 | 10/2006 | Credali et al. |
| 7,129,292 B1 | 10/2006 | Kristen et al. |
| 7,138,173 B2 | 11/2006 | Wheatley et al. |
| 7,141,182 B2 | 11/2006 | Walters et al. |
| 7,141,300 B2 | 11/2006 | Yamamoto et al. |
| 7,144,542 B2 | 12/2006 | Holzer et al. |
| 7,144,925 B2 | 12/2006 | Burgun et al. |
| 7,144,939 B2 | 12/2006 | Dotson et al. |
| 7,144,959 B2 | 12/2006 | Kitahara |
| 7,148,305 B2 | 12/2006 | Stevens et al. |
| 7,153,906 B2 | 12/2006 | Akiyama et al. |
| 7,160,949 B2 | 1/2007 | Ota et al. |
| 7,160,950 B2 | 1/2007 | Mori et al. |
| 7,169,727 B2 | 1/2007 | Thorman |
| 7,169,827 B2 | 1/2007 | Debras et al. |
| 7,169,866 B2 | 1/2007 | Ostoja Starzewski et al. |
| 7,169,871 B2 | 1/2007 | Morini et al. |
| 7,173,099 B1 | 2/2007 | Minami |
| 7,175,906 B2 | 2/2007 | Longmoore |
| 7,183,364 B2 | 2/2007 | Sita |
| 7,186,312 B1 | 3/2007 | Bolte et al. |
| 7,189,788 B2 | 3/2007 | Machida et al. |
| 7,192,902 B2 | 3/2007 | Brinen et al. |
| 7,193,003 B2 | 3/2007 | Oi et al. |
| 7,193,013 B2 | 3/2007 | Machida et al. |
| 7,199,204 B2 | 4/2007 | Haner et al. |
| 7,201,815 B2 | 4/2007 | Muvundamina |
| 7,202,296 B2 | 4/2007 | Muylem et al. |
| 7,208,436 B2 | 4/2007 | Dall'Occo et al. |
| 7,208,552 B2 | 4/2007 | Komoto et al. |
| 7,211,537 B2 | 5/2007 | Fujita et al. |
| 7,214,745 B2 | 5/2007 | Arai et al. |
| 7,217,455 B2 | 5/2007 | Valdez |
| 7,217,766 B2 | 5/2007 | Datta et al. |
| 7,226,880 B2 | 6/2007 | Potnis |
| 7,226,974 B2 | 6/2007 | Nishihara |
| 7,229,687 B2 | 6/2007 | Kinning et al. |
| 7,232,872 B2 | 6/2007 | Shaffer et al. |
| 7,235,191 B2 | 6/2007 | Schmidt et al. |
| 7,235,610 B2 | 6/2007 | Fujino et al. |
| 7,235,618 B2 | 6/2007 | Lin et al. |
| 7,238,759 B2 | 7/2007 | Stevens et al. |
| 7,238,846 B2 | 7/2007 | Janssen et al. |
| 7,241,844 B2 | 7/2007 | Bouhelal |
| 7,247,675 B2 | 7/2007 | Thomas et al. |
| 7,250,211 B1 | 7/2007 | Minami et al. |
| 7,250,470 B2 | 7/2007 | Stevens et al. |
| 7,250,471 B2 | 7/2007 | Stevens et al. |
| 7,253,234 B2 | 8/2007 | Mori et al. |
| 7,262,251 B2 | 8/2007 | Kanderski et al. |
| 7,268,185 B2 | 9/2007 | Shimojo et al. |
| 2001/0004662 A1 | 6/2001 | Bidell et al. |
| 2001/0007896 A1 | 7/2001 | Agarwal et al. |
| 2001/0016639 A1 | 8/2001 | Agarwal et al. |
| 2001/0031843 A1 | 10/2001 | Whiteker et al. |
| 2001/0034299 A1 | 10/2001 | Terry et al. |
| 2001/0044505 A1 | 11/2001 | Ford et al. |
| 2001/0044515 A1 | 11/2001 | Siedel et al. |
| 2001/0047064 A1 | 11/2001 | Sun |
| 2001/0053837 A1 | 12/2001 | Agarwal et al. |
| 2002/0010077 A1 | 1/2002 | Lue et al. |
| 2002/0013440 A1 | 1/2002 | Agarwal et al. |
| 2002/0016254 A1 | 2/2002 | Whiteker et al. |
| 2002/0040114 A1 | 4/2002 | Loveday et al. |
| 2002/0045054 A1 | 4/2002 | Uhara et al. |
| 2002/0049135 A1 | 4/2002 | Moody et al. |
| 2002/0061945 A1 | 5/2002 | Oates et al. |
| 2002/0064653 A1 | 5/2002 | Ladika et al. |
| 2002/0065192 A1 | 5/2002 | Mackenzie et al. |
| 2002/0086955 A1 | 7/2002 | Kendrick |
| 2002/0123538 A1 | 9/2002 | Zhou et al. ............ 523/176 |
| 2002/0124956 A1 | 9/2002 | Zhou ..................... 156/334 |
| 2002/0132923 A1 | 9/2002 | Langohr et al. |
| 2003/0078350 A1 | 4/2003 | Weng et al. ............ 526/160 |
| 2003/0096896 A1 | 5/2003 | Wang et al. |
| 2004/0023037 A1 | 2/2004 | Baumert et al. ........... 428/421 |
| 2004/0034170 A1 | 2/2004 | Brant |
| 2004/0039117 A1 | 2/2004 | Kijima .................. 525/55 |
| 2004/0048984 A1 | 3/2004 | Weng et al. ............ 525/245 |
| 2004/0127614 A1 | 7/2004 | Jiang et al. ............. 524/270 |
| 2004/0138392 A1 | 7/2004 | Jiang et al. ............. 526/114 |
| 2004/0220320 A1 | 11/2004 | Abhari et al. ........... 524/487 |
| 2004/0220336 A1 | 11/2004 | Abhari et al. ........... 525/70 |
| 2004/0220359 A1 | 11/2004 | Abhari et al. ........... 526/65 |
| 2004/0249046 A1 | 12/2004 | Abhari et al. ........... 524/474 |
| 2005/0020778 A1 | 1/2005 | DeGroot et al. |
| 2005/0065286 A1 | 3/2005 | DeGroot et al. |
| 2005/0187350 A1 | 8/2005 | Stevens et al. |
| 2005/0187351 A1 | 8/2005 | Stevens et al. |
| 2006/0025535 A1 | 2/2006 | Onoe et al. |

FOREIGN PATENT DOCUMENTS

| | | |
|---|---|---|
| CA | 2407183 | 4/2003 |
| DE | 2316614 | 10/1973 |
| DE | 19960411 | 7/2001 |
| DE | 19963585 | 7/2001 |
| EP | 0 033 220 | 8/1981 |
| EP | 0 930 320 | 10/1983 |
| EP | 0 115 434 | 8/1984 |
| EP | 0 263 718 | 4/1988 |
| EP | 0 248 708 | 10/1988 |
| EP | 0 284 707 | 10/1988 |
| EP | 0 319 043 | 6/1989 |
| EP | 0 366 411 | 5/1990 |
| EP | 0 387 691 | 9/1990 |
| EP | 0 486 293 | 9/1991 |
| EP | 0 459 264 | 12/1991 |
| EP | 0 513 808 | 11/1992 |
| EP | 0 515 132 | 11/1992 |

| | | | | | |
|---|---|---|---|---|---|
| EP | 0 524 624 | 1/1993 | EP | 0 953 581 | 11/1999 |
| EP | 0375730 | 1/1993 | EP | 0 602 716 | 12/1999 |
| EP | 0 530 908 | 3/1993 | EP | 0 423 101 | 1/2000 |
| EP | 0 536 104 | 4/1993 | EP | 0 974 601 | 1/2000 |
| EP | 0 417 428 | 9/1993 | EP | 0 909 284 | 2/2000 |
| EP | 0 577 581 | 1/1994 | EP | 0 731 729 | 3/2000 |
| EP | 0 363 029 | 8/1994 | EP | 0 909 283 | 3/2000 |
| EP | 0 612 768 | 8/1994 | EP | 0 985 677 | 3/2000 |
| EP | 0 310 734 | 11/1994 | EP | 0 719 797 | 4/2000 |
| EP | 0 647 246 | 11/1994 | EP | 0 719 802 | 5/2000 |
| EP | 0 648 801 | 4/1995 | EP | 0 769 505 | 5/2000 |
| EP | 0 653 433 | 5/1995 | EP | 1 141 051 | 6/2000 |
| EP | 0 666 267 | 8/1995 | EP | 0 586 168 | 7/2000 |
| EP | 0 557 718 | 10/1995 | EP | 0889912 | 7/2000 |
| EP | 0 516 019 | 12/1995 | EP | 1 031 580 | 8/2000 |
| EP | 0 564 596 | 2/1996 | EP | 0 889 911 | 11/2000 |
| EP | 0 695 765 | 2/1996 | EP | 1 050 558 | 11/2000 |
| EP | 0 516 018 | 3/1996 | EP | 0 654 476 | 1/2001 |
| EP | 0 700 937 | 3/1996 | EP | 1 077 244 | 2/2001 |
| EP | 0 593 083 | 5/1996 | EP | 0 702 030 | 3/2001 |
| EP | 0 718 359 | 6/1996 | EP | 1 081 203 | 3/2001 |
| EP | 0 719 829 | 7/1996 | EP | 1 081 204 | 3/2001 |
| EP | 0 553 757 | 9/1996 | EP | 0 882 069 | 4/2001 |
| EP | 0 733 652 | 9/1996 | EP | 0 882 076 | 4/2001 |
| EP | 0 652 905 | 10/1996 | EP | 1 238 035 | 4/2001 |
| EP | 0 747 430 | 12/1996 | EP | 0 351 392 | 5/2001 |
| EP | 0 749 989 | 12/1996 | EP | 0 882 077 | 5/2001 |
| EP | 0 773 238 | 5/1997 | EP | 1 095 944 | 5/2001 |
| EP | 0 773 239 | 5/1997 | EP | 1 095 951 | 5/2001 |
| EP | 0 791 607 | 5/1997 | EP | 1 100 854 | 5/2001 |
| EP | 0 643 100 | 7/1997 | EP | 0 824 113 | 6/2001 |
| EP | 0 527 221 | 9/1997 | EP | 1 237 963 | 6/2001 |
| EP | 0 598 628 | 9/1997 | EP | 1 252 231 | 7/2001 |
| EP | 0 620 257 | 9/1997 | EP | 0 619 325 | 8/2001 |
| EP | 0 803 559 | 10/1997 | EP | 1 023 379 | 8/2001 |
| EP | 0 812 854 | 12/1997 | EP | 0 886 656 | 9/2001 |
| EP | 0 700 934 | 1/1998 | EP | 1 144 533 | 10/2001 |
| EP | 0 661 300 | 3/1998 | EP | 0 963 382 | 11/2001 |
| EP | 0 832 924 | 4/1998 | EP | 1 153 944 | 11/2001 |
| EP | 0 646 604 | 5/1998 | EP | 0 645 401 | 12/2001 |
| EP | 0 841 349 | 5/1998 | EP | 0 707 010 | 12/2001 |
| EP | 0 842 955 | 5/1998 | EP | 0 747 402 | 12/2001 |
| EP | 0 527 589 | 6/1998 | EP | 0 821 748 | 12/2001 |
| EP | 0 563 917 | 6/1998 | EP | 0 891 381 | 12/2001 |
| EP | 0 613 908 | 7/1998 | EP | 1 118 637 | 12/2001 |
| EP | 0 948 432 | 7/1998 | EP | 1 066 330 | 2/2002 |
| EP | 0 958 318 | 7/1998 | EP | 1 181 979 | 2/2002 |
| EP | 0 857 735 | 8/1998 | EP | 0 659 757 | 3/2002 |
| EP | 0 958 313 | 8/1998 | EP | 1 197 500 | 4/2002 |
| EP | 0 958 314 | 8/1998 | EP | 1 089 878 | 5/2002 |
| EP | 0 958 324 | 8/1998 | EP | 1 231 236 | 8/2002 |
| EP | 0 864 593 | 9/1998 | EP | 0 868 498 | 1/2003 |
| EP | 0 500 944 | 10/1998 | EP | 1 295 925 | 3/2003 |
| EP | 0 573 120 | 11/1998 | EP | 1 295 926 A | 3/2003 |
| EP | 0 879 849 | 11/1998 | EP | 1 165 622 | 4/2003 |
| EP | 0 977 666 | 11/1998 | FR | 1396054 | 4/1965 |
| EP | 0 977 808 | 11/1998 | FR | 1582841 | 10/1969 |
| EP | 0 788 521 | 12/1998 | GB | 2323846 | 3/1997 |
| EP | 0 882 731 | 12/1998 | JP | 51114438 | 10/1976 |
| EP | 0 889 089 | 1/1999 | JP | 56072033 | 6/1981 |
| EP | 0 584 609 | 3/1999 | JP | 56109213 | 8/1981 |
| EP | 0 627 447 | 4/1999 | JP | 57030774 | 2/1982 |
| EP | 0 685 498 | 5/1999 | JP | 57076041 | 5/1982 |
| EP | 0 696 303 | 6/1999 | JP | 58049736 | 3/1983 |
| EP | 0 922 653 | 6/1999 | JP | 59159843 | 9/1984 |
| EP | 1 040 140 | 6/1999 | JP | 59217709 | 12/1984 |
| EP | 1 040 146 | 6/1999 | JP | 60011538 | 1/1985 |
| EP | 1 044 225 | 6/1999 | JP | 01054010 | 3/1989 |
| EP | 0 608 054 | 7/1999 | JP | 0 208 6676 | 3/1990 |
| EP | 1 049 730 | 7/1999 | JP | 08336937 | 12/1996 |
| EP | 0 827 526 | 8/1999 | JP | 11115217 | 4/1999 |
| EP | 0 747 403 | 9/1999 | JP | 99349634 A | 12/1999 |
| EP | 0 950 667 | 10/1999 | JP | 2004/127614 | 4/2004 |

| | | | | | |
|---|---|---|---|---|---|
| JP | 2004/220336 | 8/2004 | WO | 00/01745 | 1/2000 |
| WO | 89/12828 | 12/1989 | WO | 00/23483 | 4/2000 |
| WO | 90/12839 | 11/1990 | WO | 00/29655 | 5/2000 |
| WO | WO 91/07472 | 5/1991 | WO | 00/37514 | 6/2000 |
| WO | WO 92/20644 | 11/1992 | WO | 00/44799 | 8/2000 |
| WO | WO 94/04625 | 3/1994 | WO | 00/47592 | 8/2000 |
| WO | 94/07930 | 4/1994 | WO | 00/50466 | 8/2000 |
| WO | 94/12193 | 6/1994 | WO | 00/50475 | 8/2000 |
| WO | 94/13715 | 6/1994 | WO | 00/58320 | 10/2000 |
| WO | 94/25498 | 11/1994 | WO | 00/59721 | 10/2000 |
| WO | 94/25526 | 11/1994 | WO | 00/69869 | 11/2000 |
| WO | WO 95/10575 | 4/1995 | WO | 00/69963 | 11/2000 |
| WO | 95/24449 | 9/1995 | WO | 00/75198 | 12/2000 |
| WO | 96/13531 | 5/1996 | WO | 01/00257 | 1/2001 |
| WO | 96/23010 | 8/1996 | WO | 01/00691 | 1/2001 |
| WO | 96/23751 | 8/1996 | WO | 01/02444 | 1/2001 |
| WO | 96/26967 | 9/1996 | WO | WO 01/00693 | 1/2001 |
| WO | 96/27622 | 9/1996 | WO | 01/09200 | 2/2001 |
| WO | 96/29460 | 9/1996 | WO | 01/14429 | 3/2001 |
| WO | 96/37568 | 11/1996 | WO | 01/16189 | 3/2001 |
| WO | 97/04271 | 2/1997 | WO | 01/18109 | 3/2001 |
| WO | 97/12919 | 4/1997 | WO | 01/19609 | 3/2001 |
| WO | WO 97/20872 | 6/1997 | WO | 01/23396 | 4/2001 |
| WO | 97/23577 | 7/1997 | WO | 01/25296 | 4/2001 |
| WO | 97/26287 | 7/1997 | WO | 01/27213 | 4/2001 |
| WO | 97/29138 | 8/1997 | WO | 01/29096 | 4/2001 |
| WO | 97/33921 | 9/1997 | WO | 01/32721 | 5/2001 |
| WO | 97/49738 | 12/1997 | WO | 01/34665 | 5/2001 |
| WO | 98/02467 | 1/1998 | WO | 01/40325 | 6/2001 |
| WO | 98/02471 | 1/1998 | WO | 01/42322 | 6/2001 |
| WO | 98/03603 | 1/1998 | WO | 01/42323 | 6/2001 |
| WO | 98/09996 | 3/1998 | WO | 01/42350 | 6/2001 |
| WO | 98/23690 | 6/1998 | WO | 01/44309 | 6/2001 |
| WO | 98/23699 | 6/1998 | WO | 01/46274 | 6/2001 |
| WO | 98/29249 | 7/1998 | WO | 01/46277 | 6/2001 |
| WO | 98/32784 | 7/1998 | WO | 01/46278 | 6/2001 |
| WO | 98/33860 | 8/1998 | WO | 01/48029 | 7/2001 |
| WO | 98/34965 | 8/1998 | WO | 01/48034 | 7/2001 |
| WO | 98/34970 | 8/1998 | WO | 01/48036 | 7/2001 |
| WO | 98/34971 | 8/1998 | WO | 01/48037 | 7/2001 |
| WO | 98/34985 | 8/1998 | WO | 01/48038 | 7/2001 |
| WO | 98/38374 | 9/1998 | WO | 01/70878 | 9/2001 |
| WO | 98/41574 | 9/1998 | WO | 01/74745 | 10/2001 |
| WO | 98/42780 | 10/1998 | WO | 01/77193 | 10/2001 |
| WO | 98/46694 | 10/1998 | WO | 01/81493 | 11/2001 |
| WO | 98/49229 | 11/1998 | WO | 01/83498 | 11/2001 |
| WO | 98/52686 | 11/1998 | WO | 01/83571 | 11/2001 |
| WO | 98/57998 | 12/1998 | WO | 01/98374 | 12/2001 |
| WO | WO 99/01481 | 1/1999 | WO | 01/98380 | 12/2001 |
| WO | 99/05152 | 2/1999 | WO | 01/98381 | 12/2001 |
| WO | 99/10425 | 3/1999 | WO | WO 01/96490 | 12/2001 |
| WO | 99/14046 | 3/1999 | WO | WO 02/20644 | 3/2002 |
| WO | 99/14047 | 3/1999 | WO | 02/35956 | 5/2002 |
| WO | 99/14262 | 3/1999 | WO | 02/36651 A | 5/2002 |
| WO | 99/19394 | 4/1999 | WO | 02/053668 | 7/2002 |
| WO | 99/20664 | 4/1999 | WO | 02/053669 | 7/2002 |
| WO | 99/20694 | 4/1999 | WO | WO 02/051931 | 7/2002 |
| WO | 99/20701 | 4/1999 | WO | 02/074816 | 9/2002 |
| WO | 99/24516 | 5/1999 | WO | 02/074817 | 9/2002 |
| WO | 99/29742 | 6/1999 | WO | WO 02/070572 | 9/2002 |
| WO | 99/29743 | 6/1999 | WO | WO 03/033612 | 4/2003 |
| WO | 99/29749 | 6/1999 | WO | WO 03/091289 | 11/2003 |
| WO | 99/32272 | 7/1999 | WO | 2004/037872 A | 5/2004 |
| WO | 99/32288 | 7/1999 | WO | 2004/046214 A | 6/2004 |
| WO | 99/32525 | 7/1999 | WO | 2005/095468 | 10/2005 |
| WO | 99/37711 | 7/1999 | WO | 2005/095474 | 10/2005 |
| WO | 99/46348 | 9/1999 | WO | 96/12744 | 5/2006 |
| WO | 99/54421 | 10/1999 | | | |
| WO | 99/60060 | 11/1999 | | | |
| WO | 99/61487 | 12/1999 | | | |
| WO | 99/65949 | 12/1999 | | | |
| WO | 99/67094 | 12/1999 | | | |
| WO | 00/00565 | 1/2000 | | | |

OTHER PUBLICATIONS

Abstract of CA 2407183.
U.S. Appl. No. 10/687,508, filed Oct. 15, 2003, entitled "Multiple Catalyst System for Olefin Polymerization and Polymers Produced Therefrom", Inventors: Jiang, et al.
U.S. Appl. No. 10/825,380, filed Apr. 15, 2004, entitled "Multiple Catalyst and Reactor System for Olefin Polymerization and Polymers Produced Therefrom", Inventors: Abhari et al.
U.S. Appl. No. 10/825,635, filed Apr. 15, 2004, entitled "Blend Functionalized Polyolefin Adhesive", Inventors: Abhari et al.
U.S. Appl. No. 10/825,349, filed Apr. 15, 2004, entitled "Functionalized Olefin Polymers", Inventors: Abhari et al.
U.S. Appl. No. 10/825,348, filed Apr. 15, 2004, entitled "Polyolefin Adhesive Compositions and Articles Made Therefrom", Inventors: Abhari et al.
Abstract of EP 0 882 076, published on Dec. 9, 1998, entitled "Supported Catalyst System".
Abstract of EP 0 882 077, published on Dec. 9, 1998, entitled "Process for Producing Alkene Polymers by Gas Phase Polymerisation".
Abstract of EP 0 882 731, published on May 31, 2000, entitled "Bridged Metallocene Compounds and Their Use as Olefin Polymerization Catalysts".
Abstract of EP 0 909 283, published on Apr. 21, 1999, entitled "Method for Producing High Melting-Point Polyolefins".
Abstract of EP 0 909 284, published on Apr. 21, 1999, entitled "Method for Producing Thermoplastic Elastomers".
Abstract of EP 1 066 330, published on Jan. 10, 2001, entitled "Catalyst System, Method for the Production Thereof, and the Utilization Thereof for the Polymerization of Olefins".
Abstract of EP 1 077 244, published on Sep. 5, 2001, entitled "Use of Reaktive Phenolic Resins in the Preparation of Highly Viscous, Self-Adhesive Materials".
Abstract of EP 1 081 203, published on Mar. 7, 2001, entitled "Use of Isocyanates in the Production of Highly Viscous Self-Sticking Compositions".
Abstract of EP 1 081 204, published on Mar. 7, 2001, entitled "Use of Sulfur for Curing High-Viscocity Pressure-Sensitive self-Adhesive Materials Based on Non-thermoplastic Elastomers".
Abstract of EP 1 089 878, published on Apr. 11, 2001, entitled "Sealable Multilayer Film Made of a Grafted Terpolymer".
Abstract of WO96/23751, published on Aug. 8, 1996, entitled "Process for Preparing Olefin Oligomers".
Abstract of WO99/05152, published on Feb. 4, 1999, entitled "Method for Producing Metallocenes".
Abstract of WO99/61487, published on Dec. 2, 1999, entitled "Catalyst System and the Use of Said Catalyst system for Polymerising Propylene".
Abstract of WO99/67094, published on Dec. 29, 1999, entitled "Sealable Multilayer Film Made of a Grafted Terpolymer".
Abstract of WO/0044799, published on Aug. 3, 2000, entitled "Organometal Compound, Catalyst System Containing Said Organometal Compound and its Use".
Abstract of WO01/14429, published on Mar. 1, 2001, entitled "Supported Catalyst Systems, Method for the Production Thereof and Method for Producing Poly-1 Alkenes with Bimodal or Multimodal Molecular Weight Distribution".
Abstract of WO01/46274, published on Jun. 28, 2001 entitled "Partly Crystalline Propylene Polymerisate Composition for Production of Biaxial-Stretched Polypropylene Films".
Abstract of WO01/48034, published on Jun. 20, 2002 entitled "Transition Metal Compound Ligand System, Catalyst System and the Use of the Latter for the Polymerisation of Olefins".
Abstract of EP 0 602 716, published on Jun. 22, 1994, entitled "Catalyst System, Process for its Production and its Use in (Co)Polymerization of Olefins".
Abstract of EP 0 613 908, published on Sep. 7, 1994, entitled "Solid Precursor of a Catalytic System for Polymerization of Olefins, Process for its Preparation and Catalytic System Containing said Precursor".
Abstract of EP 0 627 447, published on Dec. 7, 1994, entitled "Catalyst Support and Catalyst for Alpha-Olefin Polymerization; Processes for Preparing Them and Polymerization of Alpha-Olefins in the Presence of the Catalyst".
Abstract of EP 0 643 100, published on Mar. 15, 1995, entitled "Low temperature Impact-Resistant Composition of Semicrystalline Propylene Homopolymers".
Abstract of EP 0 645 401, published on Mar. 29, 1995, entitled "Process for Producing Polyolefins".
Abstract of EP 0 646 604, published on Apr. 5, 1995, entitled "Process for Olefin Polymerization".
Abstract of EP 0 654 476, published on May 24, 1995, entitled "Metallocenes, Their Preparation and Use as Catalysts".
Abstract of EP 0 659 757, published on Jun. 28, 1995, entitled "Metallocenes".
Abstract of EP 0 661 300, published on Jul. 5, 1995, entitled "Process for the Production of Polyolefins".
Abstract of EP 0 700 934, published on Mar 13, 1996, entitled "Supported Metallocene Catalyst System".
Abstract of EP 0 700 937, published on Mar. 13, 1996, entitled "Process for Preparing Ethylene Polymers".
Abstract of EP 0 702 030, published on Mar. 20, 1996, entitled "Process for Preparing Olefin Polymers with Large Molecular Weight Distribution".
Abstract of EP 0 707 010, published on Sep. 29, 1999, entitled "Metallocenes".
Abstract of EP 0 719 802, published on Nov. 25, 1998, entitled "Polyolefin Was".
Abstract of EP 0 824 113, published on Feb. 18, 1998, entitled "Supported Catalyst, Process for its Preparation and its Use in Olefin Polymerization".
Abstract of EP 0 832 924, published on Apr. 1, 1998, entitled "Polyolefin Composition for the Preparation of Non-Wovens".
Abstract of EP 0 857 735, published on Jul. 26, 2000, entitled "Process for Producing a Catalyst System, Process for the (Co)Polymerization of Olefins and (Co)Polymers of at Least One Olefin".
Abstract of EP 0 864 593, published on Sep. 16, 1998, entitled "Comb-Polymers Via Metallocene Catalysis".
Abstract of EP 0 882 069, published on Dec. 9, 1998, entitled "Process for Producing Polymers of Alkenes by Suspension Polymerisation".
De Souza, et al., "Recent Advances in Olefin Polymerization Using Binary Catalyst Systems", *Macromol. Rapid Commun.*, 2001, 22, pp. 1293-1301.
Chen, et al., "Cocatalysts for Metal-Catalyzed Olefin Polymerization: Activators, Activation Processes, and Structure-Activity Relationships", *Chem. Rev.*, 2000, 100, pp. 1391-1434.
Resconi, et al., "Selectivity in Propene Polymerization with Metallocene Catalysts", *Chem. Rev.*, 2000, pp. 1253-1345.
Chien, et al., "Homogeneous Binary Zirconocenium Catalyst Systems for Propylene Polymerization. 1. Isotactic/Atactic Interfacial Compatibilized Polymers Having Thermoplastic Elastomeric Properties", *Macromolecules*, 1997, 30, pp. 3447-3459.
Mun Fu Tse, "Studies of triblock copolymer-tackifying resin interactions by viscoelasticity and adhesive performance", *J. Adhesion Sci. Technol.*, 1989, vol. 3, No. 7, pp. 551-579.
Markel, et al., "Metallocene-Based Branch-Block Thermoplastic Elastomers", *Macromolecules*, vol. 33, No. 23, pp. 8541-8548.
Sun, et al., "Effect of Short Chain Branching on the Coil Dimensions of Polyolefins in Dilute Solution", *Macromolecules*, 2001, 34, pp. 6812-6820.
Huntsman REXtac APAO Polymers.
Dr. Thomas Sun, "Characterization of Polyolefins Using High Temperature Size Exclusion Chromatography Combined with Multi-Angle Laser Light Scattering and Viscometry", 1999.
"Standard Test Method for Peel Resistance of Adhesives (T-Peel Test)[1]", Designation: D 1876-01, ASTM International, 2002.
Abstract of EP 0 248708, published on Dec. 9, 1987, entitled "Process for Controlling a Plant for Producing Cement by the Dry Way with Precalcination".
Abstract of EP 0 387 691, published on Sep. 19, 1999, entitled, "Process for Preparing a Syndiotactic Polyolefin".

Abstract of EP 0 516 018, published on Dec. 2, 1992, entitled "Process for Preparing Olefin Polymers with Large Molecular Weight Distribution".

Abstract of EP 0 516 019, published on Dec. 2, 1992, entitled "Process for Preparing Syndiotactic Polyolefins with Large Molecular Weight Distribution".

Abstract of EP 0 553 757, published on Aug. 4, 1993, entitled "Catalyst and Process for Polymerisation and Copolymerisation of Olefins".

Abstract of EP 0 557 718, published on Sep. 1, 1993, entitled "Catalyst for Olefin Polymerisation, Process for Preparing the Same and Its Sue".

Abstract of EP 0 563 917, published on Oct. 6, 1993, entitled "Catalyst for the Polymerisation of Olefins, Process for its Preparation and its Use".

Abstract of EP 0 573 120, published on Dec. 8, 1993, entitled "Process for Producing a Catalyst System, Process for the (Co)Polymerisation of Olefins and (Co)Polymers of at Least One Olefin".

Lieber and Brintzinger in "Propene Polymerization with Catalyst Mixtures Containing Different Ansa-Zirconocenes: Chain Transfer to Alkylaluminum Cocatalysts and Formation of Stereoblock Polymers", Macromolecules 2000, 33, No. 25 (pp. 9192-9199), Germany.

"Structures and Properties of Block Polymers and Multiphase Polymer Systems: An Overview of Present Status and Future Potential", S. L. Aggarwal, Sixth Biennial Manchester Polymer Symposium (UMIST Manchester, Mar. 1976).

"Structures and Properties of Block Polymers and Multiphase Polymer Systems: An Overview of Present Status and Future Potential", S. L. Aggarwal, Sixth Biennial Manchester Polymer Symposium (UMIST Manchester, Mar. 1976).

U.S. Appl. No. 11/888,876, filed Aug. 2, 2007, Inventor: Jiang, et al., entitled Multiple Catalyst System for Olefin Polymerization and Polymers Produced Therefrom (2002B140/3).

U.S. Appl. No. 11/888,870, filed Aug. 2, 2007, Inventor: Jiang, et al., entitled Multiple Catalyst System for Olefin Polymerization and Polymers Produced Therefrom (2002B140/4).

\* cited by examiner

Example 4

Example 31

FIGURE K
Example 32 in Table 6
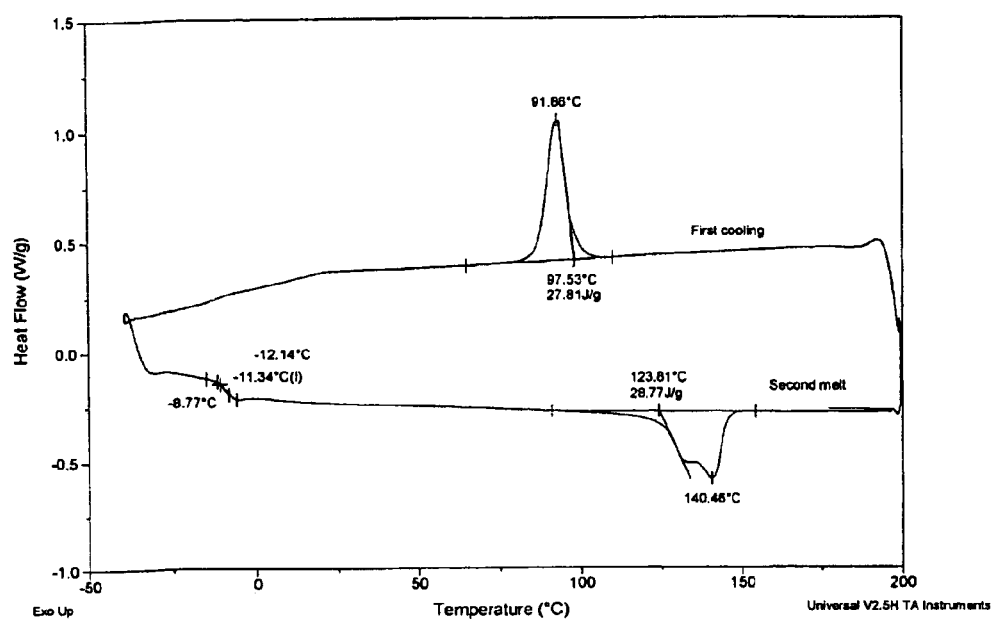

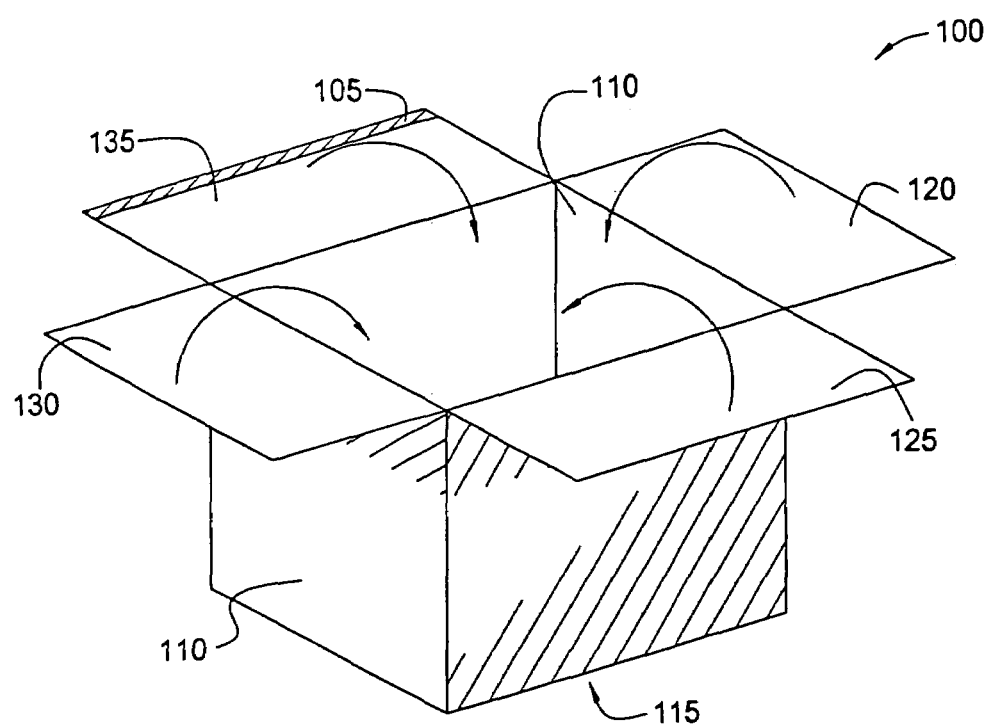
FIG. A6
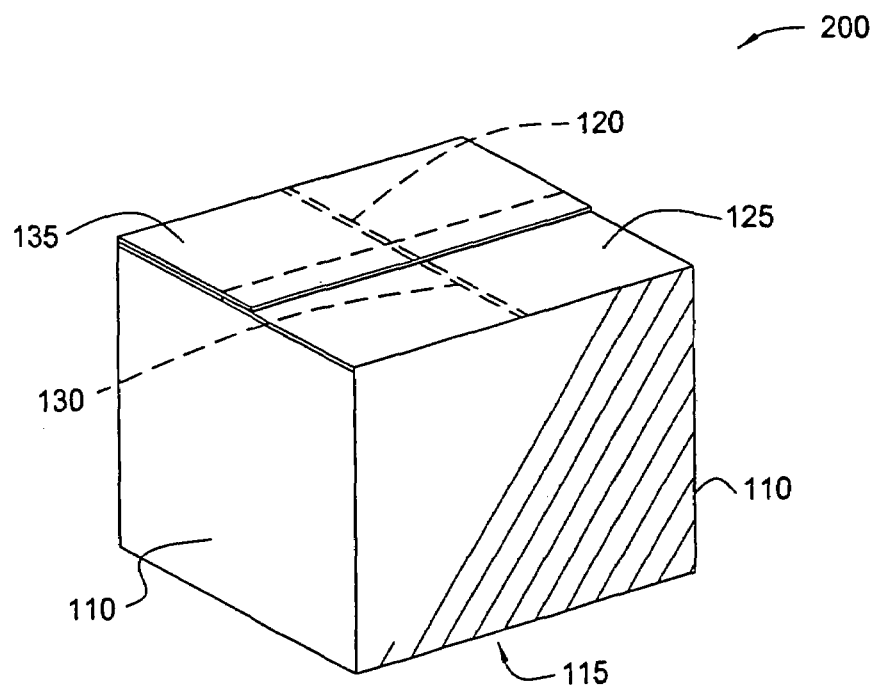
FIG. A7

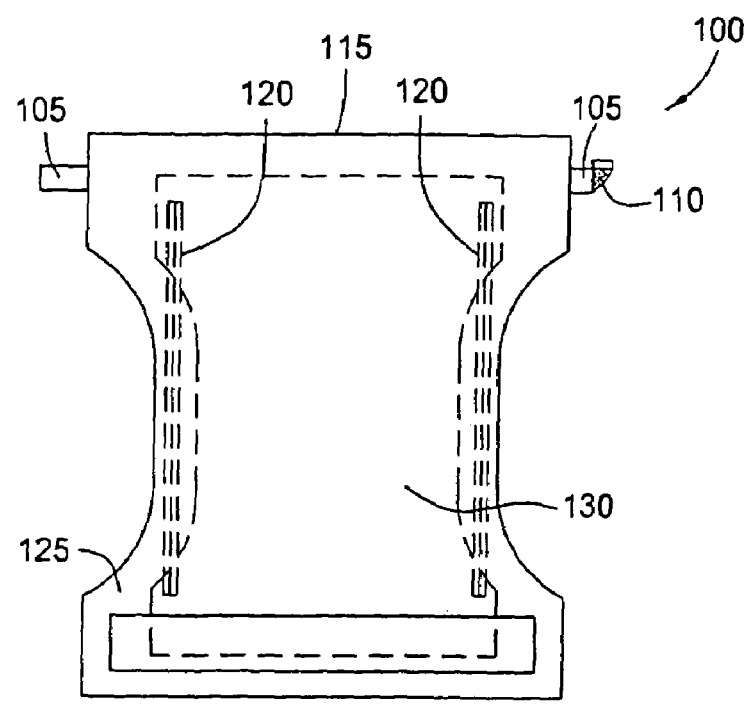
FIG. B6
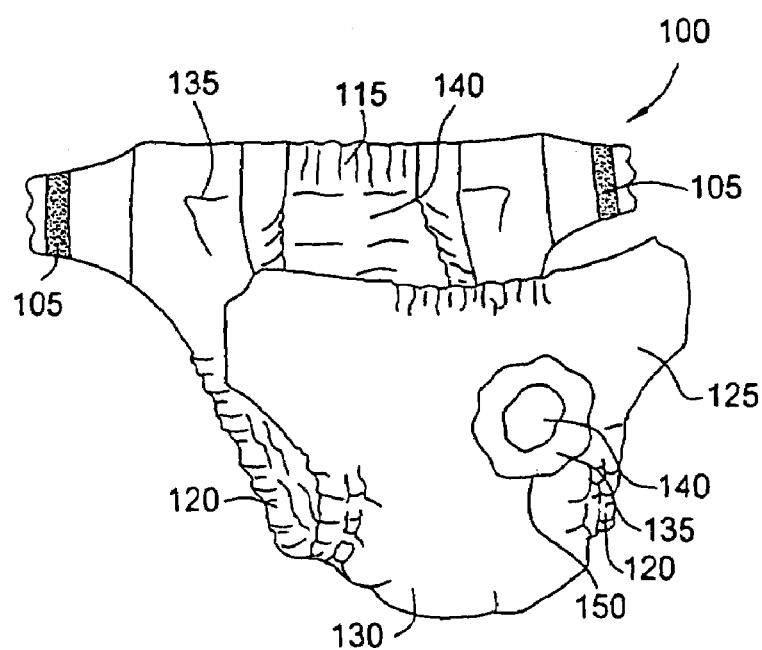
FIG. B7

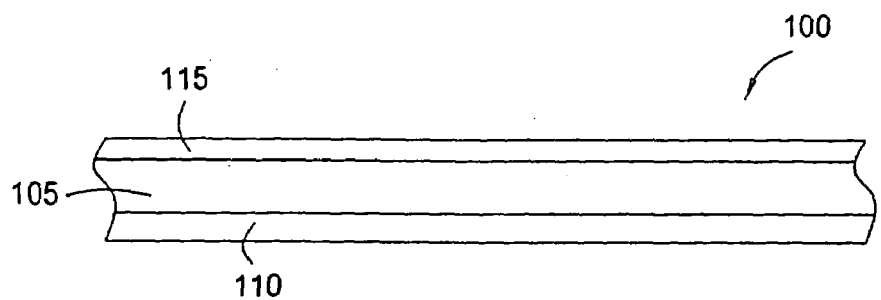
FIG. H6
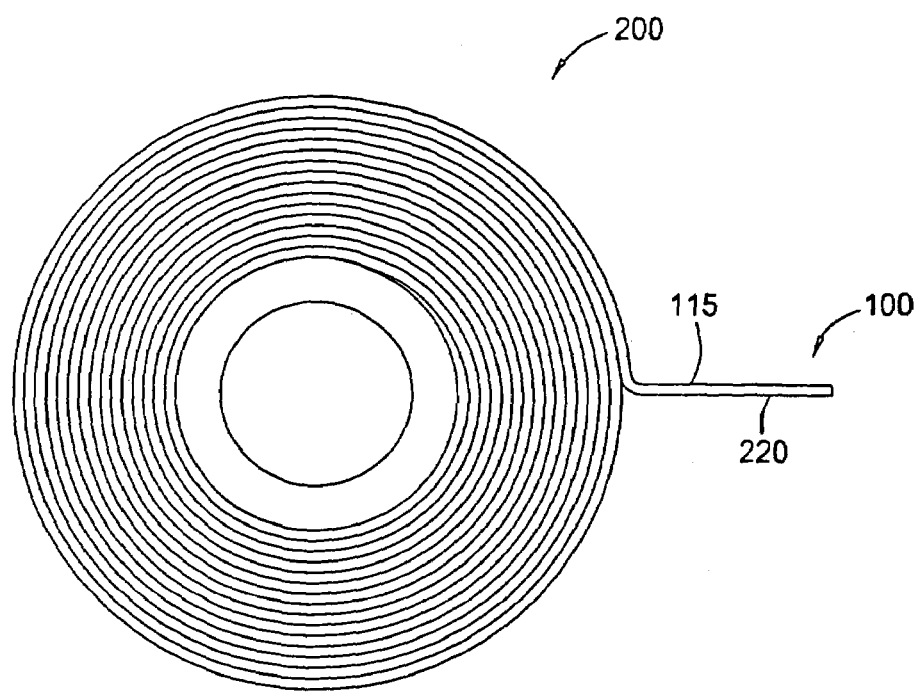
FIG. H7
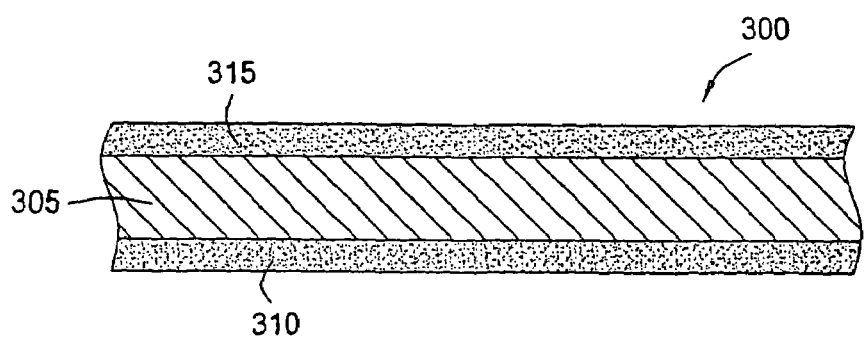
FIG. H8

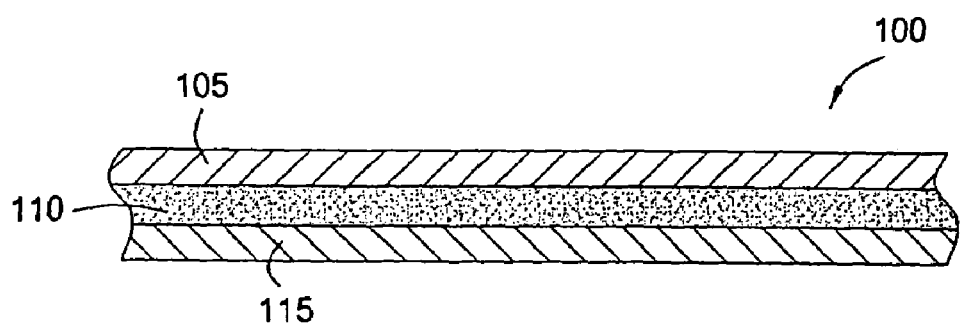
FIG. J6

US 7,524,910 B2

POLYOLEFIN ADHESIVE COMPOSITIONS AND ARTICLES MADE THEREFROM

CROSS-REFERENCE TO RELATED APPLICATIONS

This application claims priority to provisional USSN 60/418,482, filed Oct. 15, 2002, entitled "Multiple Catalyst System for Olefin Polymerization and Polymers Produced Therefrom." This application also claims priority from USSN 60/460,714, filed Apr. 4, 2003 entitled "Polyolefin Adhesive Compositions and Articles Made Therefrom."

This application also is related to USSN 60/199,093, filed on Apr. 21, 2000 and US2000000199093P, filed Apr. 20, 2001 claiming priority from USSN. 60/199,093. The instant application also relates to U.S. S No. 60/171,715, filed Dec. 21, 1999; U.S. Ser. No. 09/745,394, filed Dec. 21, 2000; and U.S. Ser. No. 09/746,332 filed Dec. 21, 2000. The instant application also relates to WO 01/81493.

FIELD OF THE INVENTION

This invention relates to adhesives comprising polymers of $C_{3-40}$ olefins having a Dot T-Peel of 1 Newton or more; a branching index (g') of 0.95 or less measured at the z-average molecular weight (Mz) of the polymer; a weight average molecular weight (Mw) of 100,000 or less; and good strength.

BACKGROUND OF THE INVENTION

For some applications such as adhesives individual polymers do not possess the necessary combination of properties. Individual polyolefins having certain characteristics are often blended together in the hope of combining the positive attributes of the individual components. Typically the result is a blend which displays an average of the individual properties of the individual resins. For example EP 0 527 589 discloses blends of flexible, low molecular weight amorphous polypropylene with higher molecular weight isotactic polypropylene to obtain compositions with balanced mechanical strength and flexibility. These compositions show better flexibility compared to that of the isotactic polypropylene alone, but are still lacking in other physical attributes. Physical blends also have the problems of inadequate miscibility. Unless the components are selected for their compatibility they can phase separate or smaller components can migrate to the surface. Reactor blends, also called intimate blends (a composition comprising two or more polymers made in the same reactor or in a series of reactors) are often used to address these issues, however finding catalyst systems that will operate under the same environments to produce different polymers has been a challenge.

Multiple catalyst systems have been used in the past to produce reactor blends (also called intimate blends) of various polymers and other polymer compositions. Reactor blends and other one-pot polymer compositions are often regarded as superior to physical blends of similar polymers. For example U.S. Pat. No. 6,248,832 discloses a polymer composition produced in the presence of one or more stereospecific metallocene catalyst systems and at least one non-stereospecific metallocene catalyst system. The resultant polymer has advantageous properties over the physical blends disclosed in EP 0 527 589 and U.S. Pat. No. 5,539,056.

Thus there has been interest in the art in developing multiple catalyst systems to produce new polymer compositions. For example, U.S. Pat. No. 5,516,848 discloses the use of two different cyclopentadienyl based transition metal compounds activated with alumoxane or non-coordinating anions. In particular, the examples disclose, among other things, catalyst compounds in combination, such as $(Me_2Si(Me_4C_5)(N-c-C_{12}H_{23})TiCl_2$ and $rac-Me_2Si(H_4Ind)ZrCl_2$, or $Me_2Si(Me_4C_5)(N-c-C_{12}H_{23})TiCl_2$ and $Me_2Si(Ind_2)HfMe_2$, (Ind=indenyl) activated with activators such as methylalumoxane or N,N-dimethyl anilinium tetrakis(pentafluorphenyl)borate to produce polypropylenes having bimodal molecular weight distributions (Mw/Mn), varying amounts of isotacticity (from 12 to 52 weight % isotactic PP in the product in Ex 2, 3 and 4), and having weight average molecular weights over 100,000, and some even as high as 1,200,000 for use as thermoplastics. Likewise, U.S. Pat. No. 6,184,327 discloses a thermoplastic elastomer comprising a branched olefin polymer having crystalline sidechains and an amorphous backbone wherein at least 90 mole percent of the sidechains are isotactic or syndiotactic polypropylene and at least 80 mole percent of the backbone is atactic polypropylene produced by a process comprising: a) contacting, in solution, at a temperature from about 90° C. to about. 120° C., propylene monomers with a catalyst composition comprising a chiral, stereorigid transition metal catalyst compound capable of producing isotactic or syndiotactic polypropylene; b) copolymerizing the product of a) with propylene and, optionally, one or more copolymerizable monomers, in a polymerization reactor using an achiral transition metal catalyst capable of producing atactic polypropylene; and c) recovering a branched olefin polymer. Similarly U.S. Pat. No. 6,147,180 discloses the synthesis of a thermoplastic polymer composition, which is produced by first polymerizing monomers to produce at least 40% vinyl terminated macromonomers and then copolymerizing the macromonomers with ethylene. In addition U.S. Pat. No. 6,323,284 discloses a method to produce thermoplastic compositions (mixtures of crystalline and amorphous polyolefin copolymers) by copolymerizing alpha-olefins and alpha, omega dienes using two separate catalyst systems.

Likewise others have experimented with multiple stage processes to produce new polymer compositions. For example EP 0 366 411 discloses a graft polymer having an EPDM backbone with polypropylene grafted thereto at one or more of the diene monomer sites through the use of a two-step process using a different Ziegler-Natta catalyst system in each step. This graft polymer is stated to be useful for improving the impact properties in blended polypropylene compositions.

Although each of the polymers described in the above references has interesting combinations of properties, there remains a need for new composition that offer other new and different property balances tailored for a variety of end uses. In particular, it would be desirable to find a composition that is strong yet has adhesive characteristics and the ability to be applied using adhesive technology and equipment.

WO 01/46277, at example 30 discloses a copolymer of propylene and hexene made using two catalysts.

For general information in this area, one may refer to:

1. DeSouza and Casagrande, in 2001 addressed the issue of binary catalyst systems in "*Recent Advances in Olefin Polymerization Using Binary Catalyst Systems*, Macromol. Rapid Commun. 2001, 22, No. 16 (pages 1293 to 1301). At page 1299 they report propylene systems that produce a "gooey" product.

2. Studies with respect to the production of stereoblock polypropylene by using in-situ mixtures of metallocene catalysts with different stereoselectivity were recently performed by Lieber and Brintzinger in "Propene Polymerization with Catalyst Mixtures Containing Different Ansa-Zirconocenes:

Chain Transfer to Alkylaluminum Cocatalysts and Formation of Stereoblock Polymers", Macromolecules 2000, 33, No.25 (pages 9192-9199). Propylene polymerization reactions were performed using metallocene catalysts $H_4C_2(Flu)_2ZrCl_2$, rac-$Me_2Si(2-Me-4-tBu-C_5H_2)_2ZrCl_2$ and rac-$Me_2Si(2-MeInd)_2 ZrCl_2$ in the presence of either MAO (methylalumoxane) or tri-iso-butylaluminium $(Al(iBu)_3)$/triphenylcarbenium tetrakis(perfluorophenylborate) (trityl borate) as the cocatalyst. Propylene polymerization using the mixed catalysts, $H_4C_2 (Flu)_2ZrCl_2$ and rac-$Me_2Si(2-MeInd)_2ZrCl_2$ in the presence of either MAO or $Al(iBu)_3$/trityl borate produced waxy solids, which are completely separable into an atactic (diethyl ether soluble) and an isotactic (insoluble) fraction. Neither fraction contained any combination of isotactic and atactic pentad patterns indicating that these catalyst mixtures did not form stereoblock polymers.

3. Aggarwal addressed the various polymers produced in "Structures and Properties of Block Polymers and Multiphase Polymer Systems: An Overview of Present Status and Future Potential", S. L. Aggarwal, Sixth Biennial Manchester Polymer Symposium (UMIST Manchester, March 1976)

4. Selectivity in Propene Polymerization with Metallocene Catalysts" Resconi, et al, Chem Rev. 2000, 100, 1253-1345.

None of the references above has directly addressed the need for polyolefin based adhesives containing both amorphous and crystalline components. Such adhesives are desired in the industry as a replacement for blends requiring significant amount of tackifiers and or other additives.

Additional references that are of interest include:
1) EP Patents: EP 0 619 325 B1, EP 719 802 B1;
2) US Patents/Publications: U.S. Pat. Nos. 6,207,606, 6,258,903; 6,271,323; 6,340,703, 6,297,301, US 2001/0007896 A1, U.S. Pat. Nos. 6,184,327, 6,225,432, 6,342,574, 6,147,180, 6,114,457, 6,143,846, 5,998,547; 5,696,045; 5,350,817;
3) PCT Publications: WO 00/37514, WO 01/81493, WO 98/49229, WO 98/32784; and WO 01/09200;
4) "Metallocene-Based Branch-Block thermoplastic Elastomers," Markel, et al. Macromolecules 2000, Volume 33, No. 23. pgs. 8541-8548.

SUMMARY OF THE INVENTION

This invention relates to adhesives comprising a polymer comprising one or more C3 to C40 olefins where the polymer has:
  a) a Dot T-Peel of 1 Newton or more on Kraft paper;
  b) a branching index (g') of 0.95 or less measured at the Mz of the polymer;
  c) a Mw of 10,000 to 100,000; and
  d) a heat of fusion of 1 to 70 J/g.

This invention also relates to adhesives comprising a polymer comprising one or more C3 to C40 olefins where the polymer has:
  a) a Dot T-Peel of 1 Newton or more on Kraft paper;
  b) a branching index (g') of 0.98 or less measured at the Mz of the polymer;
  c) a Mw of 10,000 to 60,000;
  d) a heat of fusion of 1 to 50 J/g.

This invention also relates to adhesives comprising a homopolypropylene or a copolymer of propylene and up to 5 mole % ethylene having:
  a) an isotactic run length of 1 to 30 (isotactic run length "IRL" is defined to be the percent of mmmm pentad divided by 0.5× percent of mmmr pentad) as determined by Carbon 13 NMR, preferably 3 to 25, more preferably 4 to 20,
  b) a percent of r dyad of greater than 20%, preferably from 20 to 70% as determined by Carbon 13 NMR, and
  c) a heat of fusion of 70 J/g or less, preferably 60 J/g or less, more preferably between 1 and 55 J/g, more preferably between 4 and 50 J/g.

Figure 1:
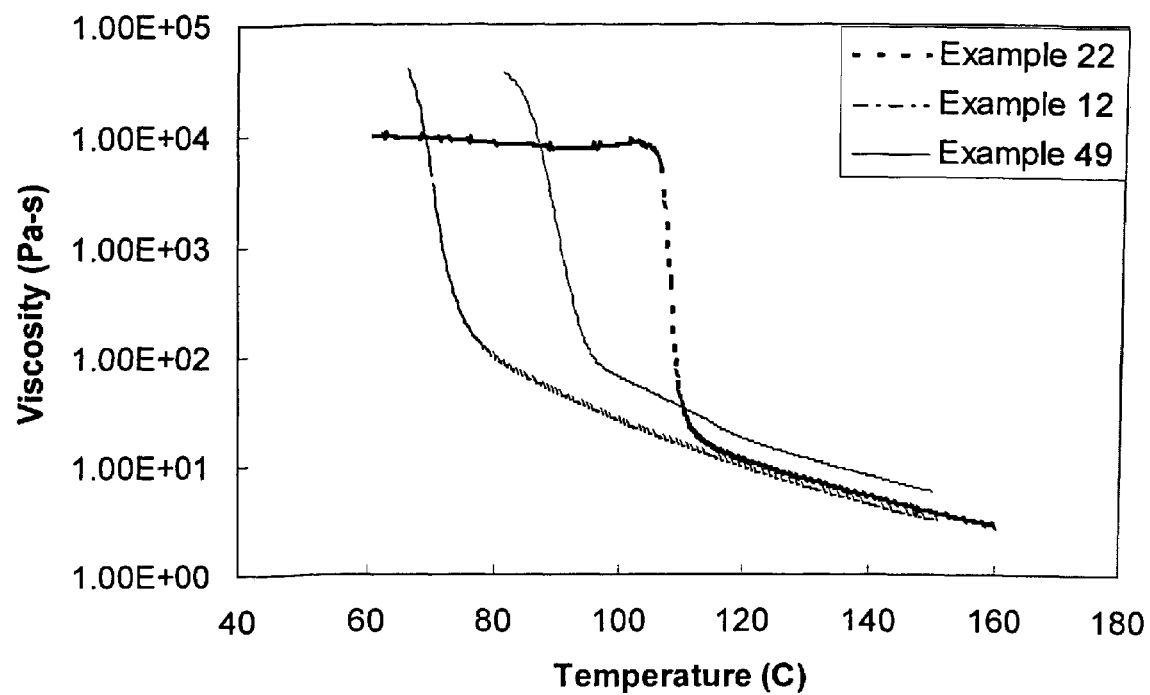
FIG. 1 is an illustration of complex viscosity changes with the temperature when the samples were cooled at 10° C. per minute for Examples 12, 22 and 49.
Figure 2:
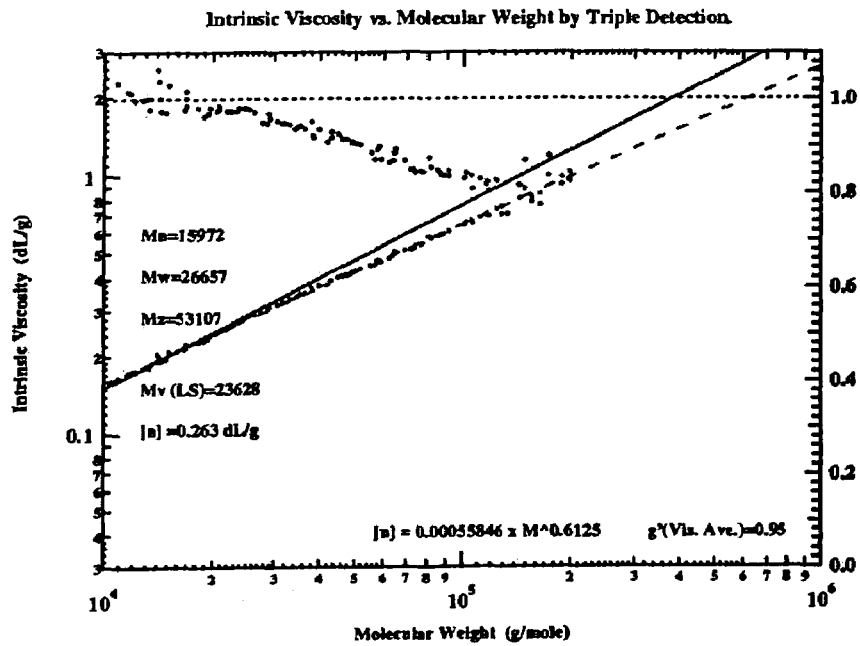
FIG. 2 is a graphic illustration of the relationship between the branching index, g', and the molecular weight for polymers produced in Examples 4 and 31.
Figure 2:
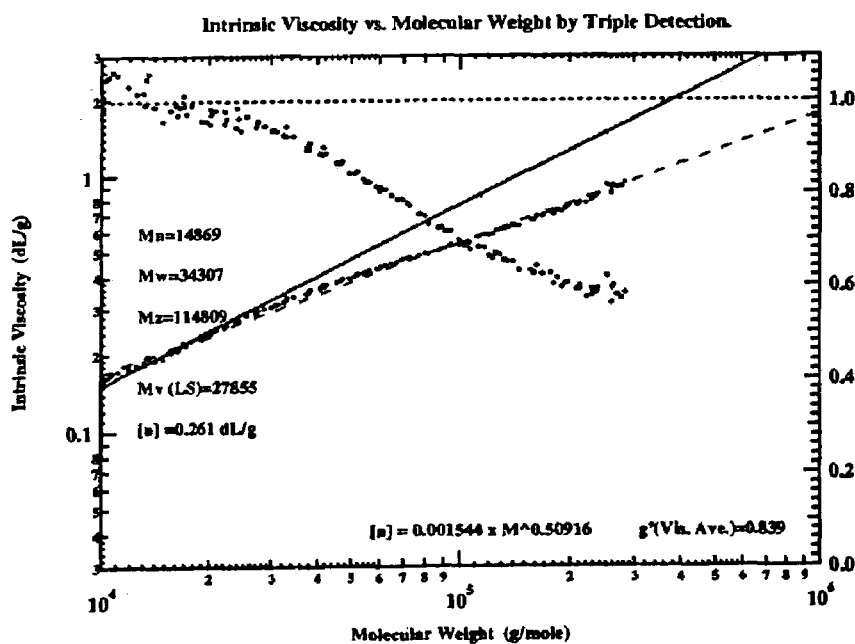
Figure 3:
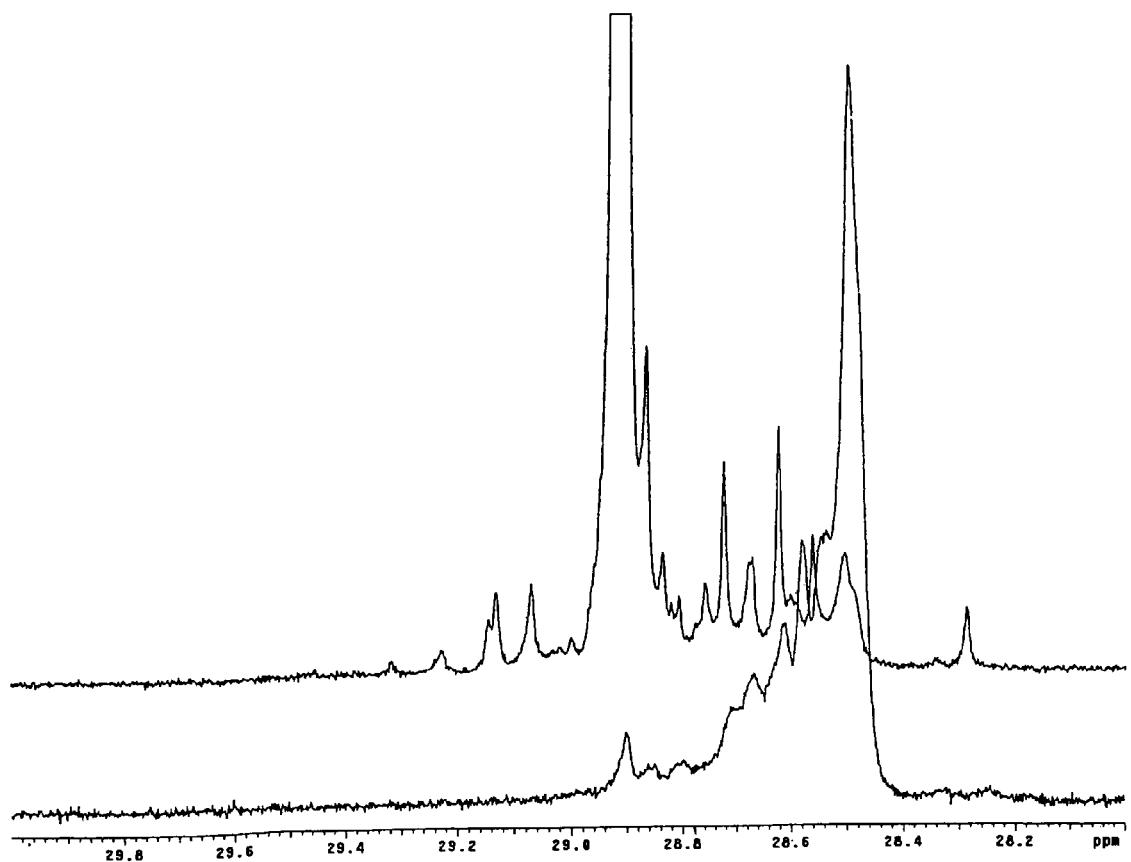
FIG. 3 is the C-13 NMR spectra of heptane soxhlet insoluble (top trace) and hexane room temperature soluble fractions (bottom trace) extracted from Example 4.
Figure 4:
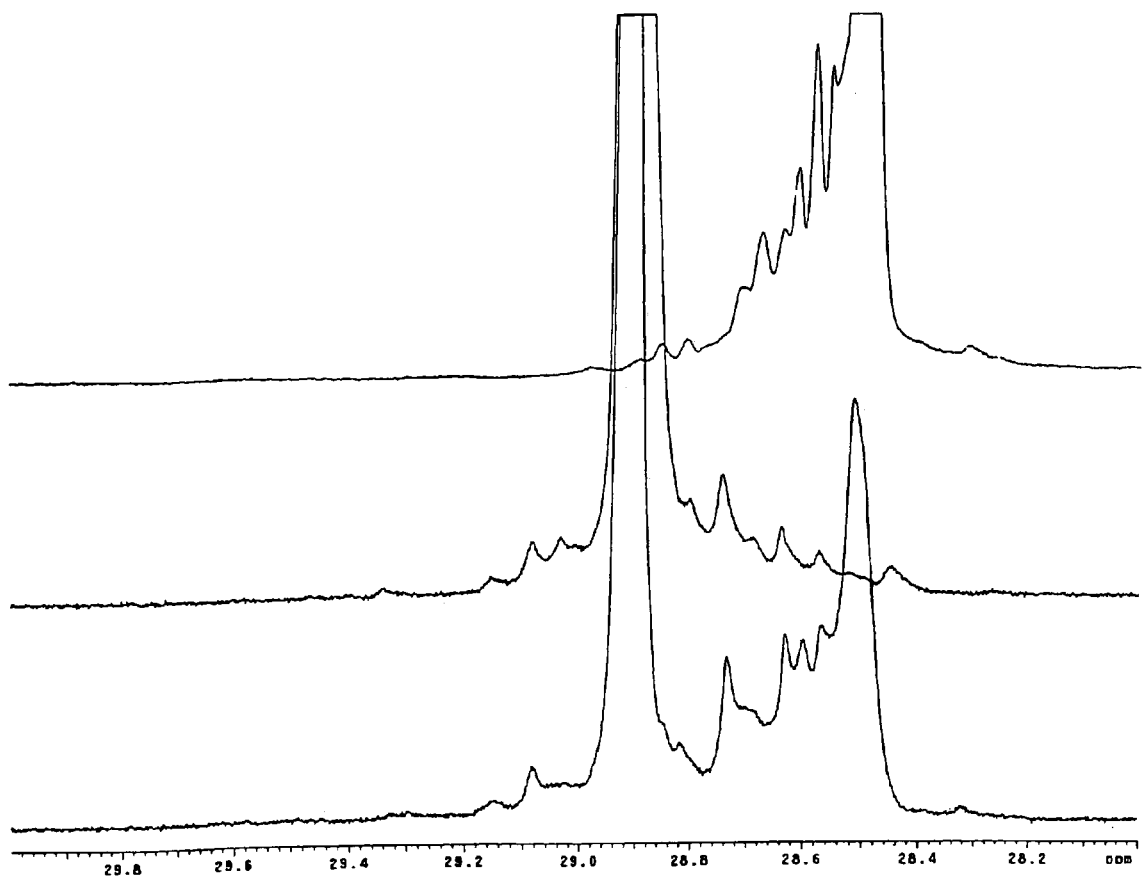
FIG. 4 is the C-13 NMR spectra of aPP/scPP branch block relative to scPP and aPP control. The control samples were produced using one catalyst at a time; aPP was synthesized using a specific catalyst, while the scPP was produced using stereospecific catalyst. The top trace is the aPP control sample. The middle trace is the scPP control sample and the bottom trace is Example 4.

FIG. A6 shows a perspective view of a carton having the adhesives of this invention at least partially disposed thereon.

FIG. A7 is a perspective view of the carton of FIG. A6 after being sealed to form a closed container.

FIG. B6 shows a schematic, plan view of a disposable diaper according to the present invention.

FIG. B7 shows a schematic view of the disposable diaper of FIG. B6 when arranged in a partially closed configuration.

FIG. H6 illustrates a cross-sectional view of an exemplary single-sided tape.

FIG. H7 illustrates a side-view of the tape of FIG. H6 in roll form.

FIG. H8 illustrates a cross-sectional view of an exemplary double-sided tape.

FIG. J6 is a cross-sectional view of a label.

Figure K is a DSC trace for the polymer of example 32, in table 6.

DETAILED DESCRIPTION OF THE PREFERRED EMBODIMENT

For the purposes of this invention and the claims thereto and for ease of reference when a polymer is referred to as comprising an olefin, the olefin present in the polymer is the polymerized form of the olefin. For ease of reference amorphous polypropylene is abbreviated aPP, isotactic polypropylene is abbreviated iPP, syndiotactic polypropylene is abbreviated sPP, semi-crystalline polypropylene is abbreviated scPP, and "-g-" indicates that the components are In another embodiment this invention relates to an adhesive comprising a polymer comprising one or more C3 to C40 olefins, preferably propylene, and, in some embodiments, less than 15 mole % of ethylene (preferably less than 5 mole % ethylene), having:
  a) a Dot T-Peel between 1 Newton and the 10,000 Newtons on kraft paper;
  b) a Mz/Mn of 2 to 200; and
  c) an Mw of X and a g' of Y (measured at the Mz of the polymer) according to the following Table C:

TABLE C

| X (Mw) | Y (g') |
|---|---|
| 100,000 or less, preferably 80,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments X is also at least 7000, more preferably 10,000, more preferably at least 15,000. | 0.9 or less, preferably 0.7 or less Preferably between 0.5-0.9 |
| 75,000 or less, preferably 70,000 or less, more preferably 60,000 or less, more preferably 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.92 or less, preferably, 0.6 or less preferably between 0.4-0.6- |
| 50,000 or less, more preferably 40,000 or less, more preferably 30,000 or less, more preferably 20,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.95 or less, preferably 0.7 or less preferably between 0.5-0.7- |
| 30,000 or less, preferably 25,000 or less, more preferably 20,000 or less, more preferably 15,000 or less, more preferably 10,000 or less. In some embodiments A is also at least 1000, preferably at least 2000, more preferably at least 3000, more preferably at least 4000, more preferably at least 5000, more preferably at least 7000, more preferably 10,000, more preferably at least 15,000. | 0.98 or less preferably between 0.7-0.98 |

In another embodiment, when Mw is between 15,000 and 100,000, then $g'<(10^{-12} Mw^2 -10 Mw+1.0178)$.

In a some embodiments the g' is 0.9 or less, 0.8 or less, 0.7 or less, 0.6 or less, measured at the Mz of the polymer.

In another embodiment the polymer described above also has a peak melting point (Tm) between 40 and 250° C., or between 60 and 190° C., or between about 60 and 150° C., or between 80 and 130° C. In some embodiments the peak melting point is between 60 and 160° C. In other embodiments the peak melting point is between 124-140° C. In other embodiments the peak melting temperature is between 40-130° C.

In another embodiment the polymer described above also has a viscosity (also referred to a Brookfield Viscosity or Melt Viscosity) of 90,000 mPa·sec or less at 190° C. (as measured by ASTM D 3236 at 190° C.; ASTM=American Society for Testing and Materials); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the viscosity is 50,000 mPa·sec or less depending on the applications.

In another embodiment the polymer described above also has a heat of fusion of 70 J/g or less, or 60 J/g or less; or 50 J/g or less; or 40 J/g or less, or 30 J/g or less, or 20 J/g or less and greater than zero, or greater than 1 J/g, or greater than 10 J/g, or between 20 and 50 J/g.

In another embodiment the polymer described above also has a Shore A Hardness (as measured by ASTM 2240) of 95 or less, 70 or less, or 60 or less, or 50 or less, or 40 or less or 30 or less, or 20 or less. In other embodiments the Shore A Hardness is 5 or more, 10 or more, or 15 or more. In certain applications, such as packaging, the Shore A Hardness is preferably 50-85. In another embodiment, the polymer has a Shore A hardness of 20-90.

In another embodiment the polymer of this invention has an Mz/Mn of 2 to 200, preferably 2 to 150, preferably 10 to 100.

In another embodiment the polymer described above also has a Shear Adhesion Fail Temperature (SAFT—as measured by ASTM 4498) of 200° C. or less, or of 40 to 150° C., or 60 to 130° C., or 65 to 110° C., or 70-80° C. In certain embodiments SAFT's of 130-140° C. are preferred. In other embodiments, SAFT's of 100-130° C. are preferred. In other embodiments, SAFT's of 110-140° C. are preferred.

In another embodiment the polymer described above also has a Dot T-Peel on Kraft paper of between 1 Newton and 10,000 Newtons, or 3 and 4000 Newtons, or between 5 and 3000 Newtons, or between 10 and 2000 Newtons, or between 15 and 1000 Newtons. Dot T-Peel is determined according to ASTM D 1876, as described below.

In another embodiment the polymer described above also has a set time of several days to 1 second, or 60 seconds or less, or 30 seconds or less, or 20 seconds or less, or 15 seconds or less, or 10 seconds or less, or 5 seconds or less, or 4 seconds or less, or 3 seconds or less, or 2 seconds or less, or 1 second or less.

In another embodiment the polymer described above also has an Mw/Mn of 2 to 75, or 4 to 60, or 5 to 50, or 6 to 20.

In another embodiment the polymer described above also has an Mz of 1,000,000 or less, preferably 15,000 to 1,000, 000, or 20,000 to 800,000, or 25,000 to 350,000.

In another embodiment the polymer described above may also have a strain at break (as measured by ASTM D-1708 at 25° C.) of 50 to 1000%, preferably 80 to 200%. In some other embodiments the strain at break is 100 to 500%.

In another embodiment, the polymer described herein has a tensile strength at break (as measured by ASTM D-1708 at 25° C.) of 0.5 MPa or more, alternatively 0.75 MPa or more, alternatively 1.0 MPa or more, alternatively 1.5 MPa, or more, alternatively 2.0 MPa or more, alternatively 2.5 MPa or more, alternatively 3.0 MPa or more, alternatively 3.5 MPa or more.

In another embodiment the polymer described above also has a crystallization point (Tc) between 20 and 110° C. In some embodiments the Tc is between 70 to 100° C. In other embodiments the Tc is between 30 to 80° C. In other embodiments the Tc is between 20 to 50° C.

In some embodiment the polymers described above has a slope of −0.1 or less, preferably −0.15 or less, more preferably −0.25 or less in the trace of complex viscosity versus temperature as shown in FIG. 1 (as measured by ARES dynamic mechanical spectrometer operating at a frequency of 10 rad/s, with a strain of 20% under a nitrogen atmosphere, and a cooling rate of 10° C./min) over the range of temperatures from Tc+10° C. to Tc+40° C. The slope is defined as a derivative of log (complex viscosity) with respect to temperature.

In another embodiment the polymer described above has a Tc that is at least 10° C. below the Tm, preferably at least 20°

C. below the Tm, preferably at least 30° C. below the Tm, more preferably at least 35° C. below the Tm.

In another embodiment some polymers described above have a melt index ratio ($I_{10}/I_2$) of 6.5 or less, preferably 6.0 or less, preferably 5.5 or less, preferably 5.0 or less, preferably 4.5 or less, preferably between 1 and 6.0. ($I_{10}$ and $I_2$ are measured according to ASTM 1238 D, 2.16 kg, 190° C.).

In another embodiment some polymers described above have a melt index (as determined by ASTM 1238 D, 2.16 kg, 190 deg. C) of 25 dg/min or more, preferably 50 dg/min or more, preferably 100 dg/min or more, more preferably 200 dg/min or more, more preferably 500 dg/mn or more, more preferably 2000 dg/min or more.

In another embodiment the polymer described above has a range of crystallization of 10 to 60° C. wide, preferably 20 to 50° C., preferably 30 to 45° C. in the DSC traces. In DSC traces where there are two or more non-overlapping peaks, then each peak has a range of crystallization of 10 to 60° C. wide, preferably 20 to 50° C., preferably 30 to 45° C. in the DSC traces.

In another embodiment the polymer produced by this invention has a molecular weight distribution (Mw/Mn) of at least 2, preferably at least 5, preferably at least 10, even more preferably at least 20.

In another embodiment the polymer produced may have a unimodal, bimodal, or multimodal molecular weight distribution (Mw/Mn) distribution of polymer species as determined by Size Exclusion Chromatography (SEC). By bimodal or multimodal is meant that the SEC trace has more than one peak or inflection points. An inflection point is that point where the second derivative of the curve changes in sign (e.g., from negative to positive or vice versus).

In another embodiment the polymer described above has an Energy of activation of 8 to 15 cal/mol. Energy of activation was calculated using the relationships of complex viscosity and temperature over the region where thermal effects are responsible for viscosity increase (assuming an Arrhenius-like relationship).

In another embodiment the polymers produced herein have a cloud point of 200° C. or less, preferably 180° C. or less, preferably 160° C. or less, preferably 120° C. or less, preferably 100° C. or less. Likewise any composition that the polymer is part of preferably has a cloud point of 200° C. or less, preferably 180° C. or less, preferably 160° C. or less, preferably 120° C. or less, preferably 100° C. or less In another embodiment the polymer described above may also have one or more of the following:

a) a peak melting point between 30 and 190° C., or between about 60 and 150° C., or between 80 and 130° C.; and/or b) a viscosity of 8000 mPa·sec or less at 190° C. (as measured by ASTM D 3236 at 190° C.); or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, or a viscosity of 8000 mPa·sec or less at 160° C. (as measured by ASTM D 3236 at 160° C.); or 7000 or less, or 6000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec; and/or c) an $H_f$ (Heat of fusion) of 70 J/g or less, or 60 J/g or less, or 50 J/g or less; or 40 J/g or less, or 30 J/g or less, or 20 J/g or less and greater than zero, or greater than 1 J/g, or greater than 10 J/g, or between 10 and 50 J/g; and or d) a Shore A Hardness (as measured by ASTM 2240) of 90 or less, or 60 or less, or 50 or less, or 40 or less or 30 or less, or 20 or less; and or e) a Shear Adhesion Fail Temperature (SAFT—as measured by ASTM 4498) of 40 to 150° C., or 60 to 130° C., or 65 to 110° C., or 70-80° C.; and or;

f) a Dot T-Peel of between 1 Newton and 10,000 Newtons, or 3 and 4000 Newtons, or between 5 and 3000 Newtons, or between 10 and 2000 Newtons, or between 15 and 1000 Newtons; and/or g) a set time of several days to 0.1 second, or 60 seconds or less, or 30 seconds or less, or 20 seconds or less, or 15 seconds or less, or 10 seconds or less, or 5 seconds or less, or 4 seconds or less, or 3 seconds or less, or 2 seconds or less, or 1 second or less; and/or h) an Mw/Mn of greater than 1 to 75, or 2 to 60, or 2 to 50, or 3 to 20; and/or i) an Mz of 500,000 or less, preferably 15,000 to 500,000, or 20,000 to 400,000, or 25,000 to 350,000.

Useful combinations of features include polymers as described above having a Dot T-Peel of between 1 Newton and 10,000 Newtons, or 3 and 4000 Newtons, or between 5 and 3000 Newtons, or between 10 and 2000 Newtons, or between 15 and 1000 Newtons and:

1) an Mw of 30,000 or less, a peak melting point between 60 and 190° C., a Heat of fusion of 1 to 70 J/g, a branching index (g') of 0.90 or less measured at the Mz of the polymer; and a melt viscosity of 8000 mPa·sec or less at 190° C.; or 2) an Mz of 20,000 to 5,000,000 and a SAFT of 60 to 150° C.; or 3) an Mz/Mn of 2-200 and a set time of 4 seconds or less; or 4) an $H_f$ (heat of fusion) of 20 to 50 J/g, an Mz or 20,000-500,000 and a shore hardness of 50 or less; or 5) an Mw/Mn of greater than 1 to 50, a viscosity of 5000 or less mPa·sec at 190° C.; or 6) an Mw of 50,000 or less, a peak melting point between 60 and 190° C., a heat of fusion of 2 to 70 J/g, a branching index (g') of 0.70 or less measured at the Mz of the polymer, and a melt viscosity of 8000 mPa·sec or less at 190° C.

In a preferred embodiment, the polymer of this invention comprises amorphous, crystalline and branch-block molecular structures.

In a preferred embodiment the polymer comprises at least 50 weight % propylene, preferably at least 60% propylene, alternatively at least 70% propylene, alternatively at least 80% propylene.

In another embodiment the polymer produced has a glass transition temperature ($T_g$) as measured by ASTM E 1356 of 5° C. or less, preferably 0° C. or less, alternatively between 0° C. and −40° C., alternatively between −5° C. and −15° C.

In another embodiment the polymer of this invention has an amorphous content of at least 50%, alternatively at least 60%, alternatively at least 70%, even alternatively between 50 and 99%. Percent amorphous content is determined by subtracting the percent crystallinity from 100. Percent crystallinity content is determined using Differential Scanning Calorimetry measurement according to ASTM E 794-85.

In another embodiment the polymer of this invention has a crystallinity of 40% or less, alternatively 30% or less, alternatively 20% or less, even alternatively between 10% and 30%. Percent crystallinity content is determined using Differential Scanning Calorimetry measurement according to ASTM E 794-85. In another embodiment, the polymers described herein have a percent crystallinity of between 5 and 40%, alternatively between 10 to 30%.

In another embodiment the polymer produced by this invention has a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less. Molecular weight distribution generally depends on the catalysts used and process conditions such as temperature, monomer concentration, catalyst ratio, if multiple catalysts are used, and the presence or absence of hydrogen. Hydrogen may be used at amounts up to 2 weight %, but is preferably used at levels of 50 to 500 ppm.

In another embodiment the polymer produced is found to have at least two molecular weights fractions are present at greater than 2 weight %, preferably greater than 20 weight %, each based upon the weight of the polymer as measured by Gel Permeation Chromatography. The fractions can be identified on the GPC trace by observing two distinct populations of molecular weights. An example would be a GPC trace showing a peak at 20,000 Mw and another peak at 50,000 Mw where the area under the first peak represents more than 2 weight % of the polymer and the area under the second peak represents more than 2 weight % of the polymer.

In another embodiment the polymer of this invention has 20 weight % or more (based upon the weight of the starting polymer) of hexane room temperature soluble fraction, and 70 weight % or less, preferably 50 weight % or less of Soxhlet boiling heptane insoluble, based upon the weight of the polymer. Soxhlet heptane insoluble refers to one of the fractions obtained when a sample is fractionated using successive solvent extraction technique. The fractionations are carried out in two steps: one involves room temperature solvent extraction, the other soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insoluble and the thimble from the final stage are air-dried in a hood to evaporate most of the solvent, then dried in a nitrogen-purged vacuum oven. The amount of insoluble left in the thimble is then calculated, provided the tare weight of the thimble is known.

In another embodiment, the polymers produced in this invention have a heptane insoluble fraction 70 weight % or less, based upon the weight of the starting polymer, and the heptane insoluble fraction has branching index g' of 0.9 (preferably 0.7) or less as measured at the Mz of the polymer. In a preferred embodiment the composition also has at least 20 weight % hexane soluble fraction, based upon the weight of the starting polymer. In another embodiment, the polymers produced in this invention have a heptane insoluble fraction 70 weight % or less, based upon the weight of the starting polymer and a Mz between 20,000 and 5000,000 of the heptane insoluble portion. In a preferred embodiment the composition also has at least 20 weight % hexane soluble fraction, based upon the weight of the starting polymer. In another embodiment the polymers produced have a hexane soluble portion of at least 20 weight %, based upon the weight of the starting polymer.

In another embodiment the polymer comprises propylene and 15 mole % ethylene or less, preferably 10 mole % ethylene or less, more preferably 9 mole % ethylene or less, more preferably 8 mole % ethylene or less, more preferably 7 mole % ethylene or less, more preferably 6 mole % ethylene or less, more preferably 5 mole % ethylene or less, more preferably 4 mole % ethylene or less, more preferably 3 mole % ethylene or less, more preferably 2 mole % ethylene or less, more preferably 1 mole % ethylene or less.

In another embodiment the polymer of this invention comprises less than 5 mole % of ethylene, preferably less than 4.5 mole % ethylene, preferably less than 4.0 mole % ethylene, alternatively less than 3.5 mole % ethylene, alternatively less than 3.0 mole % ethylene, alternatively less than 2.5 mole % ethylene, alternatively less than 2.0 mole % ethylene, alternatively less than 1.5 mole % ethylene, alternatively less than 1.0 mole % ethylene, alternatively less than 0.5 mole % ethylene, alternatively less than 0.25 mole % ethylene, alternatively 0 mole % ethylene.

For ease of reference the polymer produced by the second catalyst having at least 20% crystallinity may also be referred to as the "semi-crystalline polymer" and the polymer produced by the first catalyst component having a crystallinity of less than 5% may be referred to as the "amorphous polymer."

In another embodiment of this invention the polymer produced has a characteristic three-zone complex viscosity-temperature pattern, as shown in FIG. 1. The temperature dependence of complex viscosity was measured using ARES dynamic mechanical spectrometer operating at a frequency of 10 rad/s, with a strain of 20% under a nitrogen atmosphere, and a cooling rate of 10° C./min. The sample was first molten then gradually cooled down to room temperature while monitoring the build-up in complex viscosity. Above the melting point, which is typical of polymer processing temperature, the complex viscosity is relatively low (Zone I) and increases gradually with decreasing temperature. In zone II, a sharp increase in complex viscosity appears as temperature is dropped. The third zone (Zone III) is the high complex viscosity zone, which appears at lower temperatures corresponding to application (end use) temperatures. In Zone III the complex viscosity is high and varies slightly with further decrease in temperature. Such a complex viscosity profile provides, in hot melt adhesive applications, a desirable combination of long opening time at processing temperatures and fast set time at lower temperatures.

In a preferred embodiment, the polymers produced herein having less than 1 mol % ethylene, have at least 2 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 5 mol % as measured by Carbon 13 NMR as described below.

In an another embodiment, the polymers produced herein having between 1 and 10 mol % ethylene, have at least 2+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

In a preferred embodiment, the polymers produced herein, having less than 1 mol % ethylene, have an amorphous component (which is defined to be that portion of the polymer composition that has a crystallinity of less than 5%) which contains at least 3 mol % $(CH_2)_2$ units, preferably 4 mol %, preferably 6 mol %, more preferably 8 mol %, more preferably 10 mol %, more preferably 12 mol %, more preferably 15 mol %, more preferably 18 mol %, more preferably 20 mol % as measured by Carbon 13 NMR as described below.

In an another embodiment, the polymers produced herein having between 1 and 10 mol % ethylene, have an amorphous component (which is defined to be that portion of the polymer composition that has a crystallinity of less than 20%) which contains at least 3+X mol % $(CH_2)_2$ units, preferably 4+X mol %, preferably 6+X mol %, more preferably 8+X mol %, more preferably 10+X mol %, more preferably 12+X mol %, more preferably 15+X mol %, more preferably 18+X mol %, more preferably 20+X mol %, where X is the mole % of ethylene, and the $(CH_2)_2$ units are determined by Carbon 13 NMR as described below.

Monomers

In a preferred embodiment the polymer comprises an olefin homopolymer or copolymer, having less than 5 mol % ethylene, and comprising one or more C3 to C40 alpha olefins. In another preferred embodiment the olefin polymer, having less than 5 mol % ethylene, further comprises one or more diolefin comonomers, preferably one or more C4 to C40 diolefins.

In a preferred embodiment the polymer produced herein is a propylene homopolymer or copolymer. The comonomer is preferably a C4 to C20 linear, branched or cyclic monomer, and in one embodiment is a C4 to C12 linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. Ethylene may be present at 5 mol % or less.

In another embodiment the polymer produced herein is a copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

The polymerizable olefinic moiety can be linear, branched, cyclic-containing, or a mixture of these structures. Preferred linear alpha-olefins include C3 to C8 alpha-olefins, more preferably propylene, 1-butene, 1-hexene, and 1-octene, even more preferably propylene or 1-butene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the olefin polymer is homopolypropylene. In another preferred embodiment the olefin polymer comprises propylene, less than 5 mol % ethylene, and at least one divinyl comonomer. In another preferred embodiment the olefin polymer comprises propylene and at least one divinyl comonomer.

In another embodiment, the olefin polymer comprises:

a first monomer present at from 40 to 95 mole %, preferably 50 to 90 mole %, preferably 60 to 80 mole %, a comonomer present at from 5 to 40 mole %, preferably 10 to 60 mole %, more preferably 20 to 40 mole %, and a termonomer present at from 0 to 10 mole %, more preferably from 0.5 to 5 mole %, more preferably 1 to 3 mole %.

In a preferred embodiment the first monomer comprises one or more of any C3 to C8 linear, branched or cyclic alpha-olefins, including propylene, butene (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, and the like.

In a preferred embodiment the comonomer comprises one or more of any C2 to C40 linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, styrene, 3,5,5-trimethylhexene-1,3-methylpentene-1,4-methylpentene-1, norbornene and cyclopentene.

In a preferred embodiment the termonomer comprises one or more of any C2 to C40 linear, branched or cyclic alpha-olefins, (provided ethylene, if present, is present at 5 mole % or less), including, but not limited to, ethylene, propylene, butene, pentene, hexene, heptene, and octene, nonene, decene, undecene, dodecene, hexadecene, butadiene, 1,5-hexadiene, 1,6-heptadiene, 1,4-pentadiene, 1,7-octadiene, 1,8-nonadiene, 1,9-decadiene, 1,11-dodecadiene, styrene, 3,5,5-trimethylhexene-1,3-methylpentene-1,4-methylpentene-1, and cyclopentadiene.

Process

The polymers described herein may be produced by a process comprising:

1) selecting a first catalyst component capable of producing a polymer having a Mw of 100,000 or less and a heat of fusion of 10 J/g or less under the selected reaction conditions;

2) selecting a second catalyst component capable of producing polymer having an Mw of 100,000 or less and a crystallinity of 20% or more under the selected reaction conditions; and 3) contacting the catalyst components in the presence of one or more activators with one or more olefins, in a reaction zone.

The polymers described herein may be produced by a process comprising:

1) selecting a first catalyst component capable of producing a polymer having an Mw of 100,000 or less and a heat of fusion of 10 J/g or less;

2) selecting a second catalyst component capable of producing polymer having an Mw of 100,000 or less and a crystallinity of 20% or more;

3) contacting the catalyst components in the presence of one or more activators with one or more olefins and one or more dienes, in a reaction zone.

The polymers described herein may be produced by a process comprising:

1) selecting a first catalyst component capable of producing a polymer having an Mw of 100,000 or less and a heat of fusion of 10 J/g or less, capable of polymerizing macromonomers having reactive termini;

2) selecting a second catalyst component capable of producing macromonomers having reactive termini, an Mw of 100,000 or less and a crystallinity of 20% or more; and 3) contacting the catalyst components in the presence of one or more activators with one or more olefins, and optionally a diolefin in a reaction zone.

The polymers described herein may be produced by a process comprising:

1) selecting a first catalyst component capable of producing a polymer having an Mw of 50,000 or less and a heat of fusion of 10 J/g or less, capable of polymerizing macromonomers having reactive termini;

2) selecting a second catalyst component capable of producing macromonomers having reactive termini, an Mw of 30,000 or less and a crystallinity of 20% or more;

3) contacting the catalyst components in the presence of one or more activators with propylene, and optionally other olefins, in a reaction zone.

The polymers described herein may be produced by a continuous process comprising:

1) selecting a first catalyst component capable of producing a polymer having an Mw of 100,000 or less, preferably 80,000 or less, preferably 60,000 or less and a crystallinity of 5% or less, preferably 3% or less, more preferably 2% or less, under selected polymerization conditions;

2) selecting a second catalyst component capable of producing polymer having an Mw of 100,000 or less, preferably 80,000 or less, preferably 60,000 or less and a crystallinity of 30% or more, preferably 50% or more, more preferably 60% or more at the selected polymerization conditions;

3) contacting, under the selected polymerization conditions, the catalyst components in the presence of one or more activators with one or more C3 to C40 olefins, preferably one or more C3 to C12 olefins, preferably C3 and one or more C4 to C20 comonomers, and, optionally one or more diolefins, preferably a C4 to C20 diene;

4) at a temperature of greater than 100° C., preferably greater than 105° C., more preferably greater than 110° C., more preferably greater than 115° C.;

5) at a residence time of 120 minutes or less, preferably 50 minutes or less, preferably 40 minutes, preferably 30 minutes or less, preferably 25 minutes or less, more preferably 20 minutes or less, more preferably 15 minutes or less, more preferably at 10 minutes or less, more preferably at 5 minutes or less, or alternately between 120 minutes and 60 minutes;

6) wherein the ratio of the first catalyst to the second catalyst is from 1:1 to 50:1, preferably 1:1 to 40:1, more preferably 1:1 to 1:30;

7) wherein the activity of the catalyst components is at least 3 kilograms, preferably at least 50 kilograms, more preferably at least 100 kilograms, more preferably at least 200 kilograms, more preferably, 300 kilograms, more preferably 400 kilograms, more preferably 500 kilograms of polymer per gram of the catalyst mixture; and wherein at least 80%, preferably at least 85%, more preferably at least 90%, more preferably at least 95% of the olefins are converted to polymer.

In another embodiment at least 20% or more of the olefins are converted to polymer, preferably 20% or more, more preferably 60% or more, more preferably 75% or more, more preferably 85% or more, more preferably 95% or more.

In a preferred embodiment the process described above takes place in a solution phase, slurry or bulk phase polymerization process.

By continuous is meant a system that operates (or is intended to operate) without interruption or cessation. For example, a continuous process to produce a polymer would be one where the reactants are continually introduced into one or more reactors and polymer product is continually withdrawn.

In another preferred embodiment, in the process described above the concentrations of the reactants vary by 20% or less in the reaction zone during the residence time, preferably by 15% or less, more preferably by 10% or less. In a preferred embodiment the concentration of the monomer(s) remains constant in the reaction zone during the residence time. Preferably the concentration of the monomer(s) varies by 20% or less, preferably by 15% or less, more preferably by 10% or less, more preferably by 5% or less.

In a preferred embodiment the concentration of the catalyst components remains constant in the reaction zone during the residence time. Preferably the concentration of the monomer(s) varies by 20% or less, preferably by 15% or less, more preferably by 10% or less, more preferably by 5% or less.

In a preferred embodiment the concentration of the activator(s) remains constant in the reaction zone during the residence time. Preferably the concentration of the monomer(s)

varies by 20% or less, preferably by 15% or less, more preferably by 10% or less, more preferably by 5% or less.

In another preferred embodiment a third catalyst (or more) may be present in the processes described above. The third catalyst may be any of the catalyst components listed herein. Preferred third catalysts include catalysts that are capable of producing waxes. Other preferred third catalysts may include any catalyst described herein. One may select two or more catalysts to produce various macromonomers having reactive termini, used in combination with a catalyst that can polymerize such macromonomers. One may select two or more catalysts that can polymerize macromonomers and one catalyst that can produce macromonomers with reactive termini. Likewise one could also select three catalysts that produce different polymers under the same reaction conditions. For example one could select a catalyst that produces a somewhat crystalline polymer, one that produces a very crystalline polymer and one that produces an amorphous polymer, any of which may produce macromonomers with reactive termini or polymerize polymers having reactive termini. Similarly one could select two catalysts, one that produces crystalline polymers and one that produces an amorphous polymer, any of which may make macromonomers with reactive termini or polymerize polymers having reactive termini. Likewise one could select a catalyst that produces a somewhat crystalline polymer, one that produces a wax and one that produces an amorphous polymer, any of which may make macromonomers with reactive termini or polymerize polymers having reactive termini.

By reaction zone is meant an area where the activated catalyst and monomers can react.

By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer (which tend to be molecules larger than a typical single monomer such as ethylene or propylene), having reactive termini into a growing polymer chain. Vinyl terminated chains are generally more reactive than vinylene or vinylidene terminated chains.

In a particular embodiment the present invention is directed to a polyolefin polymer produced by copolymerizing one or more $C_3$ or higher alpha-olefins and/or one or more di-vinyl monomers, and optionally up to 5 mol % ethylene, in the presence of at least one stereospecific catalyst system and at least one other catalyst system in the same polymerization medium. Preferably, the polymerizations are carried out simultaneously in the presence of both catalysts. The polymer so produced may contain amorphous polymer segments and crystalline polymer segments in which at least some of the segments are linked. Typically the amorphous and the crystalline polymer segments are copolymers of one or more alpha-olefins (optionally including up to 5 mol % ethylene) and/or one or more monomers having at least two olefinically unsaturated bonds. Both of these unsaturated bonds are suitable for and readily incorporated into a growing polymer chain by coordination polymerization using either the first or second catalyst systems independently such that the di-olefin is incorporated into polymer segments produced by both catalysts in the mixed catalyst system according to this invention. In a preferred embodiment these monomers having at least two olefinically unsaturated bonds are di-olefins, preferably di-vinyl monomers. Crosslinking of at least a portion of the mixture of polymer segments is believed to be accomplished during the polymerization of the composition by incorporation of a portion of di-vinyl comonomers into two polymer segments, thus producing a crosslink between those segments.

In another embodiment, polyolefin branch-block compositions containing amorphous and semi-crystalline components may be prepared in a single reactor to yield desired property balance. In particular, aPP-g-scPP branch structures may be produced in-situ in a continuous solution reactor using mixed catalysts and propylene as the preferred feed. In one embodiment stereospecific bridged bis-indenyl group 4 catalysts can be selected to produce semicrystalline PP macromonomers. (All references to the Periodic Table of the Elements are to the Table published in Chemical and Engineering News, 63(5), 27, 1985.) A bridged mono-cyclopentadienyl heteroatom group 4 catalyst can be used to build amorphous PP (aPP) backbone while simultaneously incorporating some of the semi-crystalline macromonomers (scPP). This is believed to produce a aPP-g-scPP structure where the "-g-" indicates that the polymer types are at least partially grafted. By selecting the catalysts, the polymerization reaction conditions, and/or by introducing a diene modifier, the amorphous and crystalline components can be linked together to produce various branch-block structures. To effectively incorporate into a growing chain, a macromonomer with vinyl end group is preferred. Other types of chain end unsaturations (vinylene and vinylidene) can also be used. While not wishing to be bound by theory, branch-block copolymer is believed to comprise an amorphous backbone having crystalline side chains originating from the scPP macromonomers and the sidechains are believed to be polypropylene macromonomers, which can be prepared under solution polymerization conditions with catalysts suitable for preparing either of isotactic or syndiotactic polypropylene.

A preferred reaction process to produce polypropylene macromonomers having high levels of terminal vinyl unsaturation is described in U.S. Pat. No. 6,117,962. Typically used catalysts are stereorigid, chiral or asymmetric, bridged metallocenes. See, for example, U.S. Pat. No. 4,892,851, U.S. Pat. No. 5,017,714, U.S. Pat. No. 5,132,281, U.S. Pat. No. 5,296,434, U.S. Pat. No. 5,278,264, U.S. Pat. No. 5,304,614, U.S. Pat. No. 5,510,502, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954-963, and "ansa-Zirconocene Polymerization Catalysts with Annelated Ring Ligands-Effects on Catalytic Activity and Polymer Chain Lengths", Brinzinger, H., et al, Organometallics 1994, 13, 964-970, and documents referred to therein.

In some embodiments, the first catalyst which comprises a stereorigid transition metal pre-catalyst compound used to produce the semi-crystalline polypropylene macromonomers of the present invention is selected from the group consisting of racemic bridged bis(indenyl)zirconocenes or hafnocenes. In a another embodiment, the transition metal pre-catalyst compound is a rac-dimethylsilyl-bridged bis(indenyl)zirconocene or hafnocene. In another embodiment, the transition metal pre-catalyst compound is rac-dimethylsilyl bis(2-methyl-4-phenylindenyl)zirconium or hafnium dichloride or dimethyl. In another preferred embodiment, the transition metal catalyst is a rac-dimethylsilyl-bridged bis(indenyl) hafnocene such as rac-dimethylsilyl bis(indenyl)hafnium dimethyl or dichloride.

It is believed that the fraction of branch-block and the level of branching depend on the availability of macromonomers with unsaturated chain end and macromonomer incorporation capability of the specific catalyst. To increase the population of aPP-g-scPP branch-block composition, one typically operates within a process window that favors macromonomer production and insertion. Such conditions have been described in U.S. Pat. No. 6,117,962 and the journal article by W. Weng et al., Macromol. Rapid Commun., 2000, 21, 1103-1107 and are further illustrated by the examples therein.

It is also believed that the higher the population of vinyl terminated scPP macromonomers the higher the probability of getting them incorporated into aPP backbone and therefore the higher the branch-block population.

To further increase the population of macromonomers having vinyl chain ends diolefin monomers can be introduced into the reaction medium. The resultant product is typically a blend comprised of isotactic polypropylene segments, atactic polypropylene segments, and increased population of branch-block species resulting from the additional couplings brought about by the diolefin crosslinking agent.

Crosslinking typically refers to the connection of two polymer segments by incorporation of each double bond of a diolefin monomer into two different polymer segments. The polymer segments so connected can be the same or different, with respect to their crystallinity. Three or more polymer segments may also be connected via incorporation of two or more diolefins in on polymer segment into two other polymer segments.

A consideration for selection of the monomer, or combinations of monomers, is that, both crystalline and amorphous polymer segments can be formed with the selection of two or more different catalyst systems. In some embodiments it is further desired that the level of incorporation of the diolefin monomer, if present, into the crystalline segments be limited to an amount that will not substantially alter its crystallinity. The diolefin coupling agent is typically kept minimum to avoid gel formation.

As mentioned above, to increase the population of aPP-g-scPP branch-block composition, one typically operates within a process window that favors macromonomer production and insertion. Favorable conditions include:

1. High concentration of catalyst producing the semi-crystalline vinyl terminated macromonomers, and or 2. Adjusting the Al/metal ratio; and or 3. High operating temperature; and or 4. Catalyst structure that has a high affinity for macromonomer incorporation; and or 5. Relatively long residence time; and or 6. High monomer conversion (monomer starvation condition enhances the insertion of macromonomer); and or 7. Addition of modifier (diene) to enhance the population of vinyl terminated macromonomers.

Another method of enhancing aPP-g-scPP branch block compositions is to add in a chain transfer agent that transfers a vinyl group to the end of the polymer chain while deactivating the catalyst. Such chain transfer agents include, but are not limited to, vinyl chloride, vinyl fluoride, vinyl bromide. In the process, the catalyst is reactivated by the presence of an aluminum alkyl activator such as an alumoxane (typically methylalumoxane).

Similarly, molecular weight distribution, melting and crystallization characteristics can be controlled through catalyst selection, comonomer addition and changes in process conditions such as temperature and catalyst ratio if more than one catalyst is used.

Catalyst Compounds

Any catalyst compound that can produce the desired polymer species (i.e. a polymer having an Mw of 100,000 or less and a heat of fusion of 70 J/g or less, or a polymer having an Mw of 100,000 or less and a crystallinity of 40% or less) may be used in the practice of this invention. In the description herein the transition metal compound may be described as a catalyst precursor, a pre-catalyst compound or a catalyst compound, and these terms are used interchangeably. A catalyst system is combination of a catalyst precursor and an activator.

Catalyst Compounds and Selection

Any pre-catalyst compound (catalyst precursor compound) that can produce the desired polymer species may be used in the practice of this invention. Pre-catalyst compounds which may be utilized in the process of the invention include metallocene transition metal compounds (containing one, two, or three cyclopentadienyl ligands per metal atom), non-metallocene early transition metal compounds (including those with amide and/or phenoxide type ligands), non-metallocene late transition metal compounds (including those with diimine or diiminepyridyl ligands), and other transition metal compounds.

Generally, bulky ligand metallocene compounds (pre-catalysts) useful in this invention include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadienyl, a cyclooctatetraendiyl, a cyclobutadienyl, or a substituted allyl ligand. Other ligands that can function similarly to a cyclopentadienyl-type ligand include amides, phosphides, imines, phosphinimines, amidinates, and ortho-substituted phenoxides. The metal atom is preferably selected from Groups 3 through 15 and or lanthanide or actinide series of the Periodic Table of Elements. Preferably the metal is a transition metal from Groups 3 through 12, more preferably Groups 4, 5 and 6, and most preferably the transition metal is from Group 4.

In one embodiment, the catalyst composition useful in the invention includes one or more bulky ligand metallocene catalyst compounds represented by the formula:

$$L^A L^B M Q^*_n \qquad (1)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, dibenzo[b,h]fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, boratobenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula 1 only one of either $L^A$ or $L^B$ is present.

Independently, each $L^A$ and $L^B$ may be unsubstituted or substituted with a combination of substituent groups R*. Non-limiting examples of substituent groups R* include one or more from the group selected from hydrogen, or linear or branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals or combination thereof. In a preferred embodiment, substituent groups R* have up to 50 non-hydrogen atoms, preferably from 1 to 30 carbon, that can also be substituted with halogens or heteroatoms or the like. Non-limiting examples of alkyl substituents R* include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R* include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R* groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group, R*, may also be a diradical bonded to L at one end and forming a carbon sigma bond to the metal M. Other ligands may be bonded to the metal M, such as at least one leaving group Q*. In one embodiment, Q* is a monoanionic labile ligand having a sigma-bond to M. Depending on the oxidation state of the metal, the value for n is 0, 1 or 2 such that Formula 1 above represents a neutral bulky ligand metallocene catalyst compound. Non-limiting examples of Q* ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q*'s form a part of a fused ring or ring system. Other examples of Q* ligands include those substituents for R* as described above and including cyclobutyl, cyclohexyl, heptyl, tolyl, trifluoromethyl, tetramethylene (both Q*), pentamethylene (both Q*), methylidene (both Q*), methoxy, ethoxy, propoxy, phenoxy, bis(N-methylanilide), dimethylamide, dimethylphosphide radicals and the like.

In another embodiment, the catalyst composition useful in the invention may include one or more bulky ligand metallocene catalyst compounds where $L^A$ and $L^B$ of Formula 1 are bridged to each other by at least one bridging group, A*, as represented by Formula 2:

$$L^A A^* L^B M Q^*_n \qquad (2)$$

The compounds of Formula 2 are known as bridged, bulky ligand metallocene catalyst compounds. $L^A$, $L^B$, M, Q* and n are as defined above. Non-limiting examples of bridging group A* include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A* contains a carbon, silicon or germanium atom, most preferably A* contains at least one silicon atom or at least one carbon atom. The bridging group A* may also contain substituent groups R* as defined above including halogens and iron. Non-limiting examples of bridging group A* may be represented by $R'_2C$, $R'_2CCR'_2$, $R'_2Si$, $R'_2SiCR'_2$, $R'_2SiSiR'_2$ $R'_2Ge$, R'P, R'N, R'B where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula 2 have two or more bridging groups A* (EP 664 301 B1). In another embodiment, the bulky ligand metallocene catalyst compounds are those where the R* substituents on the bulky ligands $L^A$ and $L^B$ of Formulas 1 and 2 are substituted with the same or different number of substituents on each of the bulky ligands. In another embodiment, the bulky ligands $L^A$ and $L^B$ of Formulas 1 and 2 are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions useful in the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the catalyst composition useful in the invention includes one or more bulky ligand metallocene catalyst compounds represented by Formula 3:

$$L^C A^* J^* MQ^*_n \qquad (3)$$

where M is a Group 3 to 16 metal atom or a metal selected from the Group of actinides and lanthanides of the Periodic Table of Elements, preferably M is a Group 3 to 12 transition metal, and more preferably M is a Group 4, 5 or 6 transition metal, and most preferably M is a Group 4 transition metal in any oxidation state, and is especially titanium; $L^C$ is a substituted or unsubstituted bulky ligand bonded to M; $J^*$ is bonded to M; $A^*$ is bonded to $J^*$ and $L^C$; $J^*$ is a heteroatom ancillary ligand; and $A^*$ is a bridging group; $Q^*$ is a univalent anionic ligand; and n is the integer 0, 1 or 2. In Formula 3 above, $L^C$, $A^*$ and $J^*$ form a fused ring system. In an embodiment, $L^C$ of Formula 3 is as defined above for $L^A$. $A^*$, M and $Q^*$ of Formula 3 are as defined above in Formula 1. In Formula 3, $J^*$ is a heteroatom containing ligand in which $J^*$ is an element with a coordination number of three from Group 15 or an element with a coordination number of two from Group 16 of the Periodic Table of Elements. Preferably $J^*$ contains a nitrogen, phosphorus, oxygen or sulfur atom with nitrogen being most preferred. In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene compounds (pre-catalysts) are those complexes based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst systems are described in U.S. Pat. No. 5,942,462, which is incorporated herein by reference.

Still other useful catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

It is further contemplated that any one of the bulky ligand metallocene catalyst compounds, described above, have at least one fluoride or fluorine containing leaving group as described in U.S. application Ser. No. 09/191,916 file Nov. 13, 1998.

The Group 15 containing metal compounds utilized in the catalyst composition of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference.

For additional information of Group 15 containing metal compounds, please see Mitsui Chemicals, Inc. in EP 0 893 454 A1 which discloses transition metal amides combined with activators to polymerize olefins.

In one embodiment the Group 15 containing metal compound is allowed to age prior to use as a polymerization. It has been noted on at least one occasion that one such catalyst compound (aged at least 48 hours) performed better than a newly prepared catalyst compound.

It is further contemplated that bis-amide based pre-catalysts may be used. Exemplary compounds include those described in the patent literature. International patent publications WO 96/23010, WO 97/48735 and Gibson, et al., *Chem. Comm.*, pp. 849-850 (1998), which disclose diiminebased ligands for Group 8-10 compounds that undergo ionic activation and polymerize olefins. Polymerization catalyst systems from Group-5-10 metals, in which the active center is highly oxidized and stabilized by low-coordination-number, polyanionic, ligand systems, are described in U.S. Pat. No. 5,502,124 and its divisional U.S. Pat. No. 5,504,049. See also the Group-5 organometallic catalyst compounds of U.S. Pat. No. 5,851,945 and the tridentate-ligand-containing, Group-5-10, organometallic catalysts of U.S. Pat. No. 6,294,495. Group-11 catalyst precursor compounds, activatable with ionizing cocatalysts, useful for olefin and vinylic polar molecules are described in WO 99/30822.

Other useful catalyst compounds are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1995, 14, 5478-5480, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is herein incorporated herein by reference.

U.S. Pat. No. 5,318,935 describes bridged and unbridged, bisamido catalyst compounds of Group-4 metals capable of olefin polymerization. Bridged bi(arylamido)-Group-4 compounds for olefin polymerization are described by D. H. McConville, et al., in *Organometallics* 1995, 14, 5478-5480. This reference presents synthetic methods and compound characterizations. Further work appearing in D. H. McConville, et al, *Macromolecules* 1996, 29, 5241-5243, describes bridged bis(arylamido)-Group-4 compounds that are polymerization catalysts for 1-hexene. Additional invention-suitable transition metal compounds include those described in WO 96/40805. Cationic Group-3- or Lanthanide-metal olefin polymerization complexes are disclosed in copending U.S. application Ser. No. 09/408,050, filed 29 Sep. 1999. A monoanionic bidentate ligand and two monoanionic ligands stabilize those catalyst precursors, which can be activated with this invention's ionic cocatalysts.

The literature describes many additional suitable catalyst-precursor compounds. Compounds that contain abstractable ligands or that can be alkylated to contain abstractable ligands suit this invention. See, for instance, V. C. Gibson, et al; "The Search for New-Generation Olefin Polymerization Catalysts: Life Beyond Metallocenes", *Angew. Chem. Int. Ed.,* 38, 428-447 (1999).

This invention may also be practiced with the catalysts containing phenoxide ligands such as those disclosed in EP 0 874 005 A1, which in incorporated by reference herein.

In another embodiment, conventional-type transition metal catalysts may be used in the practice of this invention. Conventional-type transition metal catalysts are those traditional Ziegler-Natta, vanadium and Phillips-type catalysts well known in the art. Such as, for example Ziegler-Natta catalysts as described in *Ziegler-Natta Catalysts and Polymerizations*, John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359 and 4,960,741, all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

Preferred conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2HS)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethylhexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302, 565, 4,302,566, 4,376,062, 4,379,758, 5,066,737, 5,763,723, 5,849,655, 5,852,144, 5,854,164 and 5,869,585 and published EP-A2 0 426 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487, 112, 4,472,559, 4,182,814 and 4,689,437, all of which are incorporated herein by reference.

It is also contemplated that other catalysts can be combined with the catalyst compounds in the catalyst composition useful in the invention. For example, see U.S. Pat. Nos. 4,937, 299, 4,935,474, 5,281,679, 5,359,015, 5,470,811, and 5,719, 241 all of which are herein fully incorporated herein reference.

It is further contemplated that one or more of the catalyst compounds described above or catalyst systems may be used in combination with one or more conventional catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Preferred metallocene catalysts used in this invention can more specifically be represented by one of the following general formulae (all references to Groups being the new Group notation of the Period Table of the Elements as described by Chemical and Engineering News, 63(5), 27, 1985):

 (4)

 (5)

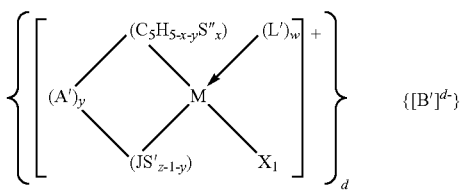

(6)

wherein:

(A-Cp) is either (Cp), (Cp*) or Cp-A'-Cp*; Cp and Cp* are the same or different cyclopentadienyl rings substituted with from zero to five substituent groups S", each substituent group S" being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S" groups are joined forming a $C_4$ to $C_{20}$ ring to give a saturated or unsaturated polycyclic cyclopentadienyl ligand; Cp and Cp* may also have one or two carbon atoms within the ring replaced by a Group 15 or 16 element especially, S, O, N or P;

A' is a bridging group;

$(C_5H_{5-y-x}S''_x)$ is a cyclopentadienyl ring substituted with from zero to five S" radicals as defined above;

x is from 0 to 5 denoting the degree of substitution;

M is titanium, zirconium or hafnium;

$X_1$ is a hydride radical, hydrocarbyl radical, substituted-hydrocarbyl radical, hydrocarbyl-substituted organometalloid radical or halocarbyl-substituted organometalloid radical which radical may optionally be covalently bonded to both either M and L or L' or all or any M, S" or S', and provided that $X_1$ is not a substituted or unsubstituted cyclopentadienyl ring;

$(JS'_{z-1-y})$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

y is 0 or 1;

L is an olefin, diolefin or aryne ligand. L' is the same as L, and can additionally be an amine, phosphine, ether, or sulfide ligand, or any other neutral Lewis base; L' can also be a second transition metal compound of the same type such that the two metal center M and M* are bridged by $X_1$ and $X'_1$, wherein M* has the same meaning as M, $X'_1$, $X_2$ and $X'_2$ have the same meaning as $X_1$, where such dimeric compounds which are precursors to the cationic portion of the catalyst are represented by the formula:

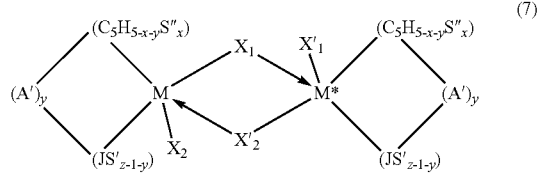

(7)

wherein:

w is an integer from 0 to 3;

B' is a chemically stable, non-nucleophilic anionic complex having a molecular diameter about or greater than 4 Angstroms or an anionic Lewis-acid activator resulting from the reaction of a Lewis-acid activator with the precursor to the cationic portion of the catalyst system described in formulae 1-4. When B' is a Lewis-acid activator, $X_1$ can also be an alkyl group donated by the Lewis-acid activator; and d is an integer representing the charge of B'.

The catalysts are preferably prepared by combining at least two components. In one preferred method, the first component is a cyclopentadienyl derivative of a Group 4 metal compound containing at least one ligand which will combine with the second component or at least a portion thereof such as a cation portion thereof. The second component is an ion-exchange compound comprising a cation which will irreversibly react with at least one ligand contained in said Group 4 metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallacarboranes.

In general, suitable anions for the second component may be any stable and bulky anionic complex having the following molecular attributes: 1) the anion should have a molecular diameter greater than 4 Angstroms; 2) the anion should form stable ammonium salts; 3) the negative charge on the anion should be delocalized over the framework of the anion or be localized within the core of the anion; 4) the anion should be a relatively poor nucleophile; and 5) the anion should not be a powerful reducing or oxidizing agent. Anions meeting these criteria—such as polynuclear boranes, carboranes, metallacarboranes, polyoxoanions and anionic coordination complexes are well described in the chemical literature.

The cation portion of the second component may comprise Bronsted acids such as protons or protonated Lewis bases or may comprise Lewis acids such as ferricinum, tropylium, triphenylcarbenium or silver cations.

In another preferred method, the second component is a Lewis-acid complex which will react with at least one ligand of the first component, thereby forming an ionic species described in formulae 4-6 with the ligand abstracted from the first component now bound to the second component. Alumoxanes and especially methylalumoxane, the product formed from the reaction of trimethylaluminum in an aliphatic or aromatic hydrocarbon with stoichiometric quantities of water, are particularly preferred Lewis-acid second components. Modified alumoxanes are also preferred. Alumoxanes are well known in the art and methods for their preparation are illustrated by U.S. Pat. Nos. 4,542,199; 4,544,762; 5,015,749; and 5,041,585. A technique for preparing modified alumoxanes has been disclosed in U.S. Pat. No. 5,041,584, in EPA 0 516 476, and in EPA 0 561 476, which are incorporated by reference herein.

Upon combination of the first and second components, the second component reacts with one of the ligands of the first component, thereby generating an anion pair consisting of a Group 4 metal cation and the aforementioned anion, which anion is compatible with and non-coordinating towards the Group 4 metal cation formed from the first component. The anion of the second compound must be capable of stabilizing the Group 4 metal cation's ability to function as a catalyst and must be sufficiently labile to permit displacement by an olefin, diolefin or an acetylenically unsaturated monomer during polymerization. The catalysts of this invention may be supported. U.S. Pat. No. 4,808,561, issued Feb. 28, 1989; U.S. Pat. No. 4,897,455 issued Jan. 3, 1990; U.S. Pat. No. 5,057,475 issued Oct. 15, 1991; U.S. patent application Ser. No. 459,921 (published as PCT International publication WO 91/09882), Canadian Patent 1,268,753, U.S. Pat. No. 5,240,894 and WO 94 03506 disclose such supported catalysts and the methods to produce such and are herein incorporated by reference.

The Group 4 metal compounds; i.e., titanium, zirconium and hafnium metallocene compounds, useful as first compounds (pre-catalysts) in the preparation of the preferred metallocene catalysts of this invention are cyclopentadienyl derivatives of titanium, zirconium and hafnium. In general, useful titanocenes, zirconocenes and hafnocenes may be represented by the following general formulae:

(8)

(9)

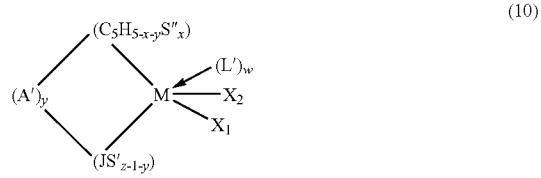

(10)

wherein:
(A-Cp) is either (Cp)(Cp*) or Cp-A'-Cp*; Cp and Cp* are the same or different cyclopentadienyl rings substituted with from zero to five substituent groups S", each substituent group S" being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S" groups are joined forming a $C_4$ to $C_{20}$ ring to give a saturated or unsaturated polycyclic cyclopentadienyl ligand;
A' is a bridging group;
y is 0 or 1;
$(C_5H_{5-y-x}S''_x)$ is a cyclopentadienyl ring substituted with from zero to five S" radicals as defined above;
x is from 0 to 5 denoting the degree of substitution;
$(JS'_{x-1-y})$ is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;
L is an olefin, diolefin or aryne ligand. L' is the same as L and can additionally be an amine, phosphine, ether, or sulfide ligand, or any other neutral Lewis base; L' can also be a second transition metal compound of the same type such that the two metal centers M and M* are bridged by $X_1$ and $X'_1$, wherein M* has the same meaning as M, $X'_1$ has the same meaning as $X_1$ and $X'_2$ has the same meaning as $X_2$ where such dimeric compounds which are precursors to the cationic portion of the catalyst are represented by formula 7 above;

w is an integer from 0 to 3; and
$X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Table A depicts representative constituent moieties for the metallocene components of formulae 7-10. The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, 1-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl. In general, the ligands or groups illustrated in Table A include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. Examples of specific invention catalyst precursors take the following formula where some components are listed in Table A. To illustrate members of the transition metal component, select any combination of the species listed in Tables A. For nomenclature purposes, for the bridging group, A', the words "silyl" and "silylene" are used interchangeably, and represent a diradical species. For the bridging group A', "ethylene" refers to a 1,2-ethylene linkage and is distinguished from ethene-1,1-diyl. Thus, for the bridging group A', "ethylene" and "1,2-ethylene" are used interchangeably. For compounds possessing a bridging group, A', the bridge position on the cyclopentadienyl-type ring is always considered the 1-position. Thus, for example, the use of "1-fluorenyl" is interchangeable with the use of "fluorenyl."

Illustrative compounds of the formula 8 type are: bis(cyclopentadienyl)hafnium dimethyl, ethylenebis(tetrahydroindenyl)zirconium dihidryde, bis(pentamethyl)zirconium diethyl, dimethylsilyl(1-fluorenyl)(cyclopentadienyl)titanium dichloride and the like. Illustrative compounds of the formula 9 type are: bis(cyclopentadienyl)(1,3-butadiene)zirconium, bis(cyclopentadienyl)(2,3-dimethyl-1,3-butadiene) zirconium, bis(pentamethylcyclopentadienyl)(benzene)zirconium, bis(pentamethylcyclopentadienyl)titanium ethylene and the like. Illustrative compounds of the formula 10 type are: dimethylsilyl(tetramethylcyclopentadienyl)(t-butylamido)zirconium dichloride, ethylene(methylcyclopentadienyl)(phenylamido)titanium dimethyl, methylphenylsilyl(indenyl)(phenyphosphido)hafnium dihydride and (pentamethylcyclopentadienyl)(di-t-butylamido)hafnium dimethoxide.

The conditions under which complexes containing neutral Lewis base ligands such as ether or those which form dimeric compounds is determined by the steric bulk of the ligands about the metal center. For example, the t-butyl group in $Me_2Si(Me_4C_5)(N-t-Bu)ZrCl_2$ has greater steric requirements that the phenyl in $Me_2Si(Me_4C_5)(NPh)ZrCl_2.Et_2O$ thereby not permitting ether coordination in the former compound in its solid state. Similarly, due to the decreased steric bulk of the trimethylsilylcyclopentadienyl group in $[Me_2Si(Me_3SiC_5H_3)(N-t-Bu)ZrCl_2]_2$ versus that of the tetramethylcyclopentadienyl group in $Me_2Si(Me_4C_5)(N-t-Bu)ZrCl_2$, the former compound is dimeric and the latter is not.

TABLE A

A'

Dimethylsilylene
Diethylsilylene
Dipropylsilylene
Dibutylsilylene
Dipentylsilylene
Dihexylsilylene
Diheptylsilylene
Dioctylsilylene
Dinonylsilylene
Didecylsilylene
Diundecylsilylene
Didodecylsilylene
Ditridecylsilylene
Ditetradecylsilylene
Dipentadecylsilylene
Dihexadecylsilylene
Diheptadecylsilylene
Dioctadecylsilylene
Dinonadecylsilylene
Dieicosylsilylene
Diheneicosylsilylene
Didocosylsilylene
Ditricosylsilylene
Ditetracosylsilylene
Dipentacosylsilylene
Dihexacosylsilylene
Diheptacosylsilylene
Dioctacosylsilylene
Dinonacosylsilylene
Ditriacontylsilylene
Dicyclohexylsilylene
Dicyclopentylsilylene
Dicycloheptylsilylene
Dicyclooctylsilylene
Dicyclodecylsilylene
Dicyclododecylsilylene
Dinapthylsilylene
Diphenylsilylene
Ditolylsilylene
Dibenzylsilylene
Diphenethylsilylene
di(butylphenethyl)silylene
Methylethylsilylene
Methylpropylsilylene
Methylbutylsilylene
Methylhexylsilylene
Methylphenylsilylene
Ethylphenylsilylene
Ethylpropylsilylene
Ethylbutylsilylene
Propylphenylsilylene
Dimethylgermylene
Diethylgermylene TABLE A-continued Diphenylgermylene
Methylphenylgermylene
Cyclotetramethylenesilylene
Cyclopentamethylenesilylene
Cyclotrimethylenesilylene
Cyclohexylazanediyl
Butylazanediyl
Methylazanediyl
Phenylazanediyl
Perfluorophenylazanediyl
Methylphosphanediyl
Ethylphosphanediyl
Propylphosphanediyl
Butylphosphanediyl
Cyclohexylphosphanediyl
Phenylphosphanediyl
Methylboranediyl
Phenylboranediyl
Methylene
Dimethylmethylene
Diethylmethylene
Dibutylmethylene
Dipropylmethylene
Diphenylmethylene
Ditolylmethylene
di(butylphenyl)methylene
di(trimethylsilylphenyl)methylene
di(triethylsilylphenyl)methylene
Dibenzylmethylene
Cyclotetramethylenemethylene
Cyclopentamethylenemethylene
Ethylene
Methylethylene
Dimethylethylene
Trimethylethylene
Tetramethylethylene
Cyclopentylene
Cyclohexylene
Cycloheptylene
Cyclooctylene
Propanediyl
Methylpropanediyl
Dimethylpropanediyl
Trimethylpropanediyl
Tetramethylpropanediyl
Pentamethylpropanediyl
Hexamethylpropanediyl
Tetramethyldisiloxylene
Vinylene
ethene-1,1-diyl
Divinylsilylene
Dipropenylsilylene
Dibutenylsilylene
Methylvinylsilylene
Methylpropenylsilylene
Methylbutenylsilylene
Dimethylsilylmethylene
Diphenylsilylmethylene
Dimethylsilylethylene
Diphenylsilylethylene
Dimethylsilylpropylene
Diphenylsilylpropylene
Dimethylstannylene
Diphenylstannylene
Cp, Cp*, CpR or $(C_5H_{5-y-x}S''_x)$ cyclopentadienyl
methylcyclopentadienyl
dimethylcyclopentadienyl
trimethylcyclopentadienyl
tetramethylcyclopentadienyl
pentamethylcyclopentadienyl (no A')
ethylcyclopentadienyl
diethylcyclopentadienyl
propylcyclopentadienyl
dipropylcyclopentadienyl
butylcyclopentadienyl
dibutylcyclopentadienyl
pentylcyclopentadienyl TABLE A-continued dipentylcyclopentadienyl
hexylcyclopentadienyl
dihexylcyclopentadienyl
heptylcyclopentadienyl
diheptylcyclopentadienyl
octylcyclopentadienyl
dioctylcyclopentadienyl
nonylcyclopentadienyl
dinonylcyclopentadienyl
decylcyclopentadienyl
didecylcyclopentadienyl
undecylcyclopentadienyl
dodecylcyclopentadienyl
tridecylcyclopentadienyl
tetradecylcyclopentadienyl
pentadecylcyclopentadienyl (no A')
hexadecylcyclopentadienyl
heptadecylcyclopentadienyl
octadecylcyclopentadienyl
nonadecylcyclopentadienyl
eicosylcyclopentadienyl
heneicosylcyclopentadienyl
docosylcyclopentadienyl
tricosylcyclopentadienyl
tetracosylcyclopentadienyl
pentacosylcyclopentadienyl
hexacosylcyclopentadienyl
heptacosylcyclopentadienyl
octacosylcyclopentadienyl
nonacosylcyclopentadienyl
triacontylcyclopentadienyl
cyclohexylcyclopentadienyl
phenylcyclopentadienyl
diphenylcyclopentadienyl
triphenylcyclopentadienyl
tetraphenylcyclopentadienyl
pentaphenylcyclopentadienyl
tolylcyclopentadineyl
benzylcyclopentadienyl
phenethylcyclopentadienyl
cyclohexylmethylcyclopentadienyl
napthylcyclopentadienyl
methylphenylcyclopentadienyl
methyltolylcyclopentadienyl
methylethylcyclopentadienyl
methylpropylcyclopentadienyl
methylbutylcyclopentadienyl
methylpentylcyclopentadienyl
methylhexylcyclopentadienyl
methylheptylcyclopentadienyl
methyloctylcyclopentadienyl
methylnonylcyclopentadienyl
methyldecylcyclopentadienyl
vinylcyclopentadienyl
propenylcyclopentadienyl
butenylcyclopentadienyl
indenyl
methylindenyl
dimethylindenyl
trimethylindenyl
methylpropylindenyl
dimethylpropylindenyl
methyldipropylindenyl
methylethylindenyl
methylbutylindenyl
ethylindenyl
propylindenyl
butylindenyl
pentylindenyl
hexylindenyl
heptylindenyl
octylindenyl
nonylindenyl
decylindenyl
phenylindenyl
(fluorophenyl)indenyl
(methylphenyl)indenyl
biphenylindenyl
(bis(trifluoromethyl)phenyl)indenyl TABLE A-continued napthylindenyl
phenanthrylindenyl
benzylindenyl
benzindenyl
cyclohexylindenyl
methylphenylindenyl
ethylphenylindenyl
propylphenylindenyl
methylnapthylindenyl
ethylnapthylindenyl
propylnapthylindenyl
(methylphenyl)indenyl
(dimethylphenyl)indenyl
(ethylphenyl)indenyl
(diethylphenyl)indenyl
(propylphenyl)indenyl
(dipropylphenyl)indenyl
methyltetrahydroindenyl
dimethyltetrahydroindenyl
dimethyldihydroindenyl
dimethyltrihydroindenyl
methylphenyltetrahydroindenyl
methylphenyldihydroindenyl
methylphenyltrihydroindenyl
ethyltetrahydroindenyl
propyltetrahydroindenyl
butyltetrahydroindenyl
Phenyltetrahydroindenyl
Fluorenyl
Methylfluorenyl
Dimethylfluorenyl
Trimethylfluorenyl
Ethylfluorenyl
Propylfluorenyl
Butylfluorenyl
Dibutylfluorenyl
Pentylfluorenyl
Hexylfluorenyl
Heptylfluorenyl
Octylfluorenyl
Nonylfluorenyl
Decylfluorenyl
Phenylfluorenyl
Napthylfluorenyl
Benzylfluorenyl
Methylphenylfluorenyl
Ethylphenylfluorenyl
Propylphenylfluorenyl
Methylnapthylfluorenyl
Ethylnapthylfluorenyl
Propylnapthylfluorenyl
Octahydrofluorenyl
tetrahydrofluorenyl
octamethyloctahydrodibenzo[b,h]fluorenyl
Tetramethyltetrahydrobenzo[b]fluorenyl
Diphenylmethylcyclopentadienyl
Trimethylsilylcyclopentadienyl
Triethylsilylcyclopentadienyl
Trimethylgermylcyclopentadienyl
Trimethylstannylcyclopentadienyl
Triethylplumbylcyclopentadienyl
Trifluromethylcyclopentadienyl
N,N-dimethylamidocyclopentadienyl
P,P-dimethylphosphidocyclopentadienyl
N,N-diethylamidocyclopentadienyl
Methoxycyclopentadienyl
Ethoxycyclopentadienyl
trimethylsiloxycyclopentadienyl
(N,N-
Methyoxyindenyl
Dimethyoxyindenyl
N,N-dimethylaminoindenyl
Trimethylsiloxyindenyl
Butyldimethylsiloxyindenyl
bis(N,N-dimethylamino)indenyl
di(trimethylsiloxy)indenyl
di(butyldimethylsiloxy)indenyl
Methoxyfluorenyl
Dimethoxyfluorenyl TABLE A-continued N,N-dimethylaminofluorenyl
Trimethylsiloxyfluorenyl
Butyldimethylsiloxyfluorenyl
Dimethoxyfluorenyl
bis(N,N-dimethylamino)fluorenyl
di(trimethylsiloxy)fluorenyl
di(butyldimethylsiloxy)fluorenyl
$(JS'_{z-1-y})$ (y = 1)

Methylamido
Ethylamido
Propylamido
Butylamido
Pentylamido
Hexylamido
Heptylamido
Octylamido
Nonylamido
Decylamido
Eicosylamido
Heneicosylamido
Docosylamido
Tricosylamido
Tetracosylamido
Pentacosylamido
Hexacosylamido
Heptacosylamido
Octacosylamido
Nonacosylamido
Triacontylamido
Phenylamido
Tolylamido
Phenethylamido
Benzylamido
Cyclobutylamido
Cyclopentylamido
Cyclohexylamido
Cycloheptylamido
Cyclooctylamido
Cyclononylamido
Cyclodecylamido
Cyclododecylamido
Adamantylamido
Norbornylamido
Perfluorophenylamido
Fluorophenylamido
Difluorophenylamido
Oxo
Sulfido
$(JS'_{z-1-y})$ (y = 0)

Methoxide
Ethoxide
Phenoxide
Dimethylphenoxide
Dipropylphenoxide
Methylthio
Ethylthio
Phenylthio
Dimethylphenylthio
Dipropylphenylthio
$X_1$ or $X_2$ Chloride
Bromide
Iodide
Fluoride
Hydride
Methyl
Ethyl
Propyl
Butyl
Pentyl
Hexyl
Heptyl
Octyl
Nonyl
Decyl
Undecyl Dodecyl
Tridecyl
Tetradecyl
Pentadecyl
Hexadecyl
Heptadecyl
Octadecyl
Nonadecyl
Eicosyl
Heneicosyl
Docosyl
Tricosyl
Tetracosyl
Pentacosyl
Hexacosyl
Heptacosyl
Octacosyl
Nonacosyl
Triacontyl
Phenyl
Benzyl
Phenethyl
Tolyl
Methoxy
Ethoxy
Propoxy
Butoxy
Dimethylamido
Diethylamido
Methylethylamido
Phenoxy
Benzoxy
Allyl
$X_1$ and $X_2$ together methylidene
Ethylidene
Propylidene
Tetramethylene
Pentamethylene
Hexamethylene
Ethylenedihydroxy
Butadiene
Methylbutadiene
Dimethylbutadiene
Pentadiene
Methylpentadiene
Dimethylpentadiene
Hexadiene
Methylhexadiene
Dimethylhexadiene
M titanium
zirconium
hafnium
L or L' (optional)

ethylene
propylene
butene
hexene
styrene
hexadiene
butadiene
dimethylbutadiene
pentadiene
methylhexadiene
dimethylhexadiene
acetylene
methylacetylene
ethylacetylene
benzyne
cyclopentene
cyclohexene
L' (optional)

diethylether
dimethylether

TABLE A-continued trimethylamine
triphenylamine
triethylamine
tricyclohexylphosp
triphenylphosphine
trimethylphosphin
tetrahydrofuran
furan
thiophene
dimethylsulfide
diphenylsulfide Additional preferred catalysts include those described in WO 01/48034, which is incorporated herein by reference. Particularly preferred catalyst compounds include those disclosed at page 9, line 38 to page 25, line 42, page 28, lines 5 to 17, and page 30, line 37 to page 35, line 28.

Activators and Activation Methods for Catalyst Compounds

The polymerization pre-catalyst compounds, described above, are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Aluminoxane and Aluminum Alkyl Activators

In one embodiment, alumoxane activators are utilized as an activator in the catalyst composition useful in the invention. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

The activator compounds comprising Lewis-acid activators and in particular alumoxanes are represented by the following general formulae:

  (11)

  (12)

  (13)

An alumoxane is generally a mixture of both the linear and cyclic compounds. In the general alumoxane formula, $R^3$, $R^4$, $R^5$ and $R^6$ are, independently a $C_1$-$C_{30}$ alkyl radical, for example, methyl, ethyl, propyl, butyl, pentyl, hexyl, heptyl, octyl, nonyl, decyl, and "p" is an integer from 1 to about 50. Most preferably, $R^3$, $R^4$, $R^5$ and $R^6$ are each methyl and "p" is a least 4. When an alkyl aluminum halide or alkoxide is employed in the preparation of the alumoxane, one or more $R^{3-6}$ groups may be halide or alkoxide. M' is a metal or metalloid, and Q' is a partially or fully fluorinated hydrocarbyl.

It is recognized that alumoxane is not a discrete material. A typical alumoxane will contain free trisubstituted or trialkyl aluminum, bound trisubstituted or trialkyl aluminum, and alumoxane molecules of varying degree of oligomerization. Those methylalumoxanes most preferred contain lower levels of trimethylaluminum. Lower levels of trimethylaluminum can be achieved by reaction of the trimethylaluminum with a Lewis base or by vacuum distillation of the trimethylaluminum or by any other means known in the art. It is also recognized that after reaction with the transition metal compound, some alumoxane molecules are in the anionic form as represented by the anion in equations 4-6, thus for our purposes are considered "non-coordinating" anions.

For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Alumoxanes may be produced by the hydrolysis of the respective trialkylaluminum compound. MMAO may be produced by the hydrolysis of trimethylaluminum and a higher trialkylaluminum such as tri-iso-butylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Aluminum alkyl or organoaluminum compounds which may be utilized as activators (or scavengers) include trimethylaluminum, triethylaluminum, tri-iso-butylaluminum, tri-n-hexylaluminum, tri-n-octylaluminum and the like.

Ionizing Activators

It is within the scope of this invention to use an ionizing or stoichiometric activator, neutral or ionic, such as tri(n-butyl) ammonium tetrakis (pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitrites and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$$(L-H)_d^+(A^{d-}) \quad (14)$$

wherein L is an neutral Lewis base;
H is hydrogen;
$(L-H)^+$ is a Bronsted acid;
$A^{d-}$ is a non-coordinating anion having the charge d−; and
d is an integer from 1 to 3.

The cation component, $(L-H)_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene, and mixtures thereof. The activating cation $(L-H)_d^+$ may also be a moiety such as silver, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the improved catalysts of this invention are trisubstituted ammonium salts such as:

trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl)borate, triethylammonium tetrakis- (2,3,4,6-tetrafluorophenyl)borate, tripropylammonium tetrakis-(2,3,4,6-tetrafluorophenyl)borate, tri(n-butyl) ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronapthyl)borate, triethylammonium tetrakis(perfluoronapthyl)borate, tripropylammonium tetrakis(perfluoronapthyl)borate, tri(n-butyl)ammonium tetrakis(perfluoronapthyl)borate, tri(t-butyl)ammonium tetrakis(perfluoronapthyl)borate, N,N-dimethylanilinium tetrakis(perfluoronapthyl)borate, N,N-diethylanilinium tetrakis(perfluoronapthyl)borate, N,N-dimethyl-(2,4,6-trimethylanilinium) tetrakis(perfluoronapthyl)borate, tropillium tetrakis(perfluoronapthyl)borate, triphenylcarbenium tetrakis(perfluoronapthyl)borate, triphenylphosphonium tetrakis(perfluoronapthyl)borate, triethylsilylium tetrakis(perfluoronapthyl)borate, benzene(diazonium)tetrakis(perfluoronapthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(t-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis (trifluoromethyl)phenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, benzene(diazonium)tetrakis(3,5-bis(trifluoromethyl)phenyl)borate, and dialkyl ammonium salts such as: di-(i-propyl)ammonium tetrakis(pentafluorophenyl)borate, and dicyclohexylammonium tetrakis(pentafluorophenyl)borate; and additional tri-substituted phosphonium salts such as tri(o-tolyl)phosphonium tetrakis(pentafluorophenyl) borate, and tri(2,6-dimethylphenyl)phosphonium tetrakis (pentafluorophenyl)borate.

Most preferably, the ionic stoichiometric activator $(L-H)_d^+$ $(A^{d-})$ is N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis (trifluoromethyl)phenyl)borate, triphenylcarbenium tetrakis (perfluoronapthyl)borate, triphenylcarbenium tetrakis (perfluorobiphenyl)borate, triphenylcarbenium tetrakis(3,5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Conventional-Type Cocatalysts (Activators)

Typically, conventional transition metal catalyst compounds excluding some conventional-type chromium catalyst compounds are activated with one or more of the conventional cocatalysts which may be represented by the formula:

$$M^3M^4_vX^2_cR^2_{b-c} \qquad (15)$$

wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^2$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^2_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^2$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, di-iso-butyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Additional Activators

Other activators include those described in PCT publication WO 98/07515 such as tris(2,2',2''-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate)·4THF as an activator for a bulky ligand metallocene catalyst compound. WO 99/18135, incorporated herein by reference, describes the use of organo-boron-aluminum acitivators. EP-B1-0 781 299 describes using a silylium salt in combination with a non-coordinating compatible anion. Also, methods of activation such as using radiation (see EP-B1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \qquad (16)$$

wherein $OX^{e+}$ is a cationic oxidizing agent having a charge of e+; e is an integer from 1 to 3; and $A^-$, and d are as previously defined. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It is within the scope of this invention that catalyst compounds can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl)boron can be used with methylalumoxane.

The Choice of Transition Metal Catalyst Components

The catalyst system of this invention comprises two or more transition metal compounds as described above. At least one of the compounds must be capable of producing a crystalline poly-alpha-olefin, preferably isotactic polypropylene or syndiotactic polypropylene, having a crystallinity of 40% or more. The other compound must be capable of producing an amorphous poly-alpha-olefin, preferably atactic polypropylene, having a crystallinity of 20% or less.

The choice of transition metal component for the crystalline polymer fraction is a subset of the transition metal component of equations 8-9. This preferred component is illustrated in equation 17:

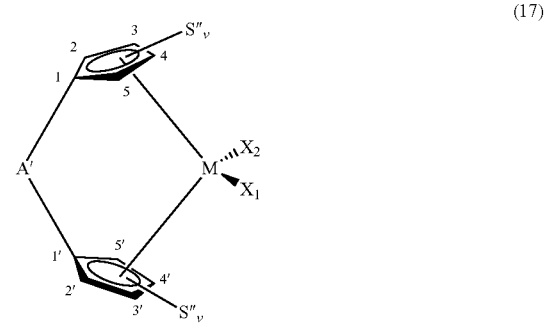

(17)

wherein A', M, $X_1$ and $X_2$ are as previously defined. Substituents $S''_v$ are independently defined as $S''$ in equations 8-9 where the subscript "v" denotes the carbon atom on the Cp-ring to which the substituent is bonded.

Preferably metallocene precursors for producing poly-alpha-olefins having enhanced isotactic character are those of Equation 17 where $S''_v$ are independently chosen such that the metallocene framework 1) has no plane of symmetry containing the metal center, and 2) has a $C_2$-axis of symmetry through the metal center. Such complexes, such as rac-$Me_2Si$ (indenyl)$_2ZrMe_2$ and rac-$Me_2Si$(indenyl)$_2HfMe_2$ are well known in the art and generally produce isotactic polymers with higher degrees of stereoregularity than the less symmetric chiral systems. Likewise another preferred class of transition metal compounds that can produce isotactic polymers useful in this invention are those monocyclopentadienyl catalysts disclosed in U.S. Pat. No. 5,026,798, which is incorporated by reference herein. A detailed description of suitable catalyst compounds and catalyst selections may be found in 60/418,482, filed Oct. 15, 2003 which is incorporated by reference herein. Particular attention should be paid to the catalyst compounds, catalysts systems and catalyst pairs that are described in the section entitled "The Choice of Transition Metal Catalyst Components."

Similarly, metallocene precursors providing tacticity control exist where (A-Cp) is (Cp) (Cp*), both Cp and Cp* having substituents on the cyclopentadienyl rings of sufficient steric bulk to restrict rotation of the cyclopentadienyl ligands such that the aforementioned symmetry conditions are satisfied. Preferable chiral racemic metallocenes of this type include bis(tricyclo[5.2.1.0$^{2,6}$]deca-2,5-dienyl)zirconium and -hafnium dimethyl, bis((1R)-9,9-dimethyltricyclo [6.1.1.0$^{2,6}$]deca-2,5-dienyl)zirconium dimethyl, bis(tricyclo [5.2.1.0$^{2,6}$]deca-2,5,8-trienyl)zirconium dimethyl, bis (tricyclo[5.2.2.0$^{2,6}$]undeca-2,5,8-trienyl)zirconium and -hafnium dimethyl and bis((1R,8R)-7,7,9,9-tetramethyl [6.1.1.0$^{2,6}$]deca-2,5-dienyl)zirconium and -hafnium dimethyl.

Preferably metallocene precursors for the production of poly-alpha-olefins having enhanced syndiotactic character are also those of Equation 17 where S" are independently chosen such that the two Cp-ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the Cp and Cp* rings that renders each to be symmetrical. With respect to the A bridging group but different with respect to each other that controls the approach of each successive monomer unit that is added to the polymer chain. The steric difference between the Cp and Cp* rings act to block the approaching monomer from a random approach such that the monomer is added to the polymer chain in the syndiotactic configuration.

Preferable metallocene precursors for the production of syndiotactic polymers are those of Equation 17 where S" are independently chosen such that 1) the steric difference between the two Cp-ligands is maximized and 2) there remains a plane of symmetry through the metal center and the $C_1$ and $C_1'$ carbon atoms of the Cp-rings in Equation 17. Thus, complexes such as Me$_2$C($\eta^5$-C$_5$H$_4$)(1-fluorenyl)MMe$_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5, 10,10,11,11-octahydrodibenzo[b,h]fluorene. Because pre-catalysts of this type often lose there ability to control the stereoregularity of the polymer under high temperature reaction conditions, to insure higher crystallinity in the material requires using these catalysts at lower reactor temperatures, preferably at temperatures below 80° C.

Preferred catalysts that can produce the lower molecular weight isotactic polypropylene are those described in U.S. Pat. No. 5,120,867, which is incorporated by reference herein. Any mixture of catalysts, including supported catalysts, which can be used together in a single reactor or in a series reactor configuration, that can also produce the desired polypropylene can be utilized in this invention to produce the in situ blend. Preferred catalysts include cyclopentadienyl transition metals compounds and derivatives thereof used in conjunction with an alumoxane and/or a compatible non-coordinating anion.

Additional preferred catalysts that produce crystalline polypropylene are discussed in Chem. rev. 2000, 100, 1253-1345, which is incorporated by reference herein.

The preferred choice of transition metal component for the amorphous polymer fraction is the mono-cyclopentadienyl transition metal component of equation 10 where y is equal to 1. This preferred component is illustrated in equation 18:

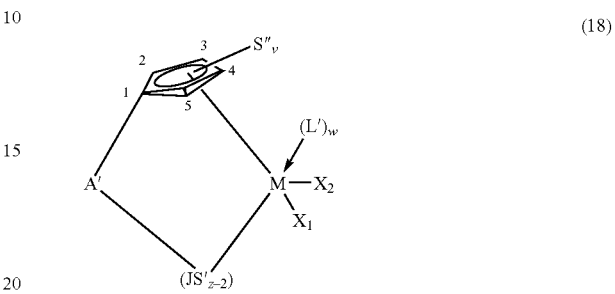

(18)

where A', J, S', $X_1$, $X_2$, L', z and w as are previously defined and M is titanium. Substituent S"$_v$ is defined to be the same as S" in equation 10 where the subscript "v" denotes the carbon atom on the cyclopentadienyl ring to which the substituent is bonded and where there can be zero, two or four substituents, S", on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with S" groups that are of approximately of the same steric bulk. Typically the size of these S" groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with S" groups and be considered symmetric as long as each of the symmetrical pairs are of similar steric bulk. Additionally, two adjacent S"-groups in the 3 and 4 position may be linked to form a ring provided that the new ring is also symmetrically substituted.

Catalyst systems of this type are known to impart 2,1-mistakes when incorporating C3 and higher alpha-olefins. The pre-catalysts where S' is bonded to the nitrogen ligand (J) via a 3° carbon (for example when S' is tert-butyl or 1-adamantyl) have fewer 2,1-mistakes then when S' is bonded to the nitrogen ligand (J) via a 1° carbon (for example when S' is n-butyl, methyl, or benzyl) or 2° carbon (for example when S' is cyclododecyl, cyclohexyl, or sec-butyl). The 2,1-mistakes in the polymer backbone impart (CH$_2$)$_2$ units that can be beneficial to the polymer properties. Polymers of this type, the characterization of such polymers and the catalyst systems used to produce such polymers are described in U.S. Pat. No. 5,723,560 and is incorporated herein by reference. Lower Mw versions of such polymers can be produced by changing process condition, for example, by increasing reactor temperature.

Additionally, at higher reaction temperatures, some catalysts that produce syndiotactic poly-alpha-olefin at lower temperatures, will produce virtually non-crystalline poly-alpha-olefins at higher temperatures. The choice of transition metal component for this amorphous polymer fraction is a subset of the transition metal component of equations 8-9. Preferred components of this type are illustrated in equation 19:

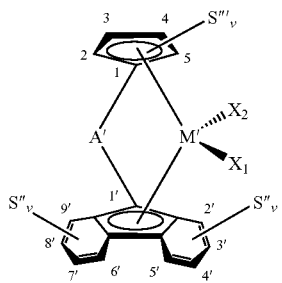

(19)

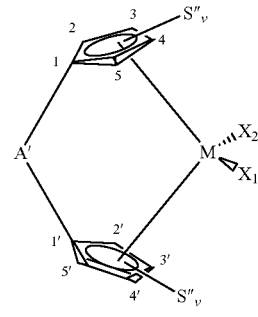

(20)

wherein A', M, $X_1$ and $X_2$ are as previously defined. Substituents $S''_v$ and $S'''_v$ are independently defined as $S''$ in equations 8-9 where the subscript "v" denotes the carbon atom on the Cp-ring or Flu-ring (fluorenyl-ring) to which the substituent is bonded.

Preferably metallocene precursors for producing poly-alpha-olefins having largely amorphous character (when used as catalysts under higher reactor temperature conditions) are those of Equation 19 where $S'''_v$ are independently chosen such that the metallocene framework has a plane of symmetry containing the metal center and bisecting the Flu- and Cp-rings. The A' ligand need not be symmetrical—for example dimethylsilyl or methylphenylsilyl will not effect the stereochemisty of the polymer produced. Substituent $S'''_v$ is defined to be the same as $S''$ in equation 8-9 where the subscript "v" denotes the carbon atom on the cyclopentadienyl ring to which the substituent is bonded and where there can be zero, two or four substituents, $S'''$, on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with $S'''$ groups that are of approximately of the same steric bulk. Typically the size of these $S'''$ groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S'''$ groups and be considered symmetric as long as each of the symmetrical pairs are of similar steric bulk. Additionally, two adjacent $S'''$-groups in the 3 and 4 position may be linked to form a ring provided that the new ring is also symmetrically substituted. Because of the distant placement of the $S''_v$ substituents on the fluorenyl ring, these substitutents need not be symmetrically placed on the fluorenyl ring. Hence, the fluorenyl ring may be substituted with form 0-7 substituents that may be the same or different. Two or more adjacent $S''$-groups may optionally be linked to form a ring.

Additionally, compounds of formula 20 may be used to produce the amorphous polymer fraction.

In this case, $S''_v$ are independently chosen such that the metallocene framework has a plane of symmetry that bisects M and A'. Substituents $S''_v$ are independently defined to be the same as $S''$ in equation 8-9 where the subscript "v" denotes the carbon atom on the cyclopentadienyl ring to which the substituent is bonded and where there can be zero to four substituents, $S''$, on the cyclopentadienyl ring provided that the cyclopentadienyl ring is symmetrically substituted. Symmetrically substituted is defined to mean that the cyclopentadienyl ring is substituted in the 2 and 2'positions and/or 3 and 3' positions and/or 4 and 4' positions and/or 5 and 5' positions with $S''$ groups that are of approximately of the same steric bulk. Typically the size of these $S''$ groups are within 2 carbons of each other. Thus a cyclopentadienyl substituted at the 2 and the 2' positions with methyl and ethyl respectively, or substituted at the 3 and the 3' positions with hexyl and octyl, respectively, would be considered symmetric. Likewise, the cyclopentadienyl ring may be substituted at all four sites with $S''$ groups and be considered symmetric as long as each of the symmetrical pairs are of similar steric bulk. Additionally, two adjacent $S''$-groups may be linked to form a ring provided that the new ring is also symmetrically substituted. Such complexes such as meso-$Me_2Si(indenyl)_2ZrMe_2$ meso-$CH_2CH_2$(indenyl)$_2ZrCl_2$ are well known in the art and generally produce amorphous polymers useful in this invention.

When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Preferred molar ratios of (A) transition metal compound to produce amorphous polymer to (B) transition metal compound to produce crystalline polymer fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts (A-"amorphous polymer producing pre-catalyst" and B-"crystalline polymer producing catalyst"), where both are activated with the same activator, the preferred mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

In general the combined pre-catalyst compounds and the activator are combined in ratios of about 1:10,000 to about 10:1. When alumoxane or aluminum alkyl activators are used, the combined pre-catalyst-to-activator molar ratio is from 1:5000 to 10:1, alternatively from 1:1000 to 10:1; alternatively, 1:500 to 2:1; or 1:300 to 1:1. When ionizing activators are used, the combined pre-catalyst-to-activator molar ratio is from 10:1 to 1:10; 5:1 to 1:5; 2:1 to 1:2; or 1.2:1 to 1:1. Multiple activators may be used, including using mixes of alumoxanes or aluminum alkyls with ionizing activators.

In another preferred embodiment a third catalyst (pre-catalyst plus activator) is present in the processes described above. The third catalyst may be any of the pre-catalyst components listed herein. Preferred third pre-catalysts include those that are capable of producing waxes.

Three transition metal compounds (pre-catalysts) may be used in any ratio. Preferred molar ratios of (A) transition metal compound to produce amorphous polypropylene to (B) transition metal compound to produce crystalline polypropylene to (C) transition metal compound to produce wax fall within the range of (A:B:C) 1:1000:500 to 1000:1:1, alternatively 1:100:50 to 500:1:1, alternatively 1:10:10 to 200:1:1, alternatively 1:1:1 to 100:1:50, and alternatively 1:1:10 to 75:1:50, and alternatively 5:1:1 to 50:1:50. The particular ratio chosen will depend on the exact pre-catalysts chosen, the method of activation, and the end product desired.

Additional preferred catalysts and process are described in U.S. Pat. Nos. 6,376,410 and 6,380,122, which are incorporated by reference herein.

In another embodiment the catalyst compositions of this invention include a support material or carrier. For example, the one or more catalyst components and/or one or more activators may be deposited on, contacted with, vaporized with, bonded to, or incorporated within, adsorbed or absorbed in, or on, one or more supports or carriers.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range is from about 100 to about 400 m$^2$/g, pore volume from about 0.8 to about 3.0 cc/g and average particle size is from about 5 to about 100 µm. The average pore size of the carrier useful in the invention typically has pore size in the range of from 10 to 1000 Å, preferably 50 to about 500 Å, and most preferably 75 to about 350 Å.

As is well known in the art, the catalysts may also be supported together on one inert support, or the catalysts may be independently placed on two inert supports and subsequently mixed. Of the two methods, the former is preferred.

In another embodiment the support may comprise one or more types of support material which may be treated differently. For example one could use tow different silicas that had different proe volumes or had been calcined at different temperatures. Likewise one could use a silica that had been treated with a scavenger or other additive and a silica that had not.

The stereospecific catalysts may be used to prepare macromonomer having a Mw of 100,000 or less and a crystallinity of 20% or more preferably having vinyl termini.

As a specific example, a method for preparing propylene-based macromonomers having a high percentage of vinyl terminal bonds involves:

(a) contacting, in solution, propylene, optionally a minor amount of copolymerizable monomer, with a catalyst composition containing the stereorigid, activated transition metal catalyst compound at a temperature from about 80° C. to about 140° C.; and b) recovering isotactic or syndiotactic polypropylene chains having number average molecular weights of about 2,000 to about 30,000 Daltons.

Preferably, the solution comprises a hydrocarbon solvent. More preferably, the hydrocarbon solvent is aliphatic or aromatic. Also, the propylene monomers are preferably contacted at a temperature from 90° C. to 120° C. More preferably, a temperature from 95° C. to 115° C. is used. Most preferably, the propylene monomers are contacted at a temperature from 100° C. to 110° C. Reactor pressure generally can vary from atmospheric to 345 MPa, preferably to 182 MPa. The reactions can be run in batch or in continuous mode. Conditions for suitable slurry-type reactions will also be suitable and are similar to solution conditions, the polymerization typically being run in liquid propylene under pressures suitable to such.

The catalyst pair selection criteria were discussed earlier. One catalyst typically is stereospecific with the ability to produce significant population of vinyl-terminated macromonomers, the other typically is aspecific and capable of incorporating the reactive macromonomers. In general it is believed that C2 symmetric bulky ligand metallocene catalysts can produce vinyl terminated isotactic polypropylene macromonomers. Catalysts that favor beta methyl elimination also often appear to also favor isotactic polypropylene macromonomer formation. Rac-dimethylsilyl bis(indenyl) hafnium dimethyl, dimethylsilyl bis(2-methyl-4-phenylindenyl)zirconium dichloride, and rac-ethylene bis(4,7-dimethylindenyl) hafnium dimethyl are catalysts capable of producing isotactic polypropylene having high vinyl chain termination for use in this invention. High temperatures, typically above 80° C., appear to positively influence vinyl termination. Likewise, $Me_2Si(Me_4C_5)(N\text{-}c\text{-}C_{12}H_{23})TiMe_2$ and $Me_2Si(Me_4C_5)$ $(N\text{-}c\text{-}C_{12}H_{23})TiMe_2$ produce amorphous polypropylene useful in this invention and are believed to incorporate the vinyl terminated macromonomers to also produce a grafted structure of scPP side chains on an amorphous backbone.

In alternate embodiments dienes such as 1,9-decadiene are introduced into the reaction zone to promote the production of vinyl-terminated aPP and scPP macromonomers that help increase the population of branch-block species.

Polymerization Processes

The catalysts and catalyst systems described above are suitable for use in a solution, bulk, gas or slurry polymerization process or a combination thereof, preferably solution phase or bulk phase polymerization process.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1,4-methyl-pentene-1, hexene-1, octene-1, decene-1,3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. Catalyst component and activator may be delivered as a solution, dry powder or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399, 722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228 all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process is preferably operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 50° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process useful in the invention is capable of and the process useful in the invention is producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process useful in the invention is producing greater than 15,000 lbs of polymer per hour (6804 kg/hr), preferably greater than 25,000 lbs/hr (11,340 kg/hr) to about 100,000 lbs/hr (45,500 kg/hr).

In another embodiment in the slurry process useful in the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process useful in the invention the concentration of predominant monomer in the reactor liquid medium is in the range of from about 1 to 100 weight percent, preferably from about 10 to about 80 weight percent, more preferably from about 20 to about 70 weight percent, most preferably from about 20 to about 40 weight percent.

Another process useful in the invention is where the process, preferably a slurry process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum, tri-n-octyl aluminum, tri-n-hexyl aluminum, and an excess of alumoxane or modified alumoxane.

Homogeneous, Bulk, or Solution Phase Polymerization

The catalysts described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or external heat exchangers or internal cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 200° C., more preferably from about 90° C. to about 150° C., and most preferably from about 100° C. to about 140° C. Polymerization temperature may vary depending on catalyst choice. For example a diimine Ni catalyst may be used at 40° C., while a metallocene Ti catalyst can be used at 100° C. or more. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane(s), pentane, isopentane, cyclohexane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, international application WO 96/33227 and WO 97/22639. All documents are incorporated by reference for US purposes for description of polymerization processes, metallocene selection and useful scavenging compounds.

This invention further relates to a continuous process to prepare an adhesive comprising:
1) combining monomer, optional solvent, catalyst and activator in a reactor system,
2) withdrawing polymer solution from the reactor system,
3) removing at least 10% solvent, if present, from the polymer solution,
4) quenching the reaction,
5) devolatilizing the polymer solution to form molten polymer,
6) combining the molten polymer and one or more additives (such as those described below) in a mixer, such as a static mixer, (in a preferred embodiment tackifer is not added or is added in amounts of less than 30 weight %, preferably less than 20 weight %, more preferably in amounts of less than 10 weight %),
7) removing the polymer combination from the mixer, and
8) pelletizing or drumming the polymer combination;

where step 1) comprises any of the processes described above.

In another embodiment this invention relates to a continuous process to prepare an adhesive comprising:
1) combining monomer, optional solvent, catalyst and activator in a reactor system,
2) withdrawing polymer solution from the reactor system,
3) removing at least 10% solvent, if present, from the polymer solution,
4) quenching the reaction,
5) devolatilizing the polymer solution to form molten polymer,
6) combining the molten polymer and one or more additives in a mixer, such as a static mixer,
7) removing the polymer combination from the mixer, and
8) pelletizing or drumming the polymer combination.

In a particularly preferred embodiment, this invention relates to a continuous process to make an adhesive comprising:
1) selecting a first catalyst component capable of producing a polymer having an Mw of 100,000 or less and a crystallinity of 5% or less under selected polymerization conditions;
2) selecting a second catalyst component capable of producing polymer having an Mw of 100,000 or less and a crystallinity of 20% or more at the selected polymerization conditions;
3) contacting, in a solvent and in a reaction zone under the selected polymerization conditions, the catalyst components in the presence of one or more activators with one or more C3 to C40 olefins, and, optionally one or more diolefins;

4) at a temperature of greater than 70° C.;

5) at a residence time of up to 120 minutes, (preferably 60 to 120 minutes);

6) wherein the ratio of the first catalyst to the second catalyst is from 1:1 to 50:1;

7) wherein the activity of the catalyst components is at least 50 kilograms of polymer per gram of the catalyst components; and wherein at least 20% of the olefins are converted to polymer;

8) withdrawing polymer solution from the reaction zone;

9) removing at least 10% solvent from the polymer solution;

10) quenching the reaction;

11) devolatilizing the polymer solution to form molten polymer;

12) combining the molten polymer and one or more additives in a mixer, such as a static mixer;

13) removing the polymer combination from the mixer; and 14) pelletizing or drumming the polymer combination.

In a particularly preferred embodiment, this invention relates to a continuous process to make an adhesive comprising:

1) selecting a first catalyst component capable of producing a polymer having an Mw of 100,000 or less and a crystallinity of 5% or less under selected polymerization conditions;

2) selecting a second catalyst component capable of producing polymer having an Mw of 100,000 or less and a crystallinity of 20% or more at the selected polymerization conditions;

3) contacting, in a solvent and in a reaction zone under the selected polymerization conditions, the catalyst components in the presence of one or more activators with one or more C3 to C40 olefins, and, optionally one or more diolefins;

4) at a temperature of greater than 70° C.;

5) at a residence time of 120 minutes or less;

6) wherein the ratio of the first catalyst to the second catalyst is from 1:1 to 50:1;

7) wherein the activity of the catalyst components is at least 50 kilograms of polymer per gram of the catalyst components; and wherein at least 50% of the olefins are converted to polymer;

8) withdrawing polymer solution from the reaction zone;

9) removing at least 10% solvent from the polymer solution;

10) quenching the reaction;

11) forming molten polymer where the polymer comprises one or more C3 to C40 olefins, and less than 5 mole % of ethylene, and where the polymer has:

a) a Dot T-Peel of 1 Newton or more;

b) a branching index (g') of 0.95 or less measured at the Mz of the polymer; and c) a Mw of 100,000 or less;

12) combining the molten polymer and one or more additives in a mixer, such as a static mixer;

13) removing the polymer combination from the mixer; and 14) pelletizing or drumming the polymer combination.

In a particularly preferred embodiment, this invention relates to a continuous process to make an adhesive comprising 1) selecting a first catalyst component capable of producing a polymer having an Mw of 100,000 or less and a crystallinity of 5% or less under selected polymerization conditions;

2) selecting a second catalyst component capable of producing polymer having an Mw of 100,000 or less and a crystallinity of 20% or more at the selected polymerization conditions;

3) contacting, in a solvent and in a reaction zone under the selected polymerization conditions, the catalyst components in the presence of one or more activators with one or more C3 to C40 olefins, and, optionally one or more diolefins;

4) at a temperature of greater than 100° C.;

5) at a residence time of 120 minutes or less;

6) wherein the ratio of the first catalyst to the second catalyst is from 1:1 to 50:1;

7) wherein the activity of the catalyst components is at least 50 kilograms of polymer per gram of the catalyst components; and wherein at least 50% of the olefins are converted to polymer;

8) withdrawing polymer solution from the reaction zone;

9) removing at least 10% solvent from the polymer solution;

10) quenching the reaction;

11) forming molten polymer where the polymer comprises one or more C3 to C40 olefins (preferably propylene), and less than 5 mole % of ethylene, and where the polymer has:

a) a Dot T-Peel of 3 Newton or more; and b) a branching index (g') of 0.90 or less measured at the Mz of the polymer; and c) an Mw of 30,000 or less;

d) a peak melting point between 60 and 190° C., e) a Heat of fusion of 1 to 70 J/g, f) a melt viscosity of 8000 mPa·sec or less at 190° C.; and 12) combining the molten polymer and one or more additives in a mixer, such as a static mixer;

13) removing the polymer combination from the mixer; and 14) pelletizing or drumming the polymer combination.

In another embodiment this invention relates to a continuous process to prepare an adhesive comprising:

1) combining monomer, catalyst and activator in a reactor system, 2) withdrawing polymer from the reactor system, 3) quenching the reaction, 4) forming molten polymer, 5) combining the molten polymer and one or more additives, and 6) pelletizing or drumming the polymer combination.

Formulations of the Polymers

The polymers produced herein then can be used directly as an adhesive or blended with other components to form an adhesive.

Tackifiers may be used with the polymers of this invention. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 150° C., preferably 100° C. to 130° C. In another embodiment the resins is liquid and has a R and B softening point of between 10 and 70° C.

The tackifier, if present, is typically present at about 1 to about 80 weight %, based upon the weight of the blend, more preferably 2 to 40 weight %, even more preferably 3 to 30 weight %.

Preferred hydrocarbon resins for use as tackifiers or modifiers include:

1. Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. No. 5,571,867, U.S. Pat. No. 5,171,793 and U.S. Pat. No. 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).

2. Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene).

The resins obtained after polymerization and separation of unreacted materials, can be hydrogenated if desired. Examples of preferred resins include those described in U.S. Pat. No. 4,078,132; WO 91/07472; U.S. Pat. No. 4,994,516; EP 0 046 344 A; EP 0 082 726 A; and U.S. Pat. No. 5,171,793.

In another embodiment an adhesive composition comprising polymer product of this invention further comprises a crosslinking agent. Preferred crosslinking agents include those having functional groups that can react with the acid or anhydride group. Preferred crosslinking agents include alcohols, multiols, amines, diamines and/or triamines. Examples of crosslinking agents useful in this invention include polyamines such as ethylenediamine, diethylenetriamine, hexamethylenediamine, diethylaniinopropylamine, and/or menthanediamine.

In another embodiment an adhesive composition comprising the polymer product of this invention further comprises typical additives known in the art such as fillers, antioxidants, adjuvants, adhesion promoters, oils, and/or plasticizers. Preferred fillers include titanium dioxide, calcium carbonate, barium sulfate, silica, silicon dioxide, carbon black, sand, glass beads, mineral aggregates, talc, clay and the like. Preferred antioxidants include phenolic antioxidants, such as Irganox 1010, Irganox, 1076 both available from Ciba-Geigy. Preferred oils include paraffinic or napthenic oils such as Primol 352, or Primol 876 available from ExxonMobil Chemical France, S.A. in Paris, France. Preferred plasticizers include polybutenes, such as Parapol 950 and Parapol 1300 formerly available from ExxonMobil Chemical Company in Houston Tex. Other preferred additives include block, anti-block, pigments, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75 (Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

In another embodiment the polymers of this invention are combined with less than 3 wt % anti-oxidant, less than 3 wt % flow improver, less than 10 wt % wax, and or less than 3 wt % crystallization aid.

Other optional components that may be combined with the polymer product of this invention are plasticizers or other additives such as oils, surfactants, fillers, color masterbatches, and the like. Preferred plasticizers include mineral oils, polybutenes, phthalates and the like. Particularly preferred plasticizers include phthalates such as di-iso-undecyl phthalate (DIUP), di-iso-nonylphthalate (DINP), dioctylphthalates (DOP) and the like. Particularly preferred oils include aliphatic naphthenic oils.

Other optional components that may be combined with the polymer product of this invention are low molecular weight products such as wax, oil or low Mn polymer, (low meaning below Mn of 5000, preferably below 4000, more preferably below 3000, even more preferably below 2500). Preferred waxes include polar or non-polar waxes, functionalized waxes, polypropylene waxes, polyethylene waxes, and wax modifiers. Preferred waxes include ESCOMER™ 101. Preferred functionalized waxes include those modified with an alcohol, an acid, a ketone, an anhydride and the like. Preferred examples include waxes modified by methyl ketone, maleic anhydride or maleic acid. Preferred oils include aliphatic napthenic oils, white oils or the like. Preferred low Mn polymers include polymers of lower alpha olefins such as propylene, butene, pentene, hexene and the like. A particularly preferred polymer includes polybutene having of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220 cSt at 100° C., as measured by ASTM D 445. In some embodiments the polar and non-polar waxes are used together in the same composition.

In some embodiments, however, wax may not be desired and is present at less than 5 weight %, preferably less than 3 weight %, more preferably less than 1 weight %, more preferably less than 0.5 weight %, based upon the weight of the composition.

In another embodiment the polymers of this invention have less than 30 weight % total of any combination of additives described above, preferably less than 25 weight %, preferably less than 20 weight %, preferably less than 15 weight %, preferably less than 10 weight %, preferably less than 5 weight %, based upon the weight of the polymer and the additives.

In another embodiment the polymer produced by this invention may be blended with elastomers (preferred elastomers include all natural and synthetic rubbers, including those defined in ASTM D1566). In a preferred embodiment elastomers are blended with the polymer produced by this invention to form rubber toughened compositions. In a particularly preferred embodiment the rubber toughened composition is a two (or more) phase system where the rubber is a discontinuous phase and the polymer is a continuous phase. Examples of preferred elastomers include one or more of the following: ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. This blend may be combined with the tackifiers and/or other additives as described above.

In another embodiment the polymer produced by this invention may be blended with impact copolymers. Impact copolymers are defined to be a blend of isotactic PP and an elastomer such as an ethylene-propylene rubber. In a preferred embodiment the blend is a two (or more) phase system where the impact copolymer is a discontinuous phase and the polymer is a continuous phase.

In another embodiment the polymer produced by this invention may be blended with ester polymers. In a preferred embodiment the blend is a two (or more) phase system where the polyester is a discontinuous phase and the polymer is a continuous phase.

In a preferred embodiment the polymers of the invention described above are combined with metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

In another embodiment the olefin polymer of this invention, preferably the polypropylene homopolymer or copolymer of this invention, can be blended with another homopolymer and/or copolymer, including but not limited to, homopolypropylene, propylene copolymerized with up to 50 weight % of ethylene or a C4 to C20 alpha.-olefin, isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET resins, crosslinked polyethylene, copolymers of ethylene and vinyl alcohol (EVOH), polymers of aromatic monomers such as polystyrene, poly-1 esters, high molecular weight polyethylene having a density of 0.94 to 0.98 g/cm$^3$ low molecular weight polyethylene having a density of 0.94 to 0.98 g/cm$^3$, graft copolymers generally, polyacrylonitrile homopolymer or copolymers, thermoplastic polyamides, polyacetal, polyvinylidine fluoride and other fluorinated elastomers, polyethylene glycols and polyisobutylene.

In a preferred embodiment the olefin polymer of this invention, preferably the polypropylene polymer of this invention, is present in the blend at from 10 to 99 weight %, based upon the weight of the polymers in the blend, preferably 20 to 95 weight %, even more preferably at least 30 to 90 weight %, even more preferably at least 40 to 90 weight %, even more preferably at least 50 to 90 weight %, even more preferably at least 60 to 90 weight %, even more preferably at least 70 to 90 weight %.

The blends described above may be produced by mixing the two or more polymers together, by connecting reactors together in series to make reactor blends or by using more than one catalyst in the same reactor to produce multiple species of polymer. The polymers can be mixed together prior to being put into the extruder or may be mixed in an extruder.

Any of the above polymers, including the polymers produced by this invention, may be functionalized. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C═O). Examples include maleic, fumaric, acrylic, methacrylic, itaconic, crotonic, alpha.methyl crotonic, and cinnamic acids as well as their anhydrides, esters and salt derivatives. Particularly preferred functional groups include maleic acid and maleic anhydride. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

In a preferred embodiment the unsaturated acid or anhydried comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof.

The blends described herein may be formed using conventional techniques known in the art. For example, blending may be accomplished using one or more static mixers, in-line mixers, elbows, orifices, baffles, and any combination thereof.

Multiple methods exist in the art for functionalizing polymers that may be used with the polymers described here.

These include, not are not limited to, selective oxidation, free radical grafting, ozonolysis, epoxidation, and the like.

Applications

For purposes of this invention and the claims thereto, the following tests are used, unless otherwise indicated.

Tensile strength, Tensile strength at break and elongation at break are measured by ASTM D 1708. Elongation at break is also called strain at break or percent elongation.

Peel strength—ASTM D-1876 (also referred to as Peel adhesion at 180° peel angle, 180° peel strength, 180° peel adhesion, T-Peel strength, T-Peel.)

Dynamic Storage modulus also called storage modulus is G'.

Creep resistance ASTM D-2293

Rolling Ball Tack PSTC 6

Hot Shear Strength is determined by suspending a 1000 gram weight from a 25 mm wide strip of MYLAR polyester film coated with the polymer or adhesive formulation which is adhered to a stainless steel plate with a contact area of 12.5 mm×25 mm. The sample is placed in a ventilated oven at 40° C. time is recorded until stress failure occurs.

Probe tack (also called Polyken probe tack) ASTM D 2979

Holding Power—PSTC 7, also called Shear adhesion or Shear strength?.

Density—ASTM D792 at 25° C.

Gardner color ASTM D 1544-68.

SAFT is also called heat resistance.

Tensile Strength Modulus at 100% elongation and Young's Modulus are determined according to ASTM E-1876.

Luminence is the reflectance "Y" in the CIE color coordinates as determined by ASTM D 1925 divided by 100.

Needle penetration is measured by ASTM D5.

Sag is also referred to as creep.

Bond strength is measured by ASTM D3983.

Adhesion to road surface is measured by ASTM D4541.

The polymer product of this invention or formulations thereof may then be applied directly to a substrate or may be sprayed thereon, typically the polymer is molten. The polymer product of this invention or formulations thereof may be applied directly to the substrate via wheels, rollers, jet-nozzels, slot dies or may be sprayed thereon. Spraying is defined to include atomizing, such as producing an even dot pattern, spiral spraying such as Nordson Controlled Fiberization or oscillating a stretched filament like is done in the ITW Dynafiber/Omega heads or Summit technology from Nordson, as well as melt blown techniques. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

End-Uses

The adhesives of this invention can be used in any adhesive application, including but not limited to, disposables, packaging, laminates, pressure sensitive adhesives, tapes, labels, wood binding, paper binding, non-wovens, road marking, reflective coatings, and the like.

In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or the polymers of this invention, may be corona discharge treated, flame treated, electron beam irradiated, gamma irradiated, microwaved, or silanized.

The adhesives produced herein, when coated in some fashion between two adherends, preferably perform such that the materials are held together in a sufficient fashion compared to a standard specification or a standard adhesive similarly constructed.

The polymer product of this invention may be used in any adhesive application described in WO 97/33921 in combination with the polymers described therein or in place of the polymers described therein.

The polymer product of this invention, alone or in combination with other polymers and or additives, may also be used to form hook and loop fasteners as described in WO 02/35956.

The polymers produced herein may be combined with other elements to prepare adhesive compositions. The adhesive compositions may include waxes such as those selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof. Likewise the adhesive compositions may include antioxidants selected from the group consisting of thioesters, phosphates, hindered phenols, tetrakis (methylene 3-(3',5'-di-t-butyl-4hydroxyphenyl)propionate)methane, 2,2'-ethyldenebis (4,6-di-tertiarybutylphenol), 1,1-3-tris(2-methyl-4-hydroxy-5-t-butylephenyl) butane, 1,3,5-trimethyl2,4,6,tris(3,5-tertbutyl-4-hydroxybenzyl)benzene, dilaurylthiodipropionate, pentaerythritol tetrakis(beta-laurylthiopropionate), alkyl-aryldi- and polyphosphates, thiophosphites, and combinations or derivatives thereof.

A. Packaging

In a particular embodiment, the adhesives of this invention can be used in a packaging article. The packaging article may be useful as a carton, container, crate, case, corrugated case, or tray, for example. More particularly, the packaging article may be useful as a cigarette product, cereal product, cracker product, beer packaging, frozen food product, paper bag, drinking cup, milk carton, juice carton, drinking cup, or as a container for shipping produce, just to name a few exemplary uses.

The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

The adhesive composition comprises the inventive polymer described herein and will be further described below. The polymer may be functionalized with maleic acid or maleic anhydride. Additional components may be combined with the polymers or formulations of the polymers to form the adhesive composition.

For ease and clarity of description, an exemplary packaging article will be described in more detail below with reference to FIGS. 6 and 7. FIG. 6 shows a perspective view of a carton 600 having the adhesives 605 of this invention at least partially disposed thereon. The carton 600 comprises sidewalls 610 connected at a first end thereof by a bottom wall 615. The carton 600 also comprises four flaps 620, 625, 630, and 635 each disposed or otherwise connected to a second end of the respective sidewalls 610 as shown. The adhesive 605 is at least partially disposed on one or more of the flaps 620, 625, 630, 635 so that when the flaps are folded, the adhesive contacts and adheres the flaps to form a sealed container as shown in FIG. 7.

FIG. 7 is a perspective view of the carton 600 after being sealed to form a closed container 700. As shown, the flaps 620 and 630 are folded toward the bottom 615. The flaps 630 and 635 are also folded toward the bottom 615 and rest adjacent the folded flaps 620 and 630. The adhesive 605 disposed on the flap 635 adheres to the flap 635 to at least flap 625, forming the closed container 700.

In one aspect, the adhesive composition may include one or more tackifiers. The tackifiers may be aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof, for example. The adhesive composition may include from 1 to 60 percent by weight of the one or more tackifiers. More preferably, the adhesive composition comprises from 1 to 40 percent by weight, and most preferably from 1 to 20 percent by weight.

In another aspect, the adhesive composition may include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, combinations thereof, for example. The adhesive composition may include less than 30 percent by weight of the one or more waxes. More preferably, he adhesive composition may include less than 15 percent by weight.

In yet another aspect, the adhesive composition may include less than 30 percent by weight, less than 20 percent by weight, less than 10 percent by weight, or less than 5 percent by weight of one or more additives. The one or more additives may include plasticizers, oils, stabilizers, antioxidants, synergists, pigments, dyestuffs, polymeric additives, defoamers, preservatives, thickeners, rheology modifiers, humectants, fillers and water, for example. Exemplary plasticizers may include mineral oils, polybutenes, phthalates, and combinations thereof, for example. The phthalates may include di-iso-undecyl phthalate (DIUP), di-iso-nonylphthalate (DINP), dioctylphthalates (DOP), combinations thereof, or derivatives thereof. Exemplary oils may include aliphatic naphthenic oils, white oils, combinations thereof, and derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers, including alkyl acrylate polymers.

The adhesive composition is formulated to have a set temperature of −20° C. to 250° C. and an open temperature of from −20° C. to 250° C. The adhesive composition should also have a percent substrate fiber tear of from 75 percent to 100 percent and preferably 95 percent to 100 percent at 22° C. or otherwise about room temperature. The adhesive composition should also have a percent substrate fiber tear of from 50 percent to 100 percent and preferably 90 percent to 100 percent at −20° C. or otherwise freezing temperatures. The adhesive composition should further have a percent substrate fiber tear of from 50 percent to 100 percent and preferably, 95 percent to 100 percent at 50° C.

The adhesive composition is also formulated to have a dynamic storage modulus of greater than 1 MPa at 25° C. and 1 radian per second, and a PAFT of from 60° C. or more, preferably a PAFT of 200° C. or less. The adhesive composition should also have a SAFT of 70° C. or more or a SAFT of 200° C. or less. The viscosity of the adhesive composition should be 9 Pa·s or less at 177° C., preferably from 0.5 Pa·s to 2.5 Pa·s at 177° C. The cloud point of the adhesive composition should be 275° C. or less, preferably 130° C. or less.

One typical formulation of the adhesive composition comprises at least 35 percent by weight of the polymer of the present invention, up to 60 percent by weight of one or more tackifiers, up to 30 percent by weight of one or more waxes, and up to 15 percent by weight of one or more additives. Another typical formulation of the adhesive composition comprises at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition comprises at least 50 percent by weight of the polymer of the present invention, up to 60 percent by weight of one or more tackifiers, up to 25 percent by weight of one or more waxes, and up to 15 percent by weight of one or more additives.

The embodiments described below further relate to compositions or combinations as described herein.

A. A packaging article comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and one or more packaging elements, wherein the adhesive composition is applied to at least a portion of the one or more packaging elements.

B. The packaging article of paragraph A, wherein the packaging element is selected from the group consisting of paper, paperboard, containerboard, tagboard, corrugated board, chipboard, kraft, cardboard, fiberboard, plastic resin, metal, metal alloys, foil, film, plastic film, laminates, and sheeting.

C. The packaging article of any of the above paragraphs, wherein the packaging article is selected from the group consisting of cartons, containers, crates, cases, corrugated cases, and trays.

D. The packaging article of any of the above paragraphs, wherein the packaging article is selected from the group consisting of cigarette products, cereal products, cracker products, beer packaging, frozen food products, paper bags, drinking cups, milk cartons, juice cartons, drinking cups, and containers for shipping produce.

E. The packaging article of any of the above paragraphs, wherein the adhesive composition further comprising one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

F. The packaging article of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The packaging article of any of the above paragraphs, wherein the adhesive composition further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

H. The packaging article of any of the above paragraphs, wherein the adhesive composition comprises 30 percent by weight or less, or 15 percent by weight or less of the one or more waxes.

I. The packaging article of any of the above paragraphs, wherein the adhesive composition comprises from 1 to 60 percent by weight, or from 1 to 40 percent by weight, or from 1 to 20 percent by weight of the one or more tackifiers.

J. The packaging article any of the above paragraphs, wherein the adhesive composition comprises 30 percent by weight or less, or 20 percent by weight or less, or 10 percent by weight or less, or 5 percent by weight or less, or 3 percent by weight or less, or 1 percent by weight or less, or 0.5 percent by weight or less of the one or more additives.

K. The packaging article of any of the above paragraphs, wherein the polymer has a melt viscosity of 90,000 mPa·s at 190° C. or less.

L. The packaging article of any of the above paragraphs, wherein the polymer has a set time of 30 minutes or less.

M. The packaging article of any of the above paragraphs, wherein the polymer has a Dot T-Peel of from 3 N to 4,000 N.

N. The packaging article of any of the above paragraphs, wherein the adhesive composition has a percent substrate fiber tear of from 75% to 100%, or from 95% to 100% at 22° C.

O. The packaging article of any of the above paragraphs, wherein the adhesive composition has a set temperature of from −20° C. to 250° C.

P. A packaged article comprising an article at least partially enclosed in a packaging article of any of the above paragraphs.

Q. The packaging article of any of the above paragraphs, wherein packaging element is individually coated using paper, foil, metal, metal alloys, polyethylene, polypropylene, polyester, polyethylene terephthalate, polyvinyl chloride, polyvinylidine chloride, polyvinyl acetate, polyamides, homo polymers thereof, and combinations and copolymers thereof.

R. A method of preparing a packaging article comprising orming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a packaging element.

B. Disposables

In a particular embodiment, the adhesives of this invention can be used in disposable articles. As used herein, "disposable articles" refer to articles that are not meant for extended use. A typical life span of a disposable article can be a single use for any given period of time to multiple uses that last from seconds to days, to even weeks or longer periods of use. Typically, disposable articles are formed by attaching a first disposable element to at least a portion of a second disposable element using an adhesive composition. Alternatively, disposable articles are formed by attaching a portion of a disposable element to another portion of the disposable element using an adhesive composition. Disposable elements may be formed from nonwoven fabrics, nonwoven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwovens, liners, elastic side panels, fastening tape, elastic bands, rayon, nylon, cellulosic pulp, cellulosic fluff, superabsorbent batts, or combinations thereof. The disposable elements may have any thickness and may vary across a cross-section thereof, depending on its intended uses. In some aspects, the thicknesses may range from microns to meters. Preferred thicknesses range from microns to millimeters.

Exemplary disposable articles may include diapers, training pants, sanitary napkins, panty liners, incontinent wear, bed pads, surgical gowns, surgical drapes, rodent traps, hook and loop fasteners, garments, medical garments, swimwear, or combinations thereof.

The adhesive composition includes the inventive polymer described herein. The polymer may be functionalized with maleic acid or maleic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 70 percent by weight or less of the one or more tackifiers. Preferably, the adhesive composition includes 40 percent by weight of the one or more tackifiers, and most preferably 20 percent by weight or less.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 30 percent by weight of the one or more waxes. More preferably, the adhesive composition includes 5 percent by weight of the one or more waxes.

In yet another aspect, the adhesive composition can include 30 percent by weight or less of one or more additives. More preferably, the adhesive composition includes 25 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. In one aspect, the adhesive composition includes 30 percent by weight of the one or more plasticizers.

Exemplary antioxidants include tris(di-t-butyl-p-hydroxybenzyl)-trimethylbenzene, alkylated bisphenol, zinc dibutyl dithiocarbamate, 4,4'-methylene bis(2,6-di-tert-butylphenol), tetrakis[methylene(3,5-di-tert-butyl-4-hydroxyhydrocinnamate)methane], lauryl stearyl thiodipropionate, dilauryl 3,3'-thiodipropionate, 2,6-di-tert-butyl-p-cresol, and combinations or derivatives thereof. In one aspect, the adhesive composition includes 2 percent by weight or less of the one or more antioxidants.

Exemplary stabilizers include hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tertbutyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tertbutyl-4-hydroxy-phenyl)propionate, and combinations or derivatives thereof. In one aspect, the adhesive composition includes from 0.1 to 3 percent by weight of the one or more stabilizers.

The adhesive composition is formulated to have a PAFT of 30° C. or more, and preferably a PAFT of from 30° C. to 110° C. The adhesive composition should also have a SAFT of 50° C. or more, and preferably up to 200° C. The Brookfield viscosity of the adhesive composition should be 25,000 mPa·s or less at 177° C., preferably from 50 to 10,000 mPa s at 177° C., and more preferably preferably from 50 to 7,000 mPa s at 177° C. A glass transition temperature of the adhesive composition should be from −65° C. to 25° C. In a preferred embodiment the adhesive composition should also have a tensile strength at break of at least 0.69 MPa, preferably at least 1.38 MPa, or more preferably at least 3.45 MPa at 25° C., and a percent elongation of at least 300, 500, or 800 percent strain of the original length at 25° C. In another embodiment the adhesive composition has a cloud point of 200° C. or less.

Furthermore, the adhesive composition in the disposable article should have a Peel strength (as measured according to ASTM D 1876) of from 90 to 625 g/cm or from 265 to 625 g/cm or from 15 to 450 g/cm. In another embodiment the Peel strength of the adhesive composition is 90 to 1000 g/cm, alternately 200 to 900 g/cm. Additionally, the disposable article should have a dynamic shear strength of from 30 kPa to 140 kPa, such as 45 to 70 kPa.

In a preferred embodiment, the adhesive composition has a peel strength of greater than 30 minutes, preferably greater than 1 hour, preferably greater than 6 hours at 40° C. In another embodiment the adhesive composition has a static peel strength of from 30 minutes to 24 hours at 40° C., preferably 12 to 24 hours, preferably 6 to 24 hours at 40° C.

In another embodiment, the adhesive composition has a complex viscosity of from 50 poise or less at 1,000 rad/s shear rate at 177° C.

In another embodiment, the adhesive composition has a creep resistance of from 70% to 95% at 38° C.

In one embodiment, the disposable article is a diaper having two different types of adhesive compositions. The first adhesive composition can be an elastic attachment type adhesive and the second type of adhesive can be a construction type adhesive, sometimes referred to as a core and chassis adhesive. It is advantageous to utilize one adhesive composition for both the elastic attachment adhesive and the construction adhesive because the use of two adhesives on the same diaper poses problems for the diaper manufacturer, which must ensure that the right adhesive is used in the correct melt tank and is applied to the correct place on the diaper. Accordingly, an adhesive that is capable of performing both types of bonding functions is highly desirable.

1. Elastic Attachment Adhesives

Elastic attachment adhesives bond elastic materials to disposable elements. Diapers have elastic bands on the legs and/or the waist of the diaper, and typically include a disposable element such as an elastic band attached to a second disposable element, which is the portion of the diaper forming the leg opening or waist. The adhesive composition is used to attach the elastic band to the second disposable element, which is usually a fluid-impermeable barrier layer. An elastic attachment adhesive primarily exhibits high creep resistance to ensure that the elastic, when under stress, does not move relative to the surface of the second disposable element or become partially or fully detached. Should the elastic move or become detached, the resulting loss of fit could result in inconvenience, waste, embarrassment, discomfort, and associated health and safety problems.

In particular, elasticized areas can be formed by adhesively bonding non-elastic nonwoven fabrics together with at least one elastic strand disposed in the middle. In such a process, the elasticized area is a laminated structure including a nonwoven substrate, at least one elastic strand and a hot-melt adhesive composition, which binds the nonwoven substrate and the at least one elastic strand to one another. The nonwoven substrate is selected from the group consisting of a necked-bonded laminate, a stretch-bonded laminate, a spunbond-meltblown-spunbond laminate, a polypropylene spunbonded layer, and a polyethylene layer in combination with a polypropylene spunbonded layer, or a combination thereof. The elastic strand is selected from the group comprising styrene-isoprene-styrene, styrene-butadiene-styrene, styrene-ethylene/propylene-styrene, styrene/ethylene-co-butadiene/styrene, polyurethane, and combinations thereof.

Another method of forming the elasticized areas includes adhesively bonding an elastic nonwoven fabric together with a non-elastic nonwoven fabric. In such a process, a hot-melt adhesive composition binds a first nonwoven elastic substrate and a second nonwoven substrate to one another. The first nonwoven elastic substrate is selected from the group including a necked-bonded laminate, a stretch-bonded laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand. The second nonwoven substrate is selected from the group including a necked-bonded laminate, a stretch-bonded laminate, a spunbond-meltblown-spunbond laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand.

Elastic attachment adhesives should function at body temperature under high peel stress or high shear stress for long periods of time, so that the adhesives should exhibit high peel strength and high shear strength.

2. Construction Adhesives

A construction adhesive is used to construct the core and chassis of the diaper. The construction portion of the diaper includes a disposable element in the form of a fluid-impermeable backing layer with a second disposable element in the form of absorbent materials applied thereto with the adhesive composition. Optionally, the construction portion may comprise the second disposable element in the form of absorbent materials applied to a liner layer with the adhesive composition.

FIGS. 6 and 7 illustrate a schematic view of an exemplary disposable diaper 100. The diaper 100 includes a waistband section 115, a leg section 120, and a chassis 130. The diaper 100 also includes a fluid-impermeable backing 125 to which the chassis 130 is adhered by the adhesive composition. The fluid-impermeable backing 125 is impervious to fluid and prevents leakage from the diaper 100. The fluid-impermeable backing is typically a plastic or polyolefin film substrate. Useful plastic substrates include films can be made from polyethylene, polypropylene, polyester such as polyethylene terephthalate, polyvinyl chloride, polyvinylidine chloride, polyvinyl acetate, and other materials capable of film formation.

The diaper 100 further includes one or more fastening tapes 105 having an adhesive composition 110 disposed thereon. The adhesive composition 110 either has the same composition as the adhesive composition that secures the chassis 130 to the backing 125, or can have a different composition. The fastening tapes 105 (two are shown) are located on an outer surface of the fluid-impermeable backing 125 (not shown), which is opposite the side of the backing 125 to which the chassis 130 is adhered. When the diaper 100 is in a closed position, the fastening tape 105 is contacted with the opposite side of the fluid-impervious backing 125 so that the adhesive 110 adheres to the opposite side of the fluid-impervious backing 125.

The waistband sections 115 and the leg sections 120 are adhered to the fluid-impermeable backing 125 using a first adhesive composition (not shown). The second adhesive composition is an elastic attachment adhesive as the waistband sections 115 and leg sections 120 typically include elastic to fit to the waist and legs of the wearer.

The chassis 130 includes multiple layers, such as an absorbent layer 135 adhered to a liner layer 140 using a second adhesive composition (not shown), which may have the same composition or a different composition than the first adhesive composition. Preferably, the second adhesive composition is a construction type adhesive. The liner layer 140 permits fluid to pass through to the absorbent layer 135, which absorbs the fluid. The absorbent layer 135 typically includes cellulosic pulp or fluff, super-absorbent batts or combinations of fluff and super-absorbent materials. Such fluff layers are often formed and wrapped in tissue to provide mechanical integrity to the fluff, which has little inherent mechanical strength. Fluff is typically manufactured through the formation of finely divided cellulosic fibers, however other materials can be used to form highly absorbent fluff or pulp layers.

The liner layer 140 typically includes a woven or nonwoven layer (not shown) formed over a tissue layer (not shown). The tissue layer may be a loosely formed cellulosic sheet of high porosity or permeability. The woven or nonwoven layers can consist of a fluid permeable flexible material made of hydrophilic or hydrophobic fiber components, natural or synthetic fibers, rayon, polyester, polypropylene, polyethylene, nylon, or mixtures thereof.

In one aspect, the elastic adhesive composition may include at least 50 percent by weight of the polymer, up to 50 percent by weight of a tackifier, up to 30 percent by weight of mineral oil, up to 10 percent by weight of wax, and up to 2 percent by weight of an anti-oxidant. In another aspect, the elastic adhesive composition may include at least 75 percent by weight of the polymer, up to 50 percent by weight of a tackifier, up to 20 percent by weight of mineral oil, up to 5 percent by weight of wax, and up to 2 percent by weight of an anti-oxidant. In yet another aspect, the elastic adhesive composition may include at least 80 percent by weight of the polymer, up to 50 percent by weight of a tackifier, up to 30 percent by weight of mineral oil, up to 10 percent by weight of wax, and up to 2 percent by weight of an anti-oxidant.

In one aspect, the construction adhesive composition may include at least, 50 percent by weight of the polymer, up to 50 percent by weight of a tackifier, up to 30 percent by weight of mineral oil, up to 10 percent by weight of wax, and up to 2 percent by weight of an anti-oxidant. In another aspect, the construction adhesive composition may include 75 to 95 percent by weight of the polymer, up to 50 percent by weight of a tackifier, up to 20 percent by weight of mineral oil, up to 5 percent by weight of wax, and up to 2 percent by weight of an anti-oxidant. In yet another aspect, the construction adhesive composition may include at least 80 percent by weight of the polymer, up to 50 percent by weight of a tackifier, up to 30 percent by weight of mineral oil, up to 10 percent by weight of wax, and up to 2 percent by weight of an anti-oxidant.

The embodiments described below further relate to compositions or combinations as described herein.

A. A disposable article comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a disposable element, wherein the adhesive composition is applied to at least a portion of the disposable element. The disposable element can be selected from the group consisting of nonwoven fabrics, non-woven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwoven articles, liners, elastic side panels, fastening tape, elastic bands, rayon, nylon, cellulosic pulp, cellulosic fluff, superabsorbent batts, and combinations thereof.

B. The disposable article of paragraph A used as a diaper, training pants, sanitary napkin, panty liner, incontinent wear, bed pad, surgical gown, surgical drape, rodent trap, hook and loop fastener, garment, medical garment, swimwear, and combinations thereof.

C. The disposable article of any of the above paragraphs, wherein the disposable element is adhered to a second disposable element by the adhesive composition.

D. The disposable article of any of the above paragraphs, wherein the adhesive composition further comprises one or more tackifiers. The tackifiers are selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin acids, hydrogenated rosin esters, derivatives thereof, and combinations thereof.

The adhesive composition can further comprise one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers; hydrocarbon waxes, petroleum waxes, paraffin waxes, synthetic waxes, polyolefin waxes, and combinations or derivatives thereof. The adhesive composition can further comprises one or more additives selected from the group consisting of plasticizers, oils, stabilizers, antioxidants, pigments, colorants, dyestuffs, polymeric additives, defoamers, preservatives, thickeners, rheology modifiers, humectants, fillers, solvents, nucleating agents, water, stabilizers, chelating agents, gelling agents, and combinations or derivatives thereof.

E. The disposable article of any of the above paragraphs, wherein the adhesive composition comprises 30 percent by weight or less of the one or more waxes, 20 percent by weight or less of the one or more waxes, 10 percent by weight or less of the one or more waxes, 5 percent by weight or less of the one or more waxes, 3 percent by weight or less of the one or more waxes, 2 percent by weight or less of the one or more waxes, or 1 percent by weight or less of the one or more waxes.

F. The disposable article of any of the above paragraphs, wherein the adhesive composition comprises 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

G. The disposable article of any of the above paragraphs, wherein the adhesive composition comprises 30 percent by weight or less of the one or more additives, 25 percent by weight or less of the one or more additives, 20 percent by weight or less of the one or more additives, 15 percent by weight or less of the one or more additives, 10 percent by weight or less of the one or more additives, 5 percent by weight or less of the one or more additives, or 1 percent by weight or less of the one or more additives.

H. The disposable article of any of the above paragraphs, wherein the polymer has a melt viscosity of 90,000 mPa·s or less at 190° C. The polymer can further have a set time of 30 minutes or less and a Dot T-Peel of from 3 N to 4,000 N, alternately 3 N to 400 N, alternately 3 N to 40 N.

I. The disposable article of any of the above paragraphs, wherein the adhesive composition has a viscosity of from 0.05 Pa·s to 25 Pa·s at 177° C. The adhesive composition can further have a cloud point of 200° C. or less and a glass transition temperature of from −65° C. to 30° C.

J. A method of preparing the disposable article of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.98 or less measured at the Mz of the polymer, and a Mw of 100,000 or less and applying the adhesive composition to at least a portion of a disposable element.

C. Laminates

In a particular embodiment, the adhesive described herein can be used in a laminate article. Laminate articles consist of layers, or laminae, bonded together by suitable binders. Laminaes are usually materials that are readily available in continuous-sheet forms, such as paper or woven fabrics. The binders are synthetic resins, predominantly phenolic resins, that are solvent-coated or impregnated into the base laminae. After drying, several laminae are stacked and the entire mass is consolidated under heat and pressure to form a rigid sheet or panel used for its mechanical, electrical, chemical, or aesthetic qualities. In industry, laminaes are used for their electrical properties, impact strength, wearing quality, or chemical resistance. They are used in electronic applications, electrical switches, gears, etc. Although extremely important functionally, they are seldom conspicuous.

Laminate articles can consist of a reinforcing fibrous web extending through a matrix of synthetic resinous material. The choice of web and resin determines the properties of the laminate article and, to a great extent, the process used for manufacture. The term "laminate article" as used herein includes any multiple-layered article that is subjected to heat and/or pressure to form a multiple layer structure. A laminate layer is a sheetlike material that may be treated with resin, such as tackifiers as described below, and consolidated by heat and pressure. Typical layers include papers, woven fabrics, mats, felts, and similar materials. The layers are usually in the form of a continuous roll, although wood veneers are a notable exception. Laminating layers are classified by the form (paper, woven fabric, etc) or the constituent, which may vary from absorbent organic cellulose to non-absorbent inorganic glass. Each layer can individually be a film layer, a coating layer, a fibrous layer, a foam layer, a substrate layer, and/or other suitable layers. Each layer of the laminate may be formed of the same or different materials, such as wood, plastic, paper, rubber, thermoplastic, cardboard, metal, including metal alloys, compounded materials, metal foil, such as aluminum and tin foil, metallized surfaces, and dynamically vulcanized alloys, cloth, spunbonded fibers, stone, plaster, glass, including silicon oxide ($SiO_x$) coatings applied by evaporating silicon oxide onto a film surface, rock, ceramics, films, foams, nonwovens, including particularly polypropylene spun bonded fibers, and substrates coated with inks, dyes, pigments, PVDC and the like and any combinations, blends, and mixtures thereof. Furthermore, each layer can vary in thickness depending on the intended uses.

In one aspect, the layers may include one or more of the following, alone or in combination with the adhesive composition described herein.

1. Polyolefins

Preferred polyolefins include homopolymers or copolymers of $C_2$ to $C_{40}$ olefins, preferably $C_2$ to $C_{20}$ olefins, and more preferably a copolymer of an alpha-olefin and another olefin or alpha-olefin (ethylene is defined to be an alpha-olefin for purposes of this invention). Most preferably, the polymer includes homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, actates, anhydrides, copolymers of a $C_2$ to $C_{20}$ olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic Polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

Moreover, each layer may be functionalized with malaic acid or malaic anhydride.

For example, the layers may include one or more films comprising any of the above materials, and blends thereof, with or without the adhesive composition described herein. Each film may vary in thickness, depending on the intended application. For example, films of a thickness from 1 to 250 µm are usually suitable for laminate articles, while films intended for packaging are usually from 10 to 60 µm thick. In one aspect, the laminate article may include one or more films for sealing either another film layer or portions of the laminate article. The thickness of the sealing layer is typically from 0.2 to 50 µm. There may be a sealing layer on both the inner surfaces and outer surfaces of the film or laminate article or the sealing layer may be present on only the inner surface or the outer surface. These films may be formed by any of the conventional techniques known in the art including extrusion, co-extrusion, extrusion coating, lamination, blowing and casting.

In one aspect, the laminate article includes at least two layers in combination with an adhesive composition. The laminate article preferably includes from 2 to 70 layers. In one aspect, the laminate article may include 2, 3, 4 or 5 layers. For example, the laminate article may include two layers, wherein the first layer is wood and the second layer is a veneer film.

The adhesive composition described herein may be included within any layer of the laminate article or applied between the layers of the laminate article. For example, the adhesive composition may be used as a tie layer or as an adhesive layer, such as on a layer of contact paper.

The adhesive composition includes the inventive polymer described herein. The polymer may be functionalized. Additional components such as tackifier, waxes, and additives, for example, may be combined with the polymers or formulations of the polymers to form the adhesive composition.

In one aspect, the adhesive composition includes one or more tackifiers. The tackifiers may be aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition may include from 1 to 80 percent by weight of the one or more tackifiers. More preferably, the adhesive composition includes from 2 to 40 percent by weight of the one or more tackifiers, and most preferably from 3 to 30 percent by weight. Furthermore, the one or more tackifiers may further be included in one or more of the layers. The layers including a tackifer may be oriented in uniaxial or biaxial directions to the same or different degrees.

In another aspect, the adhesive composition includes one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 5 percent by weight or less of the one or more waxes, or 3 percent or less, or 1 percent or less, or 0.5 percent or less.

In yet another aspect, the adhesive composition includes 30 percent by weight or less, 25 percent by weight or less, 20 percent by weight or less, or 10 percent by weight or less, or 5 percent by weight or less of one or more additives. The one or more additives may include plasticizers, oils, stabilizers, antioxidants, pigments, dyestuffs, polymeric additives, defoamers, preservatives, thickeners, rheology modifiers, humectants, fillers; fluorescing agents, and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary plasticizers may include mineral oils, polybutenes, phthalates, and combinations thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers.

In one aspect, the adhesive composition has a percent substrate fiber tear of from 75% to 100% at 22° C. At –35° C., the adhesive composition can have a percent substrate fiber tear of from 75% to 100%, and at 40° C. from 75% to 100%. In one embodiment, the adhesive composition has a Peel Adhesion Failure Temperature (PAFT) of 50° C. or more, preferably 60° C. or more, preferably 70° C. or more, preferably 75° C. or more. In yet another embodiment, the adhesive composition has a Shear Adhesion Failure Temperature of 50° C. or more. In one embodiment, the adhesive composition has a viscosity of from 0.2 Pa·s to 8 Pa·s at 177° C., or from 0.5 Pa·s to 2.5 Pa·s at 177° C. Additionally, the adhesive composition can have a glass transition temperature of from –65° C. to 30° C. In another embodiment the adhesive composition may have an open time of 60 seconds or less, preferably 3 seconds or more. In another embodiment the adhesive composition has a cloud point of 200° C. or less, preferably 190° C. or less, preferably 130° C. or less.

Typical formulations of the polymer include:

1. 80 percent by weight or more of the polymer, 20 percent by weight of the one or more tackifiers and 10 percent by weight of the one or more additives, such as fillers.

2. 95 percent by weight or more of the polymer and 5 percent by weight or less of the one or more tackifiers.

3. 92 percent by weight or more of the polymer, 5 percent by weight or less of the one or more tackifiers and 3 percent by weight or more of the one or more fillers.

The laminate article may be formed using any of the conventional techniques known or yet to be discovered in the art. Same exemplary techniques are discussed below.

In one example, such as furniture or veneer processes, the laminating process consists of treating, collating, and pressing. In the first step, the layer is brought into contact with a resin solution by impregnation or coating; the solvent is removed by drying. The treated material is cut into sheets that are placed on each other in a parallel arrangement; this is called collating. Heat and pressure are applied to consolidate the sheets into a permanently bonded and infusible unitary mass; this step is called pressing, or molding. Finishing operations complete the procedure.

Alternatively, the laminate article may be obtained by the flat film or tubular process, which may be followed by orientation in an uniaxial direction or in two mutually perpendicular directions in the plane of the film. One or more of the layers of the laminate article may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the laminate article is oriented to the same extent in both the MD and TD directions.

The laminate articles described above may be used as stretch and/or cling films. Stretch/cling films are used in various bundling, packaging and palletizing operations. To impart cling properties to, or improve the cling properties of, a particular film, a number of well-known tackifying additives can be utilized. The cling properties of a film can also be modified by the well-known physical process referred to as corona discharge. Some polymers (such as ethylene methyl acrylate copolymers) do not need cling additives and can be used as cling layers without tackifiers. Stretch/clings films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly preferred are polypropylene and linear low density polyethylene (LLDPE). Suitable polypropylene is normally solid and isotactic, i.e., greater than 90% hot heptane insolubles, having wide ranging melt flow rates of from about 0.1 to about 300 g/10 min. Additionally, the slip layer may include one or more anticling (slip and/or antiblock) additives, which may be added during the production of the polyolefin or subsequently blended in to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

The laminate article may also be used in veneers, countertops, clothing, window treatments and furniture, for example. The National Electrical Manufacturers Association (NEMA) publishes complete information on the properties of and test methods for both industrial and decorative laminates. For example, laminate articles can include the following:

Copper-clad Laminates. Grades X, XXP, XXXPC, FR-2, FR-3, FR-4, FR-5, FR-6, G-10, G-11, CEM-1, and CEM-3 laminates are used with copper foil bonded tone or both surfaces and are intended primarily for printed wiring boards but not for multiplayer applications.

Epoxy—Glass Laminates. Epoxy-resin-impregnated glass cloth in the semicured state is cured for bonding the individual circuit layers of multiplayer printed wiring boards.

Polyester-Glass Laminates. Grades GPO-1, GPO-2, and GPO-3 polyester glass-mat sheet laminates are intended for both mechanical and electrical applications.

In a specific example, the laminate article is formed in the following way:

An adhesive composition is applied between a first layer and a second layer and between the second layer and a third layer to form a three layer laminate article, wherein the adhesive composition includes 95 percent by weight polymer and 5 percent by weight tackifier.

In another specific example, the laminate article is formed by the following:

An adhesive composition is applied in between each of 6 layers to form a 6 layered laminate article, wherein the adhesive composition includes 92 percent by weight polymer, 5 percent by weight tackifier and 3 percent by weight exfoliated clay.

A hypothetical example includes forming a decorative laminate article. A face sheet is prepared by treating a roll of pigmented alpha-cellulose decorative paper with a melamine formaldehyde reaction product, the paper having a weight of approximately 69 lb/3000 ft$^3$. The formed web of paper is then carried over a reverse roll applicator for resin impregnation (with the adhesive compositions described herein) and through an air knife for metering resin to obtain a resin content of 55 percent. The web is then dried in a treater oven to a volatile content of 6 percent and the desired sheet lengths are cut therefrom. Preferably, the viscosity of the adhesive composition is 0.05 Pa·s. A first layer and a multiple layer solid color laminate comprising an aluminum foil release sheet, a melamine treated decorative sheet, a vinyl ester treated core sheet and a melamine treated decorative sheet are consolidated in a hydraulic press under 1200 psi pressure at a peak temperature of 280 F for a total cure cycle of one hour.

The embodiments described below further relate to compositions or combinations as described herein.

A. A laminate article comprising two or more layers in combination with an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less. The adhesive composition can be present between one or more layers. In one embodiment, at least one of the two or more layers comprise one or more materials selected from the group consisting of wood, plastic, paper, rubber, thermoplastic, cardboard, metal, metal foil, metallized surfaces, cloth, non-wovens, spunbonded fibers, stone, plaster, glass, rock, ceramics, films, and foams. In another embodiment, the laminate article comprises more than two layers and wherein each layer is individually selected from the group consisting of wood, plastic, paper, rubber, thermoplastic, cardboard, metal, metal foil, metallized surfaces, cloth, non-wovens, spunbonded fibers, stone, plaster, glass, rock, ceramics, films, and foams.

B. The laminate article described in paragraph A above further comprising one or more tackifiers. The one or more tackifiers can be selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

The laminate article described in paragraph A or B above, can further comprise one or more waxes. The one or more waxes are selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

The laminate article can further comprise one or more additives. The additives are selected from the group consisting of plasticizers, oils, stabilizers, antioxidants, pigments, dyestuffs, polymeric additives, defoamers, preservatives, thickeners, rheology modifiers, humectants, fillers and water. The one or more oils comprise aliphatic naphthenic oils, white oils, combinations thereof, and derivatives thereof. The one or more polymeric additives are selected from the group consisting of homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. The one or more plasticizers selected from the group consisting of mineral oils, polybutenes, phthalates, and combinations thereof. The one or more phthalates comprise di-iso-undecyl phthalate (DIUP), di-iso-nonylphthalate (DINP), dioctylphthalates (DOP), combinations thereof, or derivatives thereof.

C. The laminate article of paragraph B, wherein the adhesive composition comprises 5 percent or less by weight of the one or more waxes, from 1 percent to 90 percent by weight of the one or more tackifiers, and 30 percent or less by weight of the one or more additives.

D. The laminate article of any of the above paragraphs, wherein the polymer has a melt viscosity of 90,000 mPa·s or less at 190° C. The polymer can also have a set time of 30 minutes or less. The polymer can also have a Dot T-Peel from 3 N to 4,000 N.

E. The laminate article of any of the above paragraphs, wherein the adhesive composition has a viscosity of from 0.2 Pa·s to 8 Pa·s at 177° C. The adhesive composition can also have a Dot T-Peel of from 3 N to 4,000 N.

F. A diaper comprising the laminate article of any of the above paragraphs.

G. A process of making the laminate of any of the above paragraphs comprising combining at least two layers and an adhesive composition to form the laminate article, the adhesive composition comprising a polymer having one or more C3 to C40 olefins and from 0 to 5 mole % of ethylene, wherein the polymer has a Dot T-Peel of 1 Newton or more, a branching index (g') of 0.98 or less measured at the Mz of the polymer, and a Mw of 100,000 or less.

D. Nonwovens/Fibers

In a particular embodiment, the adhesives of this invention can be used in fiber products. Fiber products consist of fibrous materials having an adhesive composition applied thereto. The fibrous material can include a single-component fiber, a multi-component fiber, or a combination thereof. Several types of fibrous materials can be used to form fiber products and are generally distinguished based on fiber organization within the fiber product. For example, one type of fibrous material is an isotropic assembly in which individual fibers are arranged in a completely random fashion with no preferred orientation in any of the three principal spatial axes. Another example of fibrous materials is textile yarns, having a high degree of fiber orientation with respect to the principal axis of the material. Textile yarns are produced from staple (finite length) fibers by a combination of processing steps referred to collectively as yarn spinning. After preliminary fiber alignment, the fibers are locked together by twisting the structure to form the spun yarn, which is continuous in length and substantially uniform. Yarns are typically used in the formation of textile fabrics, either by weaving or knitting.

The fibrous materials can include cotton, kapok, coir, flax, hemp, ramie, jute, sisal, abaca, cellulose, wool, mohair, cashmere, human hair, common goat hair, camel hair, llama hair, alpaca hair, vicun wool, silk, nylon, aramid, Kevlar, nomax, polyamides, polyacrylates, polyolefin polymers, such as propylene, butene-1, polyethylene, polypropylene, and ethylene-vinyl acetate, polyester, such as polyethylene terephthalate, polybutylene terephthalate, polyethylene terephthalate, and poly-ethyleneoxybenzonate, asbestos, polyamides, polycarbonate, polystyrene, thermoplastic elastomers, flouropolymers, vinyl polymers, minerals, acrylics, polyvinylchloride, organic binders, glass, metal, alumina, silicon carbide, boron nitride, boron carbide, and combinations thereof.

Exemplary fiber products include nonwovens, carpet, diapers, swimwear, child training pants, adult incontinence garments, feminine care products, medical garments, bed pads, surgical drapes, cloth linings, scrubbing pads, automotive interior parts, garments, tapes, face masks and respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, and combinations thereof.

As used herein, "nonwoven" refers to a textile material that has been produced by means other than weaving. In nonwoven fabrics, the fibers are processed directly into a planar sheetlike fabric structure by passing the intermediate one-dimensional yarn state, and then are either bonded chemically or interlocked mechanically (or both) to achieve a cohesive fabric. The nonwoven article may include natural or synthetic fibers or mixtures thereof. Materials commonly used in forming nonwoven articles include rayon, polyester, polypropylene, polyethylene, nylon, and others. The individual fibers are usually staple fibers or continuous filaments. Exemplary fibers may include polypropylene fibers, rayon fibers, polyester fibers, polyethylene fibers, nylon fibers, cellulose fibers, viscose fibers, ethylene-propylene copolymer fibers, polyolefin fibers, polyamide fibers, polycarbonate fibers, polystyrene fibers, thermoplastic elastomer fibers, fluoropolymer fibers, vinyl polymer fibers, carbon fibers, glass fibers, mineral fibers, wool fibers, acrylic fibers, polyvinylchloride fibers, polyurethane fibers, organic binder fibers, and combinations thereof.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 80 percent by weight or less of the one or more tackifiers, or 60 percent by weight, or 40 percent by weight. More preferably, the adhesive composition includes 30 percent by weight of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 30 percent by weight or less, or 25 percent by weight or less, or 20 percent by weight or less of the one or more waxes. More preferably, the adhesive composition includes 15 percent by weight or less, or 10 percent by weight or less, or 5 percent by weight or less of the one or more waxes.

In yet another aspect, the adhesive composition can include 90 percent by weight or less, or 30 percent by weight or less, or 25 percent by weight or less, or 20 percent by weight or less of one or more additives. More preferably, the adhesive composition includes 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

In one aspect, the adhesive composition has a percent substrate fiber tear of from 75% to 100% at 22° C. In another aspect, the adhesive composition has a PAFT of 60° C. or more. Preferably, the adhesive composition has a PAFT of 150° C. or more. In yet another aspect, the adhesive composition has a SAFT of 70° C. or more. The adhesive composition can also have a tensile strength at break of at least 6.89 bar at 25° C. In one aspect, the adhesive composition has a viscosity of less than 9 Pa·s at 177° C. Preferably, the adhesive composition has a viscosity of from 0.2 to 8 Pa·s at 177° C. More preferably, the adhesive composition has a viscosity of from 0.5 to 2.5 Pa·s at 177° C. In another aspect, the adhesive composition has a cloud point of 275° C. or less. Preferably, the adhesive composition has a cloud point of 190° C. or less. More preferably, the adhesive composition has a cloud point of 130° C. or less. In yet another aspect, the adhesive composition has a glass transition temperature of from −65° C. to 30° C.

One typical formulation of the adhesive composition includes at least 50 percent by weight of the polymer of the present invention, up to 80 percent by weight of one or more tackifiers, up to 30 percent by weight of one or more waxes, and up to 30 percent by weight of one or more additives. Another typical formulation of the adhesive composition includes at least 50 percent by weight of the polymer of the present invention, up to 50 percent by weight of one or more tackifiers, up to 10 percent by weight of one or more waxes, and up to 10 percent by weight of one or more additives. Yet another typical formulation of the adhesive composition includes at least 50 percent by weight of the polymer of the present invention, up to 80 percent by weight of one or more tackifiers, up to 10 percent by weight of one or more waxes, and up to 10 percent by weight of one or more additives.

Fiber products can be formed by any method known to one skilled in the art, including melt spinning, dry spinning, wet spinning, thermal setting, thermal relaxation, twisting, interlacing, bundling, crimping, meltblowing, spunbonding, air laying, bonded carded web processes and cutting, for example. For example, the fiber product can be formed by extruding the adhesive composition onto one or more fibers to form the fiber product, or applying the adhesive composition to a substrate to attach a plurality of fibers (the fibrous material) thereto.

In one example, such as, melt spinning, the process consists of forcing molten polymer through the fine holes in a spinneret and solidifying the molten polymer by passage through cool air to a driven roll that draws the fibers away from the face of the spinneret.

In another example, a nonwoven article is formed impregnation of a loosely assembled web of individual fibers with the adhesive composition, followed by moderate heating to dry the web. This moderate heating also serves to cure the adhesive composition. The fibers and adhesive composition are heated to a temperature that is sufficiently high to soften the adhesive composition, but still below the melting point of the fibers. The starting fibrous web can be formed by any one of the conventional techniques for depositing or arranging fibers in a web or layer. These techniques include carding, garnetting, and air-laying. Individual webs or thin layers formed by one or more of these techniques can also be lapped or laminated to provide a thicker layer for conversion into a heavier fabric. In general, the fibers extend in a plurality of diverse directions in general alignment with the major plane while overlapping, intersecting, and supporting one another to form an open porous structure.

The fibrous web is then subjected to at least one of several types of latex bonding operations to anchor the individual fibers together to form a self-sustaining web. Some of the better known methods of bonding are overall impregnation, spraying or printing the web with intermittent or continuous, straight or wavy lines or areas of the adhesive composition extending generally transversely or diagonally across the web and additionally, if desired, along the web.

One typical formulation of the adhesive composition useful with non-woven articles includes at least 50 percent by weight of the polymer of the present invention, up to 80 percent by weight of one or more tackifiers, up to 30 percent by weight of one or more waxes, and up to 30 percent by weight of one or more additives. Another typical formulation of the adhesive composition useful with non-woven articles includes at least 50 percent by weight of the polymer of the present invention, up to 50 percent by weight of one or more tackifiers, up to 10 percent by weight of one or more waxes, and up to 5 percent by weight of one or more additives.

The fiber products described above may be used as clothing, hosiery, swimwear, foundations, underwear, medical supplies, parachutes, golf balls, automotive seats and upholstered furniture.

Nonwoven articles are useful in preparing surgical drapes, feminine hygiene articles, incontinence wear, diapers, training pants, swimwear, medical garments, outerwear, bed quilt stuffing, furniture padding, filter media, scrubbing pads, cloth linings, automotive interior parts, face masks and respirators, vacuum bags, oil and chemical spill sorbents, thermal insulation, first aid dressings, medical wraps, wipe materials, and other products. The non-woven fabric or web of the non-woven article may include diapers, swimwear, child training pants, adult incontinence garments, feminine care products, medical garments, bed pads, surgical drapes, cloth linings, scrubbing pads, automotive interior parts, garments, tapes, face masks and respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, and combinations thereof, for example.

Tufted carpets are generally composite structures in which the yarn forming the pile, e.g., the surface of the carpet, is needled through a base fabric and whereby the base of each tuft extends through the base fabric and is visible on a bottom surface of the base fabric. Tufted carpets are generally of two types. The first is known as a "nap" carpet where the yarn loops are formed by needling or punching a continuous yarn just through the base fabric, thus forming the base of the carpet, while the tops of the loops can be one-fourth inch to three-quarters inches long, thus forming the wearing surface of the carpet. The second type, commonly known as a "shag" carpet, can have the same base fabric as the nap carpet but the tops of the loops have been split. The open ends of the numerous U-shaped pieces of yarn thus form the surface of the shag carpet.

The loops of yarn are needled through and embedded in the base fabric, thus forming the tufted base, which is secured to the base fabric to prevent the loops from being pulled out of the base fabric. The tufted bases are generally secured by applying an adhesive, such as the adhesive composition described herein, to the back of the raw tufted carpet to bind the tufted yarns to the base fabric. A secondary backing material can also be applied to the back of the raw tufted carpet and bonded thereto with the same adhesive composition that bonds the yarn to the base fabric or another adhesive composition. The application of the secondary backing material further secures the loops of yarn since the loops of yarn are then bonded by the adhesive composition to the backing material as well as the base fabric.

The yarn can be made of any type of fiber known in the art to be useful for tufted carpets, e.g., nylon, acrylic, wool, cotton and rayon. The base fabric or primary backing may be of any type known in the art and may be woven. For example, the base fabric can be woven jute, woven slit polypropylene film, burlap, or may be non-woven fabric, e.g., a needle punched, or non-woven polypropylene web. Likewise, the secondary backing material may be of any type known in the art, e.g., woven jute, woven slit polypropylene film, burlap, foam material such as polyurethane foams or blown vinyl film and non-woven fabrics such as needle punched, non-woven polypropylene web, or blends of polyesters and polypropylene.

In preparing such tufted carpets, the adhesive composition is usually applied to the primary backing, which holds the tufted matrix in the form of latex. A secondary backing is then usually applied to the carpet. The carpet is then heated to cure the latex to ensure a bond between the latex and the tufted carpet, and the latex and the primary and secondary backings. As described above, the adhesive composition may or may not include fillers. Adhesive compositions including fillers can be used to lock the facing yarn fiber into place. Adhesive compositions that do not include fillers can be used as a main coat adhesive for the construction of tufted yarn carpets or as the main backing for carpet tiles.

When used in carpet manufacture, the adhesive composition preferably has a tuft bind of 1 kg or more, more preferably 3 kg or more, and most preferably 5 kg or more. As used herein, "tuft bind" is defined by the measures force required to remove a single yarn from the carpet and is measured by ASTM D1335. Even more preferably, the adhesive composition has a tuft bind of 15 kg or more. Additionally, the adhesive composition should have a flexibility of 10° C. or less, or more preferably 5° C. or less. As used herein, "flexibility" is measured by bending a strip of a carpet sample to an angle of 180 degrees at successively lower temperatures. The sample successfully passes the test if it does not crack.

A typical adhesive formulation for carpets includes from 2 to 98 percent by weight of the polymer described herein, up to 80 percent by weight of at least one tackifying resin, up to 20 percent by weight of at least one wax, up to 30 percent by weight of at least one plasticizer, and up to 5 percent by weight of at least one antioxidant.

Another typical adhesive formulation for carpets includes from 2 to 98 percent by weight of the polymer described herein, up to 50 percent by weight of at least one tackifying resin, up to 10 percent by weight of at least one wax, up to 20 percent by weight of at least one plasticizer, up to 2 percent by weight of at least one foaming agent, up to 90 percent by weight of at least one filler, and up to 5 percent by weight of at least one antioxidant.

The embodiments described below further relate to compositions or combinations as described herein.

A. A fiber product comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and one or more fibrous materials. The fibrous materials can be selected from the group consisting of cotton, hemp, cellulose esters, polyesters, wool, human hair, kevlar, nylon, nomax, polyamides, poly acrylates, polyolefins, and combinations thereof.

B. The fiber product of paragraph A, wherein the fiber product is a non-woven article. The fibrous material can comprise one or more materials selected from the group consisting of polypropylene, rayon, polyester, polyethylene, nylon, cellulose, viscose, ethylene-proplylene copolymers, polyolefin polymers, polyamides, polycarbonate, polystyrene, thermoplastic elastomers, fluoropolymers, vinyl polymers, carbon, glass, minerals, wool, acrylics, polyvinylchloride, polyurethane, organic binders, and combinations thereof.

C. The fiber product of paragraph B used as diapers, swimwear, child training pants, adult incontinence garments, feminine care products, medical garments, bed pads, surgical drapes, cloth linings, scrubbing pads, automotive interior parts, garments, tapes, face masks and respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, or combinations thereof.

D. The fiber product of paragraph A used as a carpet backing article. The carpet backing article can comprise a primary backing material, wherein the fibrous materials are attached to the primary backing material and the adhesive composition is disposed on at least a portion of the fibrous materials. The carpet backing article can further comprise a second backing material adhered to the adhesive composition. The primary backing material is selected from the group consisting of woven jute, woven slit polypropylene film, burlap, needle punched materials, non-woven polypropylene, and combinations thereof.

E. The fiber product of any of the above paragraphs, wherein the adhesive composition further comprises one or more tackifiers. The one or more tackifiers are selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof. The adhesive composition can further comprise one or more waxes. The one or more waxes are selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof. The adhesive composition can further comprise one or more additives. The one or more additives are selected from the group consisting of plasticizers, oils, stabilizers, antioxidants, pigments, dyestuffs, polymeric additives, defoamers, preservatives, thickeners, rheology modifiers, humectants, fillers, surfactants, foaming agents, polymer compatibilizers, fire retardants and water.

F. The fiber product of any of the above paragraphs, wherein the adhesive composition comprises 30 percent by weight or less of the one or more waxes, 25 percent by weight or less of the one or more waxes, 20 percent by weight or less of the one or more waxes, 15 percent by weight or less of the one or more waxes, 10 percent by weight or less of the one or more waxes, 5 percent by weight or less of the one or more waxes, 3 percent by weight or less of the one or more waxes, or 1 percent by weight or less of the one or more waxes.

G. The fiber product of any of the above paragraphs, wherein the adhesive composition comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

H. The fiber product of any of the above paragraphs, wherein the adhesive composition comprises 30 percent by weight or less of the one or more additives, 25 percent by weight or less of the one or more additives, 20 percent by weight or less of the one or more additives, 15 percent by weight or less of the one or more additives, 10 percent by weight or less of the one or more additives, 5 percent by weight or less of the one or more additives, 3 percent by weight or less of the one or more additives, 2 percent by weight or less of the one or more additives, or 1 percent by weight or less of the one or more additives.

I. The fiber product of any of the above paragraphs, wherein the polymer has a melt viscosity of 90,000 mPa·s or less at 190° C. The polymer can also have a set time of 30 minutes or less and a Dot T-Peel of from 3 N to 4,000 N.

J. The fiber product of any of the above paragraphs, wherein the adhesive composition has a viscosity of less than 9 Pa·s at 177° C. The adhesive composition can further have a tuft bind of 1 kg or more.

K. A process of making the fiber product of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a fibrous material.

E. Films

In a particular embodiment, the polymer components described herein can be used in a monolayer film. Alternatively, the polymer components can be applied to at least an outer portion of a monolayer film. Monolayer films are planar forms which are thick enough to be self-supporting but thin enough to be flexed, folded, or creased without cracking. The thickness of the film depends on the application and manufacturing, but is generally 125 μm or less. The monolayer film, which may be unoriented, uniaxially oriented, or biaxially oriented, is formed from applying a polymer component to at least a portion of a film substrate. Alternatively, the polymer component may be blended with a film substrate to alter the properties thereof.

The film substrate may include paper, foil, metal, metal alloys, polyethylene, polypropylene, polyester, polyethylene terephthalate, polyvinyl chloride, polyvinylidine chloride, polyvinyl acetate, polyamides, homo polymers thereof, and combinations and copolymers thereof.

The monolayer film may further include additional polymer components selected from polyethylene, polypropylene, polyester, polyethylene terephthalate, polyvinyl chloride, polyvinylidine chloride, polyvinyl acetate, polyamides, homo polymers thereof, combinations and copolymers thereof.

In one aspect, the polymer component includes one or more tackifiers. The tackifiers include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The polymer component may include 80 percent by weight or less of the one or more tackifiers. More preferably, the polymer component includes 60 percent by weight or less, or 40 percent by weight or less of the one or more tackifiers, and most preferably 20 percent by weight or less of the one or more tackifiers.

In another aspect, the polymer component includes one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The polymer component may include 30 percent by weight or less of the one or more waxes, or 3 percent by weight or less.

In yet another aspect, the polymer component includes 30 percent by weight or less of one or more additives. The one or more additives may include plasticizers, oils, stabilizers, antioxidants, synergists, pigments, dyestuffs, polymeric additives, defoamers, preservatives, thickeners, rheology modifiers, humectants, fillers and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary plasticizers may include mineral oils, polybutenes, phthalates, and combinations thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers.

One typical formulation of the polymer component includes one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less. Another typical formulation of the polymer component includes one or more $C_3$ to $C_5$ olefins and from 0 to 5 mole % of ethylene, wherein the polymer has a Dot T-Peel of 1 Newton or more, a branching index (g') of 0.95 or less measured at an Mz of the polymer, and a Mw of 90,000 or less. Yet another typical formulation of the polymer component includes one or more $C_3$ to $C_6$ olefins and from 0 to 5 mole % of ethylene, wherein the polymer has a Dot T-Peel of 1 Newton or more, a branching index (g') of 0.95 or less measured at an Mz of the polymer, and a Mw of 90,000 or less.

Yet another typical formulation of the polymer component includes at least 35 percent by weight of the polymer of the present invention, up to 60 percent by weight of one or more tackifiers, up to 30 percent by weight of one or more waxes, and up to 15 percent by weight of one or more additives. Yet another typical formulation of the polymer component includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the polymer component includes at least 50 percent by weight of the polymer of the present invention, up to 60 percent by weight of one or more tackifiers, up to 25 percent by weight of one or more waxes, and up to 15 percent by weight of one or more additives.

The polymer component is formulated to have a Peel Adhesion Failure Temperature (PAFT) of 60° C. or more. The polymer component should also have a Shear Adhesion Failure Temperature of 70° C. or more. The polymer component is also formulated to have a viscosity of 15 Pa·s or less at 177° C. Additionally, the polymer component should have a glass transition temperature of from −65° C. to 30° C. More preferably, the polymer component has a glass transition temperature of from 0° C. to 20° C., and most preferably from 10° C. to 20° C.

The monolayer films may be produced with any suitable technique. One example of a film forming technique is a casting technique, such as a chill roll casting process. Casting techniques generally include extruding a composition in a molten state through a flat die and then cooling the composition to form a film. As a specific example, cast films can be prepared using a pilot scale commercial cast film line machine as follows. Pellets of the polymer are melted, with the specific melt temperature being chosen to match the melt viscosity of the particular resins. This layered flow is distributed through a single manifold film extrusion die to the desired width. The material is then drawn down to the final gauge. A vacuum box or air knife can be used to pin the melt exiting the die opening to a primary chill roll. The resulting polymer film is collected on a winder. The film thickness can be monitored by a gauge monitor, and the film can be edge trimmed by a trimmer. One or more optional treaters can be used to surface treat the film, if desired. Such chill roll casting processes and apparatus are well known in the art, and are described, for example, in "The Wiley Encyclopedia of Packaging Technology," Second Edition, A. L. Brody and K. S. Marsh, Ed., John Wiley and Sons, Inc., New York (1997). Although chill roll casting is one example, other forms of casting can be used.

Another example of a film forming technique is a blown film technique. Blown film techniques, generally include, extruding the composition in a molten state through an annular die and then blowing and cooling the composition to form a tubular, blown film, which can then be axially slit and unfolded to form a flat film. As a specific example, blown films can be prepared as follows. The polymer composition is introduced into the feed hopper of an extruder. The film is extruded through the die into a film that was cooled by blowing air onto the surface of the film. The film is drawn from the die typically forming a cylindrical film that is cooled, collapsed, and optionally subjected to a desired auxiliary process, such as slitting, treating, sealing or printing. The finished film can be wound into rolls for later processing, or can be fed into other machines to convert the films into the desired articles. A particular blown film process and apparatus suitable for forming films according to embodiments of the present invention is described in U.S. Pat. No. 5,569,693. Of course, other blown film forming methods can also be used.

Another example of a film forming technique is a coating technique. For example, a solution of a composition containing the adhesive polymer is coated on a release film. After coating, the film is dried with hot air and the coating layer is released from the release film to give an adhesive film. Of course, other coating techniques may be used.

The monolayer film may be used in a wide variety of applications. In general, the monolayer film is suitable for providing an adhesive backing to a wide variety of materials, and for adhesively bonding a first surface to a second surface. For example, the monolayer film may be applied to a structural member such as particleboard or the like to allow for convenient bonding of decorative laminates thereto. As another example, the monolayer film may be applied to a decorative member, such as wall paper, coverings, or panels, or floor coverings such as tile, vinyl, synthetic stone, or stone, to allow for convenient application of these items to another surface or a supportive member.

The embodiments described below further relate to compositions or combinations as described herein.

A. A monolayer film comprising a polymer component comprising one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a film substrate.

B. The monolayer film of paragraph A, further comprising one more additional polymer components selected from the group consisting of polyethylene, polypropylene, polyester, polyethylene terephthalate, polyvinyl chloride, polyvinylidine chloride, polyvinyl acetate, polyamides, homo polymers thereof, combinations, and copolymers thereof.

C. The monolayer film of any of the above paragraphs, wherein the film substrate is selected from a group consisting of paper, foil, metal, metal alloys, polyethylene, polypropylene, polyester, polyethylene terephthalate, polyvinyl chloride, polyvinylidine chloride, polyvinyl acetate, polyamides, homo polymers thereof, combinations, and copolymers thereof.

D. The monolayer film of any of the above paragraphs, wherein the monolayer film further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof.

E. The monolayer film of any of the above paragraphs, wherein the polymer component further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

F. The monolayer film of any of the above paragraphs, wherein the polymer component further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers and water.

G. The monolayer film of any of the above paragraphs, wherein the polymer component comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

H. The monolayer film of any of the above paragraphs, wherein the polymer component comprises 75 percent by weight or less of the one or more waxes, 70 percent by weight or less of the one or more waxes, 60 percent by weight or less of the one or more waxes, 50 percent by weight or less of the one or more waxes, 40 percent by weight or less of the one or more waxes, 30 percent by weight or less of the one or more waxes, 20 percent by weight or less of the one or more waxes, 10 percent by weight or less of the one or more waxes, 5 percent by weight or less of the one or more waxes, or 1 percent by weight or less of the one or more waxes.

I. The monolayer film of any of the above paragraphs, wherein the polymer component comprises 60 percent by weight or less of the one or more additives, 50 percent by weight or less of the one or more additives, 40 percent by weight or less of the one or more additives, 30 percent by weight or less of the one or more additives, 20 percent by weight or less of the one or more additives, 10 percent by weight or less of the one or more additives, 5 percent by weight or less of the one or more additives, 3 percent by weight or less of the one or more additives, or 1 percent by weight or less of the one or more additives.

J. The monolayer film of any of the above paragraphs, wherein the polymer has a melt viscosity of 90,000 mPa·s or less at 190° C.

K. The monolayer film of any of the above paragraphs, wherein the polymer has a set time of 30 minutes or less.

L. The monolayer film of any of the above paragraphs, wherein the polymer has a Dot T-Peel from 3 N to 4,000

N.52. The monolayer film of any of the above paragraphs wherein the polymer component has a viscosity of 15 Pa·s or less at 177° C.

M. The monolayer film of any of the above paragraphs, wherein the polymer component has a glass transition temperature of from −65° C. to 30° C.

N. The monolayer film of any of the above paragraphs, wherein the polymer component has a glass transition temperature of from 0° C. to 20° C.

O. The monolayer film of any of the above paragraphs, wherein the polymer component has a glass transition temperature from 10° C. to 20° C.

P. A method of preparing the monolayer film of any of the above paragraphs comprising forming a polymer component comprising one or more $C_3$ to $C_{40}$ olefins and from 0 to 5 mole % of ethylene, wherein the polymer has a Dot T-Peel of 1 Newton or more, a branching index (g') of 0.98 or less measured at the Mz of the polymer, and a Mw of 100,000 or less and applying the polymer component to at least a portion of a film substrate.

F. Hot Melt Adhesives

In a particular embodiment, the adhesives of this invention can be used in a hot melt adhesive composition. Hot melt adhesives exist as a solid at ambient temperature and can be converted into a tacky liquid by the application of heat. Hot melt adhesives are typically applied to a substrate in molten form.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition may include 60 percent by weight or less of the one or more tackifiers. More preferably, the adhesive composition includes 40 percent by weight or less of the one or more tackifiers, and most preferably 20 percent by weight or less.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 75 percent by weight or less of the one or more waxes. More preferably, the adhesive composition includes 15 percent by weight or less of the one or more waxes.

In yet another aspect, the adhesive composition can include 60 percent by weight or less, 30 percent by weight or less, 20 percent by weight or less, 15 percent by weight or less, 10 percent by weight or less or 5 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

In one aspect, the hot melt adhesive composition has a percent substrate fiber tear of from 75% to 100% at room temperature (about 25° C.). More preferably, the hot melt adhesive composition has a percent substrate fiber tear of from 95% to 100% at room temperature. At freezing temperatures (about −20° C.), the hot melt adhesive composition exhibits a percent substrate fiber tear of from 50% to 100%, or more preferably of from 95% to 100%.

In another aspect, the hot melt adhesive composition has a peel adhesion failure temperature (PAFT) of 200° C. or less and a shear adhesion failure temperature (SAFT) of 200° C. or less. In another aspect, the hot melt adhesive composition has a tensile strength at break of 20 bar or more at 25° C., or 27 bar or more, or 34 bar or more, or 55 bar or more. Additionally, the hot melt adhesive composition can have a percent elongation of 200% strain of the original length at 25° C. or more.

In yet another aspect, the hot melt adhesive composition has a set temperature of from −20° C. to 250° C. and an open temperature of from −20° C. to 250° C. Additionally, in another aspect, the hot melt adhesive composition has a cloud point of 275° C. or less, or 120° C. or less. More preferably, the hot melt adhesive composition has a cloud point of 100° C. or less.

The hot melt adhesive compositions described herein can be prepared using conventional methods well known in the art. For example, the polymer, tackifier, and desired optional ingredients such as plasticizer oil, wax, liquid resin tackifiers, etc., can be blended under low or high shear mixing at elevated temperatures to form a fluid melt. Mixing temperatures depend upon the particular adhesive formulation, and are generally in the range of about 130° C. to about 200° C., with about 150° C. to about 160° C. being a typical suitable range.

One typical formulation of the adhesive composition includes at least 35 percent by weight of the polymer of the present invention, up to 60 percent by weight of one or more tackifiers, up to 30 percent by weight of one or more waxes, and up to 15 percent by weight of one or more additives. Another typical formulation of the adhesive composition includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 25 percent by weight of one or more waxes, and up to 15 percent by weight of one or more additives.

The embodiments described below further relate to compositions or combinations as described herein.

A. A hot melt adhesive composition comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less, wherein the adhesive composition is configured to be applied to a substrate in molten form.

B. The hot melt adhesive composition of any of the above paragraphs, wherein the adhesive composition further comprises one or more tackifiers. The one or more tackifiers are selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

C. The hot melt adhesive composition of any of the above paragraphs, further comprising one or more waxes. The one or more waxes can be selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

D. The hot melt adhesive composition of any of the above paragraphs, further comprising one or more additives. The one or more additives can be selected from the group consisting of plasticizers, oils, stabilizers, antioxidants, pigments, dyestuffs, polymeric additives, defoamers, preservatives, thickeners, rheology modifiers, humectants, fillers, water, and combinations thereof.

E. The hot melt adhesive composition of any of the above paragraphs, wherein the adhesive composition comprises 75 percent by weight or less of the one or more waxes, 70 percent by weight or less of the one or more waxes, 60 percent by weight or less of the one or more waxes, 50 percent by weight or less of the one or more waxes, 40 percent by weight or less of the one or more waxes, 30 percent by weight or less of the one or more waxes, 20 percent by weight or less of the one or more waxes, 10 percent by weight or less of the one or more waxes, 5 percent by weight or less of the one or more waxes, or 1 percent by weight or less of the one or more waxes.

F. The hot melt adhesive composition of any of the above paragraphs, wherein the adhesive composition comprises 60 percent by weight or less of the one or more additives, 50 percent by weight or less of the one or more additives, 40 percent by weight or less of the one or more additives, 30 percent by weight or less of the one or more additives, 20 percent by weight or less of the one or more additives, 10 percent by weight or less of the one or more additives, 5 percent by weight or less of the one or more additives, 3 percent by weight or less of the one or more additives, or 1 percent by weight or less of the one or more additives.

G. The hot melt adhesive composition of any of the above paragraphs, wherein the adhesive composition comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

H. The hot melt adhesive composition of any of the above paragraphs, wherein the polymer has a melt viscosity of 90,000 mPa·s or less at 190° C.

I. The hot melt adhesive composition of any of the above paragraphs, wherein the polymer has a set time of 30 minutes or less.

J. The hot melt adhesive composition of any of the above paragraphs, wherein the polymer has a Dot T-Peel of from 3 N to 4,000 N.

K. A method of making the hot melt adhesive composition of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.98 or less measured at the Mz of the polymer, and a Mw of 100,000 or less, heating the adhesive composition and applying the adhesive composition to a substrate in molten form.

G. Pressure Sensitive Adhesives

In a particular embodiment, the adhesive compositions described herein can be used in pressure sensitive adhesive compositions. As used herein, "pressure sensitive adhesive compositions" are adhesive compositions that have the ability at, or at about, room temperature (about 25° C.) to sufficiently wet a substrate under gentle pressure and to form a useful bond. As used here, the term "useful bond" differs depending on the substrate application and refers to a corresponding balance of adhesive and cohesive strength.

The adhesive composition includes the inventive polymer described herein. The polymer may be functionalized with maleic acid or maleic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 70 percent by weight or less of the one or more tackifiers. More preferably, the adhesive composition includes 40 percent by weight or less of the one or more tackifiers, and most preferably 20 percent by weight or less. In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition can include 40 percent by weight or less of the one or more waxes.

In yet another aspect, the adhesive composition can include 40 percent by weight or less, 30 percent by weight or less, 25 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

In a preferred aspect, the pressure sensitive adhesive composition is formulated to have a dynamic storage modulus of from 0.001 to 1 MPa and a glass transition temperature of from −65° C. to 30° C. In yet another aspect, the pressure sensitive adhesive composition has a viscosity of 200 Pa·s or less at 150° C.

One typical formulation of the adhesive composition includes at least 35 percent by weight of the polymer of the present invention, up to 95 percent by weight of one or more tackifiers, up to 40 percent by weight of one or more waxes, and up to 15 percent by weight of one or more additives. Another typical formulation of the adhesive composition includes at least 50 percent by weight of the polymer of the present invention, up to 95 percent by weight of one or more tackifiers, up to 40 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 40 percent by weight of one or more waxes, and up to 40 percent by weight of one or more additives.

Pressure sensitive adhesive compositions can be formed in a variety of ways known to one skilled in the art, one of which is melt blending as described in U.S. Pat. No. 4,152,189, which is hereby incorporated by reference.

The embodiments described below further relate to compositions or combinations as described herein.

A. A pressure sensitive adhesive composition comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a dynamic storage modulus of from 0.001 to 1 MPa and a glass transition temperature (Tg) of from −65° C. to 30° C.

B. The pressure sensitive adhesive composition of paragraph A, wherein the adhesive composition further comprises one or more tackifiers.

C. The pressure sensitive adhesive composition of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

D. The pressure sensitive adhesive composition of any of the above paragraphs, wherein the adhesive composition further comprises one or more waxes.

E. The pressure sensitive adhesive composition of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

F. The pressure sensitive adhesive composition of any of the above paragraphs, wherein the adhesive composition further comprises one or more additives.

G. The pressure sensitive adhesive composition of any of the above paragraphs, wherein the adhesive composition further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers and water.

H. The pressure sensitive adhesive composition of any of the above paragraphs, wherein the adhesive composition comprises 40 percent by weight or less of the one or more waxes, 30 percent by weight or less of the one or more waxes, 25 percent by weight or less of the one or more waxes, 20 percent by weight or less of the one or more waxes, 15 percent by weight or less of the one or more waxes, 10 percent by weight or less of the one or more waxes, 5 percent by weight or less of the one or more waxes, or 1 percent by weight or less of the one or more waxes.

I. The pressure sensitive adhesive composition of any of the above paragraphs, wherein the adhesive composition comprises 70 percent by weight or less of the one or more tackifiers, 60 percent by weight or less of the one or more tackifiers, 50, percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

J. The pressure sensitive adhesive composition of any of the above paragraphs, wherein the adhesive composition comprises 40 percent by weight or less of the one or more additives, 30 percent by weight or less of the one or more additives, 25 percent by weight or less of the one or more additives, 5 percent by weight or less of the one or more additives, or 1 percent by weight or less of the one or more additives.

K. The pressure sensitive adhesive composition of any of the above paragraphs, wherein the polymer has a melt viscosity of 90,000 mPa·s or less at 190° C.

L. The pressure sensitive adhesive composition of any of the above paragraphs, wherein the polymer has a set time of 30 minutes or less.

M. The pressure sensitive adhesive composition of any of the above paragraphs, wherein the polymer has a Dot T-Peel of from 3 N to 4,000 N.

H. Tapes

In a particular embodiment, the adhesives of this invention can be used in tapes. Tapes are generally configured to adhere two or more substrates together. Tapes include an adhesive composition applied to a backing element. The backing element can be selected from the group including polymeric films, polyester films, polyolefin-based films, polyurethane films, polyvinylchloride foams, polyethylene foams, nonwoven polyurethane, nonwoven polyester, fabric, face stock, paper, synthetic polymeric material, plastic, polyolefin polymers, such as polyethylene and polypropylene, polyester, polyethylene terphthalate, polyvinyl chloride, kraft paper, polymers, laminates, latex saturated papers, foil, litho stock, lightweight stock, styrene foam, expanded polystyrene foam, woven fabric, non-woven fabric, cloth, crepe paper, thermplastic elastomers, and combinations thereof. A typical backing element has a variable thickness within a range of 1 micron to several centimeters. Particularly preferred backing elements include oriented polypropylene, biaxially oriented polypropylene and polyvinylchloride polymers. Films of oriented polypropylene, biaxially oriented polypropylene and polyvinylchloride polymers are particularly preferred backing elements.

The tapes can be either single or double-sided, i.e., the adhesive material is applied to either one or two opposing sides of the backing material. FIG. 6 illustrates a cross-sectional view of an exemplary single-sided tape. The tape 100 includes an adhesive composition 110 and a release material 115 applied to opposite sides of a backing element 105. FIG. 6 illustrates a cross-sectional view of an exemplary double-sided tape. The double-sided tape 300 includes a first adhesive composition 315 and a second adhesive composition 310 applied to opposite sides of a backing element 305. At least one of the first adhesive composition 305 or the second adhesive composition 315 include the adhesive composition described herein, e.g., either or both adhesive compositions include the inventive adhesive composition.

Tapes can be configured to adhere a variety of substrates to one another, such as a first substrate to a second substrate, or tapes can be configured to adhere to a single substrate. The first substrate can be the same material as the second substrate, or the substrates can be formed of different materials. Either or both substrates can include plastic, polyolefin polymers, stainless steel, paper, paperboard, containerboard, tagboard, corrugated board, chipboard, kraft paper, cardboard, fiberboard, plastic resin, metal, metal alloys, foil, skin, film, plastic film, laminates, clothing, containers, surgical instruments, medical devices, glass and sheeting.

Tapes can be supplied in the form of rolls, sheets, pads or other shapes determined by the specific use requirements, to protect the adhesive composition adhered to the backing element from unintended adhesion to surfaces other than the intended substrate. For example, the adhesive composition applied to the backing material may be applied to a release material until use. Release materials are generally applied to the tape to retain the adhesive strength of the adhesive composition and are configured to allow release of the tape therefrom. Release materials are generally used when the tape is supplied as a sheet or a roll. The release material typically comprises a release coating, such as silicon. Tapes that are provided in a roll form can be used with a tape dispenser or be torn by hand. Tapes that are provided in pad form can include an adhesive composition between two release liners, at least one release liner being coated with a release coating composition.

FIG. 7 illustrates a side-view of the tape of FIG. 6 in roll form. The tape roll 200 comprises the tape 100 wherein tape is wound so that the side of the tape having the adhesive composition applied thereto 220 is contacting the side of the tape having the release material 215 applied thereto.

The adhesive composition is applied to at least a portion of at least one side of the backing material. Generally, the adhesive composition has the ability, at or at about room temperature, to sufficiently wet a substrate under gentle pressure to form a useful bond. As used herein, a "useful bond" refers to a balance of adhesive (adhesive to substrate failure) and cohesive (internal adhesive failure) strengths, which is optimized according to the application of the tape. For example, the adhesive composition in removable tapes can have relative a relatively low adhesive strength in comparison to cohesive strength, resulting in a tape that can be removed without leaving a residue (e.g., adhesive) on the substrate. In contrast, high performance tapes, e.g., tapes used for shipping and packaging, can exhibit both high adhesive and cohesive strength, resulting in failure of the substrate or backing element.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition may include one or more tackifiers. The tackifiers may be aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 70 percent by weight or less of the one or more tackifiers. More preferably, the adhesive composition includes 40 percent by weight or less of the one or more tackifiers. Most preferably, the adhesive composition includes 20 percent by weight or less of the one or more tackifiers.

In another aspect, the adhesive composition may include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 40 percent by weight or less of the one or more waxes.

In yet another aspect, the adhesive composition can include 40 percent by weight or less of one or more additives. The one or more additives may include plasticizers, oils, stabilizers, antioxidants, pigments, dyestuffs, antiblock additives, polymeric additives, defoamers, preservatives, thickeners, rheology modifiers, humectants, fillers, surfactants, processing aids, cross-linking agents, neutralizing agents, flame retardants, compatibilizers and antimicrobial agents, for example. The adhesive composition can include 30 percent by weight of the one or more oils. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. The adhesive composition can include 40 percent by weight or less of the one or more plasticizers. Exemplary plasticizers may include mineral oils, polybutenes, phthalates, and combinations thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers alkyl acrylate polymers, and acrylate polymers. The adhesive can further include 5 percent by weight or less of the one or more antioxidants, 30 percent be weight of the one or more fillers, 6 percent by weight or less of the one or more cross-linking agents, and combinations thereof.

The adhesive composition is formulated to have a viscosity of less than 200,000 cps at 160° C. and a glass transition temperature of from −65° C. to 30° C. The adhesive composition should have a peel adhesion at a 180° peel angle when the substrate comprises glass of from 90 to 1800 g/cm and a peel adhesion at a 180° peel angle when the substrate comprises stainless steel of from 100 g/cm to 2000 g/cm.

Furthermore, the adhesive composition is formulated to have a rolling ball tack of from 0.5 cm to 30 cm. The adhesive composition should have a hot shear strength when the substrate comprises stainless steel of 1 minute or more, preferably 10 minutes or more t 40° C. as well as a holding power when the substrate comprises stainless steel of 1 minute or more at 12.5×25.0 cm with a 1-kg load. The adhesive composition has a peak tan delta of from −65° C. to 30° C. and a probe tack of from 1 g to 1000 g. The adhesive composition should further have a shear modulus of from $1 \times 10^4$ dynes/cm$^2$ to $1 \times 10^7$ dynes/cm$^2$ at 25° C. The adhesive composition should further have melt viscosity of from 1000 mPas to 250,000 mPas at 175° C.

One typical formulation of the adhesive composition includes at least 35 percent by weight of the polymer of the present invention, up to 95 percent by weight of one or more tackifiers, up to 40 percent by weight of one or more waxes, and up to 15 percent by weight of one or more additives. Another typical formulation of the adhesive composition includes at least 50 percent by weight of the polymer of the present invention, up to 95 percent by weight of one or more tackifiers, up to 40 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 40 percent by weight of one or more waxes, and up to 40 percent by weight of one or more additives.

Tapes may be formed by any of the conventional techniques known in the art including hot melt or solvent coating release material on one side of the backing material, followed by hot melt or solvent coating the adhesive composition on the other side of the backing material. Alternatively, all three layers can be co-extruded simultaneously.

The tapes described above may be used for marking, holding, protecting, sealing and masking, for example. Additionally, tapes can be used to adhere two substrates together. For example, tape can adhere flaps of packing materials together. Tapes may also be used in medical applications, such as in wound dressings, for example.

The embodiments described below further relate to compositions or combinations as described herein.

A. A tape for adhering to a substrate comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a backing element having two opposing sides, wherein the adhesive composition is applied to at least a portion of the backing element.

B. A tape for adhering to a substrate of the above paragraph, wherein the substrate is selected from the group consisting of plastic, polyolefins, stainless steel, paper, paperboard, containerboard, tagboard, corrugated board, chipboard, kraft paper, cardboard, fiberboard, plastic resin, metal, metal alloys, foil, skin, film, plastic film, laminates, clothing, containers, surgical instruments, medical devices, glass, and sheeting.

C. A tape for adhering to a substrate of any of the above paragraphs, wherein the backing element is selected from a group consisting of polymeric films, polyester films, polyolefin-based films, polyurethane films, polyvinylchloride foam, polyethylene foam, nonwoven polyurethane, nonwoven polyester, knitten fabric, face stock, paper, synthetic polymeric material, plastic, polyolefins, such as polyethylene and polypropylene, polyester, polyethylene terphthalate, polyvinyl chloride, kraft paper, polymers, laminates, latex saturated paper, foil, litho stock, lightweight stock, styrene foam, laminated foam, expanded polystyrene foam, woven fabric, nonwoven fabric, cloth, creped paper, thermoplastic, and combinations thereof.

D. A tape for adhering to a substrate of the above paragraph, wherein the adhesive composition is applied to at least a portion of only one of the two opposing sides or wherein the adhesive composition is applied to a portion of both of the two opposing sides.

E. A tape for adhering to a substrate of the above paragraph, further comprising a release material disposed on a side opposite the adhesive composition. The adhesive composition can releasably contact the release material.

F. A tape for adhering to a substrate of the above paragraph, wherein the adhesive composition further comprises one or more tackifiers. The tackifiers are selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

G. A tape for adhering to a substrate of the above paragraph, further comprising one or more waxes. The one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

H. A tape for adhering to a substrate of the above paragraph, further comprising one or more additives. The one or more additives are selected from the group consisting of plasticizers, oils, stabilizers, antioxidants, pigments, dyestuffs, thickeners, rheology modifiers, fillers, antiblock additives, polymeric additives, surfactants, processing aids, crosslinking agents, neutralizing agents, flame retardants, compatibilizers, and antimicrobial agents.

I. A tape for adhering to a substrate of the above paragraph, wherein the adhesive composition comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

J. A tape for adhering to a substrate of the above paragraph, wherein the adhesive composition comprises 75 percent by weight or less of the one or more waxes, 70 percent by weight or less of the one or more waxes, 60 percent by weight or less of the one or more waxes, 50 percent by weight or less of the one or more waxes, 40 percent by weight or less of the one or more waxes, 30 percent by weight or less of the one or more waxes, 20 percent by weight or less of the one or more waxes, 10 percent by weight or less of the one or more waxes, 5 percent by weight or less of the one or more waxes, or 1 percent by weight or less of the one or more waxes.

K. A tape for adhering to a substrate of the above paragraph, wherein the adhesive composition comprises 60 percent by weight or less of the one or more additives, 50 percent by weight or less of the one or more additives, 40 percent by weight or less of the one or more additives, 30 percent by weight or less of the one or more additives, 20 percent by weight or less of the one or more additives, 10 percent by weight or less of the one or more additives, 5 percent by weight or less of the one or more additives, 3 percent by weight or less of the one or more additives, 1 percent by weight or less of the one or more additives, or 0.25 percent by weight or less of the one or more additives.

L. A tape for adhering to a substrate of the above paragraph, wherein the polymer has a melt viscosity of 90,000 mPa·s or less at 190° C. The polymer can also have a set time of 30 minutes or less and a Dot T-Peel of from 3 N to 4,000 N.

M. A process of making a tape of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a backing element having at least two opposing sides.

I. Wood Working

In a particular embodiment, the adhesives described herein can be used in woodworking processes. A woodworking process involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and sheetrock. A woodworking process can be used to form indoor furniture, outdoor furniture, trim, molding, doors, sashes, windows, millwork and cabinetry, for example.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 80 percent by weight or less, or 60 percent by weight or less, or from 2 to 40 percent by weight, or from 3 to 30 percent by weight or less of the one or more tackifers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

In yet another aspect, the adhesive composition can include 60 percent by weight or less, or 50 percent by weight or less, or 40 percent by weight or less, or 30 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

In one aspect, the adhesive composition is formulated to have a viscosity of from 10 Pa·s to 150 Pa·s. In another aspect, the adhesive composition has a plateau shear modulus of $1 \times 10^6$ dynes/cm$^2$ to $1 \times 10^8$ dynes/cm$^2$ at 25° C. and 1 radian per second. In another aspect, the adhesive composition has a glass transition temperature of −65° C. to 30° C. In yet another aspect, the adhesive composition has an open time of 5 minutes or more. Preferably, the adhesive composition has an open time of 10 minutes or more. More preferably, the adhesive composition has an open time of 20 minutes or more. In another aspect, the adhesive composition has a set time of 1 minute or less. Preferably, the adhesive composition has a set time of 5 minutes or less. More preferably, the adhesive composition has a set time of 10 minute or less.

One typical formulation of the adhesive composition includes at least 35 percent by weight of the polymer of the present invention, up to 60 percent by weight of one or more tackifiers, up to 30 percent by weight of one or more waxes, and up to 15 percent by weight of one or more additives. Another typical formulation of the adhesive composition includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 25 percent by weight of one or more waxes, and up to 15 percent by weight of one or more additives.

The embodiments described below further relate to compositions or combinations as described herein.

A. A woodworking article comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a structural element, wherein the adhesive composition is applied to at least a portion of the structural element.

B. The woodworking article of paragraph A, wherein the structural element comprises wood or plywood, or plastic or veneer.

C. The woodworking article of any of the above paragraphs, wherein the structural element is selected from the group consisting of lumber, wood, fiberboard, plasterboard, gypsum, wallboard, plywood, PVC, melamine, polyester, impregnated paper, and sheetrock.

D. The woodworking article of any of the above paragraphs, wherein the woodworking article is selected from the group consisting of indoor furniture, outdoor furniture, trim, molding, doors, sashes, windows, millwork and cabinetry.

E. The woodworking article of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof.

F. The woodworking article of claim 1, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The woodworking article of claim 1, wherein the adhesive composition further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers and water.

H. The woodworking article of any of the above paragraphs, wherein the adhesive composition comprises 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

I. The woodworking article of any of the above paragraphs, wherein the adhesive composition comprises 80 percent by weight or less, or 60 percent by weight or less, or from 2 to 40 percent by weight, or from 3 to 30 percent by weight or less of the one or more tackifers.

J. The woodworking article of any of the above paragraphs, wherein the adhesive composition comprises 60 percent by weight or less, or 50 percent by weight or less, or 40 percent by weight or less, or 30 percent by weight or less, or 20 percent by weight or less, or 15 percent by weight or less, or 10 percent by weight or less, or 5 percent by weight or less of the one or more additives.

K. The woodworking article of any of the above paragraphs, wherein the polymer has a melt viscosity of 90,000 mPa·s or less at 190° C.

L. The woodworking article of any of the above paragraphs, wherein the polymer has a set time of 30 minutes or less.

M. The woodworking article of any of the above paragraphs, wherein the polymer has a Dot T-Peel of from 3 N to 4,000 N.

N. The woodworking article of any of the above paragraphs, wherein the adhesive composition has a viscosity of 10 Pa·s to 150 Pa·s.

O. The woodworking article of any of the above paragraphs, wherein the adhesive composition has a set time of 1 minute or less, or 5 minutes or less, or 10 minutes or less.

P. A method of preparing the woodworking article any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a structural element having at least two opposing sides.

J. Labels

In a particular embodiment, the adhesive compositions described herein can be used in labels. In general, labels are intended to merely adhere themselves to a substrate. As such, labels are not intended to be structural components. As a result, labels may have high internal strength and low adhesive strength.

Labels comprise a layer of an adhesive composition coated on a backing element, which may have a releasable surface on the side opposite the adhesive composition. A release liner of a label is intended to adhere to the label until the label is applied to its intended substrate. Label backing elements are well known in the label art. Any suitable backing element can be utilized in the present invention. Backing elements may include polymeric film, polyester film, polyolefin-based film, polyurethane film, polyvinylchloride foam, polyethylene foam, nonwoven polyurethane, nonwoven polyester, knitted fabric, paper, synthetic polymeric material, plastic, polyolefin, polyethylene, polypropylene, polyester, polyethylene terphthalate, polyvinyl chloride, kraft paper, polymers, laminate, latex saturated paper, foil, litho stock, lightweight stock, styrene foam, laminated foam, expanded polystyrene foam, woven fabric, non-woven fabric, cloth, creped paper, thermoplastic, and mixtures of polyethylene and polypropylene, for example.

Suitable substrates may include plastic, polyolefins, stainless steel, paper, paperboard, containerboard, tagboard, corrugated board, chipboard, kraft paper, cardboard, fiberboard, plastic resin, metal, metal alloys, foil, skin, film, plastic film, laminates, clothing, containers, surgical instruments, medical devices, glass, and sheeting, for example.

Labels may be in the form of rolls, sheets or other shapes determined by the specific use requirements, so that they are protected from unintended adhesion to other surfaces. As described above, labels may be laminated to a release liner to prevent their accidental adhesion to other surfaces. The release liner of the label is supplied with a release coating such as silicone to permit the easy removal of the release liner from the label. Release liners are sheets that are coated with release material for use in labels. The release liner is expected to reproducibly provide an appropriate level of release to the adhesive of interest, to not deleteriously affect the adhesive, and to be resistant to aging so that the release level remains relatively predictable with time.

For ease and clarity of description, an exemplary label will be described in more detail with reference to FIG. 6. FIG. 6 is a cross-sectional view of a label 100. The label 100 comprises a backing element 105, an adhesive composition 110, and a release liner 115. The adhesive composition 110 is applied to the backing element 105, while the release liner 115 is applied to the adhesive composition 110. Alternatively, the adhesive composition 110 is applied to the release liner 115, and then the backing element 105 is applied to the adhesive composition 110. The release liner 115 is removed from the adhesive composition 110 prior to application to a substrate.

The adhesive composition includes the inventive polymer described herein. The polymer may be functionalized with maleic acid or maleic anhydride. Additional components may be combined with the polymers or formulations of the polymers to form the adhesive composition.

In general, an adhesive composition used to form a label has the ability, at or about room temperature, to sufficiently wet a substrate under gentle pressure and to so form a useful bond. A useful adhesive bond covers a broad expanse of adhesive (adhesive to substrate failure) and cohesive (internal adhesive failure) strengths. This balance of adhesive and cohesive strength is optimized according to the application. For example, removable labels require relative low adhesive strength and high cohesive strength so that they may be removed without leaving any residue on the substrate. High performance labels, on the other hand, require both high adhesive and cohesive strength. Such high performance labels may, in some cases, have such high adhesive and cohesive strength that the substrate or backing element will fail. Adhesive compositions used in labels should possess the desired stretchiness, elasticity, and strength (including tensile strength) for their intended use.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 70 percent by weight or less, or 40 percent by weight or less, or 20 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition can include 40 percent by weight or less of the one or more waxes.

In yet another aspect, the adhesive composition can include one or more additives. The one or more additives can include plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. In one aspect, the adhesive composition includes 40 percent by weight or less of the one or more plasticizers. Exemplary plasticizers may include mineral oils, polybutenes, phthalates, and combinations thereof. In another embodiment, the adhesive composition includes 5 percent by weight or less of the one or more anti-oxidants. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

In another aspect, the adhesive composition includes 30 percent by weight or less of the one or more fillers. Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3, 5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

Adhesive compositions for labels are well known to those of ordinary skill in the art to possess properties including the following: (1) aggressive and permanent tack, (2) adherence with no more than finger pressure, (3) sufficient ability to hold onto a substrate, and (4) sufficient cohesive strength. Materials that have been found to function well in labels are adhesive compositions formulated to exhibit the requisite viscoelastic properties resulting in a desired balance of tack, peel adhesion, and shear holding power. Optimal adhesive compositions thus have a shear modulus that falls in the range of about $5 \times 10^5$ to $1 \times 10^5$ dynes/cm$^2$ and whose glass transition temperature is from $-10°$ C. and $10°$ C.

The nature of an adhesive, whether permanent or removable, is often specified by the peel force, which is the force required to peel a one-inch sample strip at right angles from a stainless steel substrate to which it has been adhered. Permanent adhesives typically have peel forces of 3 pounds or more, while adhesives having a peel force of less than about 2 pounds are normally referred to as removable adhesives. More generally, when the entire system including the backing element, adhesive composition, and the substrate to which the label is applied is considered, a permanent adhesive is one wherein a full coating will prevent removal of the label without impairing the structural integrity of the label or the substrate. In contrast, a removable label is one which will not affect the structural integrity of the label or the substrate, but which may be peeled back and re-used.

Accordingly, in one aspect, the adhesive composition has a glass transition temperature of from $-65°$ C. to $30°$ C., preferably from $-65$ to $20°$ C. In another aspect, the adhesive composition has a plateau shear modulus of from $1 \times 10^4$ dynes/cm$^2$ to $1 \times 10^7$ dynes/cm$^2$ at $25°$ C. In another aspect, the adhesive composition has a peel strength at a $180°$ peel angle when the substrate comprises glass of from 1 to 1800 g/cm. Preferably, the adhesive composition has a peel adhesion at a $180°$ peel angle when the substrate comprises polyethylene film of from 1 to 1800 g/cm. In another aspect, the adhesive composition has a rolling ball tack of from 0.1 cm to 30 cm. In yet another aspect, the adhesive composition has a loop tack when the substrate comprises glass of from 1 N/cm to 10 N/cm. Preferably, the adhesive composition has a loop tack when the substrate comprises polyethylene film of from 1 N/cm to 10 N/cm. In yet another aspect, the adhesive composition has a hot shear strength when the substrate comprises stainless steel of greater than 40 minutes at $40°$ C. In yet another aspect, the adhesive composition has a holding power when the substrate comprises stainless steel of greater than 1 minute, preferably greater than 30 minutes at 12.5×25.0 mm with a 1-kg load. In another aspect, the adhesive composition has a peak tan delta of from $-20°$ C. to $10°$ C. In yet another aspect, the adhesive composition has a Polyken probe tack of from 1 g to 900 g. In another embodiment the adhesive composition has a brookfield viscosity of 50,000 mPa·s or less at $177°$ C.

Labels may be formed by any of the conventional techniques known in the art. For example, in a typical label construction, the removable release liner is coated with the adhesive composition, which is contacted with the backing element. Alternatively, the adhesive composition may be applied to the backing element, then the release liner applied to the adhesive composition. Fully all or at least most of the areas of a label are coated with the adhesive composition. Prior to application of the label to a substrate, the release liner is removed from the adhesive composition, while the adhesive composition remains on the backing element. Removal of the release liner allows the label to be adhered to a substrate. The release liner protects the adhesive composition during shipment and storage.

The embodiments described below further relate to compositions or combinations as described herein.

A. A label for adhering to a substrate comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less, a backing element and a release liner, wherein the release liner is adhered to the backing element using the adhesive composition.

B. The label of paragraph A, wherein the backing element is selected from the group consisting of plastic, polyolefins, stainless steel, paper, paperboard, containerboard, tagboard, corrugated board, chipboard, kraft paper, cardboard, fiberboard, plastic resin, metal, metal alloys, foil, skin, film, plastic film, laminates, clothing, containers, surgical instruments, medical devices, glass, and sheeting.

C. The label of any of the above paragraphs, wherein the backing element is selected from the group consisting of polymeric film, polyester film, polyolefin-based film, polyurethane film, polyvinylchloride foam, polyethylene foam, nonwoven polyurethane, nonwoven polyester, knitted fabric, paper, synthetic polymeric material, plastic, polyolefin, polyethylene, polypropylene, polyester, polyethylene terphthalate, polyvinyl chloride, kraft paper, polymers, laminate, latex saturated paper, foil, litho stock, lightweight stock, styrene foam, laminated foam, expanded polystyrene foam, woven fabric, non-woven fabric, cloth, creped paper, thermoplastic, and mixtures of polyethylene and polypropylene.

D. The label of any of the above paragraphs, wherein the backing element and the release liner have two opposing sides and the adhesive composition is applied to at least one of the two opposing sides of the backing element or at least one of the two opposing sides of the release liner.

E. The label any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof.

F. The label of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The label of any of the above paragraphs, wherein the adhesive composition further comprises one or more additives selected from the group consisting of plasticizers, oils, stabilizers, antioxidants, pigments, dyestuffs, thickeners, rheology modifiers, fillers, antiblock additives, surfactants, processing crosslinking agents, neutralizing agents, flame retardants, compatibilizers, and antimicrobial agents.

H. The label of any of the above paragraphs, wherein the adhesive composition comprises 40 percent by weight or less of one or more waxes.

I. The label of any of the above paragraphs, wherein the adhesive composition comprises 70 percent by weight or less, or 40 percent by weight or less, or 20 percent by weight or less of the one or more tackifiers.

J. The label of any of the above paragraphs, wherein the polymer has a melt viscosity of 90,000 mPa·s or less at 190° C.

K. The label of any of the above paragraphs, wherein the polymer has a set time of 30 minutes or less.

L. The label of any of the above paragraphs, wherein the polymer has a Dot T-Peel of from 3 N to 4,000 N.

M. The label of any of the above paragraphs, wherein the adhesive composition has a viscosity of 90 Pa·s at 177° C.

N. The label of any of the above paragraphs, wherein the adhesive composition has a loop tack when the substrate comprises glass of from 1 N/cm to 10 N/cm.

O. The label of any of the above paragraphs, wherein the adhesive composition has a holding power when the substrate comprises stainless steel of greater than 30 minutes at 25.4× 25.4 cm with a 2-kg load.

P. A method of preparing the label any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a release liner having at least two opposing sides or to at least a portion of a backing element having two opposing sides.

K. Bookbinding

In a particular embodiment, the adhesives of this invention can be used in bookbinding. For purposes of convenience, the word "bookbinding" will be used to describe the process by which books having a binder element, wherein an adhesive composition is applied to at least a portion of the binder element, are produced. However, the embodiments described herein are not limited to adhesive compositions suitable for binding only books. As used herein the term "books" is intended to include other articles containing pages bound with adhesive compositions such as paperback books, soft cover books, instruction manuals, magazines, catalogs, trade journals, directories, and the like.

The adhesive composition includes the inventive polymer described herein. The polymer may be functionalized with maleic acid or maleic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 80 percent by weight or less, or 60 percent by weight or less of the one or more tackifiers. In yet another aspect, the adhesive composition includes 45 percent by weight or less, or 20 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include amount 30 percent by weight or less or 20 percent by weight or less of the one or more waxes.

In yet another aspect, the adhesive composition can include 55 percent by weight or less, or 40 percent by weight of one or more additives. Preferably, the adhesive composition includes 30 percent by weight of one or more additives, and most preferably, the adhesive composition includes 10 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

Important performance properties of adhesive compositions used to bind books include page-pull, lay-flat, page-flex, cold crack, easy-open, and spine flexibility. Page-pull refers to the force required to pull an individual page from a bound book. Page-pull depends on both the adhesive and surface preparation of the book block. Lay-flat refers to a characteristic of a book to remain open at a given page and how flat it lies (spine up or down). Lay-flat depends on the characteristics of the adhesive and the amount of adhesive applied. Page-flex is a complex function of adhesive characteristics, penetration of the adhesive into the book block, and surface preparation of the book block. Cold crack refers to the temperature at which the spine of a book will crack when it is quickly opened so that its covers touch. Cold crack depends on the adhesive and the amount of adhesive applied. Easy-open refers to the amount of resistance a book offers when it is first opened. Easy-open depends on adhesive characteristics and amount of adhesive applied. Spine flexibility refers to the ability of a book to be opened repeatedly without the spine creasing or wrinkling. Spine flexibility is a function of adhesive properties and amount of adhesive applied.

The adhesive composition can be formulated to have a percent substrate fiber tear of from 75% to 100% at 22° C. Preferably, the adhesive composition is formulated to have a percent substrate fiber tear of from 95% to 100% at 22° C. In another aspect, the adhesive composition has a PAFT of 60° C. or more. Preferably, the adhesive composition has a PAFT of 200° C. or less. In yet another aspect, the adhesive composition has a SAFT of 70° C. or more. Preferably, the adhesive composition has a SAFT of 200° C. or less. In yet another aspect, the adhesive composition has a tensile strength at break of from 27.5 bar to 82 bar at 25° C. Preferably, the adhesive composition has a tensile strength at break of from 27.5 bar to 65 bar at 25° C. More preferably, the adhesive composition has a tensile strength at break of from 27.5 bar to 40 bar at 25° C. In yet another aspect, the adhesive composition has a percent elongation of from 100% to 1000% strain of the original length at 25° C. Preferably, the adhesive composition has a percent elongation of from 100% to 750% strain of the original length at 25° C. More preferably, the adhesive composition has a percent elongation of from 100% to 600% strain of the original length at 25° C.

The adhesive composition can also have a ratio of tensile strength at break to elongation at break of 1.5 or less. Preferably, the adhesive composition has a tensile strength to elongation ratio of 1.25 or less. More preferably, the adhesive composition has a tensile strength to elongation ratio of 0.9 or less. In one aspect, the adhesive composition has a viscosity of 2.5 Pa·s or less 177° C. Preferably, the adhesive composition has a viscosity of 10 Pa·s or less at 177° C. In yet another aspect, the adhesive composition has a glass transition temperature of from −65° C. to 30° C. In yet another aspect, the adhesive composition has a Young's Modulus of from 65 to 690 bar. In yet another aspect, the adhesive composition has a Dot T-Peel of from 3 N to 4,000 N. Preferably, the adhesive composition has a Dot T-Peel of from 5 N to 3,000 N. More preferably, the adhesive composition has a Dot T-Peel of from 15 N to 1,000 N.

One typical formulation of the adhesive composition includes at least 35 percent by weight of the polymer of the present invention, up to 60 percent by weight of one or more tackifiers, up to 20 percent by weight of one or more waxes, and up to 15 percent by weight of one or more additives. Another typical formulation of the adhesive composition includes at least 50 percent by weight of the polymer of the present invention, up to 60 percent by weight of one or more tackifiers, up to 20 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 5 percent by weight of one or more waxes, and up to 5 percent by weight of one or more additives.

In traditional bookbinding, adhesives are employed in many different steps. In a step referred to as "gluing off", adhesive is used in addition to thread or wire to bind and seal pages of a book together. In a step referred to as "lining", adhesive is used to attach reinforcing material, such as cloth or paper, to the book spine, e.g., the binder element.

In a step referred to as "casing-in", adhesive is used to attach the book's cover to the book spine. In perfect binding, adhesive alone is used to bind the pages of a book together and attach the book's cover. If only one adhesive application is used to construct a book, it is called a "one-shot process." When two adhesive applications are used, it is called a "two-shot process." In the two shot process, the first application of adhesive binds the pages of the book together. This adhesive is referred to as a primer glue. The second application of adhesive is used to attach the book's cover to the book spine. This adhesive is referred to as a cover glue.

The embodiments described below further relate to compositions or combinations as described herein.

A. A bookbinding article comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a binder element, wherein the adhesive composition is applied to at least portion of the binder element.

B. The bookbinding article of paragraph A, wherein the bookbinding article is selected from the group consisting of hard cover books, periodicals, text books, manuals, journals, soft cover text books, paperback books, magazines, and catalogs.

C. The bookbinding article of any of the above paragraphs, wherein the binder element comprises paper or heavy stock paper.

D. The bookbinding article of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

E. The bookbinding article of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

F. The bookbinding article of any of the above paragraphs, wherein the adhesive composition further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

G. The bookbinding article of any of the above paragraphs, wherein the adhesive composition comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

H. The bookbinding article of any of the above paragraphs, wherein the adhesive composition comprises 75 percent by weight or less of the one or more waxes, 70 percent by weight or less of the one or more waxes, 60 percent by weight or less of the one or more waxes, 50 percent by weight or less of the one or more waxes, 40 percent by weight or less of the one or more waxes, 30 percent by weight or less of the one or more waxes, 20 percent by weight or less of the one or more waxes, 10 percent by weight or less of the one or more waxes, 5 percent by weight or less of the one or more Waxes, or 1 percent by weight or less of the one or more waxes.

I. The bookbinding article of any of the above paragraphs, wherein the adhesive composition comprises 60 percent by weight or less of the one or more additives, 50 percent by weight or less of the one or more additives, 40 percent by weight or less of the one or more additives, 30 percent by weight or less of the one or more additives, 20 percent by weight or less of the one or more additives, 10 percent by weight or less of the one or more additives, 5 percent by weight or less of the one or more additives, 3 percent by weight or less of the one or more additives, or 1 percent by weight or less of the one or more additives.

J. The bookbinding article of any of the above paragraphs, wherein the polymer has a melt viscosity of 90,000 mPa·s or less at 190° C.

K. The bookbinding article of any of the above paragraphs, wherein the polymer has a set time of 30 minutes or less.

L. The bookbinding article of any of the above paragraphs, wherein the polymer has a Dot T-Peel of from 3 N to 4,000 N.

M. The bookbinding article of any of the above paragraphs, wherein the adhesive composition has a tensile strength to elongation ratio of 1.5 or less.

N. The bookbinding article of any of the above paragraphs, wherein the adhesive composition has a tensile strength to elongation ratio of 1.25 or less.

O. The bookbinding article of any of the above paragraphs, wherein the adhesive composition has a tensile strength to elongation ratio of 0.9 or less.

P. A method of preparing the bookbinding article of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a binder element.

L. Road Markings

In a particular embodiment, the adhesive compositions described herein can be used in a roadmarking composition. Roadmarking compositions generally include a binder composition and one or more fillers applied to one or more substrates. The one or more substrates can include asphalt, concrete, metal, brick, cobbles, ceramics, polymeric materials, cinder blocks, soft sports surfaces, playground surfaces, runways, tartan substitutes, concrete, metals, asphalt, bitumen, bricks, cobbles, tiles, steel plates, wood, ceramics, polymeric materials, glass, concrete blocks, porcelain, stone, wood panels, particle board, wooden vehicle parts, cinder blocks, scrims, and combinations thereof.

The roadmarking composition includes the one or more fillers to increase weatherability, visibility, covering power, abrasion resistance, adhesion, and/or reflectivity of the roadmarking composition. In addition, certain fillers may be added to improve the overall rheological properties of the thermoplastic road marking, prevent segregation of the roadmarking, provide friction for the binder composition to the substrate to which it is being applied, and/or reduce the cost of the roadmarking composition. Fillers that may be used for this purpose include sand, pigments, glass beads, polymer-based beads, calcium carbonate, crushed marble, aggregate, dolomite, talc, glass pearls, prismatic reflectors, lens reflectors, calcite spar, silica sand, graphite, flyash, cement dust, clay, feldspar, nepheline, fumed silica, alumina, magnesium oxide, zinc oxide, barium sulfate, aluminum silicate, calcium silicate, tianates, chalk, reflective inorganic fillers, extending fillers, beads, calcium sulfate, calcium metasilicate, quartz powder, calcined flint powder, mica, calcium silicate glass fibers, dyes, granite, plaster, slaked lime, alumina, diatomaceous earth, reflecting agents, modifiers, white lead, lithopone, chrome yellow, cadmium yellow, resin beads, polymeric gels, polymers, ceramic materials, crushed glass, stone, corundum, aluminum hydroxide, silicon oxide, glass bubbles, and zinc neodecanoate. Exemplary pigments include titanium dioxide, zinc oxide, magnesium oxide, lead chromate, and mixtures thereof. The type and content of the pigment is selected according to the specific purpose for the roadmarking, which is readily ascertainable by a person skilled in the art. In addition, one or more fillers may be added to the roadmarking composition to impart color, opacity, or hue to the roadmarking composition.

A key characteristic of roadmarking compositions is visibility under all environmental conditions. Therefore, the roadmarking composition can include one or more reflective fillers. The incorporation of one or more reflective fillers into the roadmarking composition maximizes the visibility of roadmarkings in rain and darkness by reflecting light from a vehicle's lamps. One or more reflective fillers can be included in the roadmarking composition in an amount sufficient to provide enhanced visibility to the composition by reflecting light. Suitable reflective fillers include but are not limited to glass beads, polymeric beads, sand, silica compounds, ceramic materials, and/or any other reflective filler normally used for such purpose in roadmarking compositions. Beads are the preferred reflective filler, including but not limited to polymer-based beads or glass beads. Glass beads are most preferred. The beads should not adversely affect the cohesive strength of the cooled binder, so strong bonding must occur between the binder and the beads. The primary requirement is that the beads are stable to heat applied during the preparation, mixing, and application of the road marking. Preferably, the beads should remain stable when subjected to a heat above at least 200° C. for a period of about 20 minutes.

Beads prepared from polymers should be able to withstand the pressure applied from normal traffic without breaking or crushing. Furthermore, the reflective filler should be evenly distributed throughout the binder to give uniformity of properties and to provide longevity to the reflective character of the roadmarking. An even distribution of the reflective filler causes exposure of new reflective fillers to the surface when traffic wear and weathering remove an upper layer of the roadmarking. Increasing the amount of reflective filler added to the roadmarking composition also helps maintain satisfactory reflective properties over time while increasing the reflectivity of the roadmarking. If the amount of reflective filler present in the roadmarking composition is small, the reflective ability is deteriorated when the reflective fillers interspersed in the composition are decreased due to abrasion by tires, whereas if the amount of reflective filler added is too large, the roadmarking composition is reduced in strength.

When used in the roadmarking compositions, fillers are effective in increasing the strength of the roadmarking and in retaining the thickness of the roadmarking; however, the use of the fillers in unduly large amounts may result in the production of brittle roadmarkings. As a result, the roadmarking composition includes from 20 to 90 percent by weight of the one or more fillers. In one aspect, the one or more fillers include 50 percent by weight or less, or from 10 to 40 percent by weight, or from 15 to 30 percent of the one or more beads. In yet another aspect, the one or more fillers include 20 percent by weight or less, or from 2 to 15 percent by weight or from 3 to 10 percent by weight of the one or more pigments.

In one aspect, the roadmarking composition includes from 10 to 80 percent by weight of the binder. The binder composition includes the inventive polymer described herein. The polymer may be functionalized with malaic acid or malaic anhydride. Additional components may be combined with the polymers or formulations of the polymers to form the binder composition.

In one aspect, the binder includes one or more tackifiers. Exemplary tackifiers include aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof. In one aspect, the binder includes 80 percent by weight of the tackifiers.

In another aspect, the binder includes one or more waxes. Exemplary waxes include polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, maleic anhydride grafted, polyethylenes with pendant acid functionality moieties, paraffin waxes, microcrystalline waxes, and combinations thereof. In one aspect, the binder includes 30 percent by weight or less of the one or more waxes.

In yet another aspect, the binder includes one or more additives. Exemplary additives include plasticizers, oils, stabilizers, antioxidants, pigments, dyestuffs, polymeric additives, defoamers, preservatives, thickeners, rheology modifiers, humectants, extenders, hindered phenolics, phosphates, antiblock additives, lubricants, photostabilizers, ultraviolet absorbents, dispersants, thickeners, bases, wetting agents, fire retardants, crosslinking agents, curing agents, opacifiers, and water. Exemplary oils include aliphatic oils, naphthenic oils, white oils, soya oils, combinations thereof, and derivatives thereof. In one aspect, the binder includes 40 percent by weight of the one or more polymeric additives. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. In one aspect, the binder includes 20 percent by weight or less of the one or more plasticizers. Exemplary plasticizers include mineral oils, polybutenes, phthalates, hydrocarbon oils, soybean oils, phthalate esters, elastomers, olefin oligomers, vegetable oils, cyclohexane dimethanol dibenzoate, and combinations thereof. Exemplary phthalates include di-iso-undecyl phthalate (DIUP), di-iso-nonylphthalate (DINP), dioctylphthalates (DOP), combinations thereof, or derivatives thereof. In another aspect, the binder includes 5 percent by weight or less of the one or more stabilizers. In yet another aspect, the binder comprises 1 percent by weight or less of the one or more anti-oxidants. Examples of suitable opacifiers include but are not limited to titanium dioxide, diatomaceous earth, diatomaceous silica, and barium sulfate.

The binder may further comprise one or more modifiers to enhance wetting of the one or more fillers as well as to reduce melt viscosity without a concurrent reduction in softening point. Modifiers which are useful with the roadmarking composition of the present invention include but are not limited to acids; metal oxides such as zinc oxide, white lead, lithopone, basic lead sulfate, magnesium oxide, heat resistant chrome yellow, cadmium yellow, iron oxide, and titanium dioxide; anhydrides such as polyisobutylene succinic anhydride (PIBSA); and combinations and derivatives thereof.

In some embodiments, the binder further comprises a copolymer having a Mw of from 100,000 to 250,000, preferably from 250,000 to 500,000.

In an alternate embodiment of the roadmarking composition, two or more polymers having molecular weights that are different from each other provide superior durability along with other rheological benefits to the roadmarking composition. Specifically, one or more high molecular weight polymers may be combined with one or more medium molecular weight polymers. Furthermore, one or more medium molecular weight polymers may be combined with one or more low molecular weight polymers. One or more high molecular weight polymers may be combined with one or more low molecular weight polymers. In the alternative, high, medium, and low molecular weight polymers may all be combined. The weight average molecular weights of the polymers range as follows: from 250,000 to 500,000 for the high molecular weight polymer; from 100,000 to 250,000 for the medium molecular weight polymer; and from 50,000 to 100,000 for the low molecular weight polymer. In a preferred embodiment, the binder further comprises a first copolymer having a Mw of from 100,000 to 250,000 and a second copolymer having a Mw of from 250,000 to 500,000.

One typical formulation of the binder includes at least 35 percent by weight of the polymer of the present invention, up to 99 percent by weight of one or more tackifiers, up to 20 percent by weight of one or more waxes, and up to 90 percent by weight of one or more filler. Another typical formulation of the binder includes at least 50 percent by weight of the polymer of the present invention, up to 80 percent by weight of one or more tackifiers, up to 15 percent by weight of one or more waxes, and up to 75 percent by weight of one or more additives. Yet another typical formulation of the binder includes at least 50 percent by weight of the polymer of the present invention, up to 40 percent by weight of one or more tackifiers, up to 20 percent by weight of one or more waxes, and up to 70 percent by weight of one or more additives. Yet another typical formulation of the binder includes at least 10 percent by weight of the polymer of the present invention, up to 60 percent by weight of one or more tackifiers, up to 20 percent by weight of one or more waxes, and up to 60 percent by weight of one or more additives. Yet another typical formulation of the binder includes at least 5 percent by weight of the polymer of the present invention, up to 80 percent by weight of one or more tackifiers, up to 5 percent by weight of one or more waxes, and up to 10 percent by weight of one or more additives. Yet another typical formulation of the binder includes at least 10 percent by weight of the polymer of the present invention, up to 30 percent by weight of one or more tackifiers, up to 10 percent by weight of one or more waxes, and up to 50 percent by weight of one or more additives.

In one aspect, the binder is formulated to have a viscosity of from 0.05 Pa·s to 0.5 Pa·s at 177° C. In another aspect, the binder has a glass transition temperature of from 65° C. to 30° C. In yet another aspect, the binder has a Zahn viscosity of less than 120 seconds at 190° C. In yet another aspect, the binder has a Zahn viscosity of from 35 to 180 seconds at 190° C. In yet another aspect, the binder has a Dot T-Peel of from 3 N to 4,000 N. Preferably, the binder has a Dot T-Peel of from 5 N to 3,000 N. More preferably, the binder has a Dot T-Peel of from 15 N to 1,000 N. In another aspect, the binder has an adhesion to a road surface of 1.0 N/mm² or more. Preferably, the binder has an adhesion to a road surface of 1.2 N/mm² or more. More preferably, the binder has an adhesion to a road surface of 1.3 N/mm² or more. Most preferably, the binder has an adhesion to a road surface of 1.5 N/mm² or more. Adhesion to a road surface as used herein is measured by ExxonMobil test method E-22. In another aspect, the binder has a softening point of 90° C. or more. Preferably, the binder has a softening point of 95° C. or more. More preferably, the binder has a softening point of 98° C. or more. Most preferably, the binder has a softening point of 100° C. or more. In another aspect, the binder has a needle penetration of from 5 to 120 s/10 mm. In yet another aspect, the binder has a luminance of 70 or more. Preferably, the binder has a luminance of 75 or more. More preferably, the binder has a luminance of 76 or more or 78 more. In yet another aspect, the binder has a melt viscosity of from 0.4 Pa·s to 30 Pa·s at 177° C.

The roadmarking composition may be applied to a traveled surface such as pavement to convey information. Roadmarking compositions are also suitable in a variety of coating, marking, and painting applications, including but not limited to traffic signs, runway markings, pedestrian crosswalks, building advertisements and markings, bicycle lanes, tennis courts, marking of tartan substitutes, stop lines, driving course markings, traffic symbols, traffic tapes, soft sports surface markings, playground markings, ship safety markings, oil rig safety markings, reflective traffic safety coatings, boundary lines, road signs, embossed roadmarkings, pipes, poles, highway guard rails, concrete blocks, curbs, sidewalks, parking lots, bridge abutments, wooden walkways, wooden barricades, ceramic surfaces, bricks, painted roadway markings, and painted sign surfaces.

Roadmarking compositions are usually applied by screed box, extrusion, or spray techniques. Screed box application is ordinarily used for the roadmarking composition with a higher viscosity, extrusion is ordinarily used for the roadmarking composition with an intermediate viscosity, and spray application is ordinarily used for the roadmarking composition with a lower viscosity. A roadmarking composition capable of a broad range of application temperatures, particularly from 150° C. to 250° C., allows the composition to remain suitable for application by different means. The ability of the compositions to be applied at lower application temperatures of from 150° C. to 170° C. makes them suitable for application by extrusion coating techniques, while the ability of the compositions to be applied at higher application temperatures of 200° C. to 250° C. makes them suitable for application by spray coating techniques.

When heated above its melting point, the roadmarking composition melts or becomes molten, causing a change from a solid to a liquid or fluid state. When the molten composition cools below its melting point, the roadmarking composition reverts back a solid state. The roadmarking composition of the present invention is normally applied by melting the composition and applying the molten material to the substrate at a temperature of from 175° C. to about 250° C.

In application, the one or more fillers are incorporated into the binder while the binder is in a molten state. The resulting roadmarking composition is then applied to the substrate and subsequently cooled, causing the roadmarking composition to solidify. Alternatively, the binder is first applied to the substrate in a molten state. Before the binder cools and while the binder remains in a molten state, the glass beads are applied to the binder. The binder then solidifies to adhere the beads to the substrate, forming the roadmarking. A combination of both methods is an alternate method of roadmarking. Beads may be incorporated into the binder and also spread onto the roadmarking composition while the roadmarking composition is still in a molten state. This method secures a satisfactory reflection of the roadmarking until traffic wear and weathering causes the incorporated beads to rise on the surface of the roadmarking.

The roadmarking composition should not experience excessive slumping or puddling, which involves spreading and running of the composition upon application to the substrate. Excessive slumping or puddling can cause the resultant roadmarking to possess irregular and poorly defined lines or shapes. The application temperature should be adjusted (usually cooler application temperature) or additives should be added to the composition to prevent slumping or puddling. Changes in the application temperature should also take into account the viscosity of the roadmarking composition for ease of application of the composition onto the substrate, as cooling the roadmarking composition to too low of a temperature makes application of the binder onto the substrate more difficult and perhaps impossible.

The embodiments described below further relate to compositions or combinations as described herein.

A. A roadmarking composition comprising a binder comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and one or more fillers.

B. The roadmarking composition of paragraph A, wherein the roadmarking composition is applied to one or more substrates selected from the group consisting of asphalt, concrete, metal, brick, cobbles, ceramics, polymeric materials, cinder blocks, soft sports surfaces, playground surfaces, runways, tartan substitutes, concrete, metals, asphalt, bitumen, bricks, cobbles, tiles, steel plates, wood, ceramics, polymeric materials, glass, concrete blocks, porcelain, stone, wood panels, particle board, wooden vehicle parts, cinder blocks, and scrims.

C. The roadmarking composition of any of the above paragraphs, wherein the binder further comprises a copolymer having a Mw of from 100,000 to 250,000.

D. The roadmarking composition of any of the above paragraphs, wherein the binder further comprises a copolymer having a Mw of from 250,000 to 500,000.

E. The roadmarking composition of any of the above paragraphs, wherein the binder further comprises a first copolymer having a Mw of from 100,000 to 250,000 and a second copolymer having a Mw of from 250,000 to 500,000.

F. The roadmarking composition of any of the above paragraphs, wherein the binder further comprises one or more tackifiers selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

G. The roadmarking composition of any of the above paragraphs, wherein the binder further comprises one or more waxes selected from the group consisting of polar waxes, non-polar waxes, Fischer-Tropsch waxes, oxidized Fisher-Tropsch waxes, hydroxystearamide waxes, functionalized waxes, polypropylene waxes, polyethylene waxes, wax modifiers, maleic anhydride grafted, polyethylenes with pendant acid functionality moieties, paraffin waxes, microcrystalline waxes, and combinations thereof.

H. The roadmarking composition of any of the above paragraphs, wherein the binder further comprises one or more additives selected from the group consisting of plasticizers, oils, stabilizers, antioxidants, pigments, dyestuffs, polymeric additives, defoamers, preservatives, thickeners, rheology modifiers, humectants, extenders, hindered phenolics, phosphates, antiblock additives, lubricants, photostabilizers, ultraviolet absorbents, dispersants, thickeners, bases, wetting agents, fire retardants, crosslinking agents, curing agents, opacifiers, water, and combinations thereof.

I. The roadmarking composition of any of the above paragraphs, wherein the binder further comprises one or more fillers selected from the group consisting of sand, pigments, glass beads, polymer-based beads, calcium carbonate, crushed marble, aggregate, dolomite, talc, glass pearls, prismatic reflectors, lens reflectors, calcite spar, silica sand, graphite, flyash, cement dust, clay, feldspar, nepheline, fumed silica, alumina, magnesium oxide, zinc oxide, barium sulfate, aluminum silicate, calcium silicate, tianates, chalk, reflective inorganic fillers, extending fillers, beads, calcium sulfate, calcium metasilicate, quartz powder, calcined flint powder, mica, calcium silicate glass fibers, dyes, granite, plaster, slaked lime, alumina, diatomaceous earth, reflecting agents, modifiers, white lead, lithopone, chrome yellow, cadmium yellow, resin beads, polymeric gels, polymers, ceramic materials, crushed glass, stone, corundum, aluminum hydroxide, silicon oxide, glass bubbles, zinc neodecanoate, and combinations thereof.

J. The roadmarking composition of any of the above paragraphs, wherein the binder comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

K. The roadmarking composition of any of the above paragraphs, wherein the binder comprises 75 percent by weight or less of the one or more waxes, 70 percent by weight or less of the one or more waxes, 60 percent by weight or less of the one or more waxes, 50 percent by weight or less of the one or more waxes, 40 percent by weight or less of the one or more waxes, 30 percent by weight or less of the one or more waxes, 20 percent by weight or less of the one or more waxes, 10 percent by weight or less of the one or more waxes, 5 percent by weight or less of the one or more waxes, or 1 percent by weight or less of the one or more waxes.

L. The roadmarking composition of any of the above paragraphs, wherein the binder comprises 90 percent by weight or less of the fillers, 80 percent by weight or less of the fillers, 70 percent by weight or less of the fillers, 60 percent by weight or less of the fillers, 50 percent by weight or less of the one or more fillers, 40 percent by weight or less of the one or more fillers, 30 percent by weight or less of the one or more fillers, 20 percent by weight or less of the one or more fillers, 10 percent by weight or less of the one or more fillers, or 5 percent by weight or less of the one or more fillers.

N. The roadmarking composition of any of the above paragraphs, wherein the binder comprises 90 percent by weight or less of the one or more plasticizers, 80 percent by weight or less of the one or more plasticizers, 70 percent by weight or less of the one or more plasticizers, 60 percent by weight or less of the one or more plasticizers, 50 percent by weight or less of the one or more plasticizers, 40 percent by weight or less of the one or more plasticizers, 30 percent by weight or less of the one or more additives, 20 percent by weight or less of the one or more plasticizers, or 10 percent by weight or less of the one or more plasticizers.

O. The roadmarking composition of any of the above paragraphs, wherein the one or more fillers comprises 50 percent by weight or less of the one or more more beads.

P. The roadmarking composition of any of the above paragraphs, wherein the one or more fillers comprises from 10 to 40 percent by weight of the one or more beads.

Q. The roadmarking composition of any of the above paragraphs, wherein the one or more fillers comprises from 15 to 30 percent by weight of the one or more beads.

R. The roadmarking composition of any of the above paragraphs, wherein the one or more fillers comprises 20 percent by weight or less of the one or more pigments.

S. The roadmarking composition of any of the above paragraphs, wherein the one or more fillers comprises from 2 to 15 percent by weight of the one or more pigments.

T. The roadmarking composition of any of the above paragraphs, wherein the one or more fillers comprises from 3 to 10 percent by weight of the one or more pigments.

U. The roadmarking composition of any of the above paragraphs, wherein the polymer has a melt viscosity of 90,000 mPa·s or less at 190° C.

V. The roadmarking composition of any of the above paragraphs, wherein the polymer has a set time of 30 minutes or less.

W. The roadmarking composition of any of the above paragraphs, wherein the polymer has a Dot T-Peel of from 3 N to 4,000 N.

X. The roadmarking composition of any of the above paragraphs, wherein the binder has an adhesion to a road surface of 1.0 N/mm$^2$ or more.

Y. The roadmarking composition of any of the above paragraphs, wherein the binder has a luminance of 70 or more.

Z. A method of preparing the roadmarking composition of any of the above paragraphs comprising combining one or more fillers and a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less to form the roadmarking composition.

M. Sealants

In a particular embodiment, the adhesive compositions described herein can be used in a sealant composition. The purpose of a sealant is to maintain a seal between two surfaces of a single substrate, thus repairing the substrate, or in the alternative, to establish and maintain a seal between a pair of substrates. The substrates can include concrete, roofing, marble, anodized aluminum, brick, mortar, granite, limestone, porcelain, glass, painted surfaces, wood, polyvinylchloride, polyacrylate, polycarbonate, polystyrene, fabrics, gaskets, plastic, stone, masonry materials, pipes, hoses, metal, wiring, skis, polyethylene, polypropylene, polyester, acrylic, PVDC, paper, ethylene vinyl acetate, automobiles, buildings, aircraft, panels, decks, bones, pavement, tailgates, door panels, wheel houses, rocker panels, firewalls, floor hem flanges, trunks, and floorpans. For example, sealant compositions may be used for repairing leaky pipes or cracked windshields on automobiles. Sealants further produce load bearing elastic joints between two or more surfaces and to prevent the passage of air, water and dirt there through.

Sealant compositions are useful not only in filling gaps and thus bonding the surfaces of a substrate in a repair operation, but also may be used to bond a first substrate to another substrate. The automotive industry, in particular, is a major user of sealants for this purpose. Automobiles are assembled from several structural components that are joined together in various fashions depending on the particular components and the degree of stress that will have to be endured by the components. For example, sealants are utilized in the assemblies of door panels, quarter panels, tailgates and roofs. Still other automobile assemblies that are welded or bolted together use sealant compositions in their seams. The wheel house, shock lower, rocker panel, firewall, floor hem flange, floorplan, and trunk are further examples of automotive applications which employ sealants.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 80 percent by weight or less, or 60 percent by weight or less of the one or more tackifiers. Preferably, the adhesive composition includes 40 percent by weight or less or 20 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition can include 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

In yet another aspect, the adhesive composition can include 95 percent by weight or less, or 50 percent by weight or less, or 25 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. In one embodiment, the adhesive composition includes 50 percent by weight or less of the one or more polymeric additives. Exemplary plasticizers may include mineral oils, polybutenes, phthalates, and combinations thereof. The adhesive composition can include 95 percent by weight or less, or 70 percent by weight or less, or 35 percent by weight or less, or 20 percent by weight or less, or 10 percent by weight or less of the one or more plasticizers. In another aspect, the adhesive composition includes from 0.01 to 10 percent by weight of one or more anti-oxidants, or from 0.05 to 5 percent by weight, or from 0.1 to 2.5 percent by weight or from 0.1 to 2 percent by weight of the one or more anti-oxidants. The anti-oxidants can include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc. In one aspect, the adhesive composition includes 5 percent by weight or less of the one or more crosslinking agents. In yet another aspect, the adhesive composition includes 50 percent by weight or less of one or more fillers.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. In yet another aspect, the adhesive composition includes 15 percent by weight or less of the one or more surfactants. Exemplary surfactants include vinyl-containing or mercapto-containing polyorganosiloxanes, macromonomers with vinyl terminated polydimethyl siloxane, and combinations or derivatives thereof.

In yet another aspect, the adhesive composition includes 15 percent by weight or less, or 2.5 percent by weight or less of the one or more adhesion promoters. Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof.

In one aspect, the adhesive composition includes 75 percent by weight or less of the one or more reinforcing agents, or 30 percent by weight or less. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl tri-methoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

Exemplary chain-extenders include amino silanes, amido silanes, acetoxy silanes, and aminoxy silanes, methylvinyl bis-N-methylacetamidosilane, methylhydrogendiacetoxysilane, dimethylbis-diethylhydroxylaminosilane, dimethylbis-secondarybutylaminosilane, polyisocyanates, and combinations or derivatives thereof.

When used as a caulk, sealants should comprise a crosslinking agent and, preferably, one or more of the following additives: adhesion promoters, reinforcing agents, chain extenders, and plasticizers. Antioxidants may also be employed in the sealant composition to prevent the sealant from undergoing oxidation and thermal degradation at the temperatures and environment employed during storage and ultimate use of the sealant.

One typical formulation of the adhesive composition includes at least 35 percent by weight of the polymer of the present invention, up to 80 percent by weight of one or more tackifiers, up to 30 percent by weight of one or more waxes, and up to 80 percent by weight of one or more additives. Another typical formulation of the adhesive composition includes at least 50 percent by weight of the polymer of the present invention, up to 80 percent by weight of one or more tackifiers, up to 30 percent by weight of one or more waxes, and up to 50 percent by weight of one or more additives. Yet another typical formulation of the adhesive composition includes at least 50 percent by weight of the polymer of the present invention, up to 80 percent by weight of one or more tackifiers, up to 25 percent by weight of one or more waxes, and up to 15 percent by weight of one or more additives.

In another embodiment the adhesive compositions of this invention are used in sealants applications where water vapor transmission is important. For example, sealant compositions can be used for in window sealant applications where a very low water vapor transmission rate is desired. Rates of 0.07 g/100 in$^2$/per 24 hours or less are possible.

Regardless of the purpose of its use, a sealant composition is a gap-filling material. Consequently, at the time of seal formation, sealant compositions should have an elasticity that is sufficiently low such that the sealant composition is able to flow into and fill gaps in the substrate to which it is applied and, after the sealant has solidified and thus cured, still sufficiently fill the gaps so as to seal the substrate. In the uncured state, the sealant composition should remain tacky and possess a low enough viscosity to ensure adequate wetting of the substrate.

Sealant compositions are preferably essentially not tacky to the touch once they have solidified or cured. Upon cure, sealants should have sufficient durability to withstand normal weather and user exposure in several applications. Primarily, a sealant should provide an effective barrier against oxygen, water, and air. Cured sealants should possess crack resistance and shrink resistance to mechanical stresses such as expansion in the substrate at elevated temperatures, so that the sealant does not sag or flow over time. Particularly with glass substrates, high levels of stress can cause the glass to crack. While the sealant should be sufficiently rigid to retain its general shape and dimension, it must also remain sufficiently flexible to exhibit substantial recovery upon stretching.

Therefore, a balance of high adhesive strength along with high elongation percent and low tensile modulus is desirable for the mixture used as a sealant. High adhesive strength compositions generally provide effective seals, as the higher the adhesive strength, the greater the force that is required to remove the substrate from the mixture. Elongation percent of the mixture refers to the ability of the composition to return to about its original configuration after being subject to the designated extend of elongation. High percent elongation is desirable to provide sealants with a highly advantageous self-repairing property. That is, the sealants will deform to accommodate stress exerted on the sealed portion of the substrate.

In one aspect, the adhesive composition or adhesive mixture is formulated to have a tensile strength modulus at 100% elongation of from 0.003 bar to 0.06 bar at 20° C. Preferably, the mixture has a tensile strength modulus at 100% elongation of from 0.05 bar to 0.5 bar at 20° C. More preferably, the mixture has a tensile strength modulus at 100% elongation of from 0.05 bar to 0.02 bar at 20° C. Even more preferably, the mixture has a tensile strength modulus at 100% elongation of from 0.0007 bar to 0.01 bar at 20° C., or a tensile strength modulus at 100% elongation of from 0.05 to 0.0095 bar at 20° C. In another aspect, the mixture has a percent elongation at break of 190% or more at 20° C. Preferably, the mixture has a percent elongation at break of 200% or more at 20° C. More preferably, the mixture has a percent elongation at break of 250% or more at 20° C. Even more preferably, the mixture has a percent elongation at break of 300% or more at 20° C. Most preferably, the mixture has a percent elongation at break of 350% or more at 20° C., or a percent elongation at break of 500% or more at 20° C., or a percent elongation at break of 600% or more at 20° C., or a percent elongation at break of 700% or more at 20° C., or a percent elongation at break of 800% or more at 20° C., or a percent elongation at break of 1100% or more at 20° C.

In another aspect, the mixture has a viscosity of 9 Pa·s or less at 177° C. Preferably, the mixture has a viscosity of from 0.2 Pa·s to 8 Pa·s at 177° C. More preferably, the mixture has a viscosity of from 0.5 Pa·s to 2.5 Pa·s at 177° C. In yet another aspect, the mixture has a glass transition temperature of from −65° C. to 30° C. In yet another aspect, the mixture has a Dot T-Peel of from 3 N to 4,000 N. Preferably, the mixture has a Dot T-Peel of from 5 N to 3,000 N. More preferably, the mixture has a Dot T-Peel of from 15 N to 1,000 N. In another aspect, the mixture has a sag of 7.5 cm or less after 1 week at 70° C. Preferably, the mixture has a sag of 2.5 cm or less after 1 week at 70° C. More preferably, the mixture has a sag of 1 cm or less after 1 week at 70° C. Most preferably, the mixture has a sag of 0.5 cm or less after 1 week at 70° C.

In another aspect, the mixture has a Shore A hardness of from 3 to 45. Preferably, the mixture has a Shore A hardness of from 8 to 35. More preferably, the mixture has a Shore A hardness of from 10 to 25. In yet another aspect, the mixture has a tensile strength of from 0.0095 bar to 0.2 bar. Preferably, the mixture has a tensile strength of from 0.025 bar to 0.15 bar. More preferably, the mixture has a tensile strength of from 0.028 bar to 0.095 bar. In yet another aspect, the mixture has a percent stress relaxation of 75% or less at 25° C. Preferably, the mixture has a percent stress relaxation of 25% or less at 25° C. In another aspect, the mixture has a needle penetration of from 8 to 66 dmm at 25° C.

In yet another aspect, the mixture has a shear adhesion on glass of 0.01 bar or more. Preferably, the mixture has a shear adhesion on glass of 0.02 bar or more. More preferably, the mixture has a shear adhesion on glass of 0.04 bar or more. Most preferably, the mixture has a shear adhesion on glass of 0.14 bar or more, or the mixture has a shear adhesion on glass of 0.24 bar or more, or the mixture has a shear adhesion on glass of 0.34 bar or more.

In yet another aspect, the mixture has a melting point of 200° C. or less. In another aspect, the mixture has a 180° peel strength against glass of 10 pli or more. Preferably, the mixture has a 180° peel strength against glass of 20 pli or more. More preferably, the mixture has a 180° peel strength against glass of 30 pli or more.

In general, the sealant used for repairing substrates is applied in the form of a plate over an area that extends beyond the cut, dent or scratch of the substrate to substantially cover it and provide some overlapping around it. The area of contact between the sealant and the surface is then cured by heating and cooling to ambient temperature. Optionally, the sealant is cured by ambient conditions upon exposure to moisture in the air. The sealant composition is cured when the composition becomes non-tacky to the touch after exposure of the composition to the ambient air, heat, or moisture.

It is desirable for the sealant composition to exhibit a rapid set time, which denotes the time required for the sealant composition to cure on the substrate. Compositions having rapid set time enable parts bonded therewith to be subjected to subsequent operations such as grinding, drilling, handling, packaging which could contaminate parts joined with a tacky material.

The embodiments described below further relate to compositions or combinations as described herein.

A. A sealant composition comprising a mixture comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less, wherein the mixture is applied to at least a portion of a substrate surface to be sealed.

B. The sealant composition of paragraph A, wherein the substrate is selected from the group consisting of concrete, roofing, marble, anodized aluminum, brick, mortar, granite, limestone, porcelain, glass, painted surfaces, wood, polyvinylchloride, polyacrylate, polycarbonate, polystyrene, fabrics, gaskets, plastic, stone, masonry materials, pipes, hoses, metal, wiring, skis, polyethylene, polypropylene, polyester, acrylic, PVDC, paper, ethylene vinyl acetate, automobiles, buildings, aircraft, panels, decks, bones, pavement, tailgates, door panels, wheel houses, rocker panels, firewalls, floor hem flanges, trunks, and floorpans.

C. The sealant composition of any of the above paragraphs, wherein the mixture further comprises one or more tackifiers selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, hydrogenated rosin acids, modified hydrogenated terpenes, hydrogenated rosin esters, derivatives thereof, and combinations thereof.

D. The sealant composition of any of the above paragraphs, wherein the mixture further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof.

E. The sealant composition of any of the above paragraphs, wherein the mixture further comprises one or more additives selected from the group consisting of plasticizers, oils, stabilizers, antioxidants, pigments, dyestuffs, polymeric additives, defoamers, preservatives, thickeners, rheology modifiers, humectants, fillers, water, crosslinking agents, thixotropic agents, surfactants, adhesion promoters, reinforcing agents, chain extenders, ultraviolet stabilizers, colorants, organic solvents, stabilizers, dryers, wetting agents, nucleating agents, accelerators, curing agents, and combinations or derivatives thereof.

F. The sealant composition of any of the above paragraphs, wherein the mixture comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

G. The sealant composition of any of the above paragraphs, wherein the mixture comprises 30 percent by weight or less of the one or more waxes, 20 percent by weight or less of the one or more waxes, 10 percent by weight or less of the one or more waxes, 5 percent by weight or less of the one or more waxes, or 1 percent by weight or less of the one or more waxes.

H. The sealant composition of any of the above paragraphs, wherein the mixture comprises 95 percent by weight or less of the one or more additives, 90 percent by weight or less of the one or more additives, 80 percent by weight or less of the one or more additives, 70 percent by weight or less of the one or more additives, 60 percent by weight or less of the one or more additives, 50 percent by weight or less of the one or more additives, 40 percent by weight or less of the one or more additives, 30 percent by weight or less of the one or more additives, 20 percent by weight or less of the one or more additives, 10 percent by weight or less of the one or more additives, 5 percent by weight or less of the one or more additives, 3 percent by weight or less of the one or more additives, or 1 percent by weight or less of the one or more additives.

I. The sealant composition of any of the above paragraphs, wherein the polymer has a melt viscosity of 90,000 mPa·s or less at 190° C.

J. The sealant composition of claim 1, wherein the polymer has a set time of 30 minutes or less.

K. The sealant composition of any of the above paragraphs, wherein the polymer has a Dot T-Peel of from 3 N to 4,000 N.

L. The sealant composition of any of the above paragraphs, wherein the mixture has a sag of 7.5 cm or less after 1 week at 70° C.

M. The sealant composition of any of the above paragraphs, wherein the mixture has a melting point of 200° C. or less.

N. The sealant composition of any of the above paragraphs, wherein the mixture has a 180° peel strength against glass of 10 pli or more.

O. A method of preparing the sealant composition of any of the above paragraphs comprising forming a mixture comprising a polymer having one or more $C_3$ to $C_{40}$ olefins and 0 to 5 mole % of ethylene, wherein the polymer has a Dot T-Peel of 1 Newton or more, a branching index (g') of 0.95 or less measured at the Mz of the polymer, and a Mw of 100,000 or less and applying the mixture to at least a portion of a substrate surface to be sealed.

N. Paving Compositions

In a particular embodiment, the adhesive compositions described herein can be used in paving compositions. Typically, paving compositions include asphalt, aggregate and an adhesive composition. The term "asphalt" as used herein refers to any of a variety of solid or semi-solid materials at room temperature which gradually liquify when heated, and in which the predominant constituents are naturally occurring bitumens of which are obtained as residue in petroleum refining. Asphalt is further defined by Kirk-Othmer, Encyclopedia of Chemical Technology, Vol. 3, Third Ed. (1978) pp. 284-327, John Wiley & Sons, New York. An additional discussion appears in the publication entitled "A Brief Introduction to Asphalt and some of its Uses", Manual Series No. 5 (MS-5), The Asphalt Institute, 7th Ed., September, 1974.

Exemplary naturally occurring bitumens include natural-asphalts or petroleum-refined asphalts, asphaltites, pyrogenous distillates, bottom stock, as well as other pyrogenous residues such as pyrogenous asphalts, petroleum pitch, coal tar pitch and mixtures thereof, for example. Such material is often characterized by a penetration value of from 0-300 or higher (ASTM D-5-51), preferably about 40-300, with a softening point in the range of about 32 to 120° C. (ASTM D-36-26), preferably between 38 to 65° C.

Useful sources of asphalt include many of those which are presently commercial available. For example, natural asphalts and petroleum asphalts are generally known for roofing and paving applications may be used. The natural asphalts include, for example, asphaltite such as gilsonite, grahamite and glance pitch lake asphalt such as trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The asphalts may also include petroleum tar and asphalt cement. Petroleum tars include oil gas tar obtained as a by-product when gases are produced from petroleum fractions, such tar in refined form, cut-back tar obtained by mixing a light petroleum fraction with such tar, and tar-pitch obtained as a residue by removing the volatile fraction from such tar. Any of these kinds of asphalt may be used alone or in combination. For example, straight asphalt is useful for paving applications, and oxidized and blown asphalts are useful for roofing applications.

The paving compositions of the present invention are particularly useful for preparing asphalt coating compositions. These include aggregate-containing asphalts such as employed in the paving of roads, bridges, airport runways, and sidewalks, as well as the localized repair or patching of the same. The paving compositions of the present invention may be mixed with aggregate while in a fluid or molten condition. Typically, the paving composition is mixed with preheated, predried aggregates to form a homogeneous mixture of uniformly coated aggregates. The aggregate may be heated under conditions of time and temperature that are sufficient to drive off essentially all free moisture prior to mixing. During mixing, the paving composition is typically at temperatures of about 100° C. to about 160° C. Before the resulting composition is cooled to a temperature at which it loses its workability, it may be spread on a road bed, for example, and then compacted and permitted to cure. After curing, the resulting paving composition comprises aggregate bound by a matrix of asphalt binder.

The term "aggregate" as used herein is intended to include solid particles having a range of sizes including fine particles such as sand to relatively coarse particles such as crushed stone, gravel or slag. Typically, such aggregate used in the preparation of paving compositions are primarily inorganic materials, i.e., such as crushed rock, stone, and in certain instances, sand. The size of aggregates depends in part upon the desired end use application of a particular paving composition. For example, larger aggregate is typically used in laying down of a new or resurfaced roadway, as compared to crack repairing compositions which typically have a aggregate of lower average particle sizes. Of course, the aggregate, particularly when it is ground or crushed, can be highly irregular. Exemplary aggregate materials include inorganic materials including sand, gravel, crushed stone and the like; certain organic materials including recycled tire materials and thermoplastics, as well as mixtures of one or more inorganic and organic materials. Other inorganic as well as organic materials known to be useful as aggregates, although not elucidated here, may also be used in the present inventive compositions.

The paving composition of the present invention may also be useful for preparing improved seal coats. A seal coat is generally applied as a hot asphalt, cutback asphalt, or emulsified asphalt. The molten or fluid asphalt is generally sprayed from a truck, and the aggregate is placed on top of the asphalt followed by rolling or compacting the aggregate into the asphalt to finish the application.

The paving compositions of the present invention, after formation, may be handled by conventional techniques to maintain them in fluid or molten form under, for example, road-building conditions. For example, the asphalts may be formed into a cutback by fluxing the asphalt with a suitable volatile solvent or distillate. The asphalt cutback may then be directly mixed with aggregate and applied as a paving composition in fluid form, possibly at ambient temperatures. Another conventional technique for fluidizing the asphalt prior to mixing with aggregate and forming into a paving composition is to emulsify the asphalt by known techniques. An advantage of this method of fluidizing is that after mixing with the aggregate, it may be applied as a paving composition at ambient temperature.

A key technical consideration in the production of a paving composition is to insure the chemical compatibility of both the asphalt cement as well as the intended end-use application of the paving composition. With regard to chemical compatibility, factors such as the presence of undesired salts within the aggregate must be considered, in order to minimize that the likelihood of breakdown of either the asphalt paving compositions.

Additionally, it is also a requirement that good adhesion of the aggregate and the asphalt cement contained in a paving composition exists to ensure that thorough "wetting" of the asphalt composition, and good mixing of these materials occurs, both prior to, and subsequent to the placement of the asphalt paving compositions on to a surface. Further, the physical characteristics of the aggregate must also be taken into consideration, i.e., under certain conditions where high levels of traffic, and/or heavy loads are expected to be encountered, and are a mixture appropriate to the expected usage patterns, can be selected.

As such, the paving composition includes an adhesive comprising the inventive polymer described herein. The polymer may be functionalized with maleic acid or maleic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and combinations thereof, for example. The adhesive composition can include 80 percent by weight or less, or 60 percent by weight or less, or 40 percent by weight or less, or 30 percent by weight or less, or 20 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition can include 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

In yet another aspect, the adhesive composition can include 70 percent by weight or less of from 30 to 60 percent by weight of one or more additives. The one or more additives can include plasticizers, oils, stabilizers, antioxidants, synergists, pigments, dyestuffs, polymeric additives, defoamers, preservatives, thickeners, rheology modifiers, humectants, fillers, and water, for example. Exemplary fillers include carbon black, mine chatt, mine tailings, clinkers, cinders, ash, ground tires, clay, and glass. Such fillers typically have dimensions somewhat smaller than the aggregate, and are frequently incorporated so to minimize the formation of a voidage in a paved concrete roadway.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

In one aspect, the adhesive composition is formulated to have a PAFT of 60° C. or more. In another aspect, the adhesive composition has a SAFT of 70° C. or more. In another aspect, the adhesive composition has a set temperature of from −20° C. to 250° C. In yet another aspect, the adhesive composition has an open temperature of from −20° C. to 250° C.

One typical formulation of the adhesive composition includes at least 35 percent by weight of the polymer of the present invention, up to 60 percent by weight of one or more tackifiers, up to 30 percent by weight of one or more waxes, and up to 15 percent by weight of one or more additives. Another typical formulation of the adhesive composition includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 25 percent by weight of one or more waxes, and up to 15 percent by weight of one or more additives.

Typically, the paving composition includes 95 percent by weight or less, or from 90 to 96 percent by weight of the aggregate. In one aspect, the paving composition includes from 80 to 99 percent by weight of the asphalt. In another aspect, the paving composition includes at least 20 percent by weight of the adhesive composition, at least 40 percent by weight of the aggregate, at least 20 percent by weight of the asphalt, and up to 10 percent by weight of other additives.

The embodiments described below further relate to compositions or combinations as described herein.

A. A paving composition comprising asphalt, aggregate, and an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less.

B. The paving composition of paragraph A, wherein the asphalt is one or more natural asphalts, petroleum asphalts, or any combinations thereof.

C. The paving composition of any of the above claims, wherein the natural asphalt comprises asphaltite, gilsonite, grahamite, glance pitch, lake asphalt, trinidad asphalt, or rock asphalt.

D. The paving composition of any of the above claims, wherein the aggregate particles are selected from the group consisting of clay, stone, sand, rock, gravel, and slag.

E. The paving composition of any of the above claims, wherein the adhesive composition further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

F. The paving composition of any of the above claims, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The paving composition of any of the above claims, wherein the adhesive composition further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers, and water.

H. The paving composition of any of the above claims, wherein the fillers are selected from a group consisting of carbon black, mine chatt, mine tailings, clinkers, cinders, ash, ground tires, clay, and glass.

I. The paving composition of any of the above claims, wherein the adhesive composition comprises 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

J. The paving composition of any of the above paragraphs, wherein the adhesive composition comprises 80 percent by weight or less, or 60 percent by weight or less, or 40 percent by weight or less, or 30 percent by weight or less, or 20 percent by weight or less of the one or more tackifiers.

K. The paving composition of any of the above paragraphs, wherein the adhesive composition comprises 70 percent by weight or less, or 15 percent by weight or less, or 10 percent by weight or less, or from 30 to 60 percent by weight of one or more additives.

L. The paving composition of any of the above paragraphs, wherein the paving composition comprises 95 percent by weight or less, or from 90 to 96 percent by weight of the aggregate.

M. The paving composition of any of the above paragraphs, wherein the paving composition comprises from 80 to 99 percent by weight of the asphalt.

N. The paving composition of any of the above paragraphs, wherein the polymer has a melt viscosity of 90,000 mPa·s or less at 190° C.

O. The paving composition of any of the above paragraphs, wherein the polymer has a set time of 30 minutes or less.

P. The paving composition of any of the above paragraphs, wherein the polymer has a Dot T-Peel of from 3 N to 4,000 N.

Q. A method of preparing the paving composition any of the above paragraphs comprising forming an adhesive composition comprising a polymer having one or more $C_3$ to $C_{40}$ olefins, wherein the polymer has a Dot T-Peel of 1 Newton or more, a branching index (g') of 0.95 or less measured at the Mz of the polymer, and a Mw of 100,000 or less and applying the adhesive composition to at least a portion of an asphalt admixture.

O. Glue Sticks

In a particular embodiment, the adhesive compositions described herein can be used in a glue stick. Glue sticks are sold in a variety of forms, one of which is hot melt adhesive glue sticks. Hot melt adhesive glue sticks are typically designed for use in glue guns. Glue guns are adapted to be held in the hand of an operator with a melt chamber in which an end portion of a glue stick is received and melted by heat supplied to the melt chamber. Progressive melting of the hot melt adhesive glue stick may be achieved by pressing the hot melt adhesive glue stick into the melt chamber. Melted adhesive is dispensed from a nozzle of the gun as the hot melt adhesive glue stick is fed into the melt chamber and melted therein. Therefore, the hot melt adhesive glue stick is heated to an application temperature sufficient to provide glue to a substrate in molten form. The substrate can include paper, paperboard, containerboard, tagboard, corrugated board, chipboard, kraft, cardboard, fiberboard, plastic resin, metal, metal alloys, foil, film, plastic film, laminates, sheeting, wood, plastic, polystyrene, nylon, polycarbonate, polypropylene, styrofoam, porous substrates, polyvinylchloride, walls, polyester, or combinations thereof.

The application temperature of the hot melt adhesive glue stick is adjusted to provide a low enough adhesive melt viscosity to ensure good wetting of the substrates and provide an adequate open time to position substrates after glue is applied thereto. It is desirable that the adhesive composition becomes substantially non-tacky after cooling to about room temperature or below. Adhesives for use in hot melt adhesive glue sticks should also have the ability to bond to a variety of substrates.

Another type of glue stick is a pressure sensitive adhesive glue stick. Pressure sensitive adhesive glue sticks are commercially available products comprising a body of solid adhesive contained within a housing. Conventionally, a removable cap closes the housing, the housing having an opening on its bottom. The opening is in a plane perpendicular to the axis of the pressure sensitive adhesive glue stick. The cap can be removed when one wishes to use the pressure sensitive adhesive glue stick.

Pressure sensitive adhesive glue sticks do not require heating for application to a substrate, but produce an adhesive deposition upon the substrate merely upon application of pressure. Similarly, the substrate may be subsequently attached adhesively to another substrate upon application of mere pressure, because the applied glue from the glue stick is tacky at room temperature.

For pressure sensitive adhesives, at least one component of the adhesive composition is liquid at ambient temperature. The liquid component imparts pressure sensitivity or surface tackiness to the pressure sensitive adhesive glue stick at ambient temperature. Often polymeric additives, tackifiers, and/or plasticizers are added to the adhesive composition so that the glue stick is tacky and a portion thereof remains on the substrate upon contact.

Glue sticks can be composed of a mixture of adhesive polymer, tackifier, and wax. The component amounts are altered to provide an adequate blend of melting point, application temperature, open time, bond strength, durability and heat resistance in the adhesive composition, depending on the application. It is desirable to have adhesive compositions that are good at accepting stress without failing adhesively, which is measured by bond strength and time to bond failure. Both bond strength and time to bond failure are preferably high for a glue stick composition. Longer time to bond failure increases flexibility of the glue.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof, for example. The adhesive composition can include 65 percent or less by weight of the one or more tackifiers. Preferably, the adhesive composition includes from 20 to 40 percent by weight, or from 5 to 20 percent by weight of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 40 percent by weight or less of the one or more waxes. Preferably, the adhesive composition includes 30 percent by weight or less, or 20 percent by weight or less, or 10 percent by weight or less, or 5 percent by weight or less of the one or more waxes.

In yet another aspect, the adhesive composition can include 30 percent by weight or less of one or more additives. Preferably, the adhesive composition includes 25 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, dyesm colorants, fragrances, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, and water, for example. For example, the adhesive composition can include 3 percent by weight or less, or 1.5 percent by weight or less, or from 0.1 to 1.5 percent by weight or from 0.25 to 1 percent by weight of the one or more antioxidants. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. The adhesive composition can include 30 percent by weight or less, or from 5 to 20 percent by weight, or from 1 to 12 percent by weight, or from 5 to 10 percent by weigh of the one or more plasticizers. The adhesive composition can further include 3 percent by weight or less of the one or more pigments, or 1 percent by weight or less. In yet another aspect, the adhesive composition includes 3 percent by weight or less of one or more fillers. In yet another aspect, the adhesive composition includes from 5 to 30 percent by weight of one or more inorganic salts. In yet another aspect, the adhesive composition includes 1 percent by weight or less of one or more antimicrobial agents.

One typical formulation of the adhesive composition includes at least 35 percent by weight of the polymer of the present invention, up to 95 percent by weight of one or more tackifiers, up to 40 percent by weight of one or more waxes, and up to 15 percent by weight of one or more additives. Another typical formulation of the adhesive composition includes at least 50 percent by weight of the polymer of the present invention, up to 95 percent by weight of one or more tackifiers, up to 40 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 40 percent by weight of one or more waxes, and up to 40 percent by weight of one or more additives.

Still yet another typical formulation of the adhesive composition includes at least 35 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 25 percent by weight of one or more waxes, and up to 15 percent by weight of one or more additives.

Glue sticks should exhibit sufficient heat resistance. Traditional hot-melt adhesives have a nominal heat resistance range of from 52° C. to 68° C. Heat resistance should not fall below a level of 52° C. to meet the general needs of the marketplace. A glue stick should not soften at ambient temperature, which is measured by the softening point of the adhesive composition. The glue stick also should have viscosity and rheology characteristics when melted in a glue gun such that the glue can be extruded readily when required and yet does not drool in significant quantities from the gun during periods when extrusion of glue is not required. The glue stick should possess a relatively low softening point and low melt viscosity. When melt viscosity increases, the level of wetting is generally lowered. A melt viscosity that is too high causes difficulty in applying an adequate amount of the adhesive composition to a substrate before the glue cools and become too viscous to produce an effective bond to the substrate. The time available to form a satisfactory bond of the adhesive composition to the substrate before the glue becomes too viscous or hard to manipulate is the open time.

Hot melt glue sticks should be designed to feed well into and dispense well from glue guns, which requires that the glue sticks are hard enough to allow them to be pushed into and through the glue gun and viscous enough at the desired application temperature while maintaining adhesive characteristics for good hot melt bonding when applied. To exhibit sufficient hardness, the glue stick should have a Shore A Hardness of 35 or more at 25° C. The glue stick hardness is readily adjusted by the tackifier or wax content or with the melt index of the polymer component employed. In addition, the glue stick should have a percent substrate fiber tear of from 75% to 100% at 25° C. Preferably, the adhesive composition has a percent substrate fiber tear of from 95% to 100% at 25° C. In another aspect, the adhesive composition has a PAFT of 60° C. or more. Preferably, the adhesive composition has a PAFT of 200° C. or less. In yet another aspect, the adhesive composition has a SAFT of 70° C. or more. Preferably, the adhesive composition has a SAFT of 200° C. or less. In another aspect, the adhesive composition has a viscosity of from 1 Pa·s to 50 Pa·s at 177° C. Preferably, the adhesive composition has a viscosity of from 0.8 Pa·s to 13 Pa·s at 177° C. In yet another aspect, the adhesive composition has a softening point of from 70 to 100° C. Preferably, the adhesive composition has a softening point of from 80 to 90° C. More preferably, the adhesive composition has a softening point of from 70 to 80° C. In another aspect, the adhesive composition has an application temperature of 190° C. or less. In yet another aspect, the adhesive composition has an application temperature of 138° C. or less, or 121° C. or less. In one aspect, the adhesive composition has a bond strength on beechwood of from 6 to 8 N/mm$^2$. Preferably, the adhesive composition has a bond strength on beechwood of 4 N/mm$^2$ or more. More preferably, the adhesive composition has a bond strength on beechwood of 5 N/mm$^2$ or more. In another aspect, the adhesive composition has a bond strength on oak of 5 N/mm$^2$ or more. In yet another aspect, the adhesive composition has a Dot T-Peel of from 3 N to 4,000 N. Preferably, the adhesive composition has a Dot T-Peel of from 5 N to 3,000 N. More preferably, the adhesive composition has a Dot T-Peel of from 15 N to 1,000 N.

Glue sticks are frequently processed in melt kettles or reactors at temperatures around 177° C. Such temperatures are required by the melt index and the melting point of materials in the adhesive composition. The adhesive composition of the present invention can be prepared using blending techniques well known in the art, for example, by processing in an extruder followed by well known standard pelletization processes, or the adhesive composition may be extruded into rods or cast into a tubular mold specified to size to be fed to hand-held glue guns. The glue sticks may be aged in the mold overnight until they have developed at least some crystallinity before using them.

The embodiments described below further relate to compositions or combinations as described herein.

A. A glue stick for use with a glue gun comprising an elongated member that includes an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less.

B. The glue stick of paragraph A, wherein the glue stick produces an adhesive deposition on a substrate upon application of pressure or heat.

C. The glue stick of any of the above paragraphs, wherein the substrate is selected from the group consisting of paper, paperboard, containerboard, tagboard, corrugated board, chipboard, kraft, cardboard, fiberboard, plastic resin, metal, metal alloys, foil, film, plastic film, laminates, sheeting, wood, plastic, polystyrene, nylon, polycarbonate, polypropylene, styrofoam, porous substrates, polyvinylchloride, walls, and polyester.

D. The glue stick of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, modified hydrogenated terpenes, hydrogenated rosin esters, derivatives thereof, and combinations thereof.

E. The glue stick of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

F. The glue stick of any of the above paragraphs, wherein the adhesive composition further comprises one or more additives selected from the group consisting of plasticizers, oils, stabilizers, antioxidants, pigments, dyestuffs, polymeric additives, defoamers, preservatives, thickeners, rheology modifiers, humectants, fillers, water, colorants, nucleating agents, and solvents.

G. The glue stick of any of the above paragraphs, wherein the adhesive composition comprises 40 percent or less by weight of the one or more waxes.

H. The glue stick of any of the above paragraphs, wherein the adhesive composition comprises 30 percent or less by weight of the one or more waxes.

I. The glue stick of any of the above paragraphs, wherein the adhesive composition comprises 20 percent or less by weight of the one or more waxes.

J. The glue stick of any of the above paragraphs, wherein the adhesive composition comprises from comprises 60 percent by weight or less of the one or more tackifiers.

K. The glue stick of any of the above paragraphs, wherein the adhesive composition comprises from 20 percent to 30 percent by weight of the one or more tackifiers.

L. The glue stick of any of the above paragraphs, wherein the adhesive composition comprises 30 percent or less by weight of the one or more additives.

M. The glue stick of any of the above paragraphs, wherein the adhesive composition comprises 25 percent or less by weight of the one or more additives.

N. The glue stick of any of the above paragraphs, wherein the adhesive composition comprises 20 percent or less by weight of the one or more additives.

O. The glue stick of any of the above paragraphs, wherein the adhesive composition comprises 10 percent or less by weight of the one or more additives.

P. The glue stick of any of the above paragraphs, wherein the adhesive composition comprises 5 percent or less by weight of the one or more additives.

Q. The glue stick of any of the above paragraphs, wherein the polymer has a melt viscosity of 90,000 mPa·s or less at 190° C.

R. The glue stick of any of the above paragraphs, wherein the polymer has a set time of 30 minutes or less.

S. The glue stick of any of the above paragraphs, wherein the polymer has a Dot T-Peel of from 3 N to 4,000 N.

T. The glue stick of any of the above paragraphs, wherein the adhesive composition has an application temperature of 190° C. or less.

U. The glue stick of any of the above paragraphs, wherein the adhesive composition has an application temperature of 138° C. or less.

V. The glue stick of any of the above paragraphs, wherein the adhesive composition has an application temperature of 121° C. or less.

W. The glue stick of any of the above paragraphs, wherein the adhesive composition has a Shore A hardness of 35 or more at 25° C.

X. A method of applying the glue stick of any of the above paragraphs in molten form comprising forming an adhesive composition comprising a polymer into a glue stick, the polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less, heating the glue stick to an application temperature and applying the adhesive composition to at least a portion of a substrate.

P. Pipe Wrapping

In a particular embodiment, the adhesives of this invention can be used in pipe wrapping articles. Pipe wrapping articles or pipe wrap may be used to insulate or repair leaks to pressure vessels, industrial vessels, transformers, pipes, fittings, tanks, vessels, and containers. In addition, pipe wrapping articles may be used on various types of surfaces including flat faced surfaces, circular joints and other mechanical components. The pipe wrapping articles described herein may be used in any type of industry, such as architectural, building, construction, food, beverage, mining, petrochemical, oil, gas, and water treatment, for example.

Pipe wrapping articles are generally formed by applying an adhesive composition to at least a portion of a wrapping element. The wrapping element can include fiberglass, fibers, wovens, nonwovens, fabric, cloth, polyethylene, polypropylene, acrylic rubber, EPDM, nitrile rubber, nylon, epichlorohydrin elastomer, polysulfide, acrylic elastomer, or butyl rubber, poltisobutylene, for example. The pipe wrapping article can be formed of wood, cement, concrete, nonwoven fabric, woven fabric, aluminum, stainless steel, brass, nickel, glass, glazed ceramics, unglazed ceramics, tiles, polyvinyl chloride, polyethylene terephthalate, plaster, stucco, asphaltic coatings, roofing felts, synthetic polymer membranes, and foamed polyurethane insulation, for example. The wrapping element may have any thickness. For example, a typical wrapping element for use in civil construction may have a minimum thickness of 1.27 mm.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof, for example. The adhesive composition can include 80 percent by weight or less, or 40 percent by weight or less, or 60 percent by weight or less, or 30 percent by weight or less, or 20 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition can include 30 percent by weight or less, or 25 percent by weight or less, of 20 percent by weight or less, or 15 percent by weight or less, or 10 percent by weight or less, or 5 percent by weight or less, or 3 percent by weight or less, or 1 percent by weight or less, or 0.5 percent by weight or less or the one or more waxes.

In yet another aspect, the adhesive composition can include 70 percent by weight or less or from 30 to 60 percent by weight or less of one or more additives. The one or more additives can include plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

The adhesive composition can be formulated to have a PAFT of 60° C. or more. In one aspect, the adhesive composition has a SAFT of 70° C. or more. In another aspect, the adhesive composition has a tensile strength at break of from 0.7 bar to 1.5 bar at 23° C. In another aspect, the adhesive composition has a percent elongation of 50% strain or more of the original length at 23° C. In another aspect, the adhesive composition has a set temperature of from −20° C. to 250° C. Preferably, the adhesive composition has an open temperature of from −20° C. to 250° C. In another aspect, the adhesive composition has a cloud point of 275° C. or less. Preferably, the adhesive composition has a cloud point of 190° C. or less. More preferably, the adhesive composition has a cloud point of 130° C. or less. In yet another aspect, the adhesive composition has a glass transition temperature of 0° C. or less.

One typical formulation of the adhesive composition includes at least 35 percent by weight of the polymer of the present invention, up to 95 percent by weight of one or more tackifiers, up to 40 percent by weight of one or more waxes, and up to 15 percent by weight of one or more additives. Another typical formulation of the adhesive composition includes at least 50 percent by weight of the polymer of the present invention, up to 95 percent by weight of one or more tackifiers, up to 40 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 40 percent by weight of one or more waxes, and up to 40 percent by weight of one or more additives.

The embodiments described below further relate to compositions or combinations as described herein.

A. A pipe wrapping article comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a wrapping element, wherein the adhesive composition is at least partially disposed on or within the wrapping element.

B. The pipe wrapping article of paragraph A, wherein the wrapping element is selected from the group consisting of fiberglass, fibers, wovens, nonwovens, fabric, cloth, polyethylene, polypropylene, acrylic rubber, EPDM, nitrile rubber, nylon, epichlorohydrin elastomer, polysulfide, acrylic elastomer, and butyl rubber.

C. The pipe wrapping article of any of the above paragraphs, wherein the pipe wrapping article is selected from the group consisting of pipes, fittings, tanks, vessels, and containers.

D. The pipe wrapping article of any of the above paragraphs, wherein the pipe wrapping article is made of a material selected from the group consisting of wood, cement, concrete, nonwoven fabric, woven fabric, aluminum, stainless steel, brass, nickel, glass, glazed ceramics, unglazed ceramics, tiles, polyvinyl chloride, polyethylene terephthalate, plaster, stucco, asphaltic coatings, roofing felts, synthetic polymer membranes, and foamed polyurethane insulation.

E. The pipe wrapping article of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

F. The pipe wrapping article of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The pipe wrapping article of any of the above paragraphs, wherein the adhesive composition further comprises one or more additives selected from the group consisting of carbon black, silica gel, clays, aluminas, metal oxides, plasticizers, oils, stabilizers, antioxidants, pigments, dyestuffs, polymeric additives, defoamers, preservatives, thickeners, rheology modifiers, humectants, fillers, and water.

H. The pipe wrapping article of any of the above paragraphs, wherein the adhesive composition comprises 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

I. The pipe wrapping article of any of the above paragraphs, wherein the adhesive composition comprises 80 percent by weight or less, or 60 percent by weight or less, or 40 percent by weight or less, or 30 percent by weight or less, or 20 percent by weight or less of the one or more tackifiers.

J. The pipe wrapping article of any of the above paragraphs, wherein the adhesive composition comprises 70 percent by weight or less or from 30 to 60 percent by weight of the one or more additives.

K. The pipe wrapping article of any of the above paragraphs, wherein the polymer has a melt viscosity of 90,000 mPa·s or less at 190° C.

L. The pipe wrapping article of any of the above paragraphs, wherein the polymer has a set time of 30 minutes or less.

M. The pipe wrapping article of any of the above paragraphs, wherein the polymer has a Dot T-Peel of from 3 N to 4,000 N.

N. A method of preparing the pipe wrapping article of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a wrapping element.

Q. Safety Glass

In a particular embodiment, the adhesives described herein can be used in safety glass. There are two kinds of safety glass, laminated and tempered safety glass. Laminated safety glass generally reduces the transmission of high frequency sound and blocks 97 percent of ultraviolet radiation. Tempered safety glass is a single piece of glass that is tempered by quickly heating and cooling the glass to harden it, thereby increasing the strength of the glass.

As used herein, "safety glass" is an article having a transparent pane. An important function of safety glass is that the adhesive composition used therein is not affected by temperature variations and that, in the case of breaking of the glass, the adhesive composition holds the glass pieces. Furthermore, the adhesive composition absorbs shearing stresses applied to the safety glass due to different expansion rates of the glass components, such as when the safety glass includes a first layer of glass and a second layer of polycarbonate. Safety glass generally includes layers of materials, with an adhesive layer either applied to the outside of one layer; or applied in between two or more layers to adhere them to one another. The transparent pane is formed by applying an adhesive composition to one or more transparent panels, the adhesive composition possibly forming a film on the one or more transparent panels. The one or more transparent panels can be formed of polyvinylbutyral, polyurethane, vinyl acetate, polyethylene, polypropylene, polycarbonate, glass, silicate glass, or a combination thereof.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof, for example. The adhesive composition can include 80 percent by weight or less, or 60 percent by weight or less of the one or more tackifiers. Preferably, the adhesive composition includes 40 percent by weight or less or 20 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition can include 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

In yet another aspect, the adhesive composition can include 30 percent by weight or less, or 25 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3, 5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

In one aspect, the adhesive composition is formulated to have a percent substrate fiber tear of from 75% to 100% at 22° C. Preferably, the adhesive composition has a percent substrate fiber tear of from 75% to 100% at from −35° C. to 22° C. More preferably, the adhesive composition has a percent substrate fiber tear of from 75% to 100% at from 22° C. to 40° C. In another aspect, the adhesive composition has a PAFT of 60° C. or more. In another aspect, the adhesive composition has a SAFT of 70° C. or more. In yet another aspect, the adhesive composition has a viscosity of 9 Pa·s or less at 177° C. Preferably, the adhesive composition has a viscosity of from 0.5 Pa·s to 2.5 Pa·s at 177° C. In yet another aspect, the adhesive composition has a cloud point of 275° C. or less. Preferably, the adhesive composition has a cloud point of 190° C. or less. More preferably, the adhesive composition has a cloud point of 130° C. or less. Most preferably, the adhesive composition has a cloud point of 100° C. or less. In another aspect, the adhesive composition has a glass transition temperature of from −65° C. to 30° C. Preferably, the adhesive composition has a glass transition temperature of from 0° C. to 20° C. More preferably, the adhesive composition has a glass transition temperature of from 10° C. to 20° C.

One typical formulation of the adhesive composition includes at least 35 percent by weight of the polymer of the present invention, up to 60 percent by weight of one or more tackifiers, up to 30 percent by weight of one or more waxes, and up to 15 percent by weight of one or more additives. Another typical formulation of the adhesive composition includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 25 percent by weight of one or more waxes, and up to 15 percent by weight of one or more additives including anti-oxidant.

The transparent pane described above may be used as bulletproof glass, soundproofing glass, and safety glass, for example. Safety glass can further be used for soundproofing purposes. In another example, the safety glass is used as a bulletproof glass pane formed by adhering 3 silicate glass sheets, each 6 mm thick, to a 0.76 mm thick polyvinyl butyral sheet, with the use of an adhesive composition. The adhesive composition may be the adhesive composition described herein, or another adhesive composition configured to adhere two layers. On the a passenger surface of the glass, a plate of polycarbonate is bonded by a thermoplasic polyurethane layer to the bulletproof glass pane. On the exterior surface, the bullet-proof glass pane is provided with a film formed from the adhesive composition of this invention.

In another example, the transparent pane can be used as laminated safety glass, such as auto glass. To make laminated safety glass, a thin layer of flexible plastic film, such as polyvinyl butyral (PVB), is placed between two or more pieces of glass. The plastic film holds the glass in place when the glass breaks, helping to lessen injuries from flying glass. The film also can stretch, yet the glass still sticks to it. Laminated safety glass is also used in thermometers, cutting boards, greenhouse windows, shower enclosures and office partitions.

The embodiments described below further relate to compositions or combinations as described herein.

A. An article having a transparent pane comprising one or more transparent panels and an adhesive composition applied to at least a portion of the one or more panels, the adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less.

B. The article of paragraph A, wherein the one or more transparent panels comprises polyvinylbutyral, polyurethane, vinyl acetate, polyethylene, polypropylene, polycarbonate, glass, silicate glass, or a combination thereof.

C. The article of any of the above paragraphs, wherein the article is selected from the group consisting of bulletproof glass, soundproofing glass, and safety glass.

D. The article of any of the above paragraphs, wherein the adhesive composition forms a film on the one or more transparent panels.

E. The article of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

F. The article of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The article of any of the above paragraphs, wherein the adhesive composition further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

H. The article of any of the above paragraphs, wherein the adhesive composition comprises 30 percent by weight or less, or 25 percent by weight or less, or 20 percent by weight or less, or 15 percent by weight or less, or 10 percent by weight or less, or 5 percent by weight or less, or 3 percent by weight or less, or 1 percent by weight or less, or 0.5 percent by weight or less of the one or more waxes.

I. The article of any of the above paragraphs, wherein the adhesive composition comprises 80 percent by weight or less, or 60 percent by weight or less, or 40 percent by weight or less, or 20 percent by weight or less of the one or more tackifiers.

J. The article of any of the above paragraphs, wherein the adhesive composition comprises 30 percent by weight or less, or 25 percent by weight or less, or 20 percent by weight or less, or 15 percent by weight or less, or 10 percent by weight or less, or 5 percent by weight or less of the one or more additives.

K. The article of any of the above paragraphs, wherein the polymer has a melt viscosity of 90,000 mPa·s or less at 190° C.

L. The article of any of the above paragraphs, wherein the polymer has a set time of 30 minutes or less.

M. The article of any of the above paragraphs, wherein the polymer has a Dot T-Peel of from 3 N to 4,000 N.

N. The article of any of the above paragraphs, wherein the adhesive composition has a viscosity of less than 9 Pa·s at 177° C.

O. A method of preparing the article having a transparent pane comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a transparent panel.

R. Roofing Shingles

In a particular embodiment, the adhesives of this invention can be used in shingles. Roofing shingles are generally formed of a roofing element and an adhesive to bind the roofing element to a roof. The roofing element is generally formed of a sheet metal, such as copper, terne-coated stainless steel, zinc, aluminum, or alloys thereof.

Important criteria for shingles include resistance to crush when the shingles are packed in stacks for shipment, a relatively low melting temperature to permit self-sealing without the application of heating equipment and a strong bond between the joined surfaces, which has high wind resistance and good low temperature stability. Other important considerations include good resistance to photo-oxidation; in particular, the ability to retain adhesive properties after exposure of the adhesive to sunlight for more than two hours.

In addition, the adhesive composition should exhibit a "migrating" property at low temperatures of 32° C. to 37° C. in order to provide stronger bonds and better wind resistance. As used herein, "migrating" refers to when the adhesive composition flows partially into the contacting face of the roofing material.

The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition can include one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof, for example. The adhesive composition can include 95 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example.

In yet another aspect, the adhesive composition can include 50 percent by weight or less of one or more additives. The one or more additives can include plasticizers, oils, stabilizers, antioxidants, pigments, dyestuffs, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, and water, for example. Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

In yet another aspect, the adhesive composition includes 80 percent by weight of one or more bituminous materials, such as asphalt. In another aspect, the adhesive can further include a fire-retardant. Examples of suitable fire-retardant agents include diammonium hydrogen phosphate, polyammonium phosphate, tribromoneopentyl esters of phosphoric acids; halogenated fire-retardant agents such as chlorinated biphenyl and halogenated cyctopentadieno used conjointly with metal oxides, halogenated polymers; mixtures of halogen and phosphorus fire-retardants such as the condensation products of amines with tris-(2,3-dibromopropyl)-phosphate, mixtures of 2,3 dibromopropanol and tris-(2,3-dibromopropyl)-phosphates, condensation products of bis-(carboxyethyl) phosphine oxide with halomethyl benzene; mixtures of carboxylic acid metal salts and beta-haloethylphosphate; and inorganic fire-retardants such as halogen-containing antimony oxide sols and salts of Sb(V) esters.

The adhesive composition can be formulated to have a SAFT of 90° C. or more. In another aspect, the adhesive composition is formulated to have an tensile strength at break of 6.5 bar or more at 25° C. The adhesive composition can further have a percent elongation of 5% strain or more of the original length at 25° C. In addition, the adhesive composition can have a viscosity of from 0.2 Pa·s to 10 Pa·s at 177° C. In yet another aspect, the adhesive composition has a glass transition temperature of from −65° C. to 30° C. In yet another aspect, the adhesive composition has a softening point of from 80° C. to 200° C.

One typical formulation of the adhesive composition includes at least 35 percent by weight of the polymer of the present invention, up to 80 percent by weight of one or more tackifiers, up to 80 percent by weight of one or more bituminous materials, and up to 50 percent by weight of one or more additives. Another typical formulation of the adhesive composition includes at least 50 percent by weight of the polymer of the present invention, up to 60 percent by weight of one or more tackifiers, up to 40 percent by weight of one or more bituminous materials, and up to 50 percent by weight of one or more additives. Yet another typical formulation of the adhesive composition includes at least 50 percent by weight of the polymer of the present invention, up to 60 percent by weight of one or more tackifiers, up to 25 percent by weight of one or more bituminous materials, and up to 35 percent by weight of one or more additives.

The adhesive composition may be applied to a roofing element, such as, a shingle or continuous or rolled roofing sheet in the form of an adhesive strip or bead, in a pattern of beads or in another configuration along an area which is to be contacted with a second roofing element, e.g., on the under surface or over surface of the roofing material where overlap or underlap of succeeding shingles or strips occur. The same application can be effected to seal siding shingles or sheets. The adhesive composition may also be used as a hot melt for built-up roofs.

For preparing coated shingles, the roofing element is passed over or under an applicator containing the adhesive material at a temperature of from about 120° C. to about 200° C. The applicator can be a set of print wheels or an extruder capable of applying adhesive in beads of consistent size or as a continuous ribbon on a surface of the material to be joined and sealed to another member. After affixing the adhesive composition in the desired area or areas, the adhesive composition is quenched with water, air cooled or cooled by contact with any suitable quenching media.

Generally the material on which adhesive is applied, such as the roofing element, is cut to size after application, however, it is also within the scope of this invention to precut shingles or sheets which may be subsequently presented to the applicator for adhesive application.

The embodiments described below further relate to compositions or combinations as described herein.

A. A shingle comprising an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less and a roofing element comprising a first side and a second side, wherein the adhesive composition is applied to at least a portion of the second side.

B. The shingle of paragraph A wherein the roofing element is selected from the group consisting of copper, steel, zinc, aluminum, combinations thereof, and alloys thereof.

C. The shingle of any of the above paragraphs, wherein the first side comprises one or more materials selected from the group consisting of roofing asphalt, fabric, aggregate, and combinations thereof.

D. The shingle of any of the above paragraphs, wherein the second side comprises one or more materials selected from the group consisting of rubber, fiberglass, aramid, carbon, polyester, nylon, asphalt, and sheet metal.

E. The shingle of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, modified polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes, modified terpenes, hydrogenated rosin acids, modified hydrogenated terpenes, hydrogenated rosin esters, derivatives thereof, and combinations thereof.

F. The shingle of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

G. The shingle of any of the above paragraphs, wherein the adhesive composition further comprises one or more additives selected from the group consisting of plasticizers, oils, stabilizers, antioxidants, pigments, dyestuffs, polymeric additives, defoamers, preservatives, thickeners, rheology modifiers, humectants, fire-retardants, fillers and water.

H. The shingle of any of the above paragraphs, wherein the adhesive composition further comprises one or more bituminous materials.

I. The shingle of any of the above paragraphs, wherein the adhesive composition comprises 80 percent by weight or less of the one or more bituminous materials.

J. The shingle of any of the above paragraphs, wherein the adhesive composition comprises 95 percent by weight or less of the one or more tackifiers.

K. The shingle of any of the above paragraphs, wherein the adhesive composition comprises 50 percent or less by weight of the one or more additives.

L. The shingle of any of the above paragraphs, wherein the polymer has a melt viscosity of 90,000 mPa·s or less at 190° C.

M. The shingle of any of the above paragraphs, wherein the polymer has a set time of 30 minutes or less.

N. The shingle of any of the above paragraphs, wherein the polymer has a Dot T-Peel of from 3 N to 4,000 N.

O. The shingle of any of the above paragraphs, wherein the adhesive composition has a viscosity of from 0.2 Pa·s to 10 Pa·s at 177° C.

P. The shingle of any of the above paragraphs, wherein the adhesive composition has a softening point of from 80° C. to 200° C.

Q. The shingle of any of the above paragraphs, wherein the adhesive composition comprises 80 percent by weight or less of the one or more tackifiers, 70 percent by weight or less of the one or more tackifiers, 60 percent by weight or less of the one or more tackifiers, 50 percent by weight or less of the one or more tackifiers, 40 percent by weight or less of the one or more tackifiers, 30 percent by weight or less of the one or more tackifiers, 20 percent by weight or less of the one or more tackifiers, 10 percent by weight or less of the one or more tackifiers, 5 percent by weight or less of the one or more tackifiers, or 1 percent by weight or less of the one or more tackifiers.

R. The shingle of any of the above paragraphs, wherein the adhesive composition comprises 50 percent by weight or less of the one or more waxes, 40 percent by weight or less of the one or more asphalt or other bituminous materials, 30 percent by weight or less of the one or more asphalt or other bituminous materials, 20 percent by weight or less of the one or more asphalt or other bituminous materials, 10 percent by weight or less of the one or more asphalt or other bituminous materials, or 5 percent by weight or less of the one or more asphalt or other bituminous materials.

S. The shingle of any of the above paragraphs, wherein the adhesive composition comprises 60 percent by weight or less of the one or more additives, 50 percent by weight or less of the one or more additives, 40 percent by weight or less of the one or more additives, 30 percent by weight or less of the one or more additives, 20 percent by weight or less of the one or more additives, 10 percent by weight or less of the one or more additives, 5 percent by weight or less of the one or more additives, 3 percent by weight or less of the one or more additives, or 1 percent by weight or less of the one or more additives.

T. A method of preparing the shingle of any of the above paragraphs comprising forming an adhesive composition comprising a polymer and one or more bituminous materials, wherein the polymer has one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a bottom side of a roofing element comprising a substantially flat panel.

S. Reflective Coating

In a particular embodiment, the adhesives of this invention can be used in reflective articles. Reflective articles are formed by applying a reflective material to a substrate surface to provide reflectivity to a portion of the substrate. The reflective material can include any material known to one skilled in the art. For example, the reflective material can include prisms and glass beads. The substrate surface can include roads, bicycle lanes, traffic signs, soft sports surfaces, playground surfaces, ships, runways, pedestrian crosswalks, buildings, tennis courts, driving courses, tartan substitutes, oil rigs, tunnels, concrete, metals, asphalt, bitumen, bricks, cobbles, tiles, steel plates, wood, ceramics, polymeric materials, glass, bridge abutments, traffic barricades, barriers, pipes, poles, guard rails, concrete blocks, curbs, parking lots, porcelain, stone, wood panels, particle board, wooden vehicle parts, cinder blocks, glass windows, traffic drums, traffic cones, scrims, liquid crystal displays, lights, copy machines, electronic backboards, diffuse white standards, and photographic lights.

An adhesive composition is applied to at least a portion of the reflective material to adhere the reflective material to the substrate. The adhesive composition includes the inventive polymer described herein. The polymer may be functionalized with malaic acid or malaic anhydride. Additional components may be combined with the polymers or formulations of the polymers to form the adhesive composition.

In one aspect, the adhesive composition includes one or more tackifiers. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof, for example. The adhesive composition can include 99 percent by weight or less of the one or more tackifiers.

In another aspect, the adhesive composition can include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof, for example. The adhesive composition may include 30 percent by weight or less of the one or more waxes.

In yet another aspect, the adhesive composition can include 30 percent by weight or less, or 25 percent by weight or less, or 20 percent by weight or less, or 15 percent by weight or less, or 10 percent by weight or less, or 5 percent by weight or less of one or more additives. The one or more additives can include plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, and water, for example.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof. Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl) etc.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

In one aspect, the adhesive composition is formulated to have a set temperature of from −20° C. to 250° C. In yet another aspect, the adhesive composition has an open temperature of from −20° C. to 250° C. In one aspect, adhesive composition has a viscosity of 9 Pa·s or less at 177° C. Preferably, the adhesive composition has a viscosity of from 0.2 Pa·s to 8 Pa·s at 177° C. More preferably, the adhesive composition has a viscosity of from 0.5 Pa·s to 2.5 Pa·s at 177° C. In another aspect, the adhesive composition has a cloud point of 275° C. or less. In yet another aspect, the adhesive composition has a density of 0.99 g/cm$^3$ or less at 25° C. In yet another aspect, the adhesive composition has a glass transition temperature of from −65° C. to 30° C. In yet another aspect, the adhesive composition has a luminance of 70 or more. Preferably, the adhesive composition has a luminance of 75 or more.

One typical formulation of the adhesive composition includes at least 35 percent by weight of the polymer of the present invention, up to 60 percent by weight of one or more tackifiers, up to 30 percent by weight of one or more waxes, and up to 15 percent by weight of one or more additives. Another typical formulation of the adhesive composition includes at least 50 percent by weight of the polymer of the present invention, up to 60 percent by weight of one or more tackifiers, up to 30 percent by weight of one or more waxes, and up to 15 percent by weight of one or more additives. Yet another typical formulation of the adhesive composition includes at least 50 percent by weight of the polymer of the present invention, up to 60 percent by weight of one or more tackifiers, up to 25 percent by weight of one or more waxes, and up to 15 percent by weight of one or more additives.

The embodiments described below further relate to compositions or combinations as described herein.

A. A reflective article comprising a reflective material at least partially applied to a substrate surface and an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at an Mz of the polymer, and a Mw of 100,000 or less.

B. The reflective article of paragraph A, wherein the reflective material is selected from the group consisting of prisms and glass beads.

C. The reflective article of any of the above paragraphs, wherein the substrate surface is selected from the group consisting of roads, bicycle lanes, traffic signs, soft sports surfaces, playground surfaces, ships, runways, pedestrian crosswalks, buildings, tennis courts, driving courses, tartan substitutes, oil rigs, tunnels, concrete, metals, asphalt, bitumen, bricks, cobbles, tiles, steel plates, wood, ceramics, polymeric materials, glass, bridge abutments, traffic barricades, barriers, pipes, poles, guard rails, concrete blocks, curbs, parking lots, porcelain, stone, wood panels, particle board, wooden vehicle parts, cinder blocks, glass windows, traffic drums, traffic cones, scrims, liquid crystal displays, lights, copy machines, electronic backboards, diffuse white standards, and photographic lights.

D. The reflective article of any of the above paragraphs, wherein the adhesive composition further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

E. The reflective article of any of the above paragraphs, wherein the adhesive composition further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

F. The reflective article of claim 1, wherein the adhesive composition further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

G. The reflective article of any of the above paragraphs, wherein the adhesive composition comprises 30 percent by weight or less of the one or more waxes.

H. The reflective article of any of the above paragraphs, wherein the adhesive composition 99 percent by weight or less of the one or more tackifiers.

I. The reflective article of any of the above paragraphs, wherein the adhesive composition comprises 30 percent by weight or less, or 25 percent by weight or less, or 20 percent by weight or less, or 15 percent by weight or less, or 10 percent by weight or less, or 5 percent by weight or less of the one or more additives.

J. The reflective article of any of the above paragraphs, wherein the polymer has a melt viscosity of 90,000 mPa·s or less at 190° C.

K. The reflective article of any of the above paragraphs, wherein the polymer has a set time of 30 minutes or less.

L. The reflective article of any of the above paragraphs, wherein the polymer has a Dot T-Peel of from 3 N to 4,000 N.

M. The reflective article of any of the above paragraphs, wherein the adhesive composition has a viscosity of 9 Pa·s or less at 177° C.

N. The reflective article of any of the above paragraphs, wherein the adhesive composition has a luminance of 70 or more, or 75 or more.

O. A method of preparing the reflective article of any of the above paragraphs comprising forming an adhesive composition comprising a polymer having one or more $C_3$ to $C_{40}$ olefins and from 0 to 5 mole % of ethylene, wherein the polymer has a Dot T-Peel of 1 Newton or more, a branching index (g') of 0.95 or less measured at the Mz of the polymer, and a Mw of 100,000 or less and applying the adhesive composition to at least a portion of a reflective material.

Characterization and Tests

Molecular weights (number average molecular weight (Mn), weight average molecular weight (Mw), and z-average molecular weight (Mz)) are determined using a Waters 150 Size Exclusion Chromatograph (SEC) equipped with a differential refractive index detector (DRI), an online low angle light scattering (LALLS) detector and a viscometer (VIS). The details of the detector calibrations have been described elsewhere [Reference: T. Sun, P. Brant, R. R. Chance, and W. W. Graessley, *Macromolecules*, Volume 34, Number 19, 6812-6820, (2001)]; attached below are brief descriptions of the components.

The SEC with three Polymer Laboratories PLgel 10 mm Mixed-B columns, a nominal flow rate 0.5 cm³/min, and a nominal injection volume 300 microliters is common to both detector configurations. The various transfer lines, columns and differential refractometer (the DRI detector, used mainly to determine eluting solution concentrations) are contained in an oven maintained at 135° C.

The LALLS detector is the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal is sent to a data acquisition board (National Instruments) that accumulates readings at a rate of 16 per second. The lowest four readings are averaged, and then a proportional signal is sent to the SEC-LALLS-VIS computer. The LALLS detector is placed after the SEC columns, but before the viscometer.

The viscometer is a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer is calculated from their outputs. The viscometer is inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index was measured using SEC with an on-line viscometer (SEC-VIS) and are reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^{\alpha}$, K and α are measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight are measured at individual elution volumes, which arguably contain narrowly dispersed polymer. Linear polymers selected as standards for comparison should be of the same viscosity average molecular weight and comonomer content. Linear character for polymer containing C2 to C 10 monomers is confirmed by Carbon-13 NMR the method of Randall (Rev. Macromol. Chem. Phys., C29 (2&3), p. 285-297).

Linear character for C11 and above monomers is confirmed by GPC analysis using a MALLS detector. For example, for a copolymer of propylene, the NMR should not indicate branching greater than that of the co-monomer (i.e. if the comonmer is butene, branches of greater than two carbons should not be present). For a homopolymer of propylene, the GPC should not show branches of more than one carbon atom. When a linear standard is desired for a polymer where the comomoner is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR.

In another embodiment the polymer produced by this invention has a molecular weight distribution (Mw/Mn) of at least 2, preferably at least 5, preferably at least 10, even more preferably at least 20.

In another embodiment the polymer produced may have a unimodal, bimodal, or multimodal molecular weight distribution (Mw/Mn) distribution of polymer species as determined by Size Exclusion Chromatography (SEC). By bimodal or multimodal is meant that the SEC trace has more than one peak or inflection points. An inflection point is that point where the second derivative of the curve changes in sign (e.g., from negative to positive or vice versus).

Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the curves were measured and used to determine the heat of fusion and the degree of crystallinity. The percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature.

The glass transition temperature (Tg) was measured by ASTM E 1356 using a TA Insturments model 2920 machine.

Polymer samples for $^{13}$C NMR spectroscopy were dissolved in $d_2$-1,1,2,2-tetrachloroethane and the samples were recorded at 125° C. using a NMR spectrometer of 75 or 100 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977. The percent of methylene sequences of two in length, % $(CH_2)_2$, were calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments were based on H. N. Cheng and J. A. Ewen, Makromol. Chem. 1989, 190, 1931.

Ethylene content of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+ 30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Adhesive Testing

SAFT (modified D4498) measures the ability of a bond to withstand an elevated temperature rising at 10° F. (5.5° C.)/15 min., under a constant force that pulls the bond in the shear mode. Bonds were formed in the manner described above (1 inch by 3 inch (2.5 cm×7.6 cm) (on Kraft paper). The test specimens were suspended vertically in an oven at room temperature with a 500 gram load attached to the bottom. The temperatures at which the weight fell was recorded (when the occasional sample reached temperatures above the oven capacity >265° F. (129° C.) it was terminated and averaged in with the other samples at termination temperature).

Set time is defined as the time it takes for a compressed adhesive substrate construct to fasten together enough to give substrate fiber tear when pulled apart, and thus the bond is sufficiently strong to remove the compression. The bond will likely still strengthen upon further cooling, however, it no longer requires compression. These set times were measured by placing a molten dot of adhesive on to a file folder substrate taped to a flat table. A file folder tab (1 inch by 3 inch (2.5 cm×7.6 cm) was placed upon the dot 3 seconds later and compressed with a 500 gram weight. The weight was allowed to sit for about 0.5 to about 10 seconds. The construct thus formed was pulled apart to check for a bonding level good enough to produce substrate fiber tear. The set time was recorded as the minimum time required for this good bonding to occur. Standards were used to calibrate the process.

Once a construct has been produced it can be subjected to various insults in order to assess the effectiveness of the bond. Once a bond fails to a paper substrate a simple way to quantify the effectiveness is to estimate the area of the adhesive dot that retained paper fibers as the construct failed along the bond line. This estimate is called percent substrate fiber tear. An example of good fiber, after conditioning a sample for 15 hours at −12° C. and attempting to destroy the bond, would be an estimate of 80-100% substrate fiber tear. It is likely that 0% substrate fiber tear under those conditions would signal a loss of adhesion.

Shore A hardness was measured according to ASTM 2240. An air cooled dot of adhesive was subjected to the needle and the deflection was recorded from the scale.

Dot T-Peel was determined according to ASTM D 1876, except that the specimen was produced by combining two 1 inch by 3 inch (2.54 cm×7.62 cm) substrate cut outs with a dot of adhesive with a volume that, when compressed under a 500 gram weight occupied about 1 square inch of area (1 inch=2.54 cm). Once made all the specimens were pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel.

Adhesive Melt Viscosity (ASTM D-3236) (also called "viscosity", "Brookfield viscosity", or "melt viscosity".) Melt viscosity profiles are typically measured at temperatures from 120° C. to 190° C. using a Brookfield Thermosel viscometer and a number 27 spindle.

Peel Strength (modified ASTM D1876): Substrates (1×3 inches (25×76 mm)) are heat sealed with adhesive film (5 mils (130 µm) thickness) at 135° C. for 1 to 2 seconds and 40 psi (0.28 MPa) pressure. Bond specimens were peeled back in a tensile tester at a constant crosshead speed of 2 in/min (51 mm/min). The average force required to peel the bond (5 specimens) apart is recorded.

Shear Adhesion Fail Temperature (SAFT) (modified ASTM D4498) measures the ability of the bond to withstand an elevated temperature rising at 10° F. (5.5° C.)/15 min, under a constant force that pulls the bond in the shear mode. Bonds 1 inch by 1 inch (Kraft paper) (25 mm×25 mm) were formed of adhesive by heat sealing as in procedure "(b)" above for 1.5 s. The test specimens were suspended vertically in an oven at 32° C. with a 500 g load attached to the bottom. The temperature at which the weight falls is recorded. Adhesives possessing high failure temperature are essential for the assembly of packaging goods that are often subjected to very high temperatures during storage and shipping.

Peel Adhesion Failure Temperature (PAFT) was determined using following procedure modified according to the procedure of TAPPI T814 PM-77. Two sheets of 6"×12" Kraft paper were laminated together with a one inch strip of molten adhesive heated to 177° C. The laminated sheet was trimmed and cut into 1-inch wide strips. These strips were placed in an oven with a 100-gram of weight hanging in a peel mode. The over temperature increased at a rate of 30° C. per hour. The sample were hung from a switch that trips when the samples fail to record the temperature of failure.

Low Temperature Substrate Fiber Tear: Kraft paper bonds are prepared as in procedure "(b)" above. The bond specimens are placed in a freezer or refrigerator to obtain the desired test temperature. The bonds are separated by hand and a determination made as to the type of failure observed. The amount of substrate fiber tear is expressed in percentage. "SF" indicates substrate failure.

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other.

Compression Molding: Plaques suitable for physical property testing were compression molded on a Carver hydraulic press. 6.5 g of polymer was molded between brass plates (0.05" thick) lined with Teflon™ coated aluminum foil. A 0.033" thick chase with a square opening 4"×4" was used to control sample thickness. After one minute of preheat at 170° or 180° C., under minimal pressure, the hydraulic load was gradually increased to ~10,000-15,000 lbs., at which it was held for three minutes. Subsequently the sample and molding plates were cooled for three minutes under ~10,000 to 15,000 lbs. load between the water cooled platens of the press. Plaques were allowed to equilibrate at room temperature for a minimum of two days prior to physical property testing.

Unidirectional Tensile Testing: Dogbones for tensile testing were cut from compression molded plaques using a mallet handle die. Specimen dimensions were those specified in ASTM D 1708. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Jaw separation prior to testing was 0.876", from which strains were calculated assuming affine deformation. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain.

The rheological properties (G', G") were determined on ARES instrument manufactured by Rheometric Scientific, Piscataway, N.J. The polymers were first melted and then cooled down at 1° C./min. Dynamic moduli were recorded during the cooling, starting from a temperature higher than the melting point of the material by at least 30° C. down to about 80° C. The output of the test is therefore the evolution of the storage modulus G', the loss modulus G", as well as the ratio tan δ=G"/G' as a function of temperature. Measurements were made at a constant frequency of 10 rad/s and 20 percent of strain, using a 12.5 mm diameter plate-and-plate geometry.

EXAMPLES

General

All polymerizations were performed in a liquid filled, single-stage continuous reactor using mixed metallocene catalyst systems. The reactor was a 0.5-liter stainless steel autoclave reactor and was equipped with a stirrer, a water cooling/steam heating element with a temperature controller, and a pressure controller. Solvents, propylene, and comonomers (such as butene and hexene), if present, were first purified by passing through a three-column purification system. The purification system consists of an Oxiclear column (Model # RGP-R1-500 from Labclear) followed by a 5A and a 3A molecular sieve columns. Purification columns were regenerated periodically whenever there is evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. Purified ethylene from in-house supply was fed into the manifold then the reactor through a Brookfield mass flow controller. The ethylene was delivered as a gas solubilized in the chilled solvent/monomer mixture. The purified solvents and monomers were then chilled to about −15° C. by passing through a chiller before fed into the reactor through a manifold. Solvent and monomers were mixed in the manifold and fed into reactor through a single tube. All liquid flow rates are measured using Brooksfield mass flow meters or Micro-Motion Coriolis-type flow meters.

Unless otherwise noted the catalysts compounds were obtained form Albemarle.

The catalyst compounds used to produce semi-crystalline polypropylene were rac-dimethylsilylbis(2-methyl-4-phenylindenyl)zirconium dichloride, rac-dimethylsilylbis(2-methyl-4-phenylindenyl)zirconium dimethyl, rac-dimethylsilylbis(2-methylindenyl)zirconium dimethyl, rac-dimethylsilylbis(indenyl)hafnium dimethyl, and rac-1,2-ethylene-bis(4,7-dimethylindenyl)hafnium dimethyl (obtained from Boulder Scientific Company).

The catalyst compounds used to produce amorphous polypropylene were dimethylsilyl(tetramethylcyclopentadienyl)(cyclododecylamido)titanium dichloride, dimethylsilyl (tetramethylcyclopentadienyl)(cyclododecylamido)titanium dimethyl, dimethylsilyl(tert-butylamido)(tetramethylcyclopentadienyl)titanium dimethyl (obtained from Boulder Scientific Company), [di(p-triethylsilylphenyl)methylene](cyclopentadienyl)(3,8-di-t-butylfluorenyl)hafnium dimethyl (produced according to the examples in U.S. Pat. No. 6,528, 670) and dimethylsilyl(tetramethylcylopentadienyl)(N-1-adamantyl)titanium dimethyl (produced according to the examples in U.S. Pat. No. 5,955,625).

Dimethylsilyl(tetramethylcyclopentadienyl)(cyclododecylamido)titanium dichloride was made according to the examples in U.S. Pat. No. 5,057,475. The dimethyl version was obtained by dimethylation of the dichloride version.

Rac-Dimethylsilylbis(2-methyl-4-phenylindenyl)zirconium dichloride and dimethylsilyl(tetramethylcyclopentadienyl)(cyclododecylamido)titanium dichloride were activated with MAO (methylalumoxane). Rac-1,2-ethylenebis(4,7-dimethylindenyl)hafnium dimethyl was preactivated with trityl tetrakis(pentafluorophenyl)borate (obtained from Single-Site Catalysts, LLC). The rest of the catalysts were preactivated with N,N-dimethylanilinium tetrakis(pentafluorophenyl)borate (obtained from Albemarle). For catalyst systems with preactivation, the catalysts were activated with cocatalyst at a molar ratio of 1:1 to 1:1.1 in 700 ml of toluene at least 10 minutes prior to the polymerization reaction. The catalyst systems were diluted to a concentration of catalyst ranging from 0.2 to 1.4 mg/ml in toluene. The catalyst solution was used for all polymerization runs carried out in the same day. New batch of catalyst solution was prepared in case that more than 700 ml of catalyst solution was consumed in one day. Each catalyst solution was pumped through separate lines. Catalysts were mixed in a manifold, and then fed into the reactor through a single line. In methylalumoxane activated systems, 280 ml of methylalumoxane (MAO, 10 wt. % in toluene, from Albemarle) was diluted in 1000 ml of toluene, and the solution was stored in a 5-liter stainless cylinder. Catalysts were diluted to a concentration ranging from 0.2 to 1.4 mg/ml in toluene. Each catalyst solution and the methylalumoxane solution were pumped through separate lines. Catalysts and MAO were mixed in a manifold, and then fed into the reactor through a single line. The connecting tube between the catalyst manifold and reactor inlet was about 1 meter long.

All catalyst solutions were kept in an inert atmosphere with <1.5 ppm water content and fed into reactor by metering pumps. Catalyst and monomer contacts took place in the reactor. Catalyst pumps were calibrated periodically using toluene as the calibrating medium. Catalyst concentration in the feed was controlled through changing the catalyst concentration in catalyst solution and/or changing in the pumping rate of catalyst solution. The pumping rate of catalyst solution varied in a range of 0.2 to 5 ml/minute.

As an impurity scavenger, 55 ml of tri-iso-butyl aluminum (25 wt. % in toluene, Akzo Noble) was diluted in 22.83 kilogram of hexane. The diluted tri-iso-butyl aluminum solution was stored in a 37.9-liter cylinder under nitrogen blanket. The solution was used for all polymerization runs until about 90% of consumption, then a new batch was prepared. Pumping rates of the tri-iso-butyl aluminum solution varies from polymerization reaction to reaction, ranging from 0 (no scavenger) to 4 ml per minutes.

For polymerization reactions involving alpha, omega-dienes, 1,9-decadiene was diluted to a concentration ranging from 4.8 to 9.5 vol. % in toluene. The diluted solution was then fed into reactor by a metering pump through a comonomer line. (The 1,9-decadiene was obtained from Aldrich and was purified by first passing through alumina activated at high temperature under nitrogen, followed by molecular sieve activated at high temperature under nitrogen.)

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and system reached equilibrium, the reactor was lined out by continuing operating the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of 2.41 MPa-g and in the temperature range of 45 to 130° C.

Examples 1-4

Four samples were made with rac-dimethylsilylbis(2-methyl-4-phenylindenyl)zirconium dimethyl and dimethylsilyl (tetramethylcyclopentadienyl)(cyclododecylamido)titanium dimethyl at a temperature 115° C. over a range of catalyst ratios. The polymerization reactions followed the general procedure described above. The detailed experimental conditions and results are presented in Table 1.

TABLE 1

| | Example | | | |
| --- | --- | --- | --- | --- |
| | 1 | 2 | 3 | 4 |
| Catalyst #1 | A | A | A | A |
| Catalyst #1 feed rate (mole/min) | 4.83E−06 | 3.66E−06 | 3.00E−06 | 2.68E−06 |
| Catalyst #2 | B | B | B | B |
| Catalyst #2 feed rate (mole/min) | 3.64E−07 | 3.64E−07 | 3.64E−07 | 3.64E−07 |
| Propylene feed rate (g/min) | 14 | 14 | 14 | 14 |
| Hexane feed rate (ml/min) | 90 | 90 | 90 | 90 |
| Polymerization temp (° C.) | 115 | 115 | 115 | 115 |
| Mn (kg/mol) | 19.1 | 18.2 | 16.4 | 16.9 |
| Mw (kg/mol) | 31 | 28.3 | 25.7 | 26.7 |
| Mz (kg/mol) | 66.1 | 52.4 | 46.9 | 53.1 |
| g' @ Mz | 1.02 | 0.99 | 0.96 | 0.9 |
| Tc (° C.) | 90.5 | 98.8 | 97.7 | 97.1 |
| Tm (° C.) | 140.5 | 143.2 | 143.8 | 142.8 |
| Tg (° C.) | −17.7 | −10.4 | −10.4 | −11.3 |
| Heat of fusion (J/g) | 21.7 | 25.7 | 34.7 | 35.1 |
| Viscosity @ 190° C. (cps) | 1540 | 1340 | 1240 | 798 |
| Conversion (%) | 95.3 | 89.6 | 87.1 | 92.8 |

TABLE 1-continued

|  | Example | | | |
|---|---|---|---|---|
|  | 1 | 2 | 3 | 4 |
| Catalyst activity (kg polymer/g catalyst) | 5.7 | 6.9 | 8.0 | 9.4 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 5-8

Four samples were made with rac-dimethylsilylbis(2-methyl-4-phenylindenyl)zirconium dimethyl and dimethylsilyl (tetramethylcyclopentadienyl)(t-butylamido)titanium dimethyl at a temperature of 100° C. over a range of catalyst ratio. The polymerization reactions followed the general procedure described above. The detailed experimental conditions and results are presented in Table 2.

TABLE 2

|  | Example | | | |
|---|---|---|---|---|
|  | 5 | 6 | 7 | 8 |
| Catalyst #1 | F | F | F | F |
| Catalyst #1 feed rate (mole/min) | 4.92E−06 | 4.92E−06 | 4.92E−06 | 4.92E−06 |
| Catalyst #2 | B | B | B | B |
| Catalyst #2 feed rate (mole/min) | 5.67E−07 | 8.50E−07 | 1.13E−06 | 1.42E−06 |
| Propylene feed rate (g/min) | 14 | 14 | 14 | 14 |
| Hexane feed rate (ml/min) | 90 | 90 | 90 | 90 |
| Polymerization temperature (° C.) | 100 | 100 | 100 | 100 |
| Mn (kg/mol) | 12.1 | 11.9 | 8.8 | 12.4 |
| Mw (kg/mol) | 29.4 | 30.7 | 26.3 | 28 |
| Mz (kg/mol) | 84.3 | 81.6 | 80.7 | 84.7 |
| g' @ Mz | 0.93 | 0.88 | 0.87 | 0.84 |
| Tc (° C.) | 95.8 | 98.4 | 96.1 | 95.8 |
| Tm (° C.) | 145.2 | 145.7 | 143.3 | 143.0 |
| Tg (° C.) | −9.6 | −10.4 | −11.1 | −10.0 |
| Heat of fusion (J/g) | 21.4 | 32.4 | 30.0 | 33.0 |
| Viscosity @ 190° C. (cps) | 1100 | 1040 | 840 | 675 |
| Conversion (%) | 88.63 | 91.73 | 68.09 | 77.23 |
| Catalyst activity (kg polymer/g catalyst) | 6.38 | 6.08 | 4.18 | 4.42 |

Catalysts:
B = rac-dimethylsilyl bis(2-methyl-4-phenylindenyl) zirconium dimethyl
F = dimethylsilyl(tetramethylcyclopentadienyl)(tert-butylamido) titanium dimethyl Examples 9-15

Seven samples were made with dimethylsilylbis(indenyl) hafnium dimethyl and dimethylsilyl(tetramethylcyclopentadienyl)(cyclododecylamido)titanium dimethyl at a catalyst ratio of about 80.0 molar percent over a range of temperatures. The polymerization reactions followed the general procedure described above. The detailed experimental conditions and results are presented in Table 3. The data show that temperature has appreciable effects on crystallinity, Mw, Mw/Mn, and level of branching. The population can also be manipulated through reaction temperatures since the reaction kinetics of each catalyst has unique response to polymerization temperatures.

TABLE 3

|  | Example | | | | | | |
|---|---|---|---|---|---|---|---|
|  | 9 | 10 | 11 | 12 | 13 | 14 | 15 |
| Catalyst #1 | A | A | A | A | A | A | A |
| Catalyst #1 feed rate (mole/min) | 5.22E−06 | 5.22E−06 | 5.22E−06 | 5.22E−06 | 5.22E−06 | 5.22E−06 | 5.22E−06 |
| Catalyst #2 | C | C | C | C | C | C | C |
| Catalyst #2 feed rate (mole/min) | 1.31E−06 | 1.31E−06 | 1.31E−06 | 1.31E−06 | 1.31E−06 | 1.31E−06 | 1.31E−06 |
| Propylene feed rate (g/min) | 14 | 14 | 14 | 14 | 14 | 14 | 14 |
| Hexane feed rate (ml/min) | 90 | 90 | 90 | 90 | 90 | 90 | 90 |
| Polymerization temperature (° C) | 110 | 105 | 100 | 95 | 90 | 85 | 80 |
| Mn (kg/mol) | 8.5 | 8.2 | 9.8 | 11.1 | 22.5 | 26.6 | 30.9 |
| Mw (kg/mol) | 15.7 | 17.1 | 19.8 | 23.5 | 41.1 | 46.9 | 55.8 |
| Mz (kg/mol) | 30.6 | 37.9 | 42.2 | 40.4 | 79.8 | 84.8 | 95.5 |
| g' @Mz | 1 | 0.97 | 0.95 | 0.97 | 0.98 | 0.97 | 0.98 |
| Tc (° C.) | 22.8 | 31.6 | 40.5 | 47.8 | 53.5 | 61.0 | 64.8 |
| Tm (° C.) | 74.7 | 82.3 | 87.4 | 94.3 | 103.3 | 107.7 | 113.7 |
| Tg (° C.) | −15.5 | −13.0 | −12.0 | −10.0 | −7.5 | −7.5 | −6.0 |
| Heat of fusion (J/g) | 14.4 | 16.6 | 21.5 | 26.0 | 21.0 | 27.8 | 26.7 |
| Viscosity @ 190° C. (cps) | 227 | 272 | 441 | 813 | 5280 | 7250 | 15400 |

Catalysts:
A = dimethylsilyl (tetramethylcyclopentadienyl) (cyclododecylamido) titanium dimethyl
C = rac-dimethylsilyl bis (indenyl) hafnium dimethyl

Examples 16-19

Four samples were made with rac-dimethylsilylbis(indenyl)hafnium dimethyl and dimethylsilyl(tetramethylcyclopentadienyl)(cyclododecylamido)titanium dimethyl at a temperature of 100° C. and various catalyst ratios. The polymerization reactions followed the general procedure described above. The detailed experimental conditions and results are presented in Table 4. The data show that catalyst ratios have appreciable effects on crystallinity, Mw, Mw/Mn, and level of branching. The population can also be manipulated through reaction temperatures since the reaction kinetics of each catalyst has unique response to polymerization temperatures.

TABLE 4

| | Example | | | |
|---|---|---|---|---|
| | 16 | 17 | 18 | 19 |
| Catalyst #1 | A | A | A | A |
| Catalyst #1 feed rate (mole/min) | 8.49E−07 | 8.49E−07 | 8.49E−07 | 8.49E−07 |
| Catalyst #2 | C | C | C | C |
| Catalyst #2 feed rate (mole/min) | 5.51E−07 | 8.26E−07 | 1.28E−06 | 1.93E−06 |
| Propylene feed rate (g/min) | 14 | 14 | 14 | 14 |
| Hexane feed rate (ml/min) | 90 | 90 | 90 | 90 |
| Polymerization temperature (° C.) | 100 | 100 | 100 | 100 |
| Mn (kg/mol) | 17.1 | 14.1 | 9.6 | 7.3 |
| Mw (kg/mol) | 28 | 20.7 | 14.3 | 10.6 |
| Mz (kg/mol) | 65 | 37.6 | 24.9 | 18.2 |
| g' @ Mz | 1.05 | 0.97 | 0.92 | 0.94 |
| Tc (° C.) | 61.2 | 55.2 | 30.8 | 28.8 |
| Tm (° C.) | 107.3 | 97.6 | 76.9 | 64.3 |
| Tg (° C.) | −8.9 | −14.5 | −15.3 | −14.6 |
| Heat of fusion (J/g) | 29.9 | 31.2 | 19.9 | 7.6 |
| Viscosity @ 190° C. (cps) | 1355 | 412 | 165 | 87 |
| Conversion (%) | 86.20 | 91.89 | 100.56 | 97.90 |
| Catalyst activity (kg polymer/g catalyst) | 18.74 | 16.49 | 13.97 | 10.34 |

Catalysts:
A = dimethylsilyl (tetramethylcyclopentadienyl) (cyclododecylamido) titanium dimethyl
C = rac-dimethylsilyl bis (indenyl) hafnium dimethyl

Examples 20-34

Fifteen samples were made with rac-dimethylsilylbis(2-methyl-4-phenylindenyl)zirconium dimethyl and dimethylsilyl(tetramethylcyclopentadienyl)(cyclododecylamido)titanium dimethyl catalysts, following the general procedure described above with the exception that a small quantity of 1,9-decadiene was fed as the diolefin monomer along with propylene as the alpha-olefin monomer. The detailed experimental conditions and results are presented in Tables 5 and 6.

TABLE 5

| | Example | | | | |
|---|---|---|---|---|---|
| | 20 | 21 | 22 | 23 | 24 |
| Catalyst #1 | A | A | A | A | A |
| Catalyst #1 feed rate (mole/min) | 6.53E−06 | 6.53E−06 | 6.53E−06 | 6.53E−06 | 6.53E−06 |
| Catalyst #2 | B | B | B | B | B |
| Catalyst #2 feed rate (mole/min) | 6.92E−07 | 3.64E−07 | 3.64E−07 | 2.19E−07 | 2.19E−07 |
| Propylene feed rate (g/min) | 14 | 14 | 14 | 8.3 | 10 |
| 1,9 decadiene feed rate (ml/min) | 0.19 | 0.19 | 0.19 | 0.13 | 0.13 |
| Hexane feed rate (ml/min) | 90 | 90 | 90 | 90 | 90 |
| Polymerization temperature (° C.) | 120 | 125 | 120 | 120 | 110 |
| Mn (kg/mol) | 15.6 | 14.7 | 14.3 | — | — |
| Mw (kg/mol) | 23 | 24.6 | 29.5 | — | — |
| Mz (kg/mol) | 55.2 | 64.2 | 85 | — | — |
| g' @ Mz | 0.85 | 0.91 | 0.85 | — | — |
| Tc (° C.) | 86.5 | 91.8 | 91.8 | 86.5 | 87.6 |
| Tm (° C.) | 116.6 | 128.7 | 129.7 | 128.8 | 137.6 |
| Tg (° C.) | −10.6 | −11.1 | −9.7 | −9.4 | −7.5 |
| Heat of fusion (J/g) | 31.8 | 32.1 | 26.0 | 17.0 | 19.4 |
| Viscosity @ 190° C. (cps) | 721 | 725 | 1240 | 448 | 2240 |
| Conversion (%) | 93.32 | 77.57 | 81.12 | 77.49 | 85.13 |
| Catalyst activity (kg polymer/g catalyst) | 4.00 | 3.54 | 3.70 | 2.15 | 2.85 |

| | Example | | | | |
|---|---|---|---|---|---|
| | 25 | 26 | 27 | 28 | 29 |
| Catalyst #1 | A | A | A | A | A |
| Catalyst #1 feed rate (mole/min) | 5.22E−06 | 5.22E−06 | 5.22E−06 | 6.53E−06 | 6.53E−06 |
| Catalyst #2 | B | B | B | B | B |
| Catalyst #2 feed rate (mole/min) | 7.65E−07 | 7.65E−07 | 7.65E−07 | 2.19E−07 | 4.74E−07 |

TABLE 5-continued

| | | | | | |
|---|---|---|---|---|---|
| Propylene feed rate (g/min) | 14 | 14 | 14 | 10 | 14 |
| 1,9 decadiene feed rate (ml/min) | 0.24 | 2.24 | 0.19 | 0.13 | 0.19 |
| Hexane feed rate (ml/min) | 90 | 90 | 90 | 90 | 90 |
| Polymerization temperature (° C.) | 115 | 117 | 110 | 125 | 115 |
| Mn (kg/mol) | 20 | | 23 | | 17.3 |
| Mw (kg/mol) | 36.7 | | 45.5 | | 34.5 |
| Mz (kg/mol) | 111.9 | | 104 | | 97.1 |
| g' @ Mz | 0.68 | | 0.75 | | 0.75 |
| Tc (° C.) | 91.1 | 87.0 | 96.8 | 77.3 | 88.5 |
| Tm (° C.) | 136.6 | 133.7 | 134.2 | 130.0 | 136.3 |
| Tg (° C.) | −9.6 | −10.7 | −9.7 | −11.2 | −12.4 |
| Heat of fusion (J/g) | 51.5 | 39.5 | 42.5 | 15.1 | 35.8 |
| Viscosity @ 190° C. (cps) | 880 | 518 | 1850 | 661 | 1040 |
| Conversion (%) | 92.20 | 89.30 | 96.84 | 80.62 | 91.15 |
| Catalyst activity (kg polymer/g catalyst) | 4.72 | 4.57 | 4.96 | 2.70 | 4.07 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl

TABLE 6

| | Example | | | | |
|---|---|---|---|---|---|
| | 30 | 31 | 32 | 33 | 34 |
| Catalyst #1 | A | A | A | A | A |
| Catalyst #1 feed rate (mole/min) | 1.02E−06 | 5.22E−06 | 6.53E−06 | 6.53E−06 | 6.53E−06 |
| Catalyst #2 | B | B | B | B | B |
| Catalyst #2 feed rate (mole/min) | 1.13E−07 | 7.65E−07 | 4.74E−07 | 6.20E−07 | 3.64E−07 |
| Propylene feed rate (g/min) | 14 | 14 | 14 | 14 | 14 |
| 1,9 decadiene feed rate (ml/min) | 0.19 | 0.24 | 0.19 | 0.19 | 0.19 |
| Hexane feed rate (ml/min) | 90 | 90 | 90 | 90 | 90 |
| Polymerization temperature (° C.) | 115 | 115 | 110 | 110 | 115 |
| Mn (kg/mol) | 20.3 | 14.9 | 13.6 | 16.1 | 17.6 |
| Mw (kg/mol) | 96.2 | 34.3 | 30.2 | 30.4 | 36.5 |
| Mz (kg/mol) | 636.2 | 114.8 | 67.6 | 68.7 | 91.5 |
| g' @ Mz | 0.46 | 0.72 | 0.95 | 0.88 | 0.85 |
| Tc (° C.) | | 91.4 | 91.8 | 94.3 | 84.4 |
| Tm (° C.) | | 129.3 | 140.5 | 140.6 | 137.2 |
| Tg (° C.) | | −10.0 | −11.2 | −8.9 | −8.2 |
| Heat of fusion (J/g) | | 46.9 | 28.3 | 38.4 | 20.8 |
| Viscosity @ 190° C. (cps) | | 1030 | 1870 | 1360 | 2470 |
| Conversion (%) | 56.38 | 95.32 | 97.29 | 97.24 | 87.82 |
| Catalyst activity (kg polymer/g catalyst) | 15.44 | 4.88 | 4.34 | 4.23 | 4.00 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl

Examples 35-39

Five samples were made with dimethylsilylbis(indenyl) hafnium dimethyl and dimethylsilyl(tetramethylcyclopentadienyl)(cyclododecylamido)titanium dimethyl at a catalyst ratio of 75 mol. % and over a range of temperatures from 85 to 105° C., following the general procedure described above with the exception that a small quantity of 1,9-decadiene was fed as the diolefin monomer along with propylene as the alpha-olefin monomer. The detailed experimental conditions and results are presented in Table 7.

TABLE 7

| | Example | | | | |
|---|---|---|---|---|---|
| | 35 | 36 | 37 | 38 | 39 |
| Catalyst #1 | A | A | A | A | A |
| Catalyst #1 feed rate (mole/min) | 5.22E−06 | 5.22E−06 | 5.22E−06 | 5.22E−06 | 5.22E−06 |
| Catalyst #2 | C | C | C | C | C |
| Catalyst #2 feed rate (mole/min) | 1.75E−06 | 1.75E−06 | 1.75E−06 | 1.75E−06 | 1.75E−06 |
| Propylene feed rate (g/min) | 14 | 14 | 14 | 14 | 14 |
| 1,9 decadiene feed rate (ml/min) | 0.24 | 0.24 | 0.24 | 0.24 | 0.24 |
| Hexane feed rate (ml/min) | 90 | 90 | 90 | 90 | 90 |
| Polymerization temperature (° C.) | 105 | 100 | 95 | 90 | 85 |
| Mn (kg/mol) | 9.6 | 15.7 | 14.1 | 15.2 | 29.3 |
| Mw (kg/mol) | 16.5 | 24.6 | 30 | 40.4 | 69.1 |
| Mz (kg/mol) | 33.4 | 48.4 | 70.7 | 103.1 | 222.6 |
| g' @ Mz | 0.89 | 0.81 | 0.8 | 0.76 | 0.66 |
| Tc (° C.) | 25.2 | 29.4 | 30.9 | 41.8 | 53.5 |
| Tm (° C.) | 67.3 | 76.1 | 81.2 | 91.3 | 102.3 |
| Tg (° C.) | −15.4 | −13.3 | −13.1 | −8.1 | −7.4 |
| Heat of fusion (J/g) | 13.4 | 19.5 | 20.9 | 25.7 | 33.3 |
| Viscosity @ 190° C. (cps) | 194 | 291 | 568 | 1650 | 5210 |

Catalysts:
A = dimethylsilyl (tetramethylcyclopentadienyl) (cyclododecylamido) titanium dimethyl
C = rac-dimethylsilyl bis (indenyl) hafnium dimethyl

Examples 40-43

Four samples were made with rac-dimethylsilylbis(indenyl)hafnium dimethyl and dimethylsilyl(tetramethylcyclopentadienyl)(cyclododecylamido)titanium dimethyl, following the general procedure described above with the exception that a small quantity of 1,9-decadiene was fed as the diolefin monomer along with propylene as the alpha-olefin monomer. The detailed experimental conditions and results are presented in Table 8.

TABLE 8

| | Example | | | |
|---|---|---|---|---|
| | 40 | 41 | 42 | 43 |
| Catalyst #1 | A | A | A | A |
| Catalyst #1 feed rate (mole/min) | 8.49E−07 | 8.49E−07 | 8.49E−07 | 5.22E−06 |
| Catalyst #2 | C | C | C | C |
| Catalyst #2 feed rate (mole/min) | 8.26E−07 | 5.51E−07 | 5.51E−07 | 5.82E−07 |
| Propylene feed rate (g/min) | 14 | 14 | 14 | 14 |
| 1,9 decadiene feed rate (ml/min) | 0.05 | 0.02 | 0.05 | 0.19 |
| Hexane feed rate (ml/min) | 90 | 90 | 86 | 90 |
| Polymerization temperature (° C.) | 100 | 95 | 90 | 95 |
| Mn (kg/mol) | 10.5 | 16.1 | 23 | 28.3 |
| Mw (kg/mol) | 19.5 | 24.4 | 39.4 | 94.8 |
| Mz (kg/mol) | 38 | 44.3 | 71.3 | 455.2 |
| g' @ Mz | 0.92 | 0.93 | 0.93 | 0.54 |
| Tc (° C.) | 47.7 | 53.7 | 71.0 | 37.4 |
| Tm (° C.) | 94.4 | 98.6 | 112.5 | 101.2 |
| Tg (° C.) | −12.3 | −11.1 | −24.6 | −10.3 |
| Heat of fusion (J/g) | 30.8 | 31.6 | 44.6 | 22.4 |
| Viscosity @ 190° C. (cps) | 327 | 625 | 2370 | — |
| Conversion (%) | 93.80 | — | 98.62 | — |
| Catalyst activity (kg polymer/g catalyst) | 16.83 | — | 21.44 | — |

Catalysts:
A = dimethylsilyl (tetramethylcyclopentadienyl) (cyclododecylamido) titanium dimethyl
C = rac-dimethylsilyl bis (indenyl) hafnium dimethyl

Examples 44-47

Four samples were made using rac-1,2-ethylene-bis(4,7-dimethylindenyl)hafnium dimethyl and dimethylsilyl-(tetramethylcyclopentadienyl)(cyclododecylamido)titanium dimethyl at a temperature 110° C. over a range of catalyst ratios. The conditions used for examples 44 to 47, which included diolefin incorporation, followed the general procedure described above with the exception that a small quantity of 1,9-decadiene was fed as the diolefin monomer along with propylene as the alpha-olefin monomer. The detailed experimental conditions and results are presented in Table 9.

TABLE 9

| | Example | | | |
|---|---|---|---|---|
| | 44 | 45 | 46 | 47 |
| Catalyst #1 | A | A | A | A |
| Catalyst #1 feed rate (mole/min) | 6.53E−06 | 3.79E−06 | 2.74E−06 | 2.09E−06 |
| Catalyst #2 | D | D | D | D |
| Catalyst #2 feed rate (mole/min) | 4.25E−07 | 4.25E−07 | 4.25E−07 | 4.25E−07 |
| Propylene feed rate (g/min) | 14 | 14 | 14 | 14 |
| 1,9 decadiene feed rate (ml/min) | 0.09 | 0.09 | 0.09 | 0.09 |
| Hexane feed rate (ml/min) | 90 | 90 | 90 | 90 |
| Polymerization temperature (° C.) | 115 | 115 | 115 | 115 |
| Mn (kg/mol) | 21.5 | 20 | 21.2 | 16.1 |
| Mw (kg/mol) | 36.2 | 32.7 | 34 | 33.5 |
| Mz (kg/mol) | 100.1 | 95.6 | 123.7 | 128.8 |
| Tc (° C.) | 41.0 | 51.5 | 59.8 | 74.4 |
| Tm (° C.) | 94.3 | 97.6 | 103.4 | 109.4 |
| Tg (° C.) | −22.8 | −23.8 | −12.5 | −18.9 |
| Heat of fusion (J/g) | 4.1 | 6.8 | 11.3 | 15.8 |
| Viscosity @ 190° C. (cps) | 2090 | 1750 | 1570 | 1230 |
| Conversion (%) | 83.58 | 83.95 | 71.84 | 63.10 |
| Catalyst activity (kg polymer/g catalyst) | 3.80 | 6.26 | 7.08 | 7.78 |

Catalysts:
A = dimethylsilyl (tetramethylcyclopentadienyl) (cyclododecylamido) titanium dimethyl
D = rac-1,2-ethylene bis (4,7-dimethylindenyl)hafnium dimethyl Examples 48-51

Four samples were made with rac-dimethylsilylbis(2-methylindenyl)zirconium dimethyl and dimethylsilyl(tetramethylcyclopentadienyl)(cyclododecylamido)titanium dimethyl at a temperature of 80° C. and over a range of catalyst ratios from 74 to 84 mol. %, following the general procedure described above with the exception that a small quantity of 1,9-decadiene was fed as the diolefin monomer along with propylene as the alpha-olefin monomer. The detailed experimental conditions and results are presented in Table 10.

TABLE 10

| | Example | | | |
|---|---|---|---|---|
| | 48 | 49 | 50 | 51 |
| Catalyst #1 | A | A | A | A |
| Catalyst #1 feed rate (mole/min) | 6.53E−06 | 6.53E−06 | 6.53E−06 | 6.53E−06 |
| Catalyst #2 | E | E | E | E |
| Catalyst #2 feed rate (mole/min) | 1.23E−06 | 1.57E−06 | 1.92E−06 | 2.26E−06 |
| Propylene feed rate (g/min) | 14 | 14 | 14 | 14 |
| 1,9 decadiene feed rate (ml/min) | 0.14 | 0.14 | 0.14 | 0.14 |
| Hexane rate (ml/min) | 90 | 90 | 90 | 90 |
| Polymerization temperature (° C.) | 80 | 80 | 80 | 80 |
| Mn (kg/mol) | 19.9 | 16 | 11.4 | 10 |
| Mw (kg/mol) | 43.8 | 36.9 | 25.9 | 19.2 |
| Mz (kg/mol) | 106.3 | 72.3 | 54.5 | 38.8 |
| g' @ Mz | 0.88 | 0.93 | 0.93 | 0.93 |
| Tc (° C.) | 49.0 | 53.3 | 58.6 | 53.1 |
| Tm (° C.) | 109.9 | 107.8 | 103.2 | 102.0 |
| Tg (° C.) | −10.7 | −7.4 | −9.1 | −9.6 |
| Heat of fusion (J/g) | 25.8 | 29.4 | 31.4 | 37.7 |
| Viscosity @ 190° C. (cps) | 4680 | 2040 | 952 | 464 |

Catalysts:
A = dimethylsilyl (tetramethylcyclopentadienyl) (cyclododecylamido) titanium dimethyl
E = rac-dimethylsily bis(2-methylindenyl)zirconium dimethyl Examples 52-57

Six samples were made with rac-dimethylsilylbis(2-methyl-4-phenylindenyl)zirconium dimethyl and dimethylsilyl-(tetramethylcyclopentadienyl)(cyclododecylamido)titanium dimethyl at a temperature range of 80 to 95° C. and a catalyst ratio of about 87 molar percent, following the general procedure described above with the exception that (1) a small quantity of 1,9-decadiene was fed as the diolefin monomer along with propylene as the alpha-olefin monomer; (2) A small amount of hydrogen was also fed in the reactor. The detailed experimental conditions and results are presented in Table 11. Examples 52-57 show that addition of hydrogen can effectively manipulate Mw, Mw/Mn, crystallinity, the ratio of crystalline phase to the amorphous phase, in addition to the control obtained through catalyst selections and process conditions such as temperatures.

TABLE 11

| | Example | | | | | |
|---|---|---|---|---|---|---|
| | 52 | 53 | 54 | 55 | 56 | 57 |
| Catalyst #1 | A | A | A | A | A | A |
| Catalyst #1 feed rate (mole/min) | 6.10E−06 | 6.10E−06 | 6.10E−06 | 6.10E−06 | 6.10E−06 | 6.10E−06 |
| Catalyst #2 | B | B | B | B | B | B |
| Catalyst #2 feed rate (mole/min) | 2.83E−07 | 2.83E−07 | 2.83E−07 | 2.83E−07 | 1.98E−07 | 1.98E−07 |
| Propylene (g/min) | 14 | 14 | 14 | 14 | 14 | 14 |
| 1,9 decadiene feed rate (ml/min) | 0.19 | 0.19 | 0.19 | 0.19 | 0.19 | 0.19 |
| H2 feed rate (cc/min) | 50 | 50 | 50 | 50 | 70 | 70 |

TABLE 11-continued

|  | Example | | | | | |
|---|---|---|---|---|---|---|
|  | 52 | 53 | 54 | 55 | 56 | 57 |
| Hexane feed rate (ml/min) | 90 | 90 | 90 | 90 | 90 | 90 |
| Polymerization temperature (° C.) | 95 | 90 | 85 | 80 | 90 | 80 |
| Mn (kg/mol) | 12.6 | 11 | 12.5 | 15.7 | 18.1 | 11.7 |
| Mw (kg/mol) | 27.5 | 43.2 | 42.3 | 85.3 | 34 | 29.8 |
| Mz (kg/mol) | 72.2 | 127 | 153.4 | 468.3 | 126 | 99 |
| g' @ Mz | 0.82 | 0.74 | 0.8 | 0.66 | 0.8 | 0.84 |
| Tc (° C.) | 95.7 | 95.8 | 97.4 | 97.0 | 98.9 | 97.7 |
| Tm (° C.) | 141.0 | 145.1 | 145.8 | 147.0 | 144.5 | 145.1 |
| Tg (° C.) | −14.6 | −13.3 | −12.3 | −9.8 | −17.2 | −14.8 |
| Heat of fusion (J/g) | 38.5 | 45.4 | 35.9 | 35.4 | 49.3 | 39.2 |
| Viscosity @ 190° C. (cps) | 668 | 1049 | 2148 | 16090 | 810 | 822 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 58-60

Three samples were made with rac-dimethylsilylbis(2-methyl-4-phenylindenyl)zirconium dimethyl and dimethylsilyl (tetramethylcyclopentadienyl)(cyclododecylamido)titanium dimethyl at a temperature 115° C. and a catalyst ratio of about 87 molar percent, following the general procedure described above with the following exceptions: (1) a small quantity of 1,9-decadiene was fed as the diolefin monomer; (2) both rac-dimethylsilylbis(2-methyl-4-phenylindenyl)zirconium dimethyl and dimethylsilyl(tetramethylcyclopentadienyl) (cyclododecylamido)titanium dimethyl catalysts were pre-mixed and diluted in toluene, then fed into catalyst manifold without preactivation; (3) N,N-dimethylanilinium tetrakis (pentafluorophenyl)borate was diluted in toluene and then fed into catalyst manifold; (4) catalyst activation started in catalyst manifold. The detailed experimental conditions and results are presented in Table 12. Examples 58-60 demonstrate that catalysts can be activated in-line just prior to the reactor and in reactor.

TABLE 12

|  | Example | | |
|---|---|---|---|
|  | 58 | 59 | 60 |
| Catalyst #1 | A | A | A |
| Catalyst #1 feed rate (mole/min) | 4.06E−06 | 2.54E−06 | 1.52E−06 |
| Catalyst #2 | B | B | B |
| Catalyst #2 feed rate (mole/min) | 2.95E−07 | 1.84E−07 | 1.11E−07 |
| Propylene (g/min) | 14 | 14 | 14 |
| 1,9 decadiene feed rate (ml/min) | 0.14 | 0.14 | 0.14 |
| Hexane feed rate (ml/min) | 90 | 90 | 90 |
| Polymerization temperature (° C.) | 115 | 115 | 115 |

TABLE 12-continued

|  | Example | | |
|---|---|---|---|
|  | 58 | 59 | 60 |
| Mn (kg/mol) | 13.2 | 18.2 | 24.2 |
| Mw (kg/mol) | 34.5 | 50.8 | 69.9 |
| Mz (kg/mol) | 99.6 | 169 | 248.6 |
| g' @ Mz | 0.79 | 0.72 | 0.69 |
| Tc (° C.) | 90.6 | 92.9 | 93.0 |
| Tm (° C.) | 137.0 | 139.6 | 142.6 |
| Tg (° C.) | −10.8 | −10.0 | −8.7 |
| Heat of fusion (J/g) | 32.5 | 32.9 | 28.4 |
| Viscosity @ 190° C. (cps) | 1657 | 3170 | 11600 |
| Conversion (%) | 89.64 | 77.50 | 95.59 |
| Catalyst activity (kg polymer/g catalyst) | 6.43 | 8.90 | 18.29 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 61-66

Six samples were made with dimethylsilylbis(2-methyl-4-phenylindenyl)zirconium dimethyl and dimethylsilyl(tetramethylcyclopentadienyl)(cyclododecylamido)titanium dimethyl at a temperature range of 105 to 130° C. and a catalyst ratio of about 84.6 molar percent, following the general procedure described above with the following exceptions: (1) a small quantity of 1,9-decadiene was fed as the diolefin monomer; (2) ethylene was added to the reactor. The detailed experimental conditions and results are presented in Table 13. Ethylene content in the polymer was obtained from by Fourier Transformation Infrared analysis (FTIR).

TABLE 13

|  | Example | | | | | |
|---|---|---|---|---|---|---|
|  | 61 | 62 | 63 | 64 | 65 | 66 |
| Catalyst #1 | A | A | A | A | A | A |
| Catalyst #1 feed rate (mole/min) | 1.02E−06 | 1.02E−06 | 1.02E−06 | 1.02E−06 | 1.02E−06 | 1.02E−06 |
| Catalyst #2 | B | B | B | B | B | B |

TABLE 13-continued

|  | Example | | | | | |
| --- | --- | --- | --- | --- | --- | --- |
|  | 61 | 62 | 63 | 64 | 65 | 66 |
| Catalyst #2 feed rate (mole/min) | 1.84E−07 | 1.84E−07 | 1.84E−07 | 1.84E−07 | 1.84E−07 | 1.84E−07 |
| Propylene feed rate (g/min) | 20 | 20 | 20 | 20 | 20 | 20 |
| 1,9 decadiene feed rate (ml/min) | 0.186 | 0.186 | 0.186 | 0.186 | 0.186 | 0.186 |
| Ethlyene feed rate (SLPM) | 0.2 | 0.2 | 0.2 | 0.2 | 0.2 | 0.2 |
| Hexane feed rate (ml/min) | 90 | 90 | 90 | 90 | 90 | 90 |
| Polymerization temperature (° C.) | 130 | 125 | 120 | 115 | 110 | 105 |
| Mn (kg/mol) | 13.1 | 12.3 | 11.8 | 15.1 | 15.3 | 17.7 |
| Mw (kg/mol) | 37.3 | 36.2 | 40.5 | 47.7 | 45.2 | 53.8 |
| Mz (kg/mol) | 149.2 | 122 | 132.1 | 153.9 | 206.8 | 180.7 |
| g' @ Mz | 0.67 | 0.65 | 0.63 | 0.61 | 0.56 | 0.56 |
| Tc (° C.) | 80.4 | 79.6 | 84.6 | 85.5 | 87.7 | 86.6 |
| Tm (° C.) | 121.8 | 121.9 | 124.6 | 125.2 | 126.1 | 126.2 |
| Tg (° C.) | −15.0 | −15.2 | −14.9 | −14.8 | −15.0 | −15.6 |
| Heat of fusion (J/g) | 32.4 | 43.3 | 51.7 | 50.5 | 50.4 | 49.7 |
| Viscosity @ 190° C. (cps) | 1440 | 977 | 1090 | 1510 | 1530 | 1720 |
| Ethylene content from FTIR (wt. %) | 4.3 | 3.5 | 3 | 2.6 | 2.9 | 2.9 |
| Conversion (%) | 68.11 | 82.57 | 89.87 |  | 92.79 | 92.18 |
| Catalyst activity (kg polymer/g catalyst) | 24.92 | 30.21 | 32.88 |  | 33.95 | 33.73 |

Catalysts:
A = dimethylsilyl (tetramethylcyclopentadienyl) (cyclododecylamido) titanium dimethyl
B = rac-dimethylsilyl bis(2-methyl-4-phenylindenyl) zirconium dimethyl Examples 67-71

All these samples were made with dimethylsilylbis(2-methyl-4-phenylindenyl)zirconium dimethyl and dimethylsilyl (tetramethylcyclopentadienyl)(cyclododecylamido)titanium dimethyl at a temperature range of 105 to 115° C. except example 69, following the general procedure described above with the following exceptions: (1) a small quantity of dicyclopentadiene was used in example 67 (The dicyclopentadiene, obtained from aldrich, was first dissolved in toluene. The solution was then purified by passing through alumina activated at high temperature under nitrogen, followed by molecular sieve activated at high temperature under nitrogen.); (2) 1-butene was used in examples 68 and 70; (3) 1,9-decadiene and 1-hexene were fed as the diolefin monomer and comonomer, respectively in example 71. Example 69 was made using dimethylsilyl-(tetramethylcyclopentadienyl) (cyclododecylamido)titanium dimethyl and rac-dimethylsily bis(2-methylindenyl)zirconium dimethyl catalysts. The detailed experimental conditions and results are presented in Table 14.

TABLE 14

|  | Example | | | | |
| --- | --- | --- | --- | --- | --- |
|  | 67 | 68 | 69 | 70 | 71 |
| Catalyst #1 | A | A | A | A | A |
| Catalyst #1 feed rate (mole/min) | 5.22E−06 | 5.22E−06 | 2.09E−06 | 5.22E−06 | 5.22E−06 |
| Catalyst #2 | B | B | E | B | B |
| Catalyst #2 feed rate (mole/min) | 7.65E−07 | 7.65E−07 | 4.25E−07 | 7.65E−07 | 7.65E−07 |
| Propylene feed rate (g/min) | 14 | 14 | 14 | 14 | 14 |
| Comonomer | dicyclopentadiene | Butene-1 | — | Butene-1 | 1,9 decadiene |
| Comonomer feed rate (ml/min) | 0.23 | 0.6 | — | 2.5 | 0.206 |
| 1-hexene flow rate (ml/min) | — | — | — | — | 3.29 |
| Hexane feed rate (ml/min) | 90 | 90 | 90 | 90 | 90 |
| Polymerization temperature (° C.) | 110 | 115 | 110 | 105 | 115 |
| Mn (kg/mol) | — | — | 12.2 | — | — |
| Mw (kg/mol) | — | — | 30.6 | — | — |

TABLE 14-continued

|  | Example | | | | |
|---|---|---|---|---|---|
|  | 67 | 68 | 69 | 70 | 71 |
| Mz (kg/mol) | — | — | 84.3 | — | — |
| Tc (° C.) | — | — | 72.3 | 86.0 | 42.6 |
| Tm (° C.) | — | — | 112.1 | 124.8 | 89.8 |
| Tg (° C.) | — | — | −22.4 | −12.3 | −15.2 |
| Heat of fusion (J/g) | — | — | 23.3 | 38.4 | 27.0 |
| Viscosity @ 190° C. (cp) | 665 | 563 | 1420 | 1100 | 524 |
| Conversion (%) | 74.40 | 98.07 | 65.78 | — | 98.98 |
| Catalyst activity (kg polymer/g catalyst) | 3.81 | 5.15 | 8.11 | — | 5.77 |

Catalysts
A = dimethylsilyl (tetramethylcyclopentadienyl) (cyclododecylamido) titanium dimethyl
B = rac-dimethylsilyl bis(2-methyl-4-phenylindenyl) zirconium dimethyl

Example 72

Example 72 was carried out in a 500-ml autoclave batch reactor. 125 ml of purified toluene was first added into the stainless steel autoclave reactor, followed by addition of 0.1 ml of tri-iso-butyl aluminum (TIBAL) solution (25-wt. % of TIBAL diluted in 5 ml of toluene). The mixture was then stirred and heated to 120° C. until stable pressure. The reactor was maintained at a slightly positive pressure. In succession, 125 ml of prepurified propylene was added under stirring. The reactor mixture was heated to 120° C. At this reactor temperature, 1.5 ml, of the premixed and preactivated catalyst solution was cannulated into the reactor using nitrogen. The catalyst solution consists of 32 mg of dimethylsilyl(tetramethylcyclopentadienyl)(cyclododecylamido)titanium dimethyl, 1.9 mg of rac-dimethylsilylbis(2-methyl-4-phenylindenyl)zirconium dimethyl, and 1.6 mg of dimethylsilylbis (indenyl)hafnium dimethyl, and 62.1 mg of N,N-dimethylanilinium tetrakis(pentafluorophenyl)borate were dissolved in 50 ml of toluene. The polymerization was conducted for 15 minutes. Thereafter, the reactor was cooled down and vented to the atmosphere. The resulting mixture, containing mostly solvent, polymer and unreacted monomers, was collected in a collection box and first air-dried in a hood to evaporate most of the solvent, and then dried in a vacuum oven at a temperature of about 90° C. for about 12 hours. The resulting polymer (12.79 grams) showed a peak crystallization temperature by DSC of 102.9° C., a glass transition (Tg) of −8.7° C., and a heat of fusion of 51.9 J/g. The average molecular weights, Mn/Mw/Mz, are 33825/66387/267680.

Example 73-75 (Comparative)

Three samples were made with rac-dimethylsilylbis(2-methyl-4-phenylindenyl)zirconium dimethyl or dimethylsilyl (tetramethylcyclopentadienyl)(cyclododecylamido)titanium dimethyl, following the general procedure described above except that only one catalyst was used. Rac-dimethylsilylbis (2-methyl-4-phenylindenyl)zirconium dimethyl was used to make isotactic polypropylene, while dimethylsilyl(tetramethylcyclopentadienyl)(cyclododecylamido)titanium dimethyl was used to make amorphous polypropylene. The experimental conditions and viscosity of polymer samples are presented in Table 15.

TABLE 15

|  | Example | | |
|---|---|---|---|
|  | 73 | 74 | 75 |
| Catalyst | A | A | B |
| Catalyst feed rate (mol/min) | 5.08E−06 | 5.08E−06 | 5.67E−07 |
| Propylene feed rate (g/min) | 14 | 14 | 14 |
| Hexane feed rate (ml/min) | 90 | 90 | 90 |
| Polymerization temperature (° C.) | 130 | 125 | 110 |
| Viscosity (cps) @ 190° C. | 1132 | 2220 | 328 |

Catalyst
A = dimethylsilyl (tetramethylcyclopentadienyl) (cyclododecylamido) titanium dimethyl
B = rac-dimethylsilyl bis(2-methyl-4-phenylindenyl) zirconium dimethyl Several samples from the preceding experiments were analyzed to determine their level of branching. For the purposes of this invention, the degree of branching is determined using the value of branching index g' at the molecular weight of Mz of the branched polymer. The results are presented in Tables 1 to 13.

Figure 5:
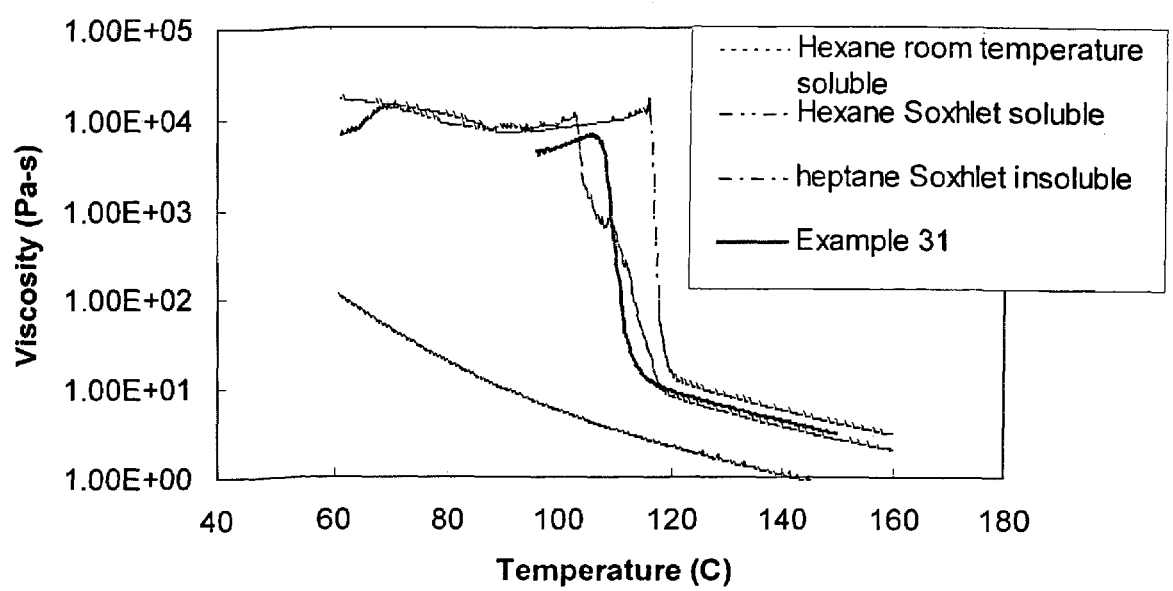
FIG. 5 shows the relationship between temperature and complex viscosity of the fractionated samples extracted from example 31.

Samples described in Example 4 and Examples 31-34 were fractionated using solvent extraction. The results are presented in Table 16. Selected fractionated fractions were analyzed using GPC-DRI-VIS-LS and DSC. The results from these analyses are also presented in Table 17. The complex viscosity profiles of the fractionated fraction from sample described in Example 31 were measured over the temperature range of 80 to 130° C., are shown in FIG. 5.

The sample described in Example 4 and its fractions extracted from solvent extraction were analyzed using $^{13}$C NMR.

Percent mm triad is measured directly from the C-13 NMR spectrum; it is assumed that the level of mm triad in the mixture depends only on the amounts of aPP and scPP ("atactic polypropylene and semi-crystalline polypropylene, respectively") components in the sample. By knowing the tacticity (mm) level of the pure aPP and scPP components the proportion of each can be calculated that corresponds to the observed mm level in the mixture. The values shown below show the percentage of isotatic triads on a whole, unfractionated polymer as well as the three fractions. The calculated data are generated by using the assumption that the isotactic and atactic reference polymers are indicative of the tacticities that are in the blocky polymer segments. Using the methyl triad region it is calculated that the isotactic reference polymer has 94.7% mm and the atactic reference contains 13.6%.

| Sample | % mm | % Calculated Isotactic Polymer |
|---|---|---|
| Unfractionated Polymer | 68 | 66 |
| Hexane Soluble | 16 | around 2% |
| Heptane Soluble | 76 | 76 |
| Heptane Insoluble | 89 | 93 |

TABLE 16

| Samples | Example 31 | Example 33 | Example 32 | Example 34 |
|---|---|---|---|---|
| Hexane room temperature solubles, wt. % | 29.17 | 42.52 | 55.39 | 74.4 |
| Soxhlet hexane soluble, wt. % | 25.14 | 15.17 | 10.55 | 6.93 |
| Soxhlet heptane soluble, wt. % | 7.88 | 7.1 | 8.53 | 0.44 |
| Soxhlet heptane insoluble, wt. % | 35.32 | 35 | 25.15 | 17.8 |

TABLE 17

Example 4

| | Hexane room temperature solubles | Heptane soxhlet solubles | Heptane soxhlet insolubles | |
|---|---|---|---|---|
| Mn (kg/mol) | 6.6 | 10.3 | 16.5 | — |
| Mw (kg/mol) | 14.3 | 30.2 | 31.3 | — |
| Mz (kg/mol) | 32.2 | 58.5 | 53.2 | — |
| g' @ Mz | 1.16 | 0.86 | 0.87 | — |
| Tc (° C.) | — | 105.2 | 112.8 | — |
| Tm (° C.) | — | 138.2 | 145.2 | — |
| Tg (° C.) | −11.1 | — | — | — |
| Heat of fusion (J/g) | 0.0 | 68.6 | 108.9 | — |

Example 31

| | Hexane room temperature solubles | Soxhlet hexane solubles | Soxhlet heptane solubles | Soxhlet heptane insolubles |
|---|---|---|---|---|
| Mn (kg/mol) | 9.5 | 20.9 | 20.1 | 20.8 |
| Mw (kg/mol) | 12.7 | 48 | 56.3 | 47.4 |
| Mz (kg/mol) | 25 | 131.5 | 148.8 | 150.2 |
| g' @ Mz | 1.08 | 0.68 | 0.64 | 0.63 |
| Tc (° C.) | — | 93.3 | 101.4 | 105.2 |
| Tm (° C.) | — | 128.2 | 133.5 | 138.3 |
| Tg (° C.) | −11.8 | −8.3 | — | — |
| Heat of fusion (J/g) | 0.0 | 52.5 | 66.1 | 70.7 |

The viscosity of products of Examples 12, 22 and 49 were measured over a temperature range of 80 to 130° C. The complex viscosity profiles are shown in FIG. 1. These data demonstrate the three-zone characteristics described above.

Selected samples and their blends were tested for adhesive performance. The pure polymers were compounded with tackifiers, oil or wax and stabilizer to form hot melt adhesive blends. The properties of these polymers and their blends were tested against typical commercially available EVA blends from Henkel and Chief. The blending was carried out under low shear at elevated temperature to form fluid melts. The mixing temperatures vary from about 130 to 190° C.

Escorez™ 5637 is a hydrogenated aromatic modified resin produced from dicyclopentadiene feedstock, exhibiting a ring and ball softening point of 130° C. available from ExxonMobil Chemical Company in Houston, Tex.

Paraflint H-1 is a Fisher-Tropsch wax exhibiting a molten viscosity of 10 mPa sec at 250 F, available from Moore and Munger.

Aristowax 165 is a refined paraffin wax available from Frank B Ross Co in Jersey City N.J. It is isolated from petroleum and has a melt point of 158 to 165 F.

Henkel Hot Melt 80-8368 is a commercial hot melt made from a blend of EVA's, tackifiers, and wax available from Henkel Corp.

MAPP 40 is a maleic anhydridemodified polypropylene, having an acid number of 50, a viscosity of 300 cps at 190° C., a softening point of 149° C., available from Chusei, USA.

Chief Hot Melt 268 is a commercial hot melt made from EVA, tackifiers, and wax available from Chief Adhesives.

KAYDOL® is a highly refined white mineral oil that consists of saturated aliphatic and alicyclic non-polar hydrocarbons having a pour point of −20° C., having a kinematic viscosity of 64 to 70 cSt at 40° C., available from Witco.

Licomont AR 504 is a maleic anhydride grafted polypropylene wax having an acid number of 41, a viscosity of 373 mPas at 190° C., and a softening point of 156° C. available from Clarient.

AC 540 is an ethylene acrylic acid copolymer having an acid number of 40, a viscosity of 575 at 140° C. and a drop point of 105° C. available from Honeywell.

Polywax 2000 is a Polyethylene wax available from Baker Petrolite Plain BOPP (biaxially oriented polypropylene film) a 28 micron thick film was obtained from Mobil Films.

Corona treated BOPP (biaxially oriented polypropylene film) a 28 micron thick film was obtained from Mobil Films.

Paperboard 84A is gray Poster Board 20 pt chipboard with 20% recycle fiber available from Huckster packaging and supply, Inc. in Houston, Tex.

Paperboard 84B is generic poster board clay coated news print available from Huckster packaging and supply, Inc. in Houston, Tex.

Cardboard 84C is generic corrugated cardboard 200 # stock available from Huckster packaging and supply, Inc. in Houston, Tex.

| Tradename | Description | Source |
|---|---|---|
| Tackifiers | | |
| Escorez ® 1102RM | C5 tackifier | ExxonMobil Chemical Company |
| Escorez ® 2203 | is a low aromatic modified hydrocarbon resin having a narrow molecular weight distribution produced from a feed of C5, C6 and C9 olefins and di-olefins, | ExxonMobil Chemical Company |

| Tradename | Description | Source |
|---|---|---|
| | having a ring and ball softening point of about 95° C. | |
| Escorez ® 2393 | is a highly aromatic modified hydrocarbon resin produced from a feed of C5, C6 and C9 olefins and di-olefins, having a ring and ball softening point of about 93° C. | ExxonMobil Chemical Company |
| Escorez ® 2596 | is a low aromatic modified hydrocarbon resin having a broad molecular weight distribution produced from a feed of C5, C6 and C9 olefins and di-olefins, having a ring and ball softening point of about 96° C. | ExxonMobil Chemical Company |
| Escorez ® 5637 | is a hydrogenated aromatic modified resin produced from dicyclopentadiene feedstock, exhibiting a ring and ball softening point of 130° C. | ExxonMobil Chemical Company |
| Escorez ® 5690 | is a hydrogenated aromatic modified resin produced from dicyclopentadiene feedstock, exhibiting a ring and ball softening point of 130° C. | ExxonMobil Chemical Company |
| Oils | | |
| Primol 352 | Hydrogenated paraffinic oil | ExxonMobil Chemical Company |
| Primol 876 | Napthenic oils | ExxonMobil Chemical Company |
| Flexon 876 | Napthenic oils | ExxonMobil Chemical Company |
| Kadol oil | Refined white mineral oil | Witco |
| Polymers/Adhesives | | |
| Escorene UL 7720 | Is an ethylene vinylacetate copolymer, having about 29 weight % vinyl acetate and a melt index of 150 dg/min. | ExxonMobil Chemical Company |
| NSC Easymelt | Hot melt adhesive for non-woven applications. | National Starch, Bound Brook, NJ |
| Henkel Hot Melt 80-8368 | Commercial adhesive of EVA, tackifier, and wax | Henkel Corp |
| Chief Hot Melt 268 | Commercial adhesive of EVA, tackifier, and wax | Chief Adhesives |
| Advantra 9250 | Commercial adhesive of ethylene/octene-1 metallocene polymers, tackifiers, and wax | Fuller |
| Tite Bond Wood Glue | Water based adhesive | Home Depot, Houston Texas |
| Dap Glue | Solvent based wood glue | Home Depot, Houston Texas |
| Waxes | | |
| Aristowax 165 | Refined petroleum wax, melting temperature: 158-165° F. | Frank B Ross, Jersey City, NJ |
| AC 8 lot 500081EQ | Polyethylene wax | Honeywell, New Jersey |
| Paraflint H-1 | Fisher-Tropsch wax, 10 mPa @ 250° F. | Moore and Munger |
| AR-504 | Maleated PE wax acid number 41 and viscosity of 373 mPa @ 190° C. | Clarient |
| AC-540 | Ethylene acrylic acid copolymer having an acid number of 40 and a viscosity of 575 cps @ 140° C. | Honeywell, New Jersey |
| Polywax 2000 | Polyethylene wax | Baker Petrolite |
| AC-1302P | Maleated polypropylene | Honeywell |

-continued

| Tradename | Description | Source |
|---|---|---|
| P-C80 | Fischer Tropsch fractionated wax | Moore and Munger |
| MAPP-40 | Maleic modified polypropylene with acid number of 50, viscosity of 300 cps @ 190° C. | Chusei, Pasadena Texas |
| Antioxidants and other additives | | |
| Irganox 1010 | Phenolic antioxidant | Ciba-Geigy |
| Dolomite 16 mesh | sand | Supplied by Fordamin Company Ltd (UK) |
| Microcarb MC 50 F | calcium carbonate | Supplied by Microfine Minerals Ltd (UK) |
| Glass beads of 3 F type | Glass bead | Supplied by Sovitec SA (Belgium) |
| TiO2 Lot: TR92 | titanium dioxide | Supplied by Hunstman Tioxide Ltd (UK) |
| Test surfaces | | |
| Metallized acrylic coated | Metallized acrylic coated cardboard for cereal box | General Mills |
| Non-coated CB testliner | 1250 gr/m2 for vegetable trays | Kappa, Holland |
| Paperboard 84A | Gray poster 20 pt chipboard with 20% recycle content | Huckster Packaging and Supply, Houston, TX |
| Paperboard 84B | Generic posterboard clay coated newsprint | Huckster Packaging and Supply, Houston, TX |
| Paperboard 84C | Generic corrugated cardboard 200# stock | Huckster Packaging and Supply, Houston, TX |
| Inland Paper Board | High Performance box board | Inland Paper Board and Packaging Company of Rome |
| Black White Fabric | Printed stretch 100% Cotton with a Thread Count of 17 by 13 per square cm, a more loosely woven fabric | High Fashion Fabrics, Houston Texas |
| Formica | Tabs were made from standard sheet Formica | Lowe's Hardware, Houston Texas |
| Blue fabric | Tabs were made from Blue Stock 038C0TP 100% Cotton, Thread Count 21 by 45 per square cm with a weight of 0.022 grams per square cm, a tightly woven cotton fabric | High Fashion Fabrics, Houston Texas. |
| Catalog paper | Book paper bound by a hot melt process as determined from examination | Seton Catalog |
| NWC | Non-woven Coverstock, Paratherm PT 120/20 | Lohmann, Germany |
| PE | Polyethylene, White Opaque Micro-embossed CO/EX film (rubber treated inside), Reference #: CM001ARIE000757-C | Tacolin Ltd, UK |
| Polyester (PET) construct | Polyester construct | |
| BOPP | Bi-axially oriented polypropylene film, 28 micron | Mobil Films, Rochester, NY |
| Corona treated BOPP | Corona treated bi-axially oriented polypropylene film, 28 micron thick | Mobil Films, Rochester, NY |
| PP cast film construct | A cast film. | |

REXTAC RT 2730 is a copolymer of propylene, butene and ethylene having about 67.5 mole percent propylene, about 30.5 mole percent butene and about 2 mole percent ethylene produced by Huntsman, Company. The copolymer has about 15 mole percent BB dyads, 43 mole percent PB dyads and about 43 mole percent PP dyads. The melting point is 70° C. with a melting range from 25 to 116° C. the Tg is −25° C., the crystallinity is about 7 percent, the enthalpy is 10 J/g by DSC. The Mn is 8260 the Mw is 59100 and the Mz 187900 by GPC. Mw/Mn is 7.15.

REXTAC RT 2715 is a copolymer of propylene, butene and ethylene having about 67.5 mole percent propylene, about 30.5 mole percent butene and about 2 mole percent ethylene produced by Huntsman, Company. The copolymer has about 11 mole percent BB dyads, 40 mole percent PB dyads and about 49 mole percent PP dyads. The melting point is 76° C. with a melting range form 23 to 124° C. the Tg is −22° C., the crystallinity is about 7 percent, the enthalpy is 11 J/g by DSC. The Mn is 6630 the Mw is 51200 and the Mz 166,700 by GPC. Mw/Mn is 7.7.

All the adhesive formulations are in weight percent, unless otherwise noted in the compositions listed in Table 18 through Table 50.

TABLE 18

Applications Formulas (percent) and Performance Values

| | Formulation | | | | | |
|---|---|---|---|---|---|---|
| | A | B | C | D | E | F |
| Example 42 | 80 | | | | | |
| Escorez ™ 5637 | 7 | 7 | 13 | 10 | 10 | |
| Paraflint H-1 | 13 | 13 | 7 | 10 | | |
| Example 27 | | 80 | 80 | 80 | 80 | |
| Aristowax 165 | | | | | 10 | |
| Henkel Standard Hot Melt 80-8368 | | | | | | 100 |
| Viscosity at 190° C. (cps) | 1091 | 870 | 1152 | 1000 | 945 | 700 |
| SAFT, F (° C.) | 233 (112) | 253 (123) | 257 (125) | 253 (123) | 259 (126) | 182 (83) |
| Set Time (sec.) | 1.5 | 1.5 | 2 | 1 | 2.5 | 1 |
| Percent Substrate Fiber Tear | 0 | 80 | 95 | 10 | 100 | 100 |
| Low Temperature −12° C., File folder | | | | | | |

TABLE 19

Comparison of Blended aPP/scPP with branched aPP-g-scPP

| | Formulation | | | | | | |
|---|---|---|---|---|---|---|---|
| | A | B | C | D | E | F | G |
| Example 73 | 100 | | | 5 | | | |
| Example 74 | | 100 | | 39 | | | |
| Example 75 | | | 100 | 39 | | | |
| Example 29 | | | | | 82 | | |
| Irganox 1010 | | | | 1 | 1 | | |
| MAPP 40 | | | | 5 | 5 | | |
| Escorez ™ 5637 | | | | 7 | 5 | | |
| Paraflint H-1 | | | | 5 | 7 | | |
| Henkel Standard Hot Melt 80-8368 | | | | | | 100 | |
| Chief Standard Hot Melt 268 | | | | | | | 100 |
| Viscosity at 190° C. (cps) | 1132 | 2220 | 328 | 711 | 812 | 807 | 1055 |
| SAFT, F (° C.) | ... | ... | ... | 263 (128) | 266 (130) | 173 (78) | 175 (79) |
| Set Time (sec.) | >6 | 6 | No Adhesion | 1.5-2.0 | 1.5 | 1 | 1.5 |
| Percent Substrate Fiber Tear Low Temperature −12° C., cardboard | 100 | 100 | 0 | 100 | 85 | 100 | 100 |
| Percent Substrate Fiber Tear Room Temperature 20-25° C., File Folder | 0 | 5 | 0 | 100 | 100 | 100 | 100 |

TABLE 20

Comparison of branched aPP-g-scPP with propylene/ethylene copolymers

| | Formulation | | | | | | | | | | |
|---|---|---|---|---|---|---|---|---|---|---|---|
| | A | B | C | D | E | F | G | H | I | J | K |
| Example 41 | 100 | 90 | 90 | | | | | | | | |
| Example 16 | | | | 100 | 90 | 90 | | | | | |
| C3/C2 | | | | | | | 100 | 90 | 90 | | |

TABLE 20-continued

Comparison of branched aPP-g-scPP with propylene/ethylene copolymers

| | Formulation | | | | | | | | | | |
|---|---|---|---|---|---|---|---|---|---|---|---|
| | A | B | C | D | E | F | G | H | I | J | K |
| Escorez 5637 | | 7 | 3 | | 7 | 3 | | 7 | 3 | | |
| Paraflint H-1 | | 3 | 7 | | 3 | 7 | | 3 | 7 | | |
| Henkel Standard Hot Melt 80-8368 | | | | | | | | | | 100 | |
| Chief Standard Hot Melt 268 | | | | | | | | | | | 100 |
| SAFT, ° F. | 204 | 195 | 198 | 215 | 198 | 200 | 198 | 199 | 179 | 171 | 185 |
| Set Time (sec.) | 6 | 5 | 2 | >6 | 6 | 1.5 | 6 | 3 | >6 | 2 | 1 |
| Percent Substrate Fiber Tear Low Temperature −12° C., Filefolder | 0 | 100 | 0 | 100 | 100 | 0 | 100 | 60 | 0 | 100 | 100 |

The C3/C2 is a comparative example. The polymer was an ethylene/propylene copolymer with ethylene content of about 10 wt. %. This: polymer was made using rac-dimethylsilyl bis(2-methyl-4-phenylindenyl) zirconium dimethyl at a polymerization temperature of 70° C., following the general procedure desribed above for example 1, except that only one catalyst was used. The polymer had a peak melting temperature of 95° C. and viscosity of 1368 cps at 190° C.

TABLE 21

Multiple Polymer and Oil Blends of branched aPP-g-scPP Polymer

| | Formulation | | | | | | | | | |
|---|---|---|---|---|---|---|---|---|---|---|
| | A | B | C | D | E | F | G | H | I | J |
| Example 26 | 74 | 69 | | | 78 | 72 | | | | |
| Example 25 | | | 74 | 69 | | | 78 | 72 | | |
| Example 23 | | | | | 5 | 9 | 5 | 9 | | |
| Irganox 1010 | 1 | 1 | 1 | 1 | 1< | 1< | 1< | 1< | | |
| Kaydol Oil | 10 | 10 | 10 | 10 | 5 | 9 | 5 | 9 | | |
| Escorez ™ 5637 | 10 | 10 | 10 | 10 | 7 | 6 | 7 | 6 | | |
| Paraflint H-1 | 5 | 10 | 5 | 10 | 5 | 4 | 5 | 4 | | |
| Henkel Standard Hot Melt 80-8368 | | | | | | | | | 100 | |
| Chief Standard Hot Melt 268 | | | | | | | | | | 100 |
| Viscosity, cps 190° C. | 315 | 120 | 525 | 445 | 358 | 262 | 888 | 724 | 1002 | 732 |
| SAFT, F (° C.) | | | | | | | | | | |
| Set Time (sec.) | 3 | 1.5 | 1.5 | 1 | 1.5 | 1.5 | 3 | 3 | 1.5 | 1.0 |
| Percent Substrate Fiber Tear Room Temperature 20-25° C., File Folder | 100 | 20 | 100 | 100 | 100 | 100 | 100 | 100 | 100 | 100 |
| Percent Substrate Fiber Tear Low Temperature 5° C., File folder | — | — | — | — | 100 | 100 | 100 | 100 | 100 | 100 |

TABLE 22

Comparison of Various formulations of branched aPP-g-scPP

| | Formulation | | | | | | | | |
|---|---|---|---|---|---|---|---|---|---|
| | A | B | C | D | E | F | G | H | I |
| Example 25 | 92.5 | 78.6 | 78.6 | | | | | | |
| Example 69 | | 5 | 5 | | | | | | |
| Example 29 | | | | 82 | 84.5 | 82 | 82 | | |
| Escorez ™ 5400 | | | | | | 5 | 7 | | |
| AR 504 | | 5 | | | | | | | |
| MAPP 40 | | | 5 | 5 | 2.5 | 5 | 5 | | |

TABLE 22-continued

Comparison of Various formulations of branched aPP-g-scPP

| | Formulation | | | | | | | | |
|---|---|---|---|---|---|---|---|---|---|
| | A | B | C | D | E | F | G | H | I |
| Irganox 1010 | .5 | .4 | .4 | 1 | 1 | 1 | 1 | | |
| Kaydol Oil | | 5 | 5 | | | | | | |
| Escorez(tm) 5637 | 2 | 1.7 | 1.7 | 5 | 5 | | | | |
| Paraflint H-1 | 5 | 4.3 | 4.3 | 7 | 7 | 7 | 5 | | |
| Henkel Standard Hot Melt 80-8368 | | | | | | | | 100 | |
| Chief Standard Hot Melt 268 | | | | | | | | | 100 |
| Viscosity at 190° C. (cps) | 790 | 695 | 688 | 688 | 758 | 750 | 830 | 834 | 1050 |
| SAFT, ° F. | 263 | >250 | >250 | 265 | 266 | 265 | 265 | 184 | 171 |
| Set Time (sec.) | 2.5 | 2 | 2 | 1.5 | 1.5 | 1.5 | 1.75 | 1 | 1.5 |
| Percent Substrate Fiber Tear Low Temperature −12° C., cardboard | 10 | 98 | 100 | 75 | 60 | 90 | 100 | 100 | 100 |
| Percent Substrate Fiber Tear Room Temperature 20-25° C., File Folder | 34 | 100 | 100 | 100 | 100 | 100 | 100 | 100 | 100 |

TABLE 23

Hard and soft aPP-g-scPP mixes with Escorez(tm) 5400

| | Formulation | | | | | | | | |
|---|---|---|---|---|---|---|---|---|---|
| | A | B | C | D | E | F | G | H | I |
| Example 28 | 9 | 9 | 9 | 9 | 9 | 9 | 9 | | |
| Example 17 | 78 | | | | | | | | |
| Example 40 | | 78 | | | | | | | |
| Example 21 | | | 78 | | | | | | |
| Example 20 | | | | 78 | | | | | |
| Example 67 | | | | | 78 | | | | |
| Example 25 | | | | | | 78 | | | |
| Example 26 | | | | | | | 78 | | |
| Irganox 1010 | 1 | 1 | 1 | 1 | 1 | 1 | 1 | | |
| Escorez ™ 5400 | 7 | 7 | 7 | 7 | 7 | 7 | 7 | | |
| Paraflint H-1 | 5 | 5 | 5 | 5 | 5 | 5 | 5 | | |
| Henkel Standard Hot Melt 80-8368 | | | | | | | | 100 | |
| Chief Standard Hot Melt 268 | | | | | | | | | 100 |
| Viscosity, cps 190° C. | 344 | 306 | 548 | 505 | 521 | 1185 | 404 | 783 | 1090 |
| SAFT, (° F.) | | | | | | | | | |
| Set Time (sec.) | 3 | 3.5 | 3.5 | 2.5 | 1.5 | >2 | 1.5 | 1 | 1.5 |
| Percent Substrate Fiber Tear Low Temperature 5° C., File Folder | 50 | 50 | 90 | 65 | 100 | 100 | 100 | 100 | 100 |
| Percent Substrate Fiber Tear Room Temperature 20-25° C., File Folder | 100 | 100 | 100 | 100 | 100 | 100 | 100 | 100 | 100 |
| Shore A Hardness | 74 | 77 | 54 | 63 | 76 | 76 | 76 | 80 | 85 |

There is no Table 24

TABLE 25

Comparison Various Wax Types with Two Polymer Types

| | Formulation | | | | | | | | | | |
|---|---|---|---|---|---|---|---|---|---|---|---|
| | A | B | C | D | E | F | G | H | I | J | K |
| Paraflint H-1 | 0 | 10 | 0 | 0 | 0 | 0 | 10 | 0 | 0 | | |
| Example 29 | 82 | 82 | 82 | 82 | 0 | 0 | 0 | 0 | 0 | | |
| Example 62 | | | | | 82 | 82 | 82 | 82 | 82 | | |
| Escorez ™ 5637 | 7 | 7 | 7 | 7 | 7 | 7 | 7 | 7 | 7 | | |
| Irganox 1010 | 1 | 1 | 1 | 1 | 1 | 1 | 1 | 1 | 1 | | |
| AC 540 | | | | 10 | 10 | | | | 5 | | |
| Polywax 2000 | 10 | | | | | | | 10 | 5 | | |
| Licowax PP 230 | | | 10 | | | 10 | | | | | |
| Henkel Standard Hot Melt 80-8368 | | | | | | | | | | 100 | |
| Chief Standard Hot Melt 268 | | | | | | | | | | | 100 |
| Viscosity, cps 190° C. | 820 | 763 | 1140 | 1254 | 848 | 977 | 588 | 691 | 715 | 765 | 1131 |
| Set Time (sec.) | 0.5 | 1 | 4 | 2 | 1.5 | 4+ | 1 | 0.5 | 1 | 1 | 1.5 |
| Percent Substrate Fiber Tear Low Temperature −12° C., cardboard | 0 | 0 | 95 | 50 | 70 | 100 | 0 | 0 | 50 | 100 | 100 |
| Percent Substrate Fiber Tear Room Temperature 20-25° C., File Folder | 100 | 0 | 98 | 100 | 100 | 100 | 0 | 5 | 100 | 100 | 100 |

TABLE 26

Formulating Response of butene-1 modified aPP-g-scPP

| | Formulation | | | | |
|---|---|---|---|---|---|
| | A | B | C | D | E |
| Example 68 | 100 | | 93 | | |
| Example 70 | | 100 | | 93 | |
| Escorez ™ 5637 | | | 2 | 2 | |
| Paraflint H-1 | | | 5 | 5 | |
| Henkel Standard Hot Melt 80-8368 | | | | | 100 |
| Viscosity @ 190° C. (cps) | 563 | 1100 | 485 | 1140 | 750 |
| Set Time (sec.) | 2.5 | >3 | 1.5 | 2 | 1 |
| Percent Substrate Fiber Tear Room Temperature 20-25° C., File Folder | 100 | 100 | 88 | 70 | 100 |

TABLE 27

Comparison of dicyclopentadiene modified aPP-g-scPP with and without diene

| | Formulation | | | | | |
|---|---|---|---|---|---|---|
| | A | B | C | D | E | F |
| Example 28 | 93 | 100 | 80 | | | |
| Example 71 | | | | 100 | 93 | |
| Escorez ™ 5637 | 2 | | 20 | | 2 | |
| Paraflint H-1 | 5 | | | | 5 | |
| Henkel Standard Hot Melt 80-8368 | | | | | | 100 |
| Viscosity, cps 190° C. | 390 | 661 | 205 | 524 | 502 | — |
| Shore A Hardness | 22 | 34 | 45 | — | — | — |
| Set Time, sec | 3 | 4 | 2.5 | 3.5 | 2 | 1 |
| Percent Substrate Fiber Tear Room Temperature 20-25° C., File Folder | 50 | 80 | 90 | 80 | 90 | 90 |

TABLE 28

Comparison Various aPP-g-scPP Polymer and Adhesive Blends

| | Formulation | | | | | | | | | | |
|---|---|---|---|---|---|---|---|---|---|---|---|
| | A | B | C | D | E | F | G | H | I | J | K |
| Example 12 | 100 | 93 | | | | | | | | | |
| Example 24 | | | 100 | 93 | | | | | | | |
| Example 22 | | | | | 100 | 93 | 88 | | | | |
| Example 37 | | | | | | | | 100 | 93 | | |
| Escorez ™ 5637 | | 2 | | 2 | | 2 | 4 | | 2 | | |
| Paraflint H-1 | | 5 | | 5 | | 5 | 8 | | 5 | | |
| Henkel Standard Hot Melt 80-8368 | | | | | | | | | | 100 | |
| Chief Standard Hot Melt 268 | | | | | | | | | | | 100 |
| Viscosity, cps 190° C. | 813 | 875 | 2240 | 1527 | 1240 | 950 | 797 | 568 | 497 | 730 | 1027 |
| Set Time, sec | 3 | 3 | 3 | 3 | 3.5 | 2.5 | 1.5 | 3.5 | 2.5 | 1 | 1.5 |
| Percent Substrate Fiber Tear Room Temperature 20-25° C., File Folder | 85 | 95 | 95 | 95 | 90 | 90 | 90 | 90 | 95 | 90 | 10 |

TABLE 29

Example Adhesive Testing on a Variety of Surfaces

| | Formulation | | | |
|---|---|---|---|---|
| | Blend of 78% example 29, 5% Licomont AR504, 7% Escorez 5637, 5% Paraflint H-1, 5% Kaydol oil. 1% Irganox 1010 was added to the blend | | Henkel 80-8368 Hot Melt | |
| Surface | Maximum average Force by Dot T-Peel Test, (Newtons\lbs) | Failure Type | Maximum average Force by Dot T-Peel Test (Newtons\lbs) | Failure Type |
| Cardboard 84C | 24.2\5.4 | Substrate Failure | 16.4\3.7 | Substrate Failure |
| BOPP Film (Corona Treated) | 19.2\4.3 | Cohesive Failure | 1.0\0.2 | Complex jerking |
| PP Film plain | 13.7\3.1 | Several Types | 1.0\0.2 | Complex jerking |
| Paperboard 84B | 6.0\1.3 | Substrate Failure | 5.3\1.2 | Substrate Failure |
| Paperboard 84A | 4.7\1.1 | Substrate Failure | 4.6\1.0 | Substrate Failure |
| Aluminum foil | 3.2\0.7 | Cohesive Failure | 1.3\0.3 | Cohesive Failure |

Example EX1-EX13

The following samples were made at a temperature range of 70 to 125° C., following the general procedure described above with the following exceptions: (1) a small quantity of 1,9-decadiene was fed as the diolefin monomer in Example EX1-EX3, EX5 and EX9; (2) ethylene was used in Example EX13-EX17. The detailed experimental conditions and results are presented in Tables 30, 31 and 32.

TABLE 30

| | Example | | | | | |
|---|---|---|---|---|---|---|
| | EX1 | EX2 | EX3 | EX4 | EX5 | EX6 |
| Catalyst #1 | A | A | A | A | A | G |
| Catalyst #1 feed rate (mole/min) | 5.22E−06 | 5.88E−06 | 6.10E−06 | 3.91E−06 | 1.82E−06 | 9.89E−07 |
| Catalyst #2 | B | E | B | C | B | C |
| Catalyst #2 feed rate (mole/min) | 7.65E−07 | 2.62E−06 | 2.83E−07 | 9.86E−07 | 9.45E−08 | 2.22E−07 |
| Propylene feed rate (g/min) | 14 | 14 | 14 | 14 | 14 | 14 |

TABLE 30-continued

| | Example | | | | | |
|---|---|---|---|---|---|---|
| | EX1 | EX2 | EX3 | EX4 | EX5 | EX6 |
| 1,9 decadiene feed rate (ml/min) | 0.09 | 0.10 | 0.19 | 0.00 | 0.01 | 0.00 |
| H2 (cc/min) | 0 | 0 | 30 | 0 | 0 | 0 |
| Hexane feed rate (ml/min) | 90 | 90 | 90 | 90 | 90 | 90 |
| Polymerization temperature (° C.) | 95 | 75 | 70 | 92 | 100 | 105 |
| Mn (kg/mol) | 28.1 | — | 15.8 | — | 33 | — |
| Mw (kg/mol) | 63 | — | 58.3 | — | 67.7 | — |
| Mz (kg/mol) | 168.3 | — | 203.7 | — | 136.4 | — |
| g' @ Mz | 0.81 | — | 0.78 | — | — | — |
| Tc (° C.) | 100.7 | 74.8 | 91.9 | 54.6 | 86.4 | 60.1 |
| Tm (° C.) | 146.1 | 113.8 | 148.9 | 103.0 | 149.4 | 102.9 |
| Tg (° C.) | −7.6 | −8.2 | −7.1 | −8.3 | −6.7 | −8.2 |
| Heat of fusion (J/g) | 36.5 | 27.8 | 19.3 | 23.9 | 12.5 | 35.8 |
| Viscosity @ 190° C. (cps) | 11200 | 4940 | 10100 | 2940 | 54870 | 5340 |

Catalysts
A = dimethylsilyl (tetramethylcyclopentadienyl) (cyclododecylamido) titanium dimethyl
B = rac-dimethylsilyl bis(2-methyl-4-phenylindenyl) zirconium dimethyl
C = rac-dimethylsilyl bis (indenyl) hafnium dimethyl
E = rac-dimethylsily bis (2-methylindenyl)zirconium dimethyl
G = di(p-triethylsilylphenyl)methylene](cyclopentadienyl)(3,8-di-t-butylfluorenyl)hafnium dimethyl

TABLE 31

| | Example | | | | | | |
|---|---|---|---|---|---|---|---|
| | EX7 | EX8 | EX9 | EX10 | EX11 | EX12 | EX13 |
| Catalyst #1 | G | G | G | G | G | G | G |
| Catalyst #1 feed rate (mole/min) | 1.65E−06 | 1.65E−06 | 1.77E−06 | 2.35E−06 | 1.65E−06 | 9.89E−07 | 1.77E−06 |
| Catalyst #2 | B | B | B | B | B | C | B |
| Catalyst #2 feed rate (mole/min) | 7.09E−08 | 4.72E−08 | 1.42E−07 | 5.74E−08 | 7.09E−08 | 3.70E−07 | 1.42E−07 |
| Propylene feed rate (g/min) | 14 | 14 | 14 | 14 | 14 | 14 | 14 |
| Ethylene feed rate (SLPM) | — | — | — | — | — | — | 0.2 |
| 1,9 decadiene feed rate (ml/min) | — | — | 0.02 | — | — | — | — |
| Hexane feed rate (ml/min) | 90 | 90 | 90 | 90 | 90 | 90 | 90 |
| Polymerization temperature (° C.) | 110 | 115 | 125 | 130 | 120 | 105 | 110 |
| Mn (kg/mol) | 22.5 | — | 17.7 | — | — | — | — |
| Mw (kg/mol) | 68.6 | — | 35.9 | — | — | — | — |
| Mz (kg/mol) | 132.4 | — | 67.8 | — | — | — | — |
| g' @ Mz | — | — | 0.82 | — | — | — | — |
| Tc (° C.) | 96.0 | 81.6 | 82.5 | 81.0 | 96.5 | 54.2 | 56.9 |
| Tm (° C.) | 147.9 | 142.6 | 124.9 | 134.1 | 144.7 | 94.5 | 113.5 |
| Tg (° C.) | −3.3 | −2.8 | −6.3 | −3.9 | −4.2 | −10.5 | −9.6 |
| Heat of fusion (J/g) | 40.7 | 15.2 | 37.2 | 17.1 | 40.0 | 32.7 | 21.7 |
| Viscosity @ 190° C. (cps) | 45400 | 47500 | 1180 | 8325 | 7957 | 1157 | 7975 |

Catalysts
B = rac-dimethylsilyl bis(2-methyl-4-phenylindenyl) zirconium dimethyl
C = rac-dimethylsilyl bis (indenyl) hafnium dimethyl
G = di(p-triethylsilylphenyl)methylene](cyclopentadienyl)(3,8-di-t-butylfluorenyl)hafnium dimethyl

TABLE 32

| | Example | | | |
|---|---|---|---|---|
| | EX14 | EX15 | EX16 | EX17 |
| Catalyst #1 | G | G | G | G |
| Catalyst #1 feed rate (mole/min) | 1.77E−06 | 1.77E−06 | 1.77E−06 | 1.77E−06 |
| Catalyst #2 | B | B | B | B |
| Catalyst #2 feed rate (mole/min) | 3.12E−07 | 3.12E−07 | 3.12E−07 | 3.12E−07 |

TABLE 32-continued

| | Example | | | |
|---|---|---|---|---|
| | EX14 | EX15 | EX16 | EX17 |
| Propylene feed rate (g/min) | 14 | 14 | 10 | 10 |
| Ethylene feed rate (SLPM) | 1.5 | 0.8 | 0.8 | 1.5 |
| Hexane feed rate (ml/min) | 90 | 90 | 90 | 90 |
| Polymerization temperature (° C.) | 80 | 80 | 105 | 105 |
| Mn (kg/mol) | | | | |
| Mw (kg/mol) | | | | |
| Mz (kg/mol) | | | | |
| g' @ Mz | | | | |
| Tc (° C.) | 28.7 | 58.0 | 19.1 | — |
| Tm (° C.) | 73.7 | 99.3 | 57.6 | −47.8 |
| Tg (° C.) | −26.3 | −19.4 | −26.8 | −19.5 |
| Heat of fusion (J/g) | 14.8 | 29.6 | 8.0 | 3.7 |
| Viscosity @ 190° C. (cps) | 23400 | 37120 | 495 | 481 |
| Ethylene content (mole %) | 16.9 | 10.7 | | |

Catalysts
B = rac-dimethylsilyl bis(2-methyl-4-phenylindenyl)zirconium dimethyl
G = di(p-triethylsilylphenyl)methylene](cyclopentadienyl)(3,8-di-t-butylfluorenyl)hafnium dimethyl Polymerization Conditions Propylene feed at the rate of 8 lb/hr was combined with hexane at 17 lb/hr to form 25 lb/hr of reactor feed solution. Tri-n-octyl aluminum (TNOA) as a 3 wt. % solution in hexane (obtained from Albemarle) was introduced into this stream at the rate of 0.0006 lb/hr.

Catalyst and activator entered the reactor from a separate port. The catalyst solution consisted of a mixture of di(p-triethylsilylphenyl)methylene](cyclopentadienyl)(3,8-di-t-butylfluorenyl)hafnium dimethyl (catalyst G) and rac-dimethylsilyl bis(2-methyl-4-phenylindenyl) zirconium dimethyl (catalyst B), with 97 molar % of catalyst G. The catalyst solution was prepared by dissolving the catalyst mixture in toluene to form a 0.5 wt % solution. The activator feed stream was made up of a 0.2 wt-% solution of N,N-dimethylanilinium tetrakis(pentafluorophenyl)borate in toluene. Both the catalysts and activator were obtained from Albemarle. The catalyst and activator feed lines were configured to mix in line immediately upstream of the reactor, with an estimated contact time of 2-4 minutes. The catalyst and activator feed rates were 0.04 g/hr and 0.1 g/hr respectively.

The reactor feed was converted to polymer through two continuous stirred tank reactors in series. The temperatures of both reactors were controlled at 135° C. The reactors were operated liquid full under 530 psig pressure. The residence time of the feed in each reactor was 45 minutes. Conversion of propylene to polymer product was about 91%.

Molten polymer was recovered from solution via two flash stages, each with a preheater. The first stage (20 psig) polymer contained about 2% solvent and the second stage (50 torr vacuum) incorporated about 800 ppm volatiles. Water was injected into the second stage flash (devolatilizer) feed to quench residual catalyst and aid with solvent stripping. The properties of the polymer and the finished adhesives are summarized in Table 33.

TABLE 33

| | Example # | | | | | | | |
|---|---|---|---|---|---|---|---|---|
| | PP1 | PP2 | PP3 | PP4 | PP5 | PP6 | PP7 | PP8 |
| Polymerization temperature (° C.) | 132 | 135 | 135 | 135 | 135 | 134 | 133 | 137 |
| Cat1 in catalyst blend (mol %) | 96 | 93 | 93 | 93 | 93 | 93 | 96 | 93 |
| Catalyst in reactor feed (wppm) | 3.20 | 4.17 | 4.17 | 4.17 | 4.17 | 4.17 | 4.17 | 3.8 |
| Propylene in reactor feed (wt %) | 28.00 | 29.17 | 29.17 | 29.17 | 29.17 | 28.0 | 28.0 | 30.0 |
| Scavenger (wppm) | 7.44 | 25 | 25 | 25 | 25 | 24 | 24 | 24 |
| Quench water (wt %) | 1.82 | 0.86 | 0.86 | 0.86 | 0.62 | 1.4 | 2.8 | 0 |
| Mn (kg/mol) | 18.3 | 17.1 | 13 | 16.7 | 12.3 | 11.4 | 17.3 | 18.5 |
| Mw (kg/mol) | 41.7 | 36.6 | 32.5 | 34.4 | 32.3 | 31.9 | 38.5 | 34.1 |
| Mz (kg/mol) | 76.4 | 68.1 | 61.9 | 61.7 | 64.6 | 61.6 | 71.4 | 69.6 |
| g' @ Mz | — | 0.83 | 0.85 | 0.83 | 0.81 | 0.83 | 0.94 | 0.89 |
| Tc (° C.) | 69.2 | 79.8 | 80.6 | 78.4 | 63.8 | 71.8 | 62.8 | 85 |
| Tm (° C.) | 131 | 134 | 136 | 137 | 130 | 132 | 137 | 136 |
| Heat of fusion (J/g) | 15.9 | 25.7 | 30.7 | 28.7 | 38 | 28.2 | 9.5 | 38.6 |
| Viscosity @ 190° C. (cps) | 2300 | 1992 | 1382 | 1527 | 1211 | 1340 | 4235 | 1270 |

Catalyst
B = rac-dimethylsilyl bis(2-methyl-4-phenylindenyl) zirconium dimethyl
G = di(p-triethylsilylphenyl)methylene](cyclopentadienyl)(3,8-di-t-butylfluorenyl)hafnium dimethyl The polymers were blended with a masterbatch of molten additives (wax, tackifier, and anti-oxidant) in a static mixer and pelletized under water. The polymer and masterbatch pump rates were controlled to incorporate 20% masterbatch in the finished adhesive. The formulated adhesive properties are summarized in Table 34.

TABLE 34

|  | HMA1 | HMA2 | HMA3 | HMA4 | HMA5 | HMA6 | HMA7 |
|---|---|---|---|---|---|---|---|
| Polymer | PP2 | PP2 | PP6 | PP3 | PP3 | PP4 | PP4 |
| polymer (wt. %) | 90 | 80.5 | 90.9 | 90 | 80.5 | 90 | 80.5 |
| E-5637 (wt. %) |  |  | 3 |  |  |  |  |
| E-5690 (wt. %) | 4.94 | 9.67 |  | 4.94 | 9.67 | 4.94 | 9.67 |
| AC-1302P (wt. %) |  |  | 6 | 2.38 | 4.67 | 4.77 | 9.34 |
| P-C80 (wt. %) | 4.77 | 9.34 |  | 2.38 | 4.67 |  |  |
| Irganox 1010 (wt. %) | 0.25 | 0.49 | 0.1 | 0.25 | 0.49 | 0.25 | 0.49 |
| Viscosity @ 190° C. (cps) | 1472 | 902.5 | 1205 | 1209 | 890 | 1457 | 1250 |
| Shore A Hardness | 77 | 78 | 64 | 66 | 64 | 60 | 63 |

| | Formulation | | |
|---|---|---|---|
|  | HMA8 | HMA9 | HMA10 |
| Polymer | PP5 | PP5 | PP6 |
| polymer (wt. %) | 89.5 | 81 | 70 |
| E-5690 (wt. %) | 5.13 | 9.29 | 15 |
| P-C80 (wt. %) | 2.56 | 4.64 | 14.5 |
| MAPP-40 (wt. %) | 2.54 | 4.6 | — |
| Irganox 1010 (wt. %) | 0.26 | 0.48 | 0.5 |
| viscosity @ 190° C. (cps) | 988 | 877 | — |
| Shore A Hardness | 53 | 53 | — |

A number of hot melt adhesives were prepared by blending the polymer, tackifer, wax, antioxidant, and other ingredients under low shear mixing at elevated temperatures to form fluid melt. The mixing temperature varies from about 130 to about 190° C. As examples, Table 35 lists the detailed formulation and the properties of blends.

TABLE 35

| | Formulation | | | | |
|---|---|---|---|---|---|
|  | HMA11 | HMA12 | HMA13 | HMA14 | HMA15 |
| Polymer | EX12 | EX11 | EX13 | EX10 | PP7 |
| polymer (gram) | 18.2 | 18.2 | 18.2 | 18.2 | 14 |
| E-5637 (gram) | 0.6 | 0.6 | 0.6 | 0.6 | 3 |
| AC-1302P (gram) | 1.2 | 1.2 | 1.2 | 1.2 | 3 |
| Irganox 1010 (gram) | 0.2 | 0.2 | 0.2 | 0.2 | 0.2 |
| viscosity @ 190° C (cps) | 1080 | 6900 | 6875 | 5375 | 2365 |
| Shore A Hardness | 88 | 86 | 56 | 26 | 26 |

TABLE 36

Additional packaging adhesive formulation and performance

| Sample | Type of card board | Average force (N) | Failure type |
|---|---|---|---|
| PP8 | Metallized acrylic coated | 0.2 | all adhesive failure |
|  | non coated CB testliner 1250 gr/m² from Kappa | 5.9 | 2 paper tear/3 partial paper tear |

TABLE 36-continued

Additional packaging adhesive formulation and performance

| Sample | Type of card board | Average force (N) | Failure type |
|---|---|---|---|
| HMA3 | Metallized acrylic coated | 0.4 | all adhesive failure |
|  | non coated CB testliner 1250 gr/m² from Kappa | 5.7 | all substrate fiber tear |
| HMA10 | Metallized acrylic coated | 3.1 | a mix of adhesive and cohesive failure |
|  | non coated CB testliner 1250 gr/m² from Kappa | 5.7 | substrate fiber tear (7 samples) + 1 cohesive failure |

Dot preparation: 0.2 grams of adhesive on substrate/application temperature 190° C./then a weight of 0.5 kg was put on substrates for 2 minutes, then performed T-Peel on the samples after one day of aging.

Sample Preparation: dimension strip 2.5 cm×7.5 cm.

Values are the average made of 5 samples unless specified differently

TABLE 37

Additional packaging formulation and testing for set time and percent of substrate fiber tear

| | Formulation | | | | | | | | | | |
|---|---|---|---|---|---|---|---|---|---|---|---|
| | HMA9 | HMA7 | HMA5 | HMA2 | HMA11 | HMA12 | HMA13 | HMA14 | HMA15 | Advantra 9250 | Tite Bond Wood Glue |
| Set time (sec.) | 2.5 | 2.0 | 2.0 | 2.5 | 3.5 | 3.5 | 4.5 | 5.0 | 3.0 | 1.5 | >3600 |
| Inland Paper Board at 5° C. (%) | 100 | 49 | 0 | 0 | 10 | 85 | 100 | 98 | 97 | 88 | 100 |
| Inland Paper Board at −12° C. (%) | 94 | 30 | 88 | 0 | 0 | 30 | 96 | 88 | 15 | 78 | 100 |

TABLE 38

Additional packaging formulation and testing II for set time and percent of substrate fiber tear

| | Formulation | | | | | | | |
|---|---|---|---|---|---|---|---|---|
| | HMA8 | HMA6 | HMA4 | HMA1 | DAP Glue | EVA Test Formula | Advantra 9250 | Tite Bond Wood Glue |
| Set time (sec.) | 3.5 | 2.5 | 3.0 | 3.0 | 1800 | 2.0 | 1.5 | >3600 |
| Inland Paper Board 5° C. (%) | 100 | 38 | 18 | 63 | 100 | 28 | 88 | 100 |
| Inland Paper Board −12° C. (%) | 95 | 63 | 30 | 45 | 100 | 1 | 78 | 100 |

TABLE 39

Simulated Wood Glue and Edgebanding Laminates
I - Adhesion (Dot T-Peel) and failure types

| | Formulation | | | | | | | | | | |
|---|---|---|---|---|---|---|---|---|---|---|---|
| | HMA9 | HMA7 | HMA5 | HMA2 | HMA11 | HMA12 | HMA13 | HMA14 | HMA15 | Advantra 9250 | Tite Bond Wood Glue |
| Set time (sec.) | 2.5 | 2.0 | 2.0 | 2.5 | 3.5 | 3.5 | 4.5 | 5.0 | 3.0 | 1.5 | >3600 |
| BLUE Fabric to Formica, lbs | 6.6 | 6.1 | 6.7 | 5.0 | 5.2 | 5.8 | 4.6 | 6.3 | 6.9 | 6.9 | 13.9 |
| | CF | CF | CF | CF | CF | AF, CF | CF | CF | CF | CF | CF |
| Black White Fabric to Formica, lbs | 11.1 | 10.0 | 10.8 | 8.6 | 6.6 | 14.0 | 9.5 | 9.3 | 9.1 | 8.9 | 25.4 |
| | CF | CF | CF | AF, AB, CF | AB, CF | AF | CF | CF | CF | AF, AB | CF |

TABLE 40

Simulated Wood Glue and Edgebanding Laminates
II - Adhesion (Dot T-Peel) and failure types

| | Formulation | | | | | | | |
|---|---|---|---|---|---|---|---|---|
| | HMA8 | HMA6 | HMA4 | HMA1 | DAP Glue | EVA Test Formula | Advantra 9250 | Tite Bond Wood Glue |
| Set time (sec.) | 3.5 | 2.5 | 3.0 | 3.0 | 1800 | 2.0 | 1.5 | >3600 |
| BLUE Fabric to Formica, lbs | 5.2 | 3.8 | 3.8 | 5.4 | 9.0 | 8.3 | 6.1 | 9.3 |
| | CF | CF | CF, AF | AF | AF | AF | AB, AF, CF | CF |
| Black White Fabric to Formica, lbs | 10.7 | 8.3 | 9.5 | 8.5 | 8.9 | 10.4 | 6.9 | 22.6 |
| | CF | CF | CF | CF | AB, CF | AFAB | AFAB | SSCF |
| Wood to Formica | 73.0 | 80.2 | 85.6 | 65.3 | 79.4 | >90 | 72 | >90 |

TABLE 40-continued

Simulated Wood Glue and Edgebanding Laminates
II - Adhesion (Dot T-Peel) and failure types

| | Formulation | | | | | | | |
|---|---|---|---|---|---|---|---|---|
| | HMA8 | HMA6 | HMA4 | HMA1 | DAP Glue | EVA Test Formula | Advantra 9250 | Tite Bond Wood Glue |
| peak lbs to failure | CF, AF | AF, AB | AF, AB | AF, CF, AB | CF, AF | | AB, AF | |

TABLE 41

Book Binding Paper Adhesion (Dot T-Peel) I

| | Formulation | | | | | | | | | | |
|---|---|---|---|---|---|---|---|---|---|---|---|
| | HMA9 | HMA7 | HMA5 | HMA2 | HMA11 | HMA12 | HMA13 | HMA14 | HMA15 | Advantra | Tite Bond Wood Glue |
| Set time (sec.) | 2.5 | 2.0 | 2.0 | 2.5 | 3.5 | 3.5 | 4.5 | 5.0 | 3.0 | 1.5 | >3600 |
| Catalog Paper from Bound Seton Catalog, lbs | 1.1 | 1.3 | 1.0 | 1.2 | 1.4 | 1.0 | 1.0 | 0.9 | 4.0 | 1.1 | 1.4 |

All constructs exhibited substrate failure

TABLE 42

Book Binding Paper Adhesion II - Adhesion
(Dot T-Peel) and failure types

| | Formulation | | | | | | | |
|---|---|---|---|---|---|---|---|---|
| | HMA8 | HMA6 | HMA4 | HMA1 | DAP Glue | EVA Test Formula | Advantra 9250 | Tite Bond Wood Glue |
| Set time (sec.) | 3.5 | 2.5 | 3.0 | 3.0 | 1800 | 2.0 | 1.5 | >3600 |
| Catalog Paper from Bound Seton Catalog, lbs | 1.2 | 1.0 | 1.2 | 1.2 | 1.8 | 1.2 | 1.2 | 1.2 |

All constructs exhibited substrate failure

TABLE 43

Adhesives for Plastic Lamination I - Adhesion
(Dot T-Peel) and failure types

| | Formulation | | | | | | | | | | |
|---|---|---|---|---|---|---|---|---|---|---|---|
| | HMA9 | HMA7 | HMA5 | HMA2 | HMA11 | HMA12 | HMA13 | HMA14 | HMA15 | Advantra 9250 | Tite Bond Wood Glue |
| Set time (sec.) | 2.5 | 2.0 | 2.0 | 2.5 | 3.5 | 3.5 | 4.5 | 5.0 | 3.0 | 1.5 | >3600 |
| Polyester (PET) | 5.4 | 4.7 | 4.9 | 4.4 | 0.04 | 4.2 | 3.9 | 4.9 | 5.7 | 5.5 | 0.2 |
| Construct, lbs | CF | CF | SS | CF | AF | SS | SS | CF | CF | CF | AF |
| PP Cast Film | 5.9 | 5.4 | 6.3 | 1.3 | 0.3 | 8.6 | 10.4 | 5.5 | 7.6 | 0.2 | 0.2 |
| Construct, lbs | CF | CF | CF | CF | CF | CF | CF | CF | CF | AF | AF |

TABLE 44

Adhesives for Plastic Lamination II - Adhesion (Dot T-Peel) and failure types

| | Formulation | | | | | | | |
|---|---|---|---|---|---|---|---|---|
| | HMA8 | HMA6 | HMA4 | HMA1 | DAP Glue | EVA Test Formula | Advantra 9250 | Tite Bond Wood Glue |
| Set Time (Sec.) | 3.5 | 2.5 | 3.0 | 3.0 | 1800 | 2.0 | 1.5 | >3600 |
| Polyester (PET) Construct, lbs | 3.8 CF | 4.1 SS, CF, AF SS, CF, AF | 4.1 SS, CF, AF | 2.3 SS, CF, AF | 1.6 CF | 0.7 AF, SS | 4.9 SS, AF, CF | 0.1 AF, CF |
| PP Cast Film Construct, lbs | 4.4 CF | 6.5 CF | 3.8 SS, CF | 4.1 AB, CF | 2.8 CF, AF | 0.0 AF | 0.5 AF | Never Dried |

CF = Cohesive Failure,
AF = Adhesive Failure,
SS = Slip Stick behavior,
SF = Substrate Failure,
AB = Adhesive Break.
When several types of failures were observed, the failure types are listed in order of most frequent.

The EVA Test formula is a laboratory blend made from commercially available raw materials from ExxonMobil Chemical Company or other raw material suppliers. The particular formulation was 35% Escorene™ UL 7720, 50% Escorez™ 2393, 15% Paraflint™ H-1, with approximately 0.5% Irganox 1010 added Polymers of Examples EX1, EX3, EX5, EX 7 and EX8 were formulated for evaluations for pressure sensitive tape and label applications. The 180° peel adhesion was measured according to PSTC 101, rolling ball tack test was done using procedure of PSTC 6, and Loop tack was obtained using PSTC 16. The formulation and performance of these blends are summarized in Table 45. PSTC=Pressure Sensitive Tape Council.

TABLE 45

Formulation for PSA and Label applications

| Formulation | Mix1 | Mix2 | Mix3 | Mix4 | Mix5 | Mix6 |
|---|---|---|---|---|---|---|
| EX5 | 60 | 70 | | | | |
| EX1 | | | 70 | | | |
| EX3 | | | | 70 | | |
| EX7 | | | | | 70 | |
| EX8 | | | | | | 70 |
| Escorez 2203 | 30 | 20 | 20 | 20 | 20 | 20 |
| Flexon 876 | 10 | 10 | 10 | 10 | 10 | 10 |
| Irganox 1010 (phr) | 1 | 1 | 1 | 1 | 1 | 1 |
| Viscosity @ 175° C. (cps) | 18120 | 26250 | 4350 | 4800 | 25600 | 23500 |
| Coating weight (gsm) | ~19 | 19-20 | ~18 | 19-22 | 18-19 | 19-19 |
| 180° peel adhesion (N/10 mm) | 7.6 | 6.4 | 1.9 Some cohesion failure (superficial) | 6.0 Some cohesion failure (superficial) | 1.2 Jerking | 5.2 |
| Ball tack (cm) | >15 | >15 | >15 | >15 | >15 | >15 |
| Shear on cardboard at RT (minute) 12.5 mm × 25 mm – 1 kg Bookbinders cardboard | 4' AF | — | — | — | — | — |
| Shear on cardboard at 40° C. (minute) 12.5 mm × 25 mm – 1 kg Bookbinders cardboard | 1' AF | — | — | — | — | — |
| Loop tack @ RT (N/25 mm) | 9.2 Jerking (max. value) cohesion failure | — | — | — | — | — |

All coatings are transparent; molten adhesive is "crystal clear" in all cases.

The following blends were prepared as Thermoplastic Road-Marking compositions (TRM) and were evaluated for viscosity, softening point, high temperature settling and color coordinates. The blending was carried out in an aluminum can (78 mm in diameter and 95 mm in height) placed in a heating mantle. The capacity of the aluminum can was about 500 grams. All the ingredients according to the formulation listed in Table 46 were added into the aluminum can in a period of 30 minutes at 180° C. Then the mixture was further stirred for 30 minutes at 180° C. prior to testing (60 minutes is the total mixing time from the start of adding the mineral part). Testing samples of thermoplastic road marking compounds were prepared immediately after completion of the blend. For the measurements of color coordinates, samples cakes were made by pouring the hot compound into a cylindrical silicone mold of about 41 mm in diameter and about 6 mm high. The color coordinates were measured on both the top (UP) and bottom (DOWN) sides of the fresh made sample cakes at room temperature, and the cakes aged for 96 hours at a temperature of about 32° C. The CIE co-ordinates X, Y and Z were measured on a Hunterlab Colorimeter (Standard Illuminant C). Yellowness and Whiteness Indexes were determined by ASTM D1925 and ASTM E313, respectively.

For high temperature settling measurements, a cylindrical specimen was made by pouring the hot compound into a cylindrical silicone mold of about 50 mm in diameter and about 70 mm high. The specimen was then kept in an oven at 200° C. for six hours, without any stirring, for particle settling. The cylindrical specimen was then cooled down to room temperature (overnight) and was cut through the middle along the cylindrical axis into two halves. High temperature settling was observed on the cross section of the fresh cut surface. Amount of settling area is reported in percent.

The Zahn cup viscosity was measured immediately after the completion of blending of thermoplastic road marking compound. A Zahn cup No. 5 where the the orifice was enlarged to 6 mm diameter was used (Obtained from Braive instruments, Liege Belgium). The Zahn viscosity was measured in the same aluminum can used for blending. At the end of the mixing cycle, the mixing device was removed from the TRM blend, and the Zahn cup was immersed into the blend. A sufficient volume of blend (500 g.) was needed for complete immersion of the cup. The following procedure was used for Zahn cup viscosity measurements:

1. Allow the compound and the cup to condition at the test temperature, e.g. 170° C. and 190° C. It is important to stir gently with the cup in the TRM blend in order to obtain a homogenous temperature and to avoid sedimentation.
2. Check the temperature of the blend on the display of the controller of the heating mantle.
3. Immerse the Zahn cup totally and allow it to fill completely with the thermoplastic blend.
4. Raise the filled cup vertically out of the melt and allow the TRM to flow freely through the orifice. Start the chronometer when the level of the compound reaches the top of the Zahn cup (when cup is raised).
5. Allow a free flowing of the compound, and stop the chronometer when the final vortex develops a "black spot" and record the time.

The experiment was repeated several times till homogenous test results were obtained. The tolerance depends on the actual result: for a low viscosity (e.g. 20 to 60 s) a few seconds of spread can be accepted; for high viscosity blends (about 2 min of Zahn cup time) the spread may be significantly higher. More than 3 minutes of Zahn cup time is recorded as ">3 min", because the test is no longer Valid.

The softening point was determined by Ring & Ball, based on ASTM E-28.

The formulation using polymers of Examples EX2, EX6 and EX9 and performance of these blends are summarized in Table 46.

TABLE 46

Formulation and performance of thermoplastic road marking compositions

| | Formulation | | | | |
|---|---|---|---|---|---|
| | #1 | #2 | #3 | #4 | #5 |
| Dolomite 16 mesh | 42.0 | 42.0 | 42.0 | 42.0 | 42.0 |
| Microcarb MC 50 F | 15.0 | 15.0 | 15.0 | 15.0 | 15.0 |
| Glassbeads 3 F | 20.0 | 20.0 | 20.0 | 20.0 | 20.0 |
| TiO$_2$ Lot: TR92 | 5.0 | 5.0 | 5.0 | 5.0 | 5.0 |
| Flexon 876 | 2.7 | 2.7 | 2.7 | 2.7 | 2.7 |
| E-1102RM lot 1212070 | 15.3 | 10.0 | 10.0 | 10.0 | |
| AC 8 lot 500081EQ | | | | | 1.5 |
| EX2 | | 5.3 | | | |
| EX6 | | | 5.3 | | |
| EX9 | | | | 5.3 | 13.8 |
| Brookfield viscosity @ 180° C. (cps) AS8 | 13950 | 24700 | 24650 | 21725 | 44350 |
| Softening Point A53 (° C.) | 93 | 109 | 97 | 118 | 132 |
| Zahn Viscosity at 170° C. (sec.) | 137 | >180 | >180 | >180 | >180 |
| Zahn Viscosity at 190° C. (sec.) | 40 | 160 | 150 | 78 | >180 |
| High Temperature Settling (6 hours, 200° C., V.O.) | | | | | |
| Top layer (%) | 16 | 11 | 18 | 18 | See note 1 |
| Middle layer (%) | | 34 | 33 | 29 | |
| Bottom layer (%) | 84 | 55 | 49 | 53 | |

TABLE 46-continued

Formulation and performance of thermoplastic road marking compositions

| | Formulation | | | | | | | | | |
|---|---|---|---|---|---|---|---|---|---|---|
| | #1 | | #2 | | #3 | | #4 | | #5 | |
| | Initial Color new Hunterlab | | | | | | | | | |
| | Initial | | Initial | | Initial | | Initial | | Initial | |
| | UP | DOWN | UP | DOWN | UP | DOWN | UP | DOWN | UP | DOWN |
| YI ASTM D1925 | 12.1 | 13.5 | 10.9 | 13.8 | 11.5 | 14.3 | 10.7 | 13.1 | 8.5 | 11.9 |
| 2C X | 70.8 | 69.5 | 73.1 | 70.2 | 73.1 | 69.7 | 73.7 | 70.9 | 75.4 | 72.0 |
| Y | 72.7 | 71.4 | 75.0 | 72.0 | 75.1 | 71.5 | 75.6 | 72.7 | 77.2 | 73.7 |
| Z | 77.0 | 74.7 | 80.4 | 75.2 | 80.0 | 74.3 | 81.1 | 76.4 | 84.8 | 78.6 |
| YI E313-98 | 12.2 | 13.5 | 10.9 | 13.9 | 11.6 | 14.3 | 10.8 | 13.1 | 8.5 | 11.9 |
| WI E313-98 | 40.8 | 36.0 | 46.7 | 36.1 | 44.8 | 34.3 | 47.6 | 38.8 | 55.7 | 43.7 |
| Surface | Smooth | | Smooth | | Smooth | | Smooth | | Rough | |
| | Color after UV aging: 96 hours, 700 W/m$^2$, BST = 70° C. | | | | | | | | | |
| YID1925 | 11.0 | 10.9 | 12.3 | 12.5 | 11.5 | 11.9 | 11.7 | 12.4 | 7.6 | 9.4 |
| 2C X | 73.2 | 73.0 | 74.9 | 72.9 | 74.4 | 72.4 | 75.2 | 72.5 | 78.1 | 75.0 |
| Y | 75.4 | 75.1 | 77.3 | 75.0 | 76.7 | 74.5 | 77.6 | 74.5 | 80.0 | 76.7 |
| Z | 80.4 | 80.2 | 81.3 | 79.0 | 81.3 | 78.9 | 82.1 | 78.6 | 88.4 | 83.5 |
| YIE313-98 | 11.0 | 11.0 | 12.3 | 12.5 | 11.6 | 11.9 | 11.7 | 12.4 | 7.6 | 9.5 |
| WIE313-98 | 45.5 | 45.7 | 43.6 | 41.7 | 45.2 | 42.7 | 45.6 | 41.6 | 60.3 | 52.7 |

Note 1:
No clean cut (smoothing of the cut line), not able to read distribution.

Non-woven

Diaper construction adhesives bond the non-woven polypropylene coverstock to a polyethylene backsheet. The adhesive can be applied by several methods. Adhesion was measured as the average force required to separate the non-woven and the PE film. Forces were measured by peeling away with an angle of 180° (T-Peel type) at various temperatures and after various times using a Zwick tensile meter. Peel speed was 300 mm/min. The adhesive was applied using a CT 325-150 Meltex coater using a single adhesive spiral of 20 mm width and an add-on weight of 5 g/m$^2$. 10 meters of non-woven/PE construct were cut into several samples approximately 20 cm long. The sample was then peeled back slightly to attach to the jaws of the Zwick tester. Six centimeter of construct were peeled and the forces were averaged by the data acquisition computer.

Spray speed limit was a measure of the maximum rate the construct could be produced. As the Meltex is not capable of these speeds the sprayability speed was stimulated. Placing a cardboard box under the spray nozzle the adhesive pump rate was increased and the spiral shape was observed using a strobe light. When the throughput exceeds the capability to produce a uniform spiral the mass flow rate was recorded. Machine rates were then calculated. Rates were calculated for two nozzle diameters 0.018 inches and 0.030 inches.

TABLE 47

Formulation and performance of adhesives formulated using composition of the invention

| Formulation | Mix449 | Mix450 | Mix457 | Mix462 | Mix463 | Mix472 | Mix404 |
|---|---|---|---|---|---|---|---|
| Polymer, wt. % | EX4, 75% | EX4, 75% | EX4, 70% | PP8, 70% | PP8, 60% | PP1, 70% | C3/C4, 58% |
| Escorez 5637 (wt. %) | 25 | 20 | 20 | 20 | 25 | 20 | 12 |
| Primol352 (wt. %) | | | 10 | | | | 3 |
| Kaydol oil (wt. %) | | 5 | | 10 | 15 | 10 | |
| ScPP (wt. %) | | | | | | | 27 |
| Viscosity at 180° C. (mPas) | 2670 | 2260 | 1930 | 725 | 570 | 1490 | 2270 |
| Softening Point (° C.) | 107 | 105 | 103 | 132 | 127 | 123 | 110.5 |
| Spray Speed limit (m/min) 0.018 inch | 394 (Good) | 463 (Good) | 548 (Good) | 794 (Good) | 668 (Good) | 648 (Good-Fair) | 771 (Good) |
| Spray Speed limit (m/min) 0.030 inch | 616 (Good) | Not tested | Not tested | Not tested | Not tested | Not tested | Not tested |
| Adhesion NWC/PE (g/spiral) at RT after 1 day | 112 ST | 156 ST | 204.5 ST | 203 ST | 152 ST | 67 AF | 113 CF |
| Adhesion NWC/PE (g/spiral) at RT after 7 days | 111 ST | 144 ST | 218 ST | 238 ST (51 days) | 102 AF | 65 AF | 89 CF |
| Adhesion NWC/PE (g/spiral) at 40° C. after 1 day | 108 ST | 149 ST | 128 ST | 147 AF | 68 AF | 41 AF | 108 CF |

TABLE 47-continued

Formulation and performance of adhesives formulated using composition of the invention

| Formulation | Mix449 | Mix450 | Mix457 | Mix462 | Mix463 | Mix472 | Mix404 |
|---|---|---|---|---|---|---|---|
| Adhesion NWC/PE (g/spiral) at 40° C. after 7 days | 125 AF | 149 AF | 93 AF | 139 AF (51 days) | 68 AF | 40 AF | 62.5 CF |

ST = Substrate Tear,
CF = Cohesion Failure,
AF = Adhesion Failure,
RT = Room temperature The polymer C3/C4 in the above table was a propylene-butene-1 copolymer, and made with di(p-triethylsilylphenyl) methylene] (cyclopentadienyl) (3,8-di-t-butylfluorenyl) hafnium dimethyl and scPP was a semi-crystalline polypropylene, and was made using rac-dimethylsilylbis(2-methyl-4-phenylindenyl)zirconium dimethyl, following the general procedure described above except that only one catalyst was used. The detailed experimental conditions and properties of these polymers are listed in Table 48.

TABLE 48

| | Polymer | |
|---|---|---|
| | C3/C4 | scPP |
| Polymerization temperature (° C.) | 112 | 130 |
| Catalyst feed rate (mol/min) | 1.98E−06 | 5.86E−07 |
| Propylene feed rate (g/min) | 6 | 14 |
| 1-butene feed rate (ml/min) | 22 | — |

TABLE 48-continued

| | Polymer | |
|---|---|---|
| | C3/C4 | scPP |
| Hexane feed rate (ml/min) | 90 | 90 |
| 1-butene in polymer (mole %) | 38.0 | — |
| Tm (° C.) | — | 77.0 |
| Tc (° C.) | — | 118.2 |
| Heat of fusion (J/g) | 0 | 54.2 |
| Mn (kg/mol) | 25.4 | 3.4 |
| Mw (kg/mol) | 49.3 | 12.2 |
| Mz (kg/mol) | 74.3 | 23.4 |
| Viscosity @ 190° C. (cps) | 6450 | 65.3 |

Mix 404 is a comparative example.

Table 49 shows the formulation and performance of adhesives formulated using EVA, SIS and SBS based polymer as well as formulated Rextac adhesives.

TABLE 49

Formulation and performance of adhesives formulated using EVA, SIS and SBS based polymer as well as formulated Rextac adhesives

| FormulationID | Rextac RT 2715 | Rextac 2730 | Easymelt SBS | Mix389 | Mix424 | Mix425 | Mix451 | Mix452 | Mix453 | Mix 459 |
|---|---|---|---|---|---|---|---|---|---|---|
| Polymer, wt. % | Rextac RT2715, 100% | Rextac RT2730, 100% | NSC Easymelt, 100% | HBF type SIS, 100% | Rextac RT2715, 85% | Rextac RT2730, 85% | Rextac RT2715, 75% | Rextac RT2730, 75% | Rextac RT2730, 75% | Rextac RT2730, 70% |
| Escorez 5637 (wt. %) | | | | | 12 | 12 | 25 | 25 | 20 | 20 |
| Primol352 (wt. %) | | | | | 3 | 3 | | | | |
| Kaydol oil (wt. %) | | | | | | | | | 5 | 10 |
| Viscosity at 180° C. (mPas) | 2280 | 4800 | 2190 | 3000 | 1360 | 4150 | 2700 | 3190 | 2010 | 1530 |
| Softening Point (° C.) | 109.5 | 107.5 | 80.5 | 92.5 | 103 | 104 | 103 | 102.5 | 101 | 99 |
| Spray Speed limit (m/min) 0.018 inch | 350/600 (Good) | Not Sprayable | 729 (Good) | 704 (Good/Fair) | 759 (Good) | 732 (Good) | 810 (Good) | 806 (Good) | 808 (Good) | 832 (Good) |
| Spray Speed limit (m/min) 0.030 inch | 700 (Good) | 550 (Good) | Not tested | Not tested | Not tested | Not tested | Not tested | Not tested | Not tested | Not tested |
| Adhesion NWC/PE (g/spiral) at RT after 1 day | 83/102 CF | 85 CF (Applied at 170° C.) | 199 AF/ST | 210 CF | 144 CF | 166 CF | 130 ST | 139 ST | 167 ST | 97 AF |
| Adhesion NWC/PE (g/spiral) at RT after 7 days | 163 CF (after 2 months) | 83 CF (Applied at 170° C.) | 209 AF/ST | 263 CF/ST (after 2 months) | 112 CF | 132 CF | 131 ST | 141 ST | 159 ST | 94 AF |
| Adhesion NWC/PE (g/spiral) at 40° C. after 1 day | 45/55 CF | 82 CF (Applied at 170° C.) | 96 AF | 128 CF | 63 CF | 69 CF | 64 AF | 69 AF | 51 AF | 64 AF |

TABLE 49-continued

Formulation and performance of adhesives formulated using EVA, SIS and SBS based polymer as well as formulated Rextac adhesives

| FormulationID | Rextac RT 2715 | Rextac 2730 | Easymelt SBS | Mix389 | Mix424 | Mix425 | Mix451 | Mix452 | Mix453 | Mix 459 |
|---|---|---|---|---|---|---|---|---|---|---|
| Adhesion NWC/PE (g/spiral) at 40° C. after 7 days | 108 CF (after 2 months) | 80 CF (Applied at 170° C.) | 101 AF | 96 CF (after 2 months) | 58 CF | 61 CF | 77 AF | 81.5 AF | 70 AF | 58 AF |

ST = Substrate Tear,
CF = Cohesion Failure,
AF = Adhesion Failure,
RT = Room Temperature All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

We Claim:

1. An adhesive comprising a polymer comprising at least 50 mol % of one or more C3 to C40 olefins where the polymers has:
   a) a Dot T-Peel of 1 Newton or more on Kraft paper;
   b) an Mw of 10,000 to 100,000;
   c) a branching index (g') of 0.98 or less measured at the Mz of the polymer when the polymer has an Mw of 10,000 to 60,000, or
   a branching index (g') of 0.95 or less measured at the Mz of the polymer when the polymer has an Mw of 10,000 to 100,000;
   d) an amorphous content of at least 50%; and
   e) a crystallinity of at least 5%,
   wherein the SEC graph of the polymer is bi- or multi-modal.

2. The adhesive of claim 1, wherein the polymer has:
   a) a Dot T-Peel of 1 Newton or more on Kraft paper;
   b) a branching index (g') of 0.98 or less measured at the Mz of the polymer;
   c) a Mw of 10,000 to 60,000; and
   d) a heat of fusion of 1 to 50 J/g.

3. The adhesive of claim 1, where the polymer is a homopolypropylene or a copolymer of propylene and up to 5 mole % ethylene having:
   a) an isotactic run length of 1 to 30,
   b) a percent of r dyad of greater than 20%,
   c) a heat of fusion of between 1 and 70 J/g; and
   d) a g' measured at the Mz of 0.95 or less.

4. The adhesive of claim 1, wherein the polymer comprises propylene and less than 15 mole % of ethylene.

5. The adhesive of claim 1, wherein the polymer has a melt viscosity of 7000 mPa·sec or less at 190° C.

6. The adhesive of claim 1, wherein the polymer has a melt viscosity of 5000 mPa·sec or less at 190° C.

7. The adhesive of claim 1, wherein the polymer has a melt viscosity of between 250 and 6000 mPa·sec at 190° C.

8. The adhesive of claim 1, wherein the polymer has a melt viscosity of between 500 and 3000 mPa·sec at 190° C.

9. The adhesive of claim 4, wherein the polymer has a Tg of 0° C. or less.

10. The adhesive of claim 4 wherein the polymer has a Tg of −10° C. or less.

11. The adhesive of claim 1, wherein the polymer has an Mw of 10,000 to 75,000 and a branching index of 0.6 or less.

12. The adhesive of claim 1, wherein the polymer has an Mw of 10,000 to 50,000 and a branching index of 0.7 or less.

13. The adhesive of claim 1, wherein the polymer has an Mw of 10,000 to 30,000 and a branching index of 0.98 or less.

14. The adhesive of claim 1, wherein the polymer has a branching index (g') of 0.90 or less measured at the Mz of the polymer.

15. The adhesive of claim 1, wherein the polymer has
   a) a peak melting point between 60 and 190° C.;
   b) a heat of fusion of 0 to 70 J/g; and
   c) a melt viscosity of 8000 mPa·sec or less at 190° C.

16. The adhesive of claim 1, wherein the polymer has 20 wt. % or more of hexane room temperature soluble fraction and 50 wt % or less of Soxhlet heptane insolubles.

17. The adhesive of claim 1, further comprising a functionalized wax.

18. The adhesive of claim 1, further comprising a wax.

19. The adhesive of claim 1 further comprising a hydrocarbon resin.

20. The adhesive of claim 1, wherein the polymer has an Mz/Mn of 2 to 200.

21. The adhesive of claim 1, wherein the polymer has an Mz of 15,000 to 500,000.

22. The adhesive of claim 1, wherein the polymer has a SAFT of 50 to 150° C.

23. The adhesive of claim 1, wherein the polymer has a Shore A hardness of 90 or less.

24. The adhesive of claim 1, wherein the polymer has a set time of 5 seconds or less.

25. The adhesive of claim 1, wherein the polymer has an Mw/Mn of 2 to 75.

26. The adhesive of claim 1, wherein the polymer has a percent crystallinity of between 5 and 40%.

27. The adhesive of claim 1, wherein the g' is 0.90 or less.

28. The adhesive of claim 1, wherein the g' is 0.80 or less.

29. The adhesive of claim 1, wherein the polymer has a viscosity at 190° C. of 20,000 mPa·s or less.

30. The adhesive of claim 1, wherein the polymer has a viscosity at 160° C. of 8,000 mPa·s or less.

31. The adhesive of claim 1, wherein the polymer has a heat of fusion greater than 10 J/g.

32. The adhesive of claim 1, wherein the polymer has heat of fusion of from 20 to 70 J/g.

33. The adhesive of claim 1, wherein the polymer has heat of fusion of from 30 to 60 J/g.

34. The adhesive of claim 1, wherein the polymer has a percent crystallinity of 10-30%.

35. The adhesive of claim 1, wherein the polymer has tensile strength at break of 0.75 MPa or more.

36. The adhesive of claim 1, wherein the polymer has a SAFT of 100-130° C.

37. The adhesive of claim 1, wherein the polymer has a Shore A hardness of 20-90.

38. The adhesive of claim 1, wherein the polymer has a Dot T-Peel of between 3 and 10,000 N.

39. The adhesive of claim 1, wherein the polymer has a Dot T-Peel of between 10 and 2,000 N.

40. The adhesive of claim 1, wherein the polymer has a tensile strength at break of 0.6 MPa or more.

41. The adhesive of claim 1, wherein the polymer has a Tg of between 5 and −65° C.

42. The adhesive of claim 1, wherein the polymer comprises at least 50 weight % propylene.

43. The adhesive of claim 1, wherein the polymer comprises at least 50 weight % propylene and up to 50 weight % of a comonomer selected from the group consisting of ethylene, butene, hexene, octene, decene, dodecene, pentene, heptene, nonene, 4-methyl-pentene-1, 3-methyl pentene-1,3,5,5-trimethyl-hexene-1, and 5-ethyl-1-nonene.

44. The adhesive of claim 1, wherein the polymer comprises at least 50 weight % propylene and 5 weight % or less of ethylene.

45. The adhesive of claim 1, wherein the polymer comprises up to 10 weight % of a diene selected from the group consisting of: butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, and dicyclopentadiene.

46. The adhesive of claim 1, wherein the adhesive further comprises one or more tackifiers.

47. The adhesive of claim 1, wherein the adhesive further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

48. The adhesive of claim 1, wherein the adhesive further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

49. The adhesive of claim 1, wherein the adhesive further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

50. The adhesive of claim 1, wherein the adhesive further comprises one or more aliphatic naphthenic oils, white oils, combinations thereof, or derivatives thereof 51. The adhesive of claim 1, wherein the adhesive further comprises one or more polymeric additives selected from the group consisting of homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

52. The adhesive of claim 1, wherein the adhesive further comprises one or more plasticizers selected from the group consisting of mineral oils, polybutenes, phthalates, and combinations thereof.

53. The adhesive of claim 1, wherein the adhesive further comprises one or more plasticizers selected from the group consisting of di-iso-undecyl phthalate, di-iso-nonylphthalate, dioctylphthalates, combinations thereof, or derivatives thereof.

54. The adhesive of claim 1, wherein the polymer has a peak melting point between 80 and 140° C.

55. adhesive of claim 1, wherein the polymer has a Tg of −20° C. or less.

56. The adhesive of claim 4 wherein the polymer has a melt index of 50 dg/min or more.

57. The adhesive of claim 1, wherein the polymer has a set time of 30 seconds or less.

58. The adhesive of claim 1, wherein the polymer has a Tc that is at least 10° C. below the Tm.

59. The adhesive of claim 1, wherein the polymer has an 110/12 of 6.5 or less.

60. The adhesive of claim 1, wherein the polymer has a range of crystallization of 10 to 60° C. wide.

61. A packaging adhesive comprising the adhesive of claim 1.

62. The pressure sensitive adhesive comprising the adhesive composition of claim 1, wherein the size exclusion chromotography trace of the polymer is bi-modal.

63. The pressure sensitive adhesive of claim 62, wherein the adhesive composition has a glass transition temperature (Tg) of from −65° C. to 30° C.

64. The pressure sensitive adhesive of claim 62, wherein the adhesive composition has a storage modulus of from $1 \times 10^4$ to $1 \times 10^7$ dynes/cm$^2$ at 25° C. and 1 radian/second.

65. The pressure sensitive adhesive of claim 62, wherein the adhesive composition has a Brookfield viscosity of 20,000 mPa·s or less at 150° C.

66. The pressure sensitive adhesive of claim 62, wherein the pressure sensitive adhesive has a brookfiled viscosity of 10,000 mPa·s or less at 190° C.

67. The pressure sensitive adhesive of claim 62, wherein the pressure sensitive adhesive has a set time of 30 minutes or less.

68. The pressure sensitive adhesive of claim 62, wherein the pressure sensitive adhesive composition is a consumer article.

69. A hot melt adhesive composition comprising the adhesive composition of claim 1.

70. The hot melt adhesive composition of claim 69, wherein the adhesive composition has a percent substrate fiber tear of from 75% to 100% at 25° C.

71. The hot melt adhesive composition of claim 69, wherein the adhesive composition has a percent substrate fiber tear of from 95% to 100% at 25° C.

72. The hot melt adhesive composition of claim 69, wherein the adhesive composition has a percent substrate fiber tear of from 50% to 100% at −20° C.

73. The hot melt adhesive composition of claim 69, wherein the adhesive composition has a percent substrate fiber tear of from 95% to 100% at −20° C.

74. The hot melt adhesive composition of claim 69, wherein the adhesive composition has a PAFT of 200° C. or less.

75. The hot melt adhesive composition of claim 69, wherein the adhesive composition has a SAFT of 200° C. or less.

76. The hot melt adhesive composition of claim 69, wherein the adhesive composition has a tensile strength at break of 20 bar or more at 25° C.

77. The hot melt adhesive composition of claim 69, wherein the adhesive composition has an tensile strength at break of 27 bar or more at 25° C.

78. The hot melt adhesive composition of claim 69, wherein the adhesive composition has an tensile strength at break of 34 bar or more at 25° C.

79. The hot melt adhesive composition of claim 69, wherein the adhesive composition has an tensile strength at break of 55 bar or more at 25° C.

80. The hot melt adhesive composition of claim 69, wherein the adhesive composition has a percent elongation of 200% or more strain of the original length at 25° C.

81. The hot melt adhesive composition of claim 69, wherein the adhesive composition has a cloud point of 100° C. or less.

82. The hot melt adhesive composition of claim 69, wherein the hot melt adhesive composition is a consumer good.

83. A glue stick comprising an elongated member that includes the adhesive composition of claim 1.

84. The glue stick of claim 83, wherein the glue stick produces an adhesive deposition on a substrate upon application of pressure or heat.

85. The glue stick of claim 84, wherein the substrate is selected from the group consisting of paper, paperboard, containerboard, tagboard, corrugated board, chipboard, kraft, cardboard, fiberboard, plastic resin, metal, metal alloys, foil, film, plastic film, laminates, sheeting, wood, plastic, polystyrene, nylon, polycarbonate, polypropylene, styrofoam, porous substrates, polyvinylchloride, walls, and polyester.

86. The glue stick of claim 83, wherein the adhesive composition further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers, water, fragrances, fire retardants, colorants, antibiotics, antiseptics, antifungal agents, inorganic salts, gelling agents, binders, surfactants, bases, antimicrobial agents, and anti-foaming agents.

87. The glue stick of claim 83, wherein the adhesive composition further comprises one or more fillers selected from the group consisting of polyethylene, titanium oxide, and calcium carbonate.

88. The glue stick of claim 83, wherein the adhesive composition comprises from 5 to 30 percent by weight of the one or more inorganic salts.

89. The glue stick of claim 83, wherein the adhesive composition comprises 5 percent by weight or less of the one or more colorants, dyes, antioxidants, fragrances, or pigments.

90. The glue stick of claim 83, wherein the adhesive composition comprises 1 percent by weight or less of the one or more antimicrobial agents.

91. The glue stick of claim 83, wherein the adhesive composition has a percent substrate fiber tear of from 75% to 100% at 25° C.

92. The glue stick of claim 83, wherein the adhesive composition has a percent substrate fiber tear of from 95% to 100% at 25° C.

93. The glue stick of claim 83, wherein the adhesive composition has a PAFT of 60° C. or more.

94. The glue stick of claim 83, wherein the adhesive composition has a SAFT of 70° C. or more.

95. The glue stick of claim 83, wherein the adhesive composition has a viscosity of from 1 Pa·s to 50 Pa·s at 177° C.

96. The glue stick of claim 83, wherein the adhesive composition has a softening point of from 70 to 100° C.

97. The glue stick of claim 83, wherein the adhesive composition has an application temperature of 190° C. or less.

98. The glue stick of claim 83, wherein the adhesive composition has a Dot T-Peel of from 3 N to 4,000 N.

99. The adhesive of claim 1, wherein the polymer has an amorphous content of at least about 60%.

100. The adhesive of claim 1, wherein the polymer has an amorphous content of at least about 70%.

101. The adhesive of claim 1, wherein the polymer has an amorphous content of between about 50 and about 99%.

102. The adhesive of claim 1, wherein the polymer has a percent crystallinity of between about 5% and about 40%.

103. An adhesive comprising a polymer comprising at least 50 mol % of one or more C3 to C40 olefins where the polymers has:
a) a Dot T-Peel of 1 Newton or more on Kraft paper;
b) an Mw of 10,000 to 100,000;
c) a branching index (g') of 0.98 or less measured at the Mz of the polymer when the polymer has an Mw of 10,000 to 60,000, or
a branching index (g') of 0.95 or less measured at the Mz of the polymer when the polymer has an Mw of 10,000 to 100,000;
d) an amorphous content of at least 50%;
e) a crystallinity of at least 5%,
f) a Tg of −10° C. or less;
g) a melt viscosity between 2000 and 6000 mPa·sec at 190° C.;
h) a molecular weight distribution (Mw/Mn) of at least 5; and
i) a bi- or multi-modal SEC graph of the polymer.

104. The adhesive of claim 103, wherein the polymer has a set time of 5 seconds or less.

105. The adhesive of claim 103, wherein the polymer has a percent crystallinity of between 5 and 40%.

106. The adhesive of claim 18 wherein the polymer has:
a) a Dot T-Peel of 1 Newton or more on Kraft paper;
b) a branching index (g') of 0.98 or less measured at the Mz of the polymer;
c) a Mw of 10,000 to 60,000; and
d) a heat of fusion of 1 to 50 J/g.

107. The adhesive of claim 103, wherein the polymer is a homopolypropylene or a copolymer of propylene and up to 5 mole % ethylene having:
a) an isotactic run length of 1 to 30,
b) a percent of r dyad of greater than 20%,
c) a heat of fusion of between 1 and 70 J/g; and
d) a g' measured at the Mz of 0.95 or less.

108. The adhesive of claim 103, wherein the polymer comprises propylene and less than 15 mole % of ethylene.

109. The adhesive of claim 103, wherein the polymer has a melt viscosity of 5000 mPa·sec or less at 190° C.

110. The adhesive of claim 103, wherein the polymer has an Mw of 10,000 to 75,000 and a branching index of 0.6 or less.

111. The adhesive of claim 103, wherein the polymer has an Mw of 10,000 to 50,000 and a branching index of 0.7 or less.

112. The adhesive of claim 103, wherein the polymer has an Mw of 10,000 to 30,000 and a branching index of 0.98 or less.

113. The adhesive of claim 103, wherein the polymer has a branching index (g') of 0.90 or less measured at the Mz of the polymer.

114. The adhesive of claim 103, wherein the polymer has 20 wt. % or more of hexane room temperature soluble fraction and 50 wt % or less of Soxhlet heptane insolubles.

115. The adhesive of claim 18 further comprising a functionalized wax.

116. The adhesive of claim 18 further comprising a wax.

117. The adhesive of claim 103, further comprising a hydrocarbon resin.

118. The adhesive of claim 103, wherein the polymer has an Mz/Mn of 2 to 200.

119. The adhesive of claim 103, wherein the polymer has an Mz of 15,000 to 500,000.

120. The adhesive of claim 103, wherein the polymer has a SAFT of 50 to 150° C.

121. The adhesive of claim 103, wherein the polymer has a Shore A hardness of 90 or less.

122. The adhesive of claim 103, wherein the polymer has a set time of 5 seconds or less.

123. The adhesive of claim 103, wherein the g' is 0.90 or less.

124. The adhesive of claim 103, wherein the g' is 0.80 or less.

125. The adhesive of claim 103, wherein the polymer has a heat of fusion greater than 10 J/g.

126. The adhesive of claim 103, wherein the polymer has heat of fusion of from 20 to 70 J/g.

127. The adhesive of claim 103, wherein the polymer has heat of fusion of from 30 to 60 J/g.

128. The adhesive of claim 103, wherein the polymer has a percent crystallinity of 10-30%.

129. The adhesive of claim 103, wherein the polymer has tensile strength at break of 0.75 MPa or more.

130. The adhesive of claim 103, wherein the polymer has a SAFT of 100-130° C.

131. The adhesive of claim 103, wherein the polymer has a Shore A hardness of 20-90.

132. The adhesive of claim 103, wherein the polymer has a Dot T-Peel of between 3 and 10,000 N.

133. The adhesive of claim 103, wherein the polymer has a Dot T-Peel of between 10 and 2,000 N.

134. The adhesive of claim 103, wherein the polymer has a tensile strength at break of 0.6 MPa or more.

135. The adhesive of claim 103, wherein the polymer comprises at least 50 weight % propylene.

136. The adhesive of claim 103, wherein the polymer comprises at least 50 weight % propylene and up to 50 weight % of a comonomer selected from the group consisting of ethylene, butene, hexene, octene, decene, dodecene, pentene, heptene, nonene, 4-methyl-pentene-1,3-methyl pentene-1,3,5,5-trimethyl-hexene-1, and 5-ethyl-1-nonene.

137. The adhesive of claim 103, wherein the polymer comprises at least 50 weight % propylene and 5 weight % or less of ethylene.

138. The adhesive of claim 103, wherein the polymer comprises up to 10 weight % of a diene selected from the group consisting of: butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, and dicyclopentadiene.

139. The adhesive of claim 103, wherein the adhesive further comprises one or more tackifiers.

140. The adhesive of claim 103, wherein the adhesive further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof.

141. The adhesive of claim 103, wherein the adhesive further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof.

142. The adhesive of claim 103, wherein the adhesive further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

143. The adhesive of claim 103, wherein the adhesive further comprises one or more aliphatic naphthenic oils, white oils, combinations thereof, or derivatives thereof.

144. The adhesive of claim 103, wherein the adhesive further comprises one or more polymeric additives selected from the group consisting of homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

145. The adhesive of claim 103, wherein the adhesive further comprises one or more plasticizers selected from the group consisting of mineral oils, polybutenes, phthalates, and combinations thereof.

146. The adhesive of claim 103, wherein the adhesive further comprises one or more plasticizers selected from the group consisting of di-iso-undecyl phthalate, di-iso-nonylphthalate, dioctylphthalates, combinations thereof, or derivatives thereof.

147. The adhesive of claim 103, wherein the polymer has a peak melting point between 80 and 140° C.

148. The adhesive of claim 103, wherein the polymer has a Tg of −20° C. or less.

149. The adhesive of claim 103, wherein the polymer has a melt index of 50 dg/min or more.

150. The adhesive of claim 103, wherein the polymer has a set time of 30 seconds or less.

151. The adhesive of claim 103, wherein the polymer has a Tc that is at least 10° C. below the Tm.

152. The adhesive of claim 103, wherein the polymer has an I10/I2 of 6.5 or less.

153. The adhesive of claim 103, wherein the polymer has a range of crystallization of 10 to 60° C. wide.

154. A packaging adhesive comprising the adhesive of claim 103.

155. The pressure sensitive adhesive of claim 103, wherein the pressure sensitive adhesive composition is a consumer article.

156. The pressure sensitive adhesive of claim 155, wherein the adhesive composition has a storage modulus of from $1\times10^4$ to $\times10^7$ dynes/cm$^2$ at 25° C. and 1 radian/second.

157. The pressure sensitive adhesive of claim 155, wherein the adhesive composition has a Brookfield viscosity of 20,000 mPa·s or less at 150° C.

158. The pressure sensitive adhesive of claim 155, wherein the size exclusion chromotography trace of the polymer is bi-modal.

159. The pressure sensitive adhesive of claim 155, wherein the pressure sensitive adhesive has a set time of 30 minutes or less.

160. A hot melt adhesive composition comprising the adhesive composition of claim 103.

161. The hot melt adhesive composition of claim 160, wherein the adhesive composition has a percent substrate fiber tear of from 75o to 100% at 25° C.

162. The hot melt adhesive composition of claim 160, wherein the adhesive composition has a percent substrate fiber tear of from 95% to 100% at 25° C.

163. The hot melt adhesive composition of claim 160, wherein the adhesive composition has a percent substrate fiber tear of from 50% to 100% at −20° C.

164. The hot melt adhesive composition of claim 160, wherein the adhesive composition has a percent substrate fiber tear of from 95% to 100% at −20° C.

165. The hot melt adhesive composition of claim 160, wherein the adhesive composition has a PAFT of 200° C. or less.

166. The hot melt adhesive composition of claim 160, wherein the adhesive composition has a SAFT of 200° C. or less.

167. The hot melt adhesive composition of claim 160, wherein the adhesive composition has a tensile strength at break of 20 bar or more at 25° C.

168. The hot melt adhesive composition of claim 160, wherein the adhesive composition has a tensile strength at break of 27 bar or more at 25° C.

169. The hot melt adhesive composition of claim 160, wherein the adhesive composition has a tensile strength at break of 34 bar or more at 25° C.

170. The hot melt adhesive composition of claim 160, wherein the adhesive composition has a tensile strength at break of 55 bar or more at 25° C.

171. The hot melt adhesive composition of claim 160, wherein the adhesive composition has a percent elongation of 200% or more strain of the original length at 25° C.

172. The hot melt adhesive composition of claim 160, wherein the adhesive composition has a cloud point of 100° C. or less.

173. The hot melt adhesive composition of claim 160, wherein the hot melt adhesive composition is a consumer good.

174. A glue stick comprising an elongated member that includes the adhesive composition of claim 103.

175. The glue stick of claim 174, wherein the glue stick produces an adhesive deposition on a substrate upon application of pressure or heat.

176. The glue stick of claim 175, wherein the substrate is selected from the group consisting of paper, paperboard, containerboard, tagboard, corrugated board, chipboard, krait, cardboard, fiberboard, plastic resin, metal, metal alloys, foil, film, plastic film, laminates, sheeting, wood, plastic, polystyrene, nylon, polycarbonate, polypropylene, styrofoam, porous substrates, polyvinylchloride, walls, and polyester.

177. The glue stick of claim 174, wherein the adhesive composition further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers, water, fragrances, fire retardants, colorants, antibiotics, antiseptics, antifungal agents, inorganic salts, gelling agents, binders, surfactants, bases, antimicrobial agents, and anti-foaming agents.

178. The glue stick of claim 174, wherein the adhesive composition further comprises one or more fillers selected from the group consisting of polyethylene, titanium oxide, and calcium carbonate.

179. The glue stick of claim 174, wherein the adhesive composition comprises from 5 to 30 percent by weight of the one or more inorganic salts.

180. The glue stick of claim 174, wherein the adhesive composition comprises 5 percent by weight or less of the one or more colorants, dyes, antioxidants, fragrances, or pigments.

181. The glue stick of claim 174, wherein the adhesive composition comprises 1 percent by weight or less of the one or more antimicrobial agents.

182. The glue stick of claim 174, wherein the adhesive composition has a percent substrate fiber tear of from 75% to 100% at 25° C.

183. The glue stick of claim 174, wherein the adhesive composition has a percent substrate fiber tear of from 95% to 100% at 25° C.

184. The glue stick of claim 174, wherein the adhesive composition has a PAFT of 60° C. or more.

185. The glue stick of claim 174, wherein the adhesive composition has a SAFT of 70° C. or more.

186. The glue stick of claim 174, wherein the adhesive composition has an application temperature of 190° C. or less.

187. The glue stick of claim 174, wherein the adhesive composition has a Dot T-Peel of from 3 N to 4,000 N.

188. The adhesive of claim 103, wherein the polymer has an amorphous content of at least about 60%.

189. The adhesive of claim 103, wherein the polymer has an amorphous content of at least about 70%.

190. The adhesive of claim 103, wherein the polymer has an amorphous content of between about 50 and about 99%.

191. An adhesive comprising a polymer comprising at least 50 mol % of one or more C3 to C40 olefins where the polymers has:
  a) a Dot T-Peel of 1 Newton or more on Kraft paper;
  b) an Mw of 10,000 to 100,000;
  c) a branching index (g') of 0.98 or less measured at the Mz of the polymer when the polymer has an Mw of 10,000 to 60,000, or
    a branching index (g') of 0.95 or less measured at the Mz of the polymer when the polymer has an Mw of 10,000 to 100,000;
  d) an amorphous content of at least 50%;
  e) a crystallinity of at least 50%,
wherein the polymer comprises less than 3.0 mole % ethylene.

192. The adhesive of claim 191, wherein the polymer comprises less than 1.0 mole % ethylene.

193. The adhesive of claim 191, wherein the polymer has a set time of 5 seconds or less.

194. The adhesive of claim 191, wherein the polymer has a percent crystallinity of between 5 and 40%.

195. The adhesive of claim 191, wherein the polymer has:
a) a Dot T-Peel of 1 Newton or more on Kraft paper;
b) a branching index (g') of 0.98 or less measured at the Mz of the polymer;
c) a Mw of 10,000 to 60,000; and
d) a heat of fusion of 1 to 50 J/g.

196. The adhesive of claim 191, wherein the polymer is a homopolypropylene or a copolymer of propylene and up to 5 mole % ethylene having:
a) an isotactic run length of 1 to 30,
b) a percent of r dyad of greater than 20%,
c) a heat of fusion of between 1 and 70 J/g; and
d) a g' measured at the Mz of 0.95 or less.

197. The adhesive of claim 191, wherein the polymer has a melt viscosity of 7000 mPa·sec or less at 190° C.

198. The adhesive of claim 191, wherein the polymer has a melt viscosity of 5000 mPa·sec or less at 190° C.

199. The adhesive of claim 191, wherein the polymer has a melt viscosity of between 250 and 6000 mPa·sec at 190° C.

200. The adhesive of claim 191, wherein the polymer has a melt viscosity of between 500 and 3000 mPa·sec at 190° C.

201. The adhesive of claim 191, wherein the polymer has an Mw of 10,000 to 75,000 and a branching index of 0.6 or less.

202. The adhesive of claim 191, wherein the polymer has an Mw of 10,000 to 50,000 and a branching index of 0.7 or less.

203. The adhesive of claim 191, wherein the polymer has an Mw of 10,000 to 30,000 and a branching index of 0.98 or less.

204. The adhesive of claim 191, wherein the polymer has a branching index (g') of 0.90 or less measured at the Mz of the polymer.

205. The adhesive of claim 191, wherein the polymer has
a) a peak melting point between 60 and 190° C.;
b) a heat of fusion of 0 to 70 J/g; and
c) a melt viscosity of 8000 mPa·sec or less at 1 90° C.

206. The adhesive of claim 191, wherein the polymer has 20 wt. % or more of hexane room temperature soluble fraction and 50 wt % or less of Soxhlet heptane insolubles.

207. The adhesive of claim 191 further comprising a functionalized wax.

208. The adhesive of claim 191 further comprising a wax.

209. The adhesive of claim 191 further comprising a hydrocarbon resin.

210. The adhesive of claim 191, wherein the polymer has an Mz of 15,000 to 500,000.

211. The adhesive of claim 191, wherein the polymer has a SAFT of 50 to 150° C.

212. The adhesive of claim 191, wherein the polymer has a Shore A hardness of 90 or less.

213. The adhesive of claim 191, wherein the polymer has a set time of 5 seconds or less.

214. The adhesive of claim 191, wherein the polymer has an Mw/Mn of 2 to 75.

215. The adhesive of claim 191, wherein the polymer has a percent crystallinity of between 5 and 40%.

216. The adhesive of claim 191, wherein the g' is 0.90 or less.

217. The adhesive of claim 191, wherein the g' is 0.80 or less.

218. The adhesive of claim 191, wherein the polymer has a viscosity at 190° C. of 20,000 mPa·s or less.

219. The adhesive of claim 191, wherein the polymer has a viscosity at 160° C. of 8,000 mPa·s or less.

220. The adhesive of claim 191, wherein the polymer has a heat of fusion greater than 10 J/g.

221. The adhesive of claim 191, wherein the polymer has heat of fusion of from 20 to 70 J/g.

222. The adhesive of claim 191, wherein the polymer has heat of fusion of from 30 to 60 J/g.

223. The adhesive of claim 191, wherein the polymer has a percent crystallinity of 10-30%.

224. The adhesive of claim 191, wherein the polymer has tensile strength at break of 0.75 MPa or more.

225. The adhesive of claim 191, wherein the polymer has a SAFT of 100-130° C.

226. The adhesive of claim 191, wherein the polymer has an Mz/Mn of 2 to 200.

227. The adhesive of claim 191, wherein the polymer has a Shore A hardness of 20-90.

228. The adhesive of claim 191, wherein the polymer has a Dot T-Peel of between 3 and 10,000 N.

229. The adhesive of claim 191, wherein the polymer has a Dot T-Peel of between 10 and 2,000 N.

230. The adhesive of claim 191, wherein the polymer has a tensile strength at break of 0.6 MPa or more.

231. The adhesive of claim 191, wherein the polymer has a Tg of between 5 and −65° C.

232. The adhesive of claim 191, wherein the polymer comprises at least 50 weight % propylene.

233. The adhesive of claim 191, wherein the polymer comprises at least 50 weight % propylene and up to 50 weight % of a comonomer selected from the group consisting of ethylene, butene, hexene, octene, decene, dodecene, pentene, heptene, nonene, 4-methyl-pentene-1, 3-methyl pentene- 1,3,5, 5-trimethyl-hexene- 1, and 5-ethyl-1-nonene.

234. The adhesive of claim 191, wherein the polymer comprises up to 10 weight % of a diene selected from the group consisting of: butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, ethylidene norbornene, divinylbenzene, and dicyclopentadiene.

235. The adhesive of claim 191, wherein the adhesive further comprises one or more tackifiers.

236. The adhesive of claim 191, wherein the adhesive further comprises one or more tackifiers selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin esters, derivatives thereof, and combinations thereof 237. The adhesive of claim 191, wherein the adhesive further comprises one or more waxes selected from the group consisting of polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations thereof 238. The adhesive of claim 191, wherein the adhesive further comprises one or more additives selected from the group consisting of plasticizers, oils, stabilizers, antioxidants, pigments, dyestuffs, polymeric additives, defoamers, preservatives, thickeners, rheology modifiers, humectants, fillers and water.

239. The adhesive of claim 191, wherein the adhesive further comprises one or more aliphatic naphthenic oils, white oils, combinations thereof, or derivatives thereof.

240. The adhesive of claim 191, wherein the adhesive further comprises one or more polymeric additives selected from the group consisting of homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

241. The adhesive of claim 191, wherein the adhesive further comprises one or more plasticizers selected from the group consisting of mineral oils, polybutenes, phthalates, and combinations thereof.

242. The adhesive of claim 191, wherein the adhesive further comprises one or more plasticizers selected from the group consisting of di-iso-undecyl phthalate, di-iso-nonylphthalate, dioctylphthalates, combinations thereof, or derivatives thereof.

243. The adhesive of claim 191, wherein the polymer has a peak melting point between 80 and 140° C.

244. The adhesive of claim 191, wherein the polymer has a Tg of -20° C. or less.

245. The adhesive of claim 191, wherein the polymer has a melt index of 50 dg/min or more.

246. The adhesive of claim 191, wherein the polymer has a set time of 30 seconds or less.

247. The adhesive of claim 191, wherein the polymer has a Tc that is at least 10° C. below the Tm.

248. The adhesive of claim 191, wherein the polymer has an I10/I2 of 6.5 or less.

249. The adhesive of claim 191, wherein the polymer has a range of crystallization of 10 to 60° C. wide.

250. A packaging adhesive comprising the adhesive of claim 191.

251. A pressure sensitive adhesive comprising the adhesive of claim 191.

252. The pressure sensitive adhesive of claim 251, wherein the adhesive composition has a glass transition temperature (Tg) of from -65° C. to 30° C.

253. The pressure sensitive adhesive of claim 251, wherein the adhesive composition has a storage modulus of from $1 \times 10^4$ to $1 \times 10^7$ dynes/cm$^2$ at 25° C. and 1 radian/second.

254. The pressure sensitive adhesive of claim 251, wherein the adhesive composition has a Brookfield viscosity of 20,000 mPa·s or less at 150° C.

255. The pressure sensitive adhesive of claim 251, wherein the size exclusion chromotography trace of the polymer is bi-modal.

256. The pressure sensitive adhesive of claim 251, wherein the pressure sensitive adhesive has a brookfiled viscosity of 10,000 mPa·s or less at 190° C.

257. The pressure sensitive adhesive of claim 251, wherein the pressure sensitive adhesive has a set time of 30 minutes or less.

258. The pressure sensitive adhesive of claim 251, wherein the pressure sensitive adhesive composition is a consumer article.

259. A hot melt adhesive composition comprising the adhesive composition of claim 191.

260. The hot melt adhesive composition of claim 259, wherein the adhesive composition has a percent substrate fiber tear of from 75% to 100% at 25° C.

261. The hot melt adhesive composition of claim 259, wherein the adhesive composition has a percent substrate fiber tear of from 95% to 100% at 25° C.

262. The hot melt adhesive composition of claim 259, wherein the adhesive composition has a percent substrate fiber tear of from 50% to 100% at -20° C.

263. The hot melt adhesive composition of claim 259, wherein the adhesive composition has a percent substrate fiber tear of from 95% to 100% at -20° C.

264. The hot melt adhesive composition of claim 259, wherein the adhesive composition has a PAFT of 200° C. or less.

265. The hot melt adhesive composition of claim 259, wherein the adhesive composition has a SAFT of 200° C. or less.

266. The hot melt adhesive composition of claim 259, wherein the adhesive composition has a tensile strength at break of 20 bar or more at 25° C.

267. The hot melt adhesive composition of claim 259, wherein the adhesive composition has an tensile strength at break of 27 bar or more at 25° C.

268. The hot melt adhesive composition of claim 259, wherein the adhesive composition has an tensile strength at break of 34 bar or more at 25° C.

269. The hot melt adhesive composition of claim 259, wherein the adhesive composition has an tensile strength at break of 55 bar or more at 25° C.

270. The hot melt adhesive composition of claim 259, wherein the adhesive composition has a percent elongation of 200% or more strain of the original length at 25° C.

271. The hot melt adhesive composition of claim 259, wherein the adhesive composition has a cloud point of 100° C. or less.

272. The hot melt adhesive composition of claim 259, wherein the hot melt adhesive composition is a consumer good.

273. A glue stick comprising an elongated member that includes the adhesive composition of claim 191.

274. The glue stick of claim 273, wherein the glue stick produces an adhesive deposition on a substrate upon application of pressure or heat.

275. The glue stick of claim 273, wherein the substrate is selected from the group consisting of paper, paperboard, containerboard, tagboard, corrugated board, chipboard, kraft, cardboard, fiberboard, plastic resin, metal, metal alloys, foil, film, plastic film, laminates, sheeting, wood, plastic, polystyrene, nylon, polycarbonate, polypropylene, styrofoam, porous substrates, polyvinylchloride, walls, and polyester.

276. The glue stick of claim 273, wherein the adhesive composition further comprises one or more additives selected from the group consisting of plasticizers, oils, stabilizers, antioxidants, synergists, pigments, dyestuffs, polymeric additives, defoamers, preservatives, thickeners, rheology modifiers, humectants, fillers, water, fragrances, fire retardants, colorants, antibiotics, antiseptics, antifungal agents, inorganic salts, gelling agents, binders, surfactants, bases, antimicrobial agents, and anti-foaming agents.

277. The glue stick of claim 273, wherein the adhesive composition further comprises one or more fillers selected from the group consisting of polyethylene, titanium oxide, and calcium carbonate.

278. The glue stick of claim 273, wherein the adhesive composition comprises from 5 to 30 percent by weight of the one or more inorganic salts.

279. The glue stick of claim 273, wherein the adhesive composition comprises 5 percent by weight or less of the one or more colorants, dyes, antioxidants, fragrances, or pigments.

280. The glue stick of claim 273, wherein the adhesive composition comprises 1 percent by weight or less of the one or more antimicrobial agents.

281. The glue stick of claim 273, wherein the adhesive composition has a percent substrate fiber tear of from 75% to 100% at 25° C.

282. The glue stick of claim 273, wherein the adhesive composition has a percent substrate fiber tear of from 95% to 100% at 25° C.

283. The glue stick of claim 273, wherein the adhesive composition has a PAFT of 60° C. or more.

284. The glue stick of claim 273, wherein the adhesive composition has a SAFT of 70° C. or more.

285. The glue stick of claim 273, wherein the adhesive composition has a viscosity of from 1 Pa·s to 50 Pa·s at 177° C.

286. The glue stick of claim 273, wherein the adhesive composition has a softening point of from 70 to 100° C.

287. The glue stick of claim 273, wherein the adhesive composition has an application temperature of 190° C. or less.

288. The glue stick of claim 273, wherein the adhesive composition has a Dot T-Peel of from 3 N to 4,000 N.

289. The adhesive of claim 191, wherein the polymer has an amorphous content of at least about 60%.

290. The adhesive of claim 191, wherein the polymer has an amorphous content of at least about 70%.

291. The adhesive of claim 191, wherein the polymer has an amorphous content of between about 50 and about 99%.

292. An adhesive comprising a polymer comprising at least 50 mol % of one or more C3 to C40 olefins where the polymers has:
   a) a Dot T-Peel of 1 Newton or more on Kraft paper;
   b) an Mw of 10,000 to 100,000;
   c) a branching index (g') of 0.98 or less measured at the Mz of the polymer when the polymer has an Mw of 10,000 to 60,000, or
      a branching index (g') of 0.95 or less measured at the Mz of the polymer when the polymer has an Mw of 10,000 to 100,000;
   d) an amorphous content of at least 50%;
   e) a crystallinity of at least 50%,
wherein the polymer comprises less than 3.0 mole % ethylene.

293. The adhesive of claim 292, wherein the diolefin comprises one or more C4 to C40 diolefins.

294. The adhesive of claim 292 wherein the diolefin is selected from the group consisting of 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, cyclopentadiene, vinylnorbornene, norbornadiene, ethylidene norbornene, divinylbenzene, dicyclopentadiene, polybutadienes having an Mw less than 1000 g/mol, or combinations thereof.

* * * * *